US008396751B2

(12) United States Patent
Becker et al.

(10) Patent No.: US 8,396,751 B2

(45) Date of Patent: Mar. 12, 2013

(54) MANAGING CONSISTENT INTERFACES FOR MERCHANDISING BUSINESS OBJECTS ACROSS HETEROGENEOUS SYSTEMS

(75) Inventors: Markus Becker, Saarlouis (DE); Sascha Theiss, Bad Schoenborn (DE); Udo Lanzer, Blieskastel (DE); Ingo Braeuninger, Neuenstadt (DE)

(73) Assignee: SAP AG, Walldorf (DE)

( * ) Notice: Subject to any disclaimer, the term of this patent is extended or adjusted under 35 U.S.C. 154(b) by 216 days.

(21) Appl. No.: 12/571,140

(22) Filed: Sep. 30, 2009

(65) Prior Publication Data

US 2011/0078048 A1 Mar. 31, 2011

(51) Int. Cl.
*G06Q 30/00* (2012.01)

(52) U.S. Cl. ...................................... 705/26.1; 705/27.1

(58) Field of Classification Search .................... 705/26, 705/27, 26.1, 27.1
See application file for complete search history.

(56) References Cited

U.S. PATENT DOCUMENTS

| | | | |
|---|---|---|---|
| 3,223,321 | A | 12/1965 | Baumgartner, Walter |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |
| 6,222,533 | B1 | 4/2001 | Notani et al. |
| 6,226,675 | B1 | 5/2001 | Meltzer et al. |
| 6,229,551 | B1 | 5/2001 | Huang |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

"Enterprise Application Integration," by Julie Gable, Information Management Journal, Mar./Apr. 2002, 36, pp. 48-52.*

(Continued)

*Primary Examiner* — Jeffrey A Smith
*Assistant Examiner* — Anne Georgalas
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to merchandise and point-of-sale transaction business objects.

6 Claims, 371 Drawing Sheets

U.S. PATENT DOCUMENTS

| | | | |
|---|---|---|---|
| 6,311,165 | B1 | 10/2001 | Coutts et al. |
| 6,327,700 | B1 | 12/2001 | Chen et al. |
| 6,331,972 | B1 | 12/2001 | Harris et al. |
| 6,332,163 | B1 | 12/2001 | Bowman-Amuah |
| 6,424,979 | B1 | 7/2002 | Livingston et al. |
| 6,434,159 | B1 | 8/2002 | Woodward et al. |
| 6,438,594 | B1 | 8/2002 | Bowman-Amuah |
| 6,542,912 | B2 | 4/2003 | Meltzer et al. |
| 6,591,260 | B1 | 7/2003 | Schwartzhoff et al. |
| 6,725,122 | B2 | 4/2004 | Mori et al. |
| 6,738,747 | B1 | 5/2004 | Tanaka et al. |
| 6,745,229 | B1 | 6/2004 | Hauryluck et al. |
| 6,763,353 | B2 | 7/2004 | Li et al. |
| 6,775,647 | B1 | 8/2004 | Evans et al. |
| 6,868,370 | B1 | 3/2005 | Burbridge et al. |
| 6,937,992 | B1 | 8/2005 | Benda et al. |
| 6,970,844 | B1 | 11/2005 | Bierenbaum |
| 7,020,594 | B1 | 3/2006 | Chacon |
| 7,039,606 | B2 | 5/2006 | Hoffman et al. |
| 7,076,449 | B2 | 7/2006 | Tsunenari et al. |
| 7,131,069 | B1 | 10/2006 | Rush et al. |
| 7,206,768 | B1 | 4/2007 | deGroeve et al. |
| 7,249,157 | B2 | 7/2007 | Stewart et al. |
| 7,269,569 | B2 | 9/2007 | Spira et al. |
| 7,292,965 | B1 | 11/2007 | Mehta et al. |
| 7,321,864 | B1 | 1/2008 | Gendler |
| 7,363,271 | B2 | 4/2008 | Morimoto |
| 7,379,931 | B2 | 5/2008 | Morinville |
| 7,383,990 | B2 | 6/2008 | Veit |
| 7,406,358 | B2 | 7/2008 | Preiss |
| 7,481,367 | B2 | 1/2009 | Fees et al. |
| 7,509,278 | B2 | 3/2009 | Jones |
| 7,515,697 | B2 | 4/2009 | Eng et al. |
| 7,516,088 | B2 | 4/2009 | Johnson et al. |
| 7,536,697 | B2 | 5/2009 | Wiseman et al. |
| 7,574,383 | B1 | 8/2009 | Parasnis et al. |
| 7,617,328 | B2 | 11/2009 | Lewis et al. |
| 7,627,504 | B2 | 12/2009 | Brady et al. |
| 7,634,482 | B2 | 12/2009 | Mukherjee et al. |
| 7,788,319 | B2 | 8/2010 | Schmidt et al. |
| 7,805,383 | B2 | 9/2010 | Veit et al. |
| 7,853,491 | B2 | 12/2010 | Wittmer et al. |
| 7,865,426 | B2 | 1/2011 | Volpert |
| 7,873,965 | B2 | 1/2011 | Hayton et al. |
| 7,895,209 | B2 | 2/2011 | Spence et al. |
| 7,941,236 | B2 | 5/2011 | Spearman |
| 2001/0042032 | A1 | 11/2001 | Crawshaw et al. |
| 2002/0013721 | A1 | 1/2002 | Dabbiere et al. |
| 2002/0026394 | A1 | 2/2002 | Savage et al. |
| 2002/0046053 | A1 | 4/2002 | Hare et al. |
| 2002/0052754 | A1 | 5/2002 | Joyce et al. |
| 2002/0072988 | A1 | 6/2002 | Aram |
| 2002/0087481 | A1 | 7/2002 | Harif |
| 2002/0087483 | A1 | 7/2002 | Harif |
| 2002/0099634 | A1 | 7/2002 | Coutts et al. |
| 2002/0107765 | A1 | 8/2002 | Walker |
| 2002/0112171 | A1 | 8/2002 | Ginter et al. |
| 2002/0138318 | A1 | 9/2002 | Ellis et al. |
| 2002/0147668 | A1 | 10/2002 | Smith et al. |
| 2002/0152104 | A1 | 10/2002 | Ojha et al. |
| 2002/0152145 | A1 | 10/2002 | Wanta et al. |
| 2002/0156693 | A1 | 10/2002 | Stewart et al. |
| 2002/0156930 | A1 | 10/2002 | Velasquez |
| 2002/0157017 | A1 | 10/2002 | Mi et al. |
| 2002/0169657 | A1 | 11/2002 | Singh et al. |
| 2002/0184070 | A1 | 12/2002 | Chen et al. |
| 2002/0186876 | A1 | 12/2002 | Jones et al. |
| 2002/0194045 | A1 | 12/2002 | Shay et al. |
| 2003/0004799 | A1 | 1/2003 | Kish |
| 2003/0069648 | A1 | 4/2003 | Douglas et al. |
| 2003/0086594 | A1 | 5/2003 | Gross |
| 2003/0120502 | A1 | 6/2003 | Robb et al. |
| 2003/0120665 | A1 | 6/2003 | Fox et al. |
| 2003/0126077 | A1 | 7/2003 | Kantor et al. |
| 2003/0167193 | A1 | 9/2003 | Jones et al. |
| 2003/0171962 | A1 | 9/2003 | Hirth et al. |
| 2003/0172007 | A1 | 9/2003 | Helmolt et al. |
| 2003/0172135 | A1 | 9/2003 | Bobick et al. |
| 2003/0195815 | A1 | 10/2003 | Li et al. |
| 2003/0204452 | A1 | 10/2003 | Wheeler |
| 2003/0208389 | A1 | 11/2003 | Kurihara et al. |
| 2003/0212614 | A1 | 11/2003 | Chu et al. |
| 2003/0216978 | A1 | 11/2003 | Sweeney et al. |
| 2003/0220875 | A1 | 11/2003 | Lam et al. |
| 2003/0229522 | A1 | 12/2003 | Thompson et al. |
| 2003/0229550 | A1 | 12/2003 | DiPrima et al. |
| 2003/0233295 | A1 | 12/2003 | Tozawa et al. |
| 2003/0236748 | A1 | 12/2003 | Gressel et al. |
| 2004/0015366 | A1 | 1/2004 | Wiseman et al. |
| 2004/0024662 | A1 | 2/2004 | Gray et al. |
| 2004/0034577 | A1 | 2/2004 | Van Hoose et al. |
| 2004/0039665 | A1 | 2/2004 | Ouchi |
| 2004/0073510 | A1 | 4/2004 | Logan |
| 2004/0083201 | A1 | 4/2004 | Sholl et al. |
| 2004/0083233 | A1 | 4/2004 | Willoughby |
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0172360 | A1 | 9/2004 | Mabrey et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038744 | A1 | 2/2005 | Viijoen |
| 2005/0049903 | A1 | 3/2005 | Raja |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |

| | | | |
|---|---|---|---|
| 2006/0069598 A1 | 3/2006 | Schweitzer et al. | |
| 2006/0069629 A1 | 3/2006 | Schweitzer et al. | |
| 2006/0069632 A1 | 3/2006 | Kahn et al. | |
| 2006/0074728 A1 | 4/2006 | Schweitzer et al. | |
| 2006/0080338 A1 | 4/2006 | Seubert et al. | |
| 2006/0085336 A1 | 4/2006 | Seubert et al. | |
| 2006/0085412 A1 | 4/2006 | Johnson et al. | |
| 2006/0085450 A1 | 4/2006 | Seubert et al. | |
| 2006/0089885 A1 | 4/2006 | Finke et al. | |
| 2006/0095373 A1 | 5/2006 | Venkatasubramanian et al. | |
| 2006/0184435 A1 | 8/2006 | Mostowfi | |
| 2006/0212376 A1 | 9/2006 | Snyder et al. | |
| 2006/0280302 A1 | 12/2006 | Baumann et al. | |
| 2006/0282360 A1 | 12/2006 | Kahn et al. | |
| 2007/0027742 A1 | 2/2007 | Emuchay et al. | |
| 2007/0043583 A1 | 2/2007 | Davulcu et al. | |
| 2007/0055688 A1 | 3/2007 | Blattner | |
| 2007/0078799 A1 | 4/2007 | Huber-Buschbeck et al. | |
| 2007/0112574 A1 | 5/2007 | Greene | |
| 2007/0124227 A1 | 5/2007 | Dembo et al. | |
| 2007/0129978 A1 | 6/2007 | Shirasu et al. | |
| 2007/0132585 A1 | 6/2007 | Llorca et al. | |
| 2007/0150387 A1 | 6/2007 | Seubert et al. | |
| 2007/0150836 A1 | 6/2007 | Deggelmann et al. | |
| 2007/0156428 A1 | 7/2007 | Brecht-Tillinger et al. | |
| 2007/0156545 A1 | 7/2007 | Lin | |
| 2007/0156552 A1 | 7/2007 | Manganiello | |
| 2007/0156690 A1 | 7/2007 | Moser et al. | |
| 2007/0165622 A1 | 7/2007 | O'Rourke et al. | |
| 2007/0214065 A1* | 9/2007 | Kahlon et al. | 705/28 |
| 2007/0225949 A1 | 9/2007 | Sundararajan et al. | |
| 2007/0226090 A1 | 9/2007 | Stratton | |
| 2007/0255639 A1 | 11/2007 | Seifert | |
| 2007/0265860 A1 | 11/2007 | Herrmann et al. | |
| 2007/0265862 A1 | 11/2007 | Freund et al. | |
| 2007/0294159 A1 | 12/2007 | Cottle | |
| 2008/0005012 A1 | 1/2008 | Deneef | |
| 2008/0021754 A1 | 1/2008 | Horn et al. | |
| 2008/0040243 A1 | 2/2008 | Chang et al. | |
| 2008/0046104 A1 | 2/2008 | Van Camp et al. | |
| 2008/0046421 A1 | 2/2008 | Bhatia et al. | |
| 2008/0120129 A1 | 5/2008 | Seubert et al. | |
| 2008/0120190 A1 | 5/2008 | Joao et al. | |
| 2008/0120204 A1 | 5/2008 | Conner et al. | |
| 2008/0133303 A1 | 6/2008 | Singh et al. | |
| 2008/0154969 A1 | 6/2008 | DeBie | |
| 2008/0162266 A1 | 7/2008 | Griessmann et al. | |
| 2008/0184265 A1 | 7/2008 | Kasi et al. | |
| 2008/0196108 A1 | 8/2008 | Dent et al. | |
| 2008/0215354 A1 | 9/2008 | Halverson et al. | |
| 2008/0243578 A1 | 10/2008 | Veit | |
| 2008/0288317 A1 | 11/2008 | Kakar | |
| 2009/0006203 A1 | 1/2009 | Fordyce et al. | |
| 2009/0063287 A1 | 3/2009 | Tribout et al. | |
| 2009/0077074 A1 | 3/2009 | Hosokawa | |
| 2009/0089198 A1 | 4/2009 | Kroutik | |
| 2009/0164497 A1 | 6/2009 | Steinmaier et al. | |
| 2009/0192926 A1 | 7/2009 | Tarapata | |
| 2009/0193432 A1 | 7/2009 | McKegney et al. | |
| 2009/0222360 A1 | 9/2009 | Schmitt et al. | |
| 2009/0248431 A1 | 10/2009 | Schoknecht et al. | |
| 2009/0248547 A1 | 10/2009 | Doenig et al. | |
| 2009/0271245 A1 | 10/2009 | Joshi et al. | |
| 2009/0300578 A1 | 12/2009 | Neil | |
| 2009/0326988 A1 | 12/2009 | Barth et al. | |
| 2010/0014510 A1 | 1/2010 | Boreli et al. | |
| 2010/0070391 A1 | 3/2010 | Storr et al. | |
| 2010/0070395 A1 | 3/2010 | Elkeles et al. | |
| 2010/0106555 A1 | 4/2010 | Mneimneh et al. | |
| 2010/0161425 A1 | 6/2010 | Sideman | |
| 2011/0046775 A1 | 2/2011 | Bailey et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

SAP Structured Entity Relationship Model (SAP-SERM) for R/3 System Release 4.0 Introduction and Index; Dec. 1998; 26 pages.

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_AnalystSummit_Vegas/2006_01_16Analyst_Summit_Vegas_009.pdf ; 36 pages.

"UML in the .com Enterprise: Modeling Corba, Components, XML/XMI and Metadata Workshop"; <http://www.omg.org/news/meetings/workshops/uml_presentations.htm>.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3.

Meltzer, Bart et al.; "XML and Electronic Commerce: Enabling the Network Economy"; SIGMOD Record; ACMPress; vol. 27, No. 4; Dec. 1998; pp. 21-24.

Huhns, Michael N. et al.; "Automating Supply-Chain Mangement"; Jul. 15-19, 2002; pp. 1017- 1024.

Soederstroem, Eva; "Standardising the Business Vocabulary of Standards"; SAC, Madrid, Spain; 2002; pp. 1048-1052.

Bastide, Remi et al.; "Formal Specification of Corba Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.; "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OGM Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 25, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: an Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.

Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.

Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Definition of "header" and "message header"; Newton's Telecom Dictionary; 18th Edition; 2002; pp. 347, 464.
Communication Pursuant to Article 94(3) issued in European Application No. 05766672.9 on Jul. 14, 2011; 4 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,155 on Oct. 31, 2011; 15 pages.
Notice of Allowance issued in U.S. Appl. No. 11/155,368 on Nov. 8, 2011; 7 pages.
Notice of Allowance issued in U.S. Appl. No. 11/775,821 on Sep. 21, 2011; 5 pages.
Notice of Allowance issued in U.S. Appl. No. 11/864,811 on Nov. 14, 2011; 8 pages.
Notice of Allowance issued in U.S. Appl. No. 11/640,422 on Sep. 29, 2011; 7 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Notice of Allowance issued in related U.S. Appl. No. 11/731,857 on Dec. 14, 2011; 7 pages.
Office Action issued in U.S. Appl. No. 12/323,116 on Jan. 27, 2012; 7 pages.
Notice of Allowance issued in U.S. Appl. No. 12/323,139 on Mar. 14, 2012; 10 pages.
Office Action issued in U.S. Appl. No. 12/571,154 on Apr. 2, 2012; 13 pages.
Office Action issued in related U.S. Appl. No. 12/059,860 on Jan. 23, 2012; 16 pages.
Notice of Allowance issued in U.S. Appl. No. 12/060,192 on Mar. 2, 2012; 18 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,618 on Dec. 22, 2011; 8 pages.
Office Action issued in U.S. Appl. No. 12/816,293 on Apr. 25, 2012; 10 pages.
Notice of Allowance issued in related U.S. Appl. No. 11/864,866 on Mar. 13, 2012; 7 pages.
Notice of Allowance issued in U.S. Appl. No. 11/775,821 on Dec. 30, 2011; 5 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012; 12 pages.
Office Action issued in related U.S. Appl. No. 11/864,863 on Dec. 22, 2011; 20 pages.

* cited by examiner

| Package | | | | | level1 | level2 | level3 | level4 | level5 | level6 | level7 | Data Type Name |
|---|---|---|---|---|---|---|---|---|---|---|---|---|
| Merchan-diseMes-sage 34000 | | | | | Merchan-diseMes-sage 34002 | | | | | | | MrchdsMsg 34004 |
| | MessageHeader 34006 | | | | | Message-Header 34008 | | | | | | BusinessDocu-mentMessage-Header 34010 |
| | Merchandise 34012 | | | | | Merchan-dise 34014 | | | | | | <MT>Mrchds (Mrchds) 34016 |
| | | | | | | | @actionCo de 34018 | | | | | ActionCode 34020 |
| | | | | | | | InternalID 34022 | | | | | NOSC_ProductInt ernalID 34024 |

FIG. 34-2

| Package | | | | | level1 | level2 | level3 | level4 | level5 | level6 | level7 | Data Type Name |
|---|---|---|---|---|---|---|---|---|---|---|---|---|
| | | | | | | | Materi-alType-Code 34026 | | | | | NOSC_MaterialTypeCode 34028 |
| | | | | | | | Material-Merchan-diseType-Code 34030 | | | | | MaterialMerchan-diseTypeCode 34032 |
| | | Receiving-Store 34034 | | | | | Receiving-Store 34036 | | | | | <MT>RcvgStore 34038 |
| | | | | | | | | StoreInter-nalID 34040 | | | | NOSC_StoreInternalID 34042 |

FIG. 34-3

| Package | | | | | level1 | level2 | level3 | level4 | level5 | level6 | level7 | Data Type Name |
|---|---|---|---|---|---|---|---|---|---|---|---|---|
| | | PointOfSaleProcessingCondition 34044 | | | | | PointOf-SaleProc-essing-Condition 34046 | | | | | <MT>PtOfSlProcg Cndn 34048 |
| | | | | | | | | PointOf-SaleRe-peatKe-yUsage-Code 34050 | | | | PointOfSaleRe-peatKeyUsage-Code 34052 |
| | | | | | | | | PriceRe-quiredIndi-cator 34054 | | | | Indicator 34056 |
| | | | | | | | | DiscountAl-lowedIndi-cator 34058 | | | | Indicator 34060 |

FIG. 34-4

| Package | | | | | level1 | level2 | level3 | level4 | level5 | level6 | level7 | Data Type Name |
|---|---|---|---|---|---|---|---|---|---|---|---|---|
| | | | | | | | | Weighting-ForPricin-gRequired-Indicator 34062 | | | | Indicator 34064 |
| | | | | | | | | TaxInclud-edIndicator 34066 | | | | Indicator 34068 |
| | | | | | | | | TextOn-PointOf-SaleRegis-terVisi-bleIndicator 34070 | | | | Indicator 34072 |
| | | Description 34074 | | | | | Description 34076 | | | | | <MT>Desc 34078 |
| | | | | | | | | Description 34080 | | | | SHORT_Description 34082 |

FIG. 34-5

| Package | | | | | level1 | level2 | level3 | level4 | level5 | level6 | level7 | Data Type Name |
|---|---|---|---|---|---|---|---|---|---|---|---|---|
| | | GlobalTradeItemNumber 34084 | | | | | Global-Trade-ItemNum-ber 34086 | | | | | <MT>GlobTrdItmNo 34088 |
| | | | | | | | | Product-StandardID 34090 | | | | NOSC_ProductStandardID 34092 |
| | | | | | | | | Measure-UnitCode 34094 | | | | MeasureUnitCode 34096 |
| | | | | | | | | Product-Standard-MainIndica-tor 34098 | | | | Indicator 34100 |
| | | QuantityUnit 34102 | | | | | Quanti-tyUnit 34104 | | | | | <MT>QtyUnit 34106 |

FIG. 34-6

| Package | | | | | level1 | level2 | level3 | level4 | level5 | level6 | level7 | Data Type Name |
|---|---|---|---|---|---|---|---|---|---|---|---|---|
| | | | | | | | | Measure-UnitCode 34108 | | | | MeasureUnitCode 34110 |
| | | | | | | | | BaseQuan-tityUnitIndi-cator 34112 | | | | Indicator 34114 |
| | | | | | | | | Supple-mentary-QuantityUnitUsage-Code 34116 | | | | Supplementary-QuantityUni-tUsageCode 34118 |
| | | Quantity-Conversion 34120 | | | | | Quantity-Conversion 34122 | | | | | <MT>QtyCnvrsn 34124 |
| | | | | | | | | Quantity 34126 | | | | Quantity 34128 |

FIG. 34-7

| Package | | | | | level1 | level2 | level3 | level4 | level5 | level6 | level7 | Data Type Name |
|---|---|---|---|---|---|---|---|---|---|---|---|---|
| | | | | | | | | CorrespondingQuantity 34130 | | | | Quantity 34132 |
| | | ProductCategory 34134 | | | | | ProductCategory 34136 | | | | | <MT>ProdCat 34138 |
| | | | | | | | | InternalID 34140 | | | | NOSC_ProductCategoryInternalID 34142 |
| | | | | | | | | ProductCategoryHierarchyID 34144 | | | | NOSC_ProductCategoryHierarchyID 34146 |

FIG. 34-8

| Package | | | | | level1 | level2 | level3 | level4 | level5 | level6 | level7 | Data Type Name |
|---|---|---|---|---|---|---|---|---|---|---|---|---|
| | | | | | | | | Pro-ductCate-goryHierar-chyType-Code 34148 | | | | ProductCategory-HierarchyType-Code 34150 |
| | | ConfigurableMaterialAssignment 34152 | | | | | Configur-ableMateri-alAssign-ment 34154 | | | | | <MT>ConfigblMtlAssgmt 34156 |
| | | | | | | | | Product-InternalID 34158 | | | | NOSC_ProductIn-tenalID 34160 |
| | | | | | | | | Product-StandardID 34162 | | | | NOSC_ProductStandardID 34164 |

FIG. 34-9

| Package | | | | | level1 | level2 | level3 | level4 | level5 | level6 | level7 | Data Type Name |
|---|---|---|---|---|---|---|---|---|---|---|---|---|
| | | ConfigurationPropertyValuation 34166 | | | | | Configura-tionProper-tyValuation 34168 | | | | | <MT>ConfignPrptyValn 34170 |
| | | | | | | | | Property-Valuation 34172 | | | | NOSC_PropertyValuation 34174 |
| | | | | | | | | Description 34176 | | | | SHORT_Description 34178 |
| | | | | | | | | Organisa-tionalAre-aName 34180 | | | | LANGUAGEINDEPENDENT_SHORT_Name 34182 |

FIG. 34-10

| Package | | | | | level1 | level2 | level3 | level4 | level5 | level6 | level7 | Data Type Name |
|---|---|---|---|---|---|---|---|---|---|---|---|---|
| | | Measure-Unit-CodeSpeci-ficDescrip-tion 34184 | | | | | Measure-Unit-CodeSpeci-ficDescrip-tion 34186 | | | | | <MT>MsrUnit-CodeSpcfcDesc 34188 |
| | | | | | | | | Measure-UnitCode 34190 | | | | MeasureUnitCode 34192 |
| | | | | | | | | Description 34194 | | | | SHORT_Description 34196 |
| | | TaxClassification 34198 | | | | | TaxClassi-fication 34200 | | | | | <MT>TxClass 34202 |
| | | | | | | | | Country-Code 34204 | | | | CountryCode 34206 |

FIG. 34-11

| Package | | | | | level1 | level2 | level3 | level4 | level5 | level6 | level7 | Data Type Name |
|---|---|---|---|---|---|---|---|---|---|---|---|---|
| | | | | | | | | Region-Code 34208 | | | | RegionCode 34210 |
| | | | | | | | | TaxJuris-diction-Code 34212 | | | | TaxJurisdiction-Code 34214 |
| | | | | | | | | TaxJuris-dictionSub-division-Code 34216 | | | | TaxJurisdiction-SubdivisionCode 34218 |
| | | | | | | | | TaxJuris-dictionSub-division-TypeCode 34220 | | | | TaxJurisdiction-SubdivisionType-Code 34222 |

FIG. 34-12

| Package | | | | | level1 | level2 | level3 | level4 | level5 | level6 | level7 | Data Type Name |
|---|---|---|---|---|---|---|---|---|---|---|---|---|
| | | | | | | | | Pro-ductTaxEventType-Code 34224 | | | | ProductTaxEvent-TypeCode 34226 |
| | | | | | | | | TaxType-Code 34228 | | | | TaxTypeCode 34230 |
| | | | | | | | | TaxRateTypeCode 34232 | | | | TaxRateTypeCode 34234 |
| | | | | | | | | TaxDe-ductibility-Code 34236 | | | | TaxDeductibility-Code 34238 |
| | | | | | | | | Percent 34240 | | | | Percent 34242 |

FIG. 34-13

| Package | | | | | level1 | level2 | level3 | level4 | level5 | level6 | level7 | Data Type Name |
|---|---|---|---|---|---|---|---|---|---|---|---|---|
| | | | | | | | | Pro-ductTaxa-tionCharac-teristic-sCode 34244 | | | | ProductTaxation-Characteristic-sCode 34246 |
| | | EmptiesBillOfMaterial 34248 | | | | | EmptiesBil-lOfMaterial 34250 | | | | | <MT>EmptsBillOfMtl 34252 |
| | | | | | | | | InternalID 34254 | | | | NOSC_BillOfMaterialInternalID 34256 |
| | | | | | | | | Usage-Code 34258 | | | | NOSC_BillOfMaterialUsageCode 34260 |
| | | | Variant 34262 | | | | | Variant 34264 | | | | <MT>EmptsBil-lOFMtlVar 34266 |

FIG. 34-14

| Package | | | | | level1 | level2 | level3 | level4 | level5 | level6 | level7 | Data Type Name |
|---|---|---|---|---|---|---|---|---|---|---|---|---|
| | | | | | | | | | ID 34268 | | | BillOfMaterialVari-antID 34270 |
| | | | | | | | | | Product-InternalID 34272 | | | NOSC_ProductIn-tenalID 34274 |
| | | | | | | | | | Product-StandardID 34276 | | | NOSC_ProductSta ndardID 34278 |
| | | | | | | | | | Measure-UnitCode 34280 | | | MeasureUnitCode 34282 |
| | | | | Item 34284 | | | | | Item 34286 | | | <MT>EmptsBil-lOFMtlItm 34288 |

FIG. 34-15

| Package | | | | | level1 | level2 | level3 | level4 | level5 | level6 | level7 | Data Type Name |
|---|---|---|---|---|---|---|---|---|---|---|---|---|
| | | | | | | | | | | ID 34290 | | BillOfMaterial-ItemID 34292 |
| | | | | | | | | | | Product-InternalID 34294 | | NOSC_ProductIn-tenalID 34296 |
| | | | | | | | | | | Product-StandardID 34298 | | NOSC_ProductSta ndardID 34300 |
| | | | | | | | | | | Quantity 34302 | | Quantity 34304 |
| | | MaterialMerchandiseBillOfMaterial 34306 | | | | | Material-Merchan-diseBillOf-Material 34308 | | | | | <MT>MtlMrchdsBil lOfMtl 34310 |

FIG. 34-16

| Package | | | | | level1 | level2 | level3 | level4 | level5 | level6 | level7 | Data Type Name |
|---|---|---|---|---|---|---|---|---|---|---|---|---|
| | | | | | | | | InternalID 34312 | | | | NOSC_BillOfMaterialInternalID 34314 |
| | | | | | | | | Usage-Code 34316 | | | | NOSC_BillOfMaterialUsageCode 34318 |
| | | | Variant 34320 | | | | | Variant 34322 | | | | <MT>MtlMrchdsBillOfMtlVar 34324 |
| | | | | | | | | | ID 34326 | | | BillOfMaterialVari-antID 34328 |
| | | | | | | | | | Product-InternalID 34330 | | | NOSC_ProductIn-tenalID 34332 |

FIG. 34-17

| Package | | | | | level1 | level2 | level3 | level4 | level5 | level6 | level7 | Data Type Name |
|---|---|---|---|---|---|---|---|---|---|---|---|---|
| | | | | | | | | | Product-StandardID 34334 | | | NOSC_ProductStandardID 34336 |
| | | | | Item 34338 | | | | | Item 34340 | | | <MT>MtlMrchdsBillOfMtlItm 34342 |
| | | | | | | | | | | ID 34344 | | BillOfMaterial-ItemID 34346 |
| | | | | | | | | | | Product-InternalID 34348 | | NOSC_ProductIn-tenalID 34350 |
| | | | | | | | | | | Product-StandardID 34352 | | NOSC_ProductStandardID 34354 |

FIG. 34-18

| Package | | | | | level1 | level2 | level3 | level4 | level5 | level6 | level7 | Data Type Name |
|---|---|---|---|---|---|---|---|---|---|---|---|---|
| | | | | | | | | | | Quantity 34356 | | Quantity 34358 |
| | | ProcurementPriceInformation 34360 | | | | | Procure-ment-PriceInfor-mation 34362 | | | | | <MT>ProcmtPrcInfo 34364 |
| | | | | | | | | Product-StandardID 34366 | | | | NOSC_ProductStandardID 34368 |
| | | | | | | | | Order-Measure-UnitCode 34370 | | | | MeasureUnitCode 34372 |
| | | | | | | | | Order-Transac-tionCur-rencyCode 34374 | | | | CurrencyCode 34376 |

FIG. 34-19

| Package | | | | | level1 | level2 | level3 | level4 | level5 | level6 | level7 | Data Type Name |
|---|---|---|---|---|---|---|---|---|---|---|---|---|
| | | | | | | | | Strate-gicPur-chasingOr-ganisa-tionID 34378 | | | | NOSC_OrganisationalCentreID 34380 |
| | | | | | | | | Supplier-InternalID 34382 | | | | NOSC_PartyID 34384 |
| | | | | | | | | ValidityPe-riod 34386 | | | | CLOSED_DatePeriod 34388 |
| | | | PriceSpecification 34390 | | | | | PriceSpeci-fication 34392 | | | | <MT>ProcmtPrIn-foPrSpec 34394 |

FIG. 34-20

| Package | | | | | level1 | level2 | level3 | level4 | level5 | level6 | level7 | Data Type Name |
|---|---|---|---|---|---|---|---|---|---|---|---|---|
| | | | | | | | | | PriceSpecificationElementTypeCode 34396 | | | NOSC_PriceSpecificationElementTypeCode 34398 |
| | | | | | | | | | PriceSpecificationElementCategoryCode 34400 | | | NOSC_PriceSpecificationElementCategoryCode 34402 |
| | | | | | | | | | ValidityPeriod 34404 | | | TimePointPeriod 34406 |
| | | | | | | | | | Amount 34408 | | | Amount 34410 |

FIG. 34-21

| Package | | | | | level1 | level2 | level3 | level4 | level5 | level6 | level7 | Data Type Name |
|---|---|---|---|---|---|---|---|---|---|---|---|---|
| | | | | | | | | | BaseQuantity 34412 | | | Quantity 34414 |
| | | | | | | | | | OrderPriceAmount 34416 | | | Amount 34418 |
| | | | | | | | | | OrderBaseQuantity 34420 | | | Quantity 34422 |
| | | | | ScaleLine 34424 | | | | | ScaleLine 34426 | | | <MT>ProcmtPrcInfoPrSpecScLine 34428 |
| | | | | | | | | | | ScaleAxisStep 34430 | | NOSC_ScaleAxisStep 34432 |

FIG. 34-22

| Package | | | | | level1 | level2 | level3 | level4 | level5 | level6 | level7 | Data Type Name |
|---|---|---|---|---|---|---|---|---|---|---|---|---|
| | | | | | | | | | | Amount 34434 | | Amount 34436 |
| | | SalesPriceInformation 34438 | | | | | SalesPriceInformation 34440 | | | | | <MT>SlsPrInfo 34442 |
| | | | | | | | | Product-StandardID 34444 | | | | NOSC_ProductStandardID 34446 |
| | | | | | | | | Measure-UnitCode 34448 | | | | MeasureUnitCode 34450 |
| | | | | | | | | SalesOr-ganisa-tionID 34452 | | | | NOSC_OrganisationalCentreID 34454 |

FIG. 34-23

| Package | | | | | level1 | level2 | level3 | level4 | level5 | level6 | level7 | Data Type Name |
|---|---|---|---|---|---|---|---|---|---|---|---|---|
| | | | | | | | | Distribu-tionChan-nelCode 34456 | | | | DsitributionChan-nelCode 34458 |
| | | | | | | | | ValidityPe-riod 34460 | | | | CLOSED_DatePer iod 34462 |
| | | | PriceSpecification 34464 | | | | | PriceSpeci-fication 34466 | | | | <MT>SlsPrInfoPrS pec 34468 |
| | | | | | | | | | PriceSpeci-ficationEle-mentType-Code 34470 | | | NOSC_PriceSpeci ficationElement-TypeCode 34472 |

FIG. 34-24

| Package | | | | | level1 | level2 | level3 | level4 | level5 | level6 | level7 | Data Type Name |
|---|---|---|---|---|---|---|---|---|---|---|---|---|
| | | | | | | | | | PriceSpecificationElementCategoryCode 34474 | | | NOSC_PriceSpecificationElementCategoryCode 34476 |
| | | | | | | | | | Amount 34478 | | | Amount 34480 |
| | | | | | | | | | BaseQuantity 34482 | | | Quantity 34484 |
| | | | | ScaleLine 34486 | | | | | ScaleLine 34488 | | | <MT>SlsPrInfoPrSpecScLine 34490 |
| | | | | | | | | | | ScaleAxisStep 34492 | | NOSC_ScaleAxisStep 34494 |

| Package | | | | | level1 | level2 | level3 | level4 | level5 | level6 | level7 | Data Type Name |
|---|---|---|---|---|---|---|---|---|---|---|---|---|
| | | | | | | | | | | Amount 34496 | | Amount 34498 |

| Package | level1 | level2 | level3 | level4 | level5 | level6 | level7 | Cardinality | Data Type Name |
|---|---|---|---|---|---|---|---|---|---|
| MerchandiseERPReplicationBulkRequestMessage 35000 | MerchandiseERPReplicationBulkRequestMessage 35002 | | | | | | | | MrchdsERPRplctnBulkReqMsg 35004 |
| MessageHeader 35006 | | MessageHeader 35008 | | | | | | 1 35010 | BusinessDocumentMessageHeader 35012 |
| MerchandiseERPReplicationRequestMessage 35014 | | MerchandiseERPReplicationRequestMessage 35016 | | | | | | 1..n 35018 | MrchdsERPRplctnReqMsg 35020 |

FIG. 35-2

| Package | | | level1 | level2 | level3 | level4 | level5 | level6 | level7 | Cardinality | Data Type Name |
|---|---|---|---|---|---|---|---|---|---|---|---|
| MessageHeader 35022 | | | | | Message-Header 35024 | | | | | 1 35026 | BusinessDocumentMessage-Header 35028 |
| Merchandise 35030 | | | | | Merchan-dise 35032 | | | | | 1 35034 | <MT>Mrchds MT=MrchdsERP RplctnReq 35036 |
| | | | | | | @actionCode 35038 | | | | 0..1 35040 | ActionCode 35042 |
| | | | | | | InternalID 35044 | | | | 1 35046 | NOSC_Product-InternalID 35048 |
| | | | | | | Materi-alType-Code 35050 | | | | 0..1 35052 | NOSC_Materi-alTypeCode 35054 |

FIG. 35-3

| Package | level1 | level2 | level3 | level4 | level5 | level6 | level7 | Cardinality | Data Type Name |
|---|---|---|---|---|---|---|---|---|---|
| | | | | MaterialMerchandiseType Code 35056 | | | | 0..1 35058 | MaterialMerchandiseTypeCode 35060 |
| ReceivingStore 35062 | | | | ReceivingStore 35064 | | | | 1..n 35066 | <MT>RcvgStore 35068 |
| | | | | | StoreInternalID 35070 | | | 1 35072 | NOSC_StoreInternalID 35074 |
| PointOfSaleProcessingCondition 35076 | | | | PointOfSaleProcessing-Condition 35078 | | | | 0..1 35080 | <MT>PtOfSlProcgCndn 35082 |

FIG. 35-4

| Package | level1 | level2 | level3 | level4 | level5 | level6 | level7 | Cardinality | Data Type Name |
|---|---|---|---|---|---|---|---|---|---|
| | | | | | PointOfSaleRepeatKeyUsageCode 35084 | | | 0..1 35086 | PointOfSaleRepeatKeyUsageCode 35088 |
| | | | | | PriceRequiredIndicator 35090 | | | 1 35092 | Indicator 35094 |
| | | | | | DiscountAllowedIndicator 35096 | | | 1 35098 | Indicator 35100 |

FIG. 35-5

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | WeightingForPricingRequiredIndicator 35102 | | | 1 35104 | Indicator 35106 |
| | | | | | | | | | | TaxIncludedIndicator 35108 | | | 1 35110 | Indicator 35112 |
| | | | | | | | | | | TextOnPointOfSaleRegisterVisibleIndicator 35114 | | | 1 35116 | Indicator 35118 |

FIG. 35-6

| Package | | level1 | level2 | level3 | level4 | level5 | level6 | level7 | Cardinality | Data Type Name |
|---|---|---|---|---|---|---|---|---|---|---|
| Description 35120 | | | | | Description 35122 | | | | 0..n 35124 | <MT>Desc 35126 |
| | | | | | | Description 35128 | | | 1 35130 | SHORT_Description 35132 |
| GlobalTradeItemNumber 35134 | | | | | Global-Trade-Item-Number 35136 | | | | 0..n 35138 | <MT>GlobTrdItmNo 35140 |
| | | | | | | Product-StandardID 35142 | | | 1 35144 | NOSC_Product-StandardID 35146 |

FIG. 35-7

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | MeasureUnit-Code 35148 | | | 1 35150 | MeasureUnit-Code 35152 |
| | | | | | | | | | | ProductStandardMainIndicator 35154 | | | 1 35156 | Indicator 35158 |
| | | | QuantityUnit 35160 | | | | | | QuantityUnit 35162 | | | | 0..n 35164 | <MT>QtyUnit 35166 |
| | | | | | | | | | | MeasureUnit-Code 35168 | | | 1 35170 | MeasureUnit-Code 35172 |

FIG. 35-8

| Package | level1 | level2 | level3 | level4 | level5 | level6 | level7 | Cardinality | Data Type Name |
|---|---|---|---|---|---|---|---|---|---|
| | | | | | Base-QuantityUnitIndicator 35174 | | | 1 35176 | Indicator 35178 |
| | | | | | Supplementary-QuantityUnitUsage-Code 35180 | | | 1 35182 | Supplementary-QuantityUnitUsageCode 35184 |
| QuantityConversion 35186 | | | | Quantity-Conversion 35188 | | | | 0..n 35190 | <MT>QtyCnvrsn 35192 |
| | | | | | Quantity 35194 | | | 1 35196 | Quantity 35198 |

FIG. 35-9

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | CorrespondingQuantity 35200 | | | 1 35202 | Quantity 35204 |
| | | | ProductCategory 35206 | | | | | | ProductCategory 35208 | | | | 0..n 35210 | <MT>ProdCat 35212 |
| | | | | | | | | | | InternalID 35214 | | | 1 35216 | NOSC_ProductCategoryInternalID 35218 |
| | | | | | | | | | | ProductCategoryHierarchyID 35220 | | | 0..1 35222 | NOSC_ProductCategoryHierarchyID 35224 |

FIG. 35-10

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | ProductCategoryHierarchyTypeCode 35226 | | | 1 35228 | ProductCategoryHierarchyTypeCode 35230 |
| | | | ConfigurableMaterialAssignment 35232 | | | | | | ConfigurableMaterialAssignment 35234 | | | | 0..1 35236 | <MT>ConfigblMtlAssgmt 35238 |
| | | | | | | | | | | ProductInternalID 35240 | | | 1 35242 | NOSC_ProductIntenalID 35244 |
| | | | | | | | | | | ProductStandardID 35246 | | | 1 35248 | NOSC_ProductStandardID 35250 |

FIG. 35-11

| Package | level1 | level2 | level3 | level4 | level5 | level6 | level7 | Cardinality | Data Type Name |
|---|---|---|---|---|---|---|---|---|---|
| ConfigurationPropertyValuation 35252 | | | | Configuration-Property-Valuation 35254 | | | | 0..n 35256 | <MT>ConfignPrptyValn 35258 |
| | | | | | Property-Valuation 35260 | | | 1 35262 | NOSC_Property-Valuation 35264 |
| | | | | | Descrip-tion 35266 | | | 1 35268 | SHORT_Descrip-tion 35270 |
| | | | | | Organisa-tionalAre-aName 35272 | | | 1 35274 | LANGUAGEINDEPENDENT_SHORT_Name 35276 |

FIG. 35-12

| Package | | | | | | level1 | level2 | level3 | level4 | level5 | level6 | level7 | Cardinality | Data Type Name |
|---|---|---|---|---|---|---|---|---|---|---|---|---|---|---|
| | | | MeasureUnitCodeSpecificDescription 35278 | | | | | | MeasureUnitCodeSpecificDescription 35280 | | | | 0..n 35282 | <MT>MsrUnitCodeSpcfcDesc 35284 |
| | | | | | | | | | | MeasureUnitCode 35286 | | | 1 35288 | MeasureUnitCode 35290 |
| | | | | | | | | | | Description 35292 | | | 1 35294 | SHORT_Description 35296 |
| | | | TaxClassification 35298 | | | | | | TaxClassification 35300 | | | | 0..n 35302 | <MT>TxClass 35304 |

FIG. 35-13

| Package | level1 | level2 | level3 | level4 | level5 | level6 | level7 | Cardinality | Data Type Name |
|---|---|---|---|---|---|---|---|---|---|
| | | | | | CountryCode 35306 | | | 0..1 35308 | CountryCode 35310 |
| | | | | | RegionCode 35312 | | | 0..1 35314 | RegionCode 35316 |
| | | | | | TaxJurisdictionCode 35318 | | | 0..1 35320 | TaxJurisdictionCode 35322 |
| | | | | | TaxJurisdictionSubdivisionCode 35324 | | | 0..1 35326 | TaxJurisdictionSubdivisionCode 35328 |

FIG. 35-14

| Package | | | | | | level1 | level2 | level3 | level4 | level5 | level6 | level7 | Cardinal-ity | Data Type Name |
|---|---|---|---|---|---|---|---|---|---|---|---|---|---|---|
| | | | | | | | | | | TaxJuris-diction-Subdivi-sion-TypeCode 35330 | | | 0..1 35332 | TaxJurisdiction-Subdivision-TypeCode 35334 |
| | | | | | | | | | | Pro-ductTaxEvent-TypeCode 35336 | | | 0..1 35338 | ProductTaxEvent TypeCode 35340 |
| | | | | | | | | | | Tax-TypeCode 35342 | | | 0..1 35344 | TaxTypeCode 35346 |
| | | | | | | | | | | TaxRateTypeCode 35348 | | | 0..1 35350 | TaxRateType-Code 35352 |

FIG. 35-15

| Package | level1 | level2 | level3 | level4 | level5 | level6 | level7 | Cardinality | Data Type Name |
|---|---|---|---|---|---|---|---|---|---|
| | | | | | TaxDeductibilityCode 35354 | | | 0..1 35356 | TaxDeductibilityCode 35358 |
| | | | | | Percent 35360 | | | 0..1 35362 | Percent 35364 |
| | | | | | ProductTaxationCharacteristicsCode 35366 | | | 0..1 35368 | ProductTaxationCharacteristicsCode 35370 |
| EmptiesBillOfMaterial 35372 | | | | EmptiesBillOfMaterial 35374 | | | | 0..n 35376 | <MT>EmptsBillOfMtl 35378 |

FIG. 35-16

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | InternalID 35380 | | | 1 35382 | NOSC_BillOfMaterialInternalID 35384 |
| | | | | | | | | | | Usage-Code 35386 | | | 1 35388 | NOSC_BillOfMaterialUsageCode 35390 |
| | | | | Variant 35392 | | | | | | Variant 35394 | | | 1..n 35396 | <MT>EmptsBil-lOFMtlVar 35398 |
| | | | | | | | | | | | ID 35400 | | 1 35402 | BillOfMaterial-VariantID 35404 |
| | | | | | | | | | | | Product-InternalID 35406 | | 0..1 35408 | NOSC_ProductIntenalID 35410 |

FIG. 35-17

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | | Product-StandardID 35412 | | 0..1 35414 | NOSC_Product-StandardID 35416 |
| | | | | | | | | | | | MeasureUnit-Code 35418 | | 1 35420 | MeasureUnit-Code 35422 |
| | | | | | Item 35424 | | | | | | Item 35426 | | 0..n 35428 | <MT>EmptsBilIOFMtlItm 35430 |
| | | | | | | | | | | | | ID 35432 | 1 35434 | BillOfMaterial-ItemID 35436 |
| | | | | | | | | | | | | Product-InternalID 35438 | 0..1 35440 | NOSC_ProductIntenalID 35442 |

FIG. 35-18

| Package | level1 | level2 | level3 | level4 | level5 | level6 | level7 | Cardinality | Data Type Name |
|---|---|---|---|---|---|---|---|---|---|
| | | | | | | | ProductStandardID 35444 | 0..1 35446 | NOSC_ProductStandardID 35448 |
| | | | | | | | Quantity 35450 | 0..1 35452 | Quantity 35454 |
| MaterialMerchandiseBillOfMaterial 35456 | | | | MaterialMerchandiseBillOfMaterial 35458 | | | | 0..n 35460 | <MT>MtlMrchdsBillOfMtl 35462 |
| | | | | | InternalID 35464 | | | 1 35466 | NOSC_BillOfMaterialInternalID 35468 |
| | | | | | UsageCode 35470 | | | 1 35472 | NOSC_BillOfMaterialUsageCode 35474 |

FIG. 35-19

| Package | | level1 | level2 | level3 | level4 | level5 | level6 | level7 | Cardinal-ity | Data Type Name |
|---|---|---|---|---|---|---|---|---|---|---|
| Variant 35476 | | | | | | Variant 35478 | | | 1 35480 | <MT>MtlMrchds BillOfMtlVar 35482 |
| | | | | | | | ID 35484 | | 1 35486 | BillOfMaterial-VariantID 35488 |
| | | | | | | | Product-InternalID 35490 | | 0..1 35492 | NOSC_ProductIntenalID 35494 |
| | | | | | | | Product-Stan-dardID 35496 | | 0..1 35498 | NOSC_Product-StandardID 35500 |
| | Item 35502 | | | | | | Item 35504 | | 0..n 35506 | <MT>MtlMrchds BillOfMtlItm 35508 |

FIG. 35-20

| Package | level1 | level2 | level3 | level4 | level5 | level6 | level7 | Cardinality | Data Type Name |
|---|---|---|---|---|---|---|---|---|---|
| | | | | | | | ID 35510 | 1 35512 | BillOfMaterial-ItemID 35514 |
| | | | | | | | Product-InternalID 35516 | 0..1 35518 | NOSC_ProductIntenalID 35520 |
| | | | | | | | Product-StandardID 35522 | 0..1 35524 | NOSC_Product-StandardID 35526 |
| | | | | | | | Quantity 35528 | 0..1 35530 | Quantity 35532 |
| ProcurementPriceInformation 35534 | | | | Procurement-PriceInformation 35536 | | | | 0..n 35538 | <MT>ProcmtPrcInfo 35540 |

FIG. 35-21

| Package | level1 | level2 | level3 | level4 | level5 | level6 | level7 | Cardinality | Data Type Name |
|---|---|---|---|---|---|---|---|---|---|
| | | | | | ProductStandardID 35542 | | | 0..1 35544 | NOSC_ProductStandardID 35546 |
| | | | | | OrderMeasureUnitCode 35548 | | | 0..1 35550 | MeasureUnitCode 35552 |
| | | | | | OrderTransactionCurrencyCode 35554 | | | 0..1 35556 | CurrencyCode 35558 |

FIG. 35-22

| Package | | | | | | level1 | level2 | level3 | level4 | level5 | level6 | level7 | Cardinal-ity | Data Type Name |
|---|---|---|---|---|---|---|---|---|---|---|---|---|---|---|
| | | | | | | | | | | Strate-gicPur-chasin-gOrgani-sationID 35560 | | | 1 35562 | NOSC_OrganisationalCentreID 35564 |
| | | | | | | | | | | Supplier-InternalID 35566 | | | 1 35568 | NOSC_PartyID 35570 |
| | | | | | | | | | | Valid-ityPeriod 35572 | | | 0..1 35574 | CLOSED_DatePeriod 35576 |
| | | | | PriceSpecification 35578 | | | | | | PriceSpecification 35580 | | | 0..n 35582 | <MT>ProcmtPrInfoPrSpec 35584 |

FIG. 35-23

| Package | level1 | level2 | level3 | level4 | level5 | level6 | level7 | Cardinality | Data Type Name |
|---|---|---|---|---|---|---|---|---|---|
| | | | | | | PriceSpecificationElementTypeCode 35586 | | 0..1 35588 | NOSC_PriceSpecificationElementTypeCode 35590 |
| | | | | | | PriceSpecificationElementCategoryCode 35592 | | 0..1 35594 | NOSC_PriceSpecificationElementCategoryCode 35596 |
| | | | | | | ValidityPeriod 35598 | | 1 35600 | TimePointPeriod 35602 |
| | | | | | | Amount 35604 | | 0..1 35606 | Amount 35608 |

FIG. 35-24

| Package | | | | | | level1 | level2 | level3 | level4 | level5 | level6 | level7 | Cardinality | Data Type Name |
|---|---|---|---|---|---|---|---|---|---|---|---|---|---|---|
| | | | | | | | | | | | Base-Quantity 35610 | | 0..1 35612 | Quantity 35614 |
| | | | | | | | | | | | Order-PriceAmount 35616 | | 0..1 35618 | Amount 35620 |
| | | | | | | | | | | | Order-Base-Quantity 35622 | | 0..1 35624 | Quantity 35626 |
| | | | | | ScaleLine 35628 | | | | | | ScaleLine 35630 | | 0..n 35632 | <MT>ProcmtPrclnfoPrSpecScLine 35634 |
| | | | | | | | | | | | | ScaleAxisStep 35636 | 1 35638 | NOSC_ScaleAxisStep 35640 |

FIG. 35-25

| Package | level1 | level2 | level3 | level4 | level5 | level6 | level7 | Cardinal-ity | Data Type Name |
|---|---|---|---|---|---|---|---|---|---|
| | | | | | | | Amount 35642 | 0..1 35644 | Amount 35646 |
| SalesPriceInformation 35648 | | | | SalesPriceInforma-tion 35650 | | | | 0..n 35652 | <MT>SlsPrInfo 35654 |
| | | | | | Product-Stan-dardID 35656 | | | 0..1 35658 | NOSC_Product-StandardID 35660 |
| | | | | | Meas-ureUnit-Code 35662 | | | 1 35664 | MeasureUnit-Code 35666 |
| | | | | | SalesOr-ganisa-tionID 35668 | | | 1 35670 | NOSC_OrganisationalCentreID 35672 |

FIG. 35-26

| Package | level1 | level2 | level3 | level4 | level5 | level6 | level7 | Cardinality | Data Type Name |
|---|---|---|---|---|---|---|---|---|---|
| | | | | | Distribution-Channel-Code 35674 | | | 1 35676 | Dsitribution-ChannelCode 35678 |
| | | | | | Valid-ityPeriod 35680 | | | 0..1 35682 | CLOSED_DatePeriod 35684 |
| PriceSpecification 35686 | | | | | PriceSpecification 35688 | | | 0..n 35690 | <MT>SlsPrInfoPrSpec 35692 |
| | | | | | | PriceSpecifica-tionEle-mentType Code 35694 | | 0..1 35696 | NOSC_PriceSpecificationEle-mentTypeCode 35698 |

FIG. 35-27

| Package | | | | | | level1 | level2 | level3 | level4 | level5 | level6 | level7 | Cardinal-ity | Data Type Name |
|---|---|---|---|---|---|---|---|---|---|---|---|---|---|---|
| | | | | | | | | | | | PriceSpecifica-tionEle-mentCategoryCode 35700 | | 0..1 35702 | NOSC_PriceSpecificationEle-mentCategory-Code 35704 |
| | | | | | | | | | | | Amount 35706 | | 1 35708 | Amount 35710 |
| | | | | | | | | | | | Base-Quantity 35712 | | 1 35714 | Quantity 35716 |
| | | | | | ScaleLine 35718 | | | | | | ScaleLine 35720 | | 0..n 35722 | <MT>SlsPrIn-foPrSpecScLine 35724 |
| | | | | | | | | | | | | ScaleAx-isStep 35726 | 1 35728 | NOSC_ScaleAxisStep 35730 |

FIG. 35-28

| Package | | | | | | level1 | level2 | level3 | level4 | level5 | level6 | level7 | Cardinal-ity | Data Type Name |
|---|---|---|---|---|---|---|---|---|---|---|---|---|---|---|
| | | | | | | | | | | | | Amount 35732 | 0..1 35734 | Amount 35736 |

BuyerParty
37060
ProductRecipientParty
37062
Total
37064
FinancialTransaction
37028
To FIG. 37-50
To FIG. 37-52
To FIG. 37-54
To FIG. 37-56

| Package | | | level1 | level2 | level3 | level4 | level5 | level6 | level7 | level8 | Data Type Name |
|---|---|---|---|---|---|---|---|---|---|---|---|
| PointOfSaleTransactionMessage 38000 | | | PointOf-Sale-Transac-tionMes-sage 38002 | | | | | | | | PtOfSlTran-sacMsg 38004 |
| MessageHeader 38006 | | | | Message Header 38008 | | | | | | | BusinessDocu-mentMessage-Header 38010 |
| PointOfSaleTransaction 38012 | | | | PointOf-Sale-Transac-tion 38014 | /POSDW/TRANSACTION_INT 38016 | | | | | | <MT>PtOfSlTransac 38018 |
| | | | | | StoreIn-ternalID 38020 | RETAILSTOREID 38022 | | | | | NOSC_StoreIn-ternalID 38024 |

FIG. 38-2

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | DeviceID 38026 | WORKSTATIONID 38028 | | | | | NOSC_DeviceID 38030 |
| | | | | | | | | | TillID 38032 | not-mapped 38034 | | | | | NOSC_TillID 38036 |
| | | | | | | | | | ID 38038 | TRANSNUMBER 38040 | | | | | NOSC_PointOfSaleTransactionID 38042 |
| | | | | | | | | | BusinessDate 38044 | BUSINESSDAYDATE 38046 | | | | | Date 38048 |

FIG. 38-3

| Package | | | | | | | | level1 | level2 | level3 | level4 | level5 | level6 | level7 | level8 | Data Type Name |
|---|---|---|---|---|---|---|---|---|---|---|---|---|---|---|---|---|
| | | | | | | | | | | ProcessingPeriod 38050 | BEGINTIMESTAMP ENDTIMESTAMP 38052 | | | | | DateTimePeriod 38054 |
| | | | | | | | | | | CurrencyCode 38056 | TRANSCURRENCY 38058 | | | | | CurrencyCode 38060 |
| | | | | | | | | | | TrainingModeActiveIndicator 38062 | | | | | | Indicator 38064 |
| | | Operator 38066 | | | | | | | | Operator 38068 | | | | | | <MT>Optr 38070 |

FIG. 38-4

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | Employ-eeID 38072 | | | | | NOSC_Employ-eeID 38074 |
| | | RetailTransaction 38076 | | | | | | | Retail-Transac-tion 38078 | | | | | | <MT>RtlTransac 38080 |
| | | | | | | | | | | LifeCy-cleStatus Code 38082 | | | | | NOSC_Retail-Transac-tionLifeCycleS-tatusCode 38084 |
| | | | Item 38086 | | | | | | | Item 38088 | | | | | <MT>RtlTransac Itm 38090 |

FIG. 38-5

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | PointOf-Sale-Transac-tio-nItemID 38092 | | | | PointOfSale-Transactio-nItemID 38094 |
| | | | | | | | | | | | Process-ingPeriod 38096 | | | | DateTimePeriod 38098 |
| | | | | | | | | | | | VoidIndi-cator 38100 | | | | Indicator 38102 |
| | | | | Sale 38104 | | | | | | | Sale 38106 | | | | <MT>RtlTransacItmSI 38108 |
| | | | | | Common 38110 | | | | | | | Common 38112 | | | <MT>RtlTransacItmCom 38114 |

FIG. 38-6

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Product-InternalID 38116 | | NOSC_Product-InternalID 38118 |
| | | | | | | | | | | | | | Product-StandardID 38120 | | NOSC_Product-StandardID 38122 |
| | | | | | | | | | | | | | ProductCategoryInternalID 38124 | | NOSC_ProductCategory-InternalID 38126 |

FIG. 38-7

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Pro-ductCategory-Hierar-chyType Code 38128 | | ProductCate-goryHierar-chyTypeCode 38130 |
| | | | | | | | | | | | | | Pro-ductCategory-Hierar-chyID 38132 | | NOSC_Pro-ductCategory-HierarchyID 38134 |
| | | | | | | | | | | | | | Descrip-tion 38136 | | MEDIUM_Description 38138 |
| | | | | | | | | | | | | | Cost-Price 38140 | | Price 38142 |

FIG. 38-8

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | ListPrice 38144 | | Price 38146 |
| | | | | | | | | | | | | | Regular-SalesPrice 38148 | | Price 38150 |
| | | | | | | | | | | | | | Actual-SalesPrice 38152 | | Price 38154 |
| | | | | | | | | | | | | | Tota-lAmount 38156 | | Amount 38158 |
| | | | | | | | | | | | | | Discoun-tAmount 38160 | | Amount 38162 |

FIG. 38-9

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | TotalDiscountAmount 38164 | | Amount 38166 |
| | | | | | | | | | | | | | Quantity 38168 | | Quantity 38170 |
| | | | | | | PriceModification 38172 | | | | | | | PriceModification 38174 | | <MT>RtlTransacItmComPrModif 38176 |
| | | | | | | | | | | | | | | PointOfSale-Transaction-PriceModificationID 38178 | PointOfSale-Transaction-PriceModificationID 38180 |

FIG. 38-10

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierType-Code 38182 | NOSC_PointOf-SaleTransac-tionPriceModifi-erTypeCode 38184 |
| | | | | | | | | | | | | | | PointOf-Sale-Transac-tion-PriceModifierID 38186 | NOSC_PointOf-SaleTransac-tionPriceModi-fierID 38188 |
| | | | | | | | | | | | | | | Amount 38190 | Amount 38192 |
| | | | | | | | | | | | | | | Percent 38194 | Percent 38196 |

FIG. 38-11

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PreviousSalesPrice 38198 | Price 38200 |
| | | | | | | | | | | | | | | NewSalesPrice 38202 | Price 38204 |
| | | | | | | | | | | | | | | PointOfSaleTransactionPriceModificationReasonCode 38206 | NOSC_PointOfSaleTransactionPriceModificationReasonCode 38208 |
| | | | | | | Tax 38210 | | | | | | | Tax 38212 | | <MT>RtlTransacItmComTx 38214 |

FIG. 38-12

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 38216 | NOSC_PointOf-SaleTransac-tionTaxID 38218 |
| | | | | | | | | | | | | | | PointOf-Sale-Transac-tionPro-ductTaxa tion-Charac-teristic-sCode 38220 | NOSC_PointOf-SaleTransac-tionPro-ductTaxation-Characteristic-sCode 38222 |
| | | | | | | | | | | | | | | Amount 38224 | Amount 38226 |

FIG. 38-13

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | ItemLink 38228 | | | | | | | ItemLink 38230 | | <MT>RtlTransacItmComItmLnk 38232 |
| | | | | | | | | | | | | | | PointOfSaleTransactionItemID 38234 | PointOfSaleTransactionItemID 38236 |
| | | | | | | TransactionLink 38238 | | | | | | | TransactionLink 38240 | | <MT>RtlTransacItmComTransacLnk 38242 |
| | | | | | | | | | | | | | | StoreInternalID 38244 | NOSC_StoreInternalID 38246 |

FIG. 38-14

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 38248 | NOSC_DeviceID 38250 |
| | | | | | | | | | | | | | | TillID 38252 | NOSC_TillID 38254 |
| | | | | | | | | | | | | | | PointOf-Sale-Transac-tionID 38256 | NOSC_PointOf-SaleTransac-tionID 38258 |
| | | | | | | | | | | | | | | Busi-nessDate 38260 | Date 38262 |
| | | | | | | | | | | | | | | Process-ingPeriod 38264 | DateTimePeriod 38266 |

FIG. 38-15

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Party 38268 | | | | | | | CommissionRecipient-Party 38270 | | | <MT>RtlTransacItmCommsnRcpntPty 38272 |
| | | | | | | | | | | | | | Party-InternalID 38274 | | NOSC_PartyInternalID 38276 |
| | | | | SaleFor-Delivery 38278 | | | | | | | SaleFor-Delivery 38280 | | | | <MT>RtlTransacItmSlForDeliv 38282 |
| | | | | | Common 38284 | | | | | | | Common 38286 | | | <MT>RtlTransacItmCom 38288 |

FIG. 38-16

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Product-Inter-nalID 38290 | | NOSC_Product-InternalID 38292 |
| | | | | | | | | | | | | | Product-Stan-dardID 38294 | | NOSC_Product-StandardID 38296 |
| | | | | | | | | | | | | | Pro-ductCate goryInter nalID 38298 | | NOSC_Pro-ductCategory-InternalID 38300 |

FIG. 38-17

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Pro-ductCate gory-Hierar-chyType Code 38302 | | ProductCate-goryHierar-chyTypeCode 38304 |
| | | | | | | | | | | | | | Pro-ductCate gory-Hierar-chyID 38306 | | NOSC_Pro-ductCategory-HierarchyID 38308 |
| | | | | | | | | | | | | | Descrip-tion 38310 | | MEDIUM_Descri ption 38312 |
| | | | | | | | | | | | | | Cost-Price 38314 | | Price 38316 |

FIG. 38-18

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | ListPrice 38318 | | Price 38320 |
| | | | | | | | | | | | | | Regular-SalesPrice 38322 | | Price 38324 |
| | | | | | | | | | | | | | Actual-SalesPrice 38326 | | Price 38328 |
| | | | | | | | | | | | | | Tota-lAmount 38330 | | Amount 38332 |
| | | | | | | | | | | | | | Discoun-tAmount 38334 | | Amount 38336 |

FIG. 38-19

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | TotalDis-countA-mount 38338 | | Amount 38340 |
| | | | | | | | | | | | | | Quantity 38342 | | Quantity 38344 |
| | | | | | | PriceMod ification 38346 | | | | | | | PriceMod ification 38348 | | <MT>RtlTransac ItmComPrModif 38350 |
| | | | | | | | | | | | | | | PointOf-Sale-Transac-tion-PriceMod ifica-tionID 38352 | PointOfSale-Transaction-PriceModifica-tionID 38354 |

FIG. 38-20

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierType-Code 38356 | NOSC_PointOf-SaleTransac-tionPriceModifi-erTypeCode 38358 |
| | | | | | | | | | | | | | | PointOf-Sale-Transac-tion-PriceModifierID 38360 | NOSC_PointOf-SaleTransac-tionPriceModi-fierID 38362 |
| | | | | | | | | | | | | | | Amount 38364 | Amount 38366 |
| | | | | | | | | | | | | | | Percent 38368 | Percent 38370 |

FIG. 38-21

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | Previous-SalesPrice 38372 | Price 38374 |
| | | | | | | | | | | | | | | NewSalesPrice 38376 | Price 38378 |
| | | | | | | | | | | | | | | PointOf-Sale-Transac-tion-PriceModification-Reason-Code 38380 | NOSC_PointOf-SaleTransac-tionPriceModifi-cationReason-Code 38382 |
| | | | | | | Tax 38384 | | | | | | | Tax 38386 | | <MT>RtlTransacItmComTx 38388 |

FIG. 38-22

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 38390 | NOSC_PointOf-SaleTransac-tionTaxID 38392 |
| | | | | | | | | | | | | | | PointOf-Sale-Transac-tionPro-ductTaxa tion-Charac-teristic-sCode 38394 | NOSC_PointOf-SaleTransac-tionPro-ductTaxation-Characteristic-sCode 38396 |
| | | | | | | | | | | | | | | Amount 38398 | Amount 38400 |

FIG. 38-23

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | ItemLink 38402 | | | | | | | ItemLink 38404 | | <MT>RtlTransacItmComItmLnk 38406 |
| | | | | | | | | | | | | | | PointOfSale-Transactio-nItemID 38408 | PointOfSale-Transactio-nItemID 38410 |
| | | | | | | Transac-tionLink 38412 | | | | | | | Transac-tionLink 38414 | | <MT>RtlTransacItmCom-TransacLnk 38416 |
| | | | | | | | | | | | | | | StoreIn-ternalID 38418 | NOSC_StoreIn-ternalID 38420 |

FIG. 38-24

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 38422 | NOSC_DeviceID 38424 |
| | | | | | | | | | | | | | | TillID 38426 | NOSC_TillID 38428 |
| | | | | | | | | | | | | | | PointOf-Sale-Transac-tionID 38430 | NOSC_PointOf-SaleTransac-tionID 38432 |
| | | | | | | | | | | | | | | Busi-nessDate 38434 | Date 38436 |
| | | | | | | | | | | | | | | Process-ingPeriod 38438 | DateTimePeriod 38440 |

FIG. 38-25

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Party 38442 | | | | | | | Produc-tRecipi-entParty 38444 | | | <MT>RtlTransacItmSlForDe-livProdRcpntPty 38446 |
| | | | | | | | | | | | | | Party-Inter-nalID 38448 | | NOSC_PartyInternalID 38450 |
| | | | | | | | | | | | | Commis-sionRe-cipient-Party 38452 | | | <MT>RtlTransacItmCommsnRcpntPty 38454 |
| | | | | | | | | | | | | | Party-Inter-nalID 38456 | | NOSC_PartyInternalID 38458 |

FIG. 38-26

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Location 38460 | | | | | | | Ship-FromLo-cation 38462 | | | <MT>RtlTransacItmSlForDe-livShipFrmLoc 38464 |
| | | | | | | | | | | | | | Location-Inter-nalID 38466 | | NOSC_LocationInternalID 38468 |
| | | | | SaleFor-Pickup 38470 | | | | | | | SaleFor-Pickup 38472 | | | | <MT>RtlTransacItmSlForPkup 38474 |
| | | | | | Common 38476 | | | | | | | Common 38478 | | | <MT>RtlTransacItmCom 38480 |
| | | | | | | | | | | | | | Product-Inter-nalID 38482 | | NOSC_Product-InternalID 38484 |

FIG. 38-27

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Product-Stan-dardID 38486 | | NOSC_Product-StandardID 38488 |
| | | | | | | | | | | | | | Pro-ductCategoryInternalID 38490 | | NOSC_Pro-ductCategory-InternalID 38492 |
| | | | | | | | | | | | | | Pro-ductCategory-Hierar-chyTypeCode 38494 | | ProductCate-goryHierar-chyTypeCode 38496 |

FIG. 38-28

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Pro-ductCate gory-Hierar-chyID 38498 | | NOSC_Pro-ductCategory-HierarchyID 38500 |
| | | | | | | | | | | | | | Descrip-tion 38502 | | MEDIUM_Descri ption 38504 |
| | | | | | | | | | | | | | Cost-Price 38506 | | Price 38508 |
| | | | | | | | | | | | | | ListPrice 38510 | | Price 38512 |
| | | | | | | | | | | | | | Regular-SalesPric e 38514 | | Price 38516 |

FIG. 38-29

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Actual-SalesPrice 38518 | | Price 38520 |
| | | | | | | | | | | | | | Tota-lAmount 38522 | | Amount 38524 |
| | | | | | | | | | | | | | Discoun-tAmount 38526 | | Amount 38528 |
| | | | | | | | | | | | | | TotalDis-countA-mount 38530 | | Amount 38532 |
| | | | | | | | | | | | | | Quantity 38534 | | Quantity 38536 |

FIG. 38-30

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | PriceModification 38538 | | | | | | | PriceModification 38540 | | <MT>RtlTransacItmComPrModif 38542 |
| | | | | | | | | | | | | | | PointOfSale-Transaction-PriceModification-ID 38544 | PointOfSale-Transaction-PriceModificationID 38546 |
| | | | | | | | | | | | | | | PointOfSale-Transaction-PriceModifierType-Code 38548 | NOSC_PointOfSaleTransactionPriceModifierTypeCode 38550 |

FIG. 38-31

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierID 38552 | NOSC_PointOf-SaleTransac-tionPriceModi-fierID 38554 |
| | | | | | | | | | | | | | | Amount 38556 | Amount 38558 |
| | | | | | | | | | | | | | | Percent 38560 | Percent 38562 |
| | | | | | | | | | | | | | | Previous-SalesPrice 38564 | Price 38566 |

FIG. 38-32

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | NewSalesPrice 38568 | Price 38570 |
| | | | | | | | | | | | | | | PointOf-Sale-Transac-tion-PriceModification-Reason-Code 38572 | NOSC_PointOf-SaleTransac-tionPriceModifi-cationReason-Code 38574 |
| | | | | | | Tax 38576 | | | | | | | Tax 38578 | | <MT>RtlTransacItmComTx 38580 |

FIG. 38-33

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 38582 | NOSC_PointOf-SaleTransac-tionTaxID 38584 |
| | | | | | | | | | | | | | | PointOf-Sale-Transac-tionPro-ductTaxa tion-Charac-teristic-sCode 38586 | NOSC_PointOf-SaleTransac-tionPro-ductTaxation-Characteristic-sCode 38588 |
| | | | | | | | | | | | | | | Amount 38590 | Amount 38592 |

FIG. 38-34

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | ItemLink 38594 | | | | | | | ItemLink 38596 | | <MT>RtlTransacItmComItmLnk 38598 |
| | | | | | | | | | | | | | | PointOf-Sale-Transac-tio-nItemID 38600 | PointOfSale-Transactio-nItemID 38602 |
| | | | | | | Transac-tionLink 38604 | | | | | | | Transac-tionLink 38606 | | <MT>RtlTransacItmCom-TransacLnk 38608 |
| | | | | | | | | | | | | | | StoreIn-ternalID 38610 | NOSC_StoreIn-ternalID 38612 |

FIG. 38-35

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 38614 | NOSC_DeviceID 38616 |
| | | | | | | | | | | | | | | TillID 38618 | NOSC_TillID 38620 |
| | | | | | | | | | | | | | | PointOf-Sale-Transac-tionID 38622 | NOSC_PointOf-SaleTransac-tionID 38624 |
| | | | | | | | | | | | | | | Busi-nessDate 38626 | Date 38628 |
| | | | | | | | | | | | | | | Process-ingPeriod 38630 | DateTimePeriod 38632 |

FIG. 38-36

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Party 38634 | | | | | | | Buyer-Party 38636 | | | <MT>RtlTransacItmSIForPkup-BuyrPty 38638 |
| | | | | | | | | | | | | | Party-InternalID 38640 | | NOSC_PartyInternalID 38642 |
| | | | | | | | | | | | | CommissionRecipient-Party 38644 | | | <MT>RtlTransacItmCommsnRcpntPty 38646 |
| | | | | | | | | | | | | | Party-InternalID 38648 | | NOSC_PartyInternalID 38650 |

FIG. 38-37

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Location 38652 | | | | | | | Ship-FromLo-cation 38654 | | | <MT>RtlTransacItmSlForPkup-ShipFrmLoc 38656 |
| | | | | | | | | | | | | | Location-Inter-nalID 38658 | | NOSC_LocationInternalID 38660 |
| | | | | Return 38662 | | | | | | | Return 38664 | | | | <MT>RtlTransacItmRet 38666 |
| | | | | | | | | | | | | PointOf-Sale-Transac-tio-nItemRe-turnRea-sonCode 38668 | | | NOSC_PointOf-SaleTransactio-nItemReturn-ReasonCode 38670 |

FIG. 38-38

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Common 38672 | | | | | | | Common 38674 | | | <MT>RtlTransacItmCom 38676 |
| | | | | | | | | | | | | | Product-InternalID 38678 | | NOSC_Product-InternalID 38680 |
| | | | | | | | | | | | | | Product-StandardID 38682 | | NOSC_Product-StandardID 38684 |
| | | | | | | | | | | | | | ProductCategoryInternalID 38686 | | NOSC_ProductCategory-InternalID 38688 |

FIG. 38-39

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Pro-ductCategory-Hierar-chyTypeCode 38690 | | ProductCate-goryHierar-chyTypeCode 38692 |
| | | | | | | | | | | | | | Pro-ductCategory-Hierar-chyID 38694 | | NOSC_Pro-ductCategory-HierarchyID 38696 |
| | | | | | | | | | | | | | Descrip-tion 38698 | | MEDIUM_Description 38700 |
| | | | | | | | | | | | | | Cost-Price 38702 | | Price 38704 |

FIG. 38-40

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | ListPrice 38706 | | Price 38708 |
| | | | | | | | | | | | | | Regular-SalesPrice 38710 | | Price 38712 |
| | | | | | | | | | | | | | Actual-SalesPrice 38714 | | Price 38716 |
| | | | | | | | | | | | | | Tota-lAmount 38718 | | Amount 38720 |
| | | | | | | | | | | | | | Discoun-tAmount 38722 | | Amount 38724 |

FIG. 38-41

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | TotalDis-countA-mount 38726 | | Amount 38728 |
| | | | | | | | | | | | | | Quantity 38730 | | Quantity 38732 |
| | | | | | | PriceMod ification 38734 | | | | | | | PriceMod ification 38736 | | <MT>RtlTransac ItmComPrModif 38738 |
| | | | | | | | | | | | | | | PointOf-Sale-Transac-tion-PriceMod ifica-tionID 38740 | PointOfSale-Transaction-PriceModifica-tionID 38742 |

FIG. 38-42

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierType-Code 38744 | NOSC_PointOf-SaleTransac-tionPriceModifi-erTypeCode 38746 |
| | | | | | | | | | | | | | | PointOf-Sale-Transac-tion-PriceModifierID 38748 | NOSC_PointOf-SaleTransac-tionPriceModi-fierID 38750 |
| | | | | | | | | | | | | | | Amount 38752 | Amount 38754 |
| | | | | | | | | | | | | | | Percent 38756 | Percent 38758 |

FIG. 38-43

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | Previous-SalesPrice 38760 | Price 38762 |
| | | | | | | | | | | | | | | NewSalesPrice 38764 | Price 38766 |
| | | | | | | | | | | | | | | PointOf-Sale-Transac-tion-PriceModification-Reason-Code 38768 | NOSC_PointOf-SaleTransac-tionPriceModifi-cationReason-Code 38770 |
| | | | | | | Tax 38772 | | | | | | | Tax 38774 | | <MT>RtlTransacItmComTx 38776 |

FIG. 38-44

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 38778 | NOSC_PointOf-SaleTransac-tionTaxID 38780 |
| | | | | | | | | | | | | | | PointOf-Sale-Transac-tionPro-ductTaxa tion-Charac-teristic-sCode 38782 | NOSC_PointOf-SaleTransac-tionPro-ductTaxation-Characteristic-sCode 38784 |
| | | | | | | | | | | | | | | Amount 38786 | Amount 38788 |

FIG. 38-45

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | ItemLink 38790 | | | | | | | ItemLink 38792 | | <MT>RtlTransacItmComItmLnk 38794 |
| | | | | | | | | | | | | | | PointOfSale-Transac-tio-nItemID 38796 | PointOfSale-Transactio-nItemID 38798 |
| | | | | | | Transac-tionLink 38800 | | | | | | | Transac-tionLink 38802 | | <MT>RtlTransacItmCom-TransacLnk 38804 |
| | | | | | | | | | | | | | | StoreIn-ternalID 38806 | NOSC_StoreIn-ternalID 38808 |

FIG. 38-46

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 38810 | NOSC_DeviceID 38812 |
| | | | | | | | | | | | | | | TillID 38814 | NOSC_TillID 38816 |
| | | | | | | | | | | | | | | PointOf-Sale-Transac-tionID 38818 | NOSC_PointOf-SaleTransac-tionID 38820 |
| | | | | | | | | | | | | | | Busi-nessDate 38822 | Date 38824 |
| | | | | | | | | | | | | | | Process-ingPeriod 38826 | DateTimePeriod 38828 |

FIG. 38-47

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | Authorisation 38830 | | | | | | | Authori-sation 38832 | | | <MT>RtlTransacItmRetAuthsn 38834 |
| | | | | | | | | | | | | | Employ-eeID 38836 | | NOSC_Employ-eeID 38838 |
| | | | | | Party 38840 | | | | | | | Commis-sionRe-cipient-Party 38842 | | | <MT>RtlTransacItmCommsnRcpntPty 38844 |
| | | | | | | | | | | | | | Party-Inter-nalID 38846 | | NOSC_PartyInternalID 38848 |

FIG. 38-48

| Package | | | level1 | level2 | level3 | level4 | level5 | level6 | level7 | level8 | Data Type Name |
|---|---|---|---|---|---|---|---|---|---|---|---|
| ReturnForDelivery 38850 | | | | | | | Return-ForDe-livery 38852 | | | | <MT>RtlTransacItmRetForDeliv 38854 |
| | | | | | | | | PointOf-Sale-Transac-tio-nItemRe-turnRea-sonCode 38856 | | | NOSC_PointOf-SaleTransactio-nItemReturn-ReasonCode 38858 |
| | Common 38860 | | | | | | | Common 38862 | | | <MT>RtlTransacItmCom 38864 |
| | | | | | | | | | Product-Inter-nalID 38866 | | NOSC_Product-InternalID 38868 |

FIG. 38-49

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Product-Stan-dardID 38870 | | NOSC_Product-StandardID 38872 |
| | | | | | | | | | | | | | Pro-ductCate goryInter nalID 38874 | | NOSC_Pro-ductCategory-InternalID 38876 |
| | | | | | | | | | | | | | Pro-ductCate gory-Hierar-chyType Code 38878 | | ProductCate-goryHierar-chyTypeCode 38880 |

FIG. 38-50

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Pro-ductCate gory-Hierar-chyID 38882 | | NOSC_Pro-ductCategory-HierarchyID 38884 |
| | | | | | | | | | | | | | Descrip-tion 38886 | | MEDIUM_Description 38888 |
| | | | | | | | | | | | | | Cost-Price 38890 | | Price 38892 |
| | | | | | | | | | | | | | ListPrice 38894 | | Price 38896 |
| | | | | | | | | | | | | | Regular-SalesPric e 38898 | | Price 38900 |

FIG. 38-51

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Actual-SalesPrice 38902 | | Price 38904 |
| | | | | | | | | | | | | | Tota-lAmount 38906 | | Amount 38908 |
| | | | | | | | | | | | | | Discoun-tAmount 38910 | | Amount 38912 |
| | | | | | | | | | | | | | TotalDis-countA-mount 38914 | | Amount 38916 |
| | | | | | | | | | | | | | Quantity 38918 | | Quantity 38920 |

FIG. 38-52

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | PriceModification 38922 | | | | | | | PriceModification 38924 | | <MT>RtlTransacItmComPrModif 38926 |
| | | | | | | | | | | | | | | PointOfSale-Transaction-PriceModificationID 38928 | PointOfSale-Transaction-PriceModificationID 38930 |
| | | | | | | | | | | | | | | PointOfSale-Transaction-PriceModifierTypeCode 38932 | NOSC_PointOfSaleTransactionPriceModifierTypeCode 38934 |

FIG. 38-53

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierID 38936 | NOSC_PointOf-SaleTransac-tionPriceModi-fierID 38938 |
| | | | | | | | | | | | | | | Amount 38940 | Amount 38942 |
| | | | | | | | | | | | | | | Percent 38944 | Percent 38946 |
| | | | | | | | | | | | | | | Previous-SalesPrice 38948 | Price 38950 |

FIG. 38-54

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | NewSalesPrice 38952 | Price 38954 |
| | | | | | | | | | | | | | | PointOf-Sale-Transac-tion-PriceModification-Reason-Code 38956 | NOSC_PointOf-SaleTransac-tionPriceModifi-cationReason-Code 38958 |
| | | | | | | Tax 38960 | | | | | | | Tax 38962 | | <MT>RtlTransacItmComTx 38964 |

FIG. 38-55

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 38966 | NOSC_PointOf-SaleTransac-tionTaxID 38968 |
| | | | | | | | | | | | | | | PointOf-Sale-Transac-tionPro-ductTaxa tion-Charac-teristic-sCode 38970 | NOSC_PointOf-SaleTransac-tionPro-ductTaxation-Characteristic-sCode 38972 |
| | | | | | | | | | | | | | | Amount 38974 | Amount 38976 |

FIG. 38-56

| Package | | | level1 | level2 | level3 | level4 | level5 | level6 | level7 | level8 | Data Type Name |
|---|---|---|---|---|---|---|---|---|---|---|---|
| | | ItemLink 38978 | | | | | | | ItemLink 38980 | | <MT>RtlTransacItmComItmLnk 38982 |
| | | | | | | | | | | PointOf-Sale-Transac-tio-nItemID 38984 | PointOfSale-Transactio-nItemID 38986 |
| | | Transac-tionLink 38988 | | | | | | | Transac-tionLink 38990 | | <MT>RtlTransacItmCom-TransacLnk 38992 |
| | | | | | | | | | | StoreIn-ternalID 38994 | NOSC_StoreIn-ternalID 38996 |

FIG. 38-57

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 38998 | NOSC_DeviceID 381000 |
| | | | | | | | | | | | | | | TillID 381002 | NOSC_TillID 381004 |
| | | | | | | | | | | | | | | PointOf-Sale-Transac-tionID 381006 | NOSC_PointOf-SaleTransac-tionID 381008 |
| | | | | | | | | | | | | | | Busi-nessDate 381010 | Date 381012 |
| | | | | | | | | | | | | | | Process-ingPeriod 381014 | DateTimePeriod 381016 |

FIG. 38-58

| Package | | | level1 | level2 | level3 | level4 | level5 | level6 | level7 | level8 | Data Type Name |
|---|---|---|---|---|---|---|---|---|---|---|---|
| | Authorisation 381018 | | | | | | | Authori-sation 381020 | | | <MT>RtlTransacItmRetAuthsn 381022 |
| | | | | | | | | | Employ-eeID 381024 | | NOSC_Employ-eeID 381026 |
| | Party 381028 | | | | | | | Produc-tRecipi-entParty 381030 | | | <MT>RtlTransacItmRetForDe-livProdRcpntPty 381032 |
| | | | | | | | | | Party-Inter-nalID 381034 | | NOSC_PartyInternalID 381036 |

FIG. 38-59

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | CommissionRecipientParty 381038 | | | <MT>RtlTransacItmCommsnRcpntPty 381040 |
| | | | | | | | | | | | | | PartyInternalID 381042 | | NOSC_PartyInternalID 381044 |
| | | | | | Location 381046 | | | | | | | ShipToLocation 381048 | | | <MT>RtlTransacItmRetForDelivShipToLoc 381050 |
| | | | | | | | | | | | | | LocationInternalID 381052 | | NOSC_LocationInternalID 381054 |

FIG. 38-60

| Package | | | level1 | level2 | level3 | level4 | level5 | level6 | level7 | level8 | Data Type Name |
|---|---|---|---|---|---|---|---|---|---|---|---|
| ReturnForPickup 381056 | | | | | | | Return-For-Pickup 381058 | | | | <MT>RtlTransacItmRetForPkup 381060 |
| | | | | | | | | PointOf-Sale-Transac-tio-nItemRe-turnRea-sonCode 381062 | | | NOSC_PointOf-SaleTransactio-nItemReturn-ReasonCode 381064 |
| | Common 381066 | | | | | | | Common 381068 | | | <MT>RtlTransacItmCom 381070 |
| | | | | | | | | | Product-Inter-nalID 381072 | | NOSC_Product-InternalID 381074 |

FIG. 38-61

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Product-Stan-dardID 381076 | | NOSC_Product-StandardID 381078 |
| | | | | | | | | | | | | | Pro-ductCate goryInter nalID 381080 | | NOSC_Pro-ductCategory-InternalID 381082 |
| | | | | | | | | | | | | | Pro-ductCate gory-Hierar-chyType Code 381084 | | ProductCate-goryHierar-chyTypeCode 381086 |

FIG. 38-62

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | ProductCategory-Hierar-chyID 381088 | | NOSC_ProductCategory-HierarchyID 381090 |
| | | | | | | | | | | | | | Descrip-tion 381092 | | MEDIUM_Description 381094 |
| | | | | | | | | | | | | | Cost-Price 381096 | | Price 381098 |
| | | | | | | | | | | | | | ListPrice 381100 | | Price 381102 |
| | | | | | | | | | | | | | Regular-SalesPrice 381104 | | Price 381106 |

FIG. 38-63

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | Actual-SalesPric e 381108 | | Price 381110 |
| | | | | | | | | | | | | | Tota-lAmount 381112 | | Amount 381114 |
| | | | | | | | | | | | | | Discoun-tAmount 381116 | | Amount 381118 |
| | | | | | | | | | | | | | TotalDis-countA-mount 381120 | | Amount 381122 |
| | | | | | | | | | | | | | Quantity 381124 | | Quantity 381126 |

FIG. 38-64

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | PriceModification 381128 | | | | | | | PriceModification 381130 | | <MT>RtlTransacItmComPrModif 381132 |
| | | | | | | | | | | | | | | PointOfSale-Transaction-PriceModificationID 381134 | PointOfSale-Transaction-PriceModificationID 381136 |
| | | | | | | | | | | | | | | PointOfSale-Transaction-PriceModifierTypeCode 381138 | NOSC_PointOfSaleTransactionPriceModifierTypeCode 381140 |

FIG. 38-65

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-PriceModifierID 381142 | NOSC_PointOf-SaleTransac-tionPriceModi-fierID 381144 |
| | | | | | | | | | | | | | | Amount 381146 | Amount 381148 |
| | | | | | | | | | | | | | | Percent 381150 | Percent 381152 |
| | | | | | | | | | | | | | | Previous-SalesPrice 381154 | Price 381156 |

FIG. 38-66

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | NewSalesPrice 381158 | Price 381160 |
| | | | | | | | | | | | | | | PointOf-Sale-Transac-tion-PriceModification-Reason-Code 381162 | NOSC_PointOf-SaleTransac-tionPriceModifi-cationReason-Code 381164 |
| | | | | | | Tax 381166 | | | | | | | Tax 381168 | | <MT>RtlTransacItmComTx 381170 |

FIG. 38-67

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | PointOf-Sale-Transac-tion-TaxID 381172 | NOSC_PointOf-SaleTransac-tionTaxID 381174 |
| | | | | | | | | | | | | | | PointOf-Sale-Transac-tionPro-ductTaxa tion-Charac-teristic-sCode 381176 | NOSC_PointOf-SaleTransac-tionPro-ductTaxation-Characteristic-sCode 381178 |
| | | | | | | | | | | | | | | Amount 381180 | Amount 381182 |

FIG. 38-68

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | ItemLink 381184 | | | | | | | ItemLink 381186 | | <MT>RtlTransacItmComItmLnk 381188 |
| | | | | | | | | | | | | | | PointOfSale-Transac-tio-nItemID 381190 | PointOfSale-Transactio-nItemID 381192 |
| | | | | | | Transac-tionLink 381194 | | | | | | | Transac-tionLink 381196 | | <MT>RtlTransacItmCom-TransacLnk 381198 |
| | | | | | | | | | | | | | | StoreIn-ternalID 381200 | NOSC_StoreIn-ternalID 381202 |

FIG. 38-69

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | | | DeviceID 381204 | NOSC_DeviceID 381206 |
| | | | | | | | | | | | | | | TillID 381208 | NOSC_TillID 381210 |
| | | | | | | | | | | | | | | PointOf-Sale-Transac-tionID 381212 | NOSC_PointOf-SaleTransac-tionID 381214 |
| | | | | | | | | | | | | | | Busi-nessDate 381216 | Date 381218 |
| | | | | | | | | | | | | | | Process-ingPeriod 381220 | DateTimePeriod 381222 |

FIG. 38-70

| Package | | | level1 | level2 | level3 | level4 | level5 | level6 | level7 | level8 | Data Type Name |
|---|---|---|---|---|---|---|---|---|---|---|---|
| | Authorisation 381224 | | | | | | | Authori-sation 381226 | | | <MT>RtlTransacItmRetAuthsn 381228 |
| | | | | | | | | | Employ-eeID 381230 | | NOSC_Employ-eeID 381232 |
| | Party 381234 | | | | | | | Buyer-Party 381236 | | | <MT>RtlTransacItmRetForPkup-BuyrPty 381238 |
| | | | | | | | | | Party-Inter-nalID 381240 | | NOSC_PartyInternalID 381242 |

FIG. 38-71

| Package | | | level1 | level2 | level3 | level4 | level5 | level6 | level7 | level8 | Data Type Name |
|---|---|---|---|---|---|---|---|---|---|---|---|
| | | | | | | | | CommissionRecipient-Party 381244 | | | <MT>RtlTransacItmCommsnRcpntPty 381246 |
| | | | | | | | | | Party-InternalID 381248 | | NOSC_PartyInternalID 381250 |
| | Location 381252 | | | | | | | Ship-ToLocation 381254 | | | <MT>RtlTransacItmRetForPick-upSipToLoc 381256 |
| | | | | | | | | | Location-InternalID 381258 | | NOSC_LocationInternalID 381260 |

FIG. 38-72

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | Void 381262 | | | | | | | Void 381264 | | | | <MT>RtlTransacItmVoid 381266 |
| | | | | | | | | | | | | PointOf-Sale-Transac-tio-nItemID 381268 | | | PointOfSale-Transactio-nItemID 381270 |
| | | | | | | | | | | | | Quantity 381272 | | | Quantity 381274 |
| | | | | Paymen-tOnAc-count 381276 | | | | | | | Paymen-tOnAc-count 381278 | | | | <MT>RtlTransacItmPaytOnAcct 381280 |

FIG. 38-73

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | BusinessTransactionDocumentID 381282 | | | NOSC_BusinessTransactionDocumentID 381284 |
| | | | | | | | | | | | | BusinessTransactionDocument-ProcessingTypeCode 381286 | | | BusinessTransactionDocumentProcessingTypeCode 381288 |
| | | | | | | | | | | | | CustomerID 381290 | | | NOSC_CustomerID 381292 |

FIG. 38-74

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Amount 381294 | | | Amount 381296 |
| | | | | | Party 381298 | | | | | | | CommissionRecipientParty 381300 | | | <MT>RtlTransacItmCommsnRcpntPty 381302 |
| | | | | | | | | | | | | | PartyInternalID 381304 | | NOSC_PartyInternalID 381306 |
| | | | PriceModification 381308 | | | | | | | PriceModification 381310 | | | | | <MT>RtlTransacPrModif 381312 |

FIG. 38-75

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | PointOf-Sale-Transac-tion-PriceModifica-tionID 381314 | | | | PointOfSale-Transaction-PriceModifica-tionID 381316 |
| | | | | | | | | | | | PointOf-Sale-Transac-tion-PriceModifierType-Code 381318 | | | | NOSC_PointOf-SaleTransac-tionPriceModifi-erTypeCode 381320 |

FIG. 38-76

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | PointOf-Sale-Transac-tion-PriceModifierID 381322 | | | | NOSC_PointOf-SaleTransac-tionPriceModi-fierID 381324 |
| | | | | | | | | | | | Amount 381326 | | | | Amount 381328 |
| | | | | | | | | | | | Percent 381330 | | | | Percent 381332 |
| | | | | | | | | | | | Previous-SalesPrice 381334 | | | | Price 381336 |

FIG. 38-77

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | NewSalesPrice 381338 | | | | Price 381340 |
| | | | | | | | | | | | PointOfSale-Transaction-PriceModification-Reason-Code 381342 | | | | NOSC_PointOfSaleTransactionPriceModificationReasonCode 381344 |
| | | | Tax 381346 | | | | | | | Tax 381348 | | | | | <MT>RtlTransacTx 381350 |

FIG. 38-78

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | PointOf-Sale-Transaction-TaxID 381352 | | | | NOSC_PointOfSaleTransactionTaxID 381354 |
| | | | | | | | | | | | PointOf-Sale-TransactionProductTaxation-Characteristics-Code 381356 | | | | NOSC_PointOfSaleTransactionProductTaxation-CharacteristicsCode 381358 |
| | | | | | | | | | | | Amount 381360 | | | | Amount 381362 |

FIG. 38-79

| Package | | | level1 | level2 | level3 | level4 | level5 | level6 | level7 | level8 | Data Type Name |
|---|---|---|---|---|---|---|---|---|---|---|---|
| Tender 381364 | | | | | | Tender 381366 | | | | | <MT>RtlTransacTndr 381368 |
| | | | | | | | PointOfSaleTransactionTenderID 381370 | | | | NOSC_PointOfSaleTransactionTenderID 381372 |
| | | | | | | | PointOfSaleTransactionTenderTypeCode 381374 | | | | NOSC_PointOfSaleTransactionTenderTypeCode 381376 |
| | | | | | | | VoidIndicator 381378 | | | | Indicator 381380 |

FIG. 38-80

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | Amount 381382 | | | | Amount 381384 |
| | | | | | | | | | | | Ti-pAmount 381386 | | | | Amount 381388 |
| | | | | | | | | | | | CashbackAmount 381390 | | | | Amount 381392 |
| | | | | Change 381394 | | | | | | | Change 381396 | | | | <MT>RtlTrans-acTndrChg 381398 |

FIG. 38-81

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PointOf-Sale-Transac-tionTen-derType-Code 381400 | | | NOSC_PointOf-SaleTransac-tionTender-TypeCode 381402 |
| | | | | | | | | | | | | Amount 381404 | | | Amount 381406 |
| | | | | Authori-sation 381408 | | | | | | | Authori-sation 381410 | | | | <MT>RtlTrans-acTndrAuthsn 381412 |

FIG. 38-82

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PaymentCardAuthorisation-Method-Code 381414 | (2nd'Payment'is-miss-inginelement-name!) 381416 | | NOSC_PaymentCardPaymentAuthorisation-MethodCode 381418 |
| | | | | | | | | | | | | ConfirmedIndicator 381420 | | | Indicator 381422 |
| | | | | | | | | | | | | Requeste-dAmount 381424 | | | Amount 381426 |
| | | | | | | | | | | | | AuthorisedA-mount 381428 | | | Amount 381430 |

FIG. 38-83

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Payment Card-Paymen-tID 381432 | | | NOSC_PaymentCardPaymentID 381434 |
| | | | | | | | | | | | | Authori-sation-Time-Point 381436 | | | TIMEZONEINDEPENDENT_DateTime 381438 |
| | | | | | | | | | | | | Payment Card-Paymen-tAuthori-sation-PartyID 381440 | | | NOSC_PaymentCardPaymen-tAuthorisation-PartyID 381442 |

FIG. 38-84

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Magnet-StripeReaderDe-viceID 381444 | | | NOSC_DeviceID 381446 |
| | | | | Cheque 381448 | | | | | | | Cheque 381450 | | | | <MT>RtlTrans-acTndrChq 381452 |
| | | | | | | | | | | | | Bank-Stan-dardID 381454 | | | BankStandardID 381456 |
| | | | | | | | | | | | | BankInternalID 381458 | | | NOSC_BankInternalID 381460 |

FIG. 38-85

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | BankAc-count-Stan-dardID 381462 | | | BankAccount-StandardID 381464 |
| | | | | | | | | | | | | BankAc-countInte rnalID 381466 | | | NOSC_BankAc-countInternalID 381468 |
| | | | | | | | | | | | | ID 381470 | | | NOSC_ChequeI D 381472 |
| | | | | CreditCard 381474 | | | | | | | Credit-Card 381476 | | | | <MT>RtlTrans-acTndrCrdtCard 381478 |

FIG. 38-86

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Payment CardID 381480 | | | PaymentCardID 381482 |
| | | | | | | | | | | | | Payment Card-Type-Code 381484 | | | PaymentCard-TypeCode 381486 |
| | | | | | | | | | | | | Payment Card-Holder-Name 381488 | | | LANGUAGEINDEPENDENT_MEDIUM_Name 381490 |
| | | | | | | | | | | | | Valid-ityPeriod 381492 | | | CLOSED_DatePeriod 381494 |

FIG. 38-87

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PaymentCard-DataO-riginTypeCode 381496 | | | NOSC_PaymentCardDataO-riginTypeCode 381498 |
| | | | | DebitCard 381500 | | | | | | | Debit-Card 381502 | | | | <MT>RtlTrans-acTndrDebit-Card 381504 |
| | | | | | | | | | | | | Bank-Stan-dardID 381506 | | | BankStandardID 381508 |
| | | | | | | | | | | | | BankInternalID 381510 | | | NOSC_BankInternalID 381512 |

FIG. 38-88

| Package | | | level1 | level2 | level3 | level4 | level5 | level6 | level7 | level8 | Data Type Name |
|---|---|---|---|---|---|---|---|---|---|---|---|
| | | | | | | | | BankAccount-StandardID 381514 | | | BankAccount-StandardID 381516 |
| | | | | | | | | BankAccountInternalID 381518 | | | NOSC_BankAccountInternalID 381520 |
| | | | | | | | | PaymentCard-Holder-Name 381522 | | | LANGUAGEINDEPENDENT_MEDIUM_Name 381524 |
| TravellersCheque 381526 | | | | | | | Traveller-sCheque 381528 | | | | <MT>RtlTrans-acTndrTrvlrChq 381530 |

FIG. 38-89

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Bank-Stan-dardID 381532 | | | BankStandardID 381534 |
| | | | | | | | | | | | | BankInternalID 381536 | | | NOSC_BankInternalID 381538 |
| | | | | | | | | | | | | BankAc-count-Stan-dardID 381540 | | | BankAccount-StandardID 381542 |
| | | | | | | | | | | | | BankAc-countInternalID 381544 | | | NOSC_BankAc-countInternalID 381546 |

FIG. 38-90

| Package | | | level1 | level2 | level3 | level4 | level5 | level6 | level7 | level8 | Data Type Name |
|---|---|---|---|---|---|---|---|---|---|---|---|
| | | | | | | | | ID 381548 | | | NOSC_ChequelD 381550 |
| GiftCard 381552 | | | | | | | GiftCard 381554 | | | | <MT>RtlTrans-acTndrGftCard 381556 |
| | | | | | | | | Payment CardID 381558 | | | NOSC_Payment CardID 381560 |
| | | | | | | | | Expira-tionDate 381562 | | | Date 381564 |
| TransactionLink 381566 | | | | | | Transac-tionLink 381568 | | | | | <MT>RtlTransac TransacLnk 381570 |

FIG. 38-91

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | StoreInternalID 381572 | | | | NOSC_StoreInternalID 381574 |
| | | | | | | | | | | | DeviceID 381576 | | | | NOSC_DeviceID 381578 |
| | | | | | | | | | | | TillID 381580 | | | | NOSC_TillID 381582 |
| | | | | | | | | | | | PointOfSaleTransactionID 381584 | | | | NOSC_PointOfSaleTransactionID 381586 |
| | | | | | | | | | | | BusinessDate 381588 | | | | Date 381590 |

FIG. 38-92

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | Process-ingPeriod 381592 | | | | DateTimePeriod 381594 |
| | | | Party 381596 | | | | | | | Buyer-Party 381598 | | | | | <MT>RtlTransacBuyrPty 381600 |
| | | | | | | | | | | | Party-Inter-nalID 381602 | | | | NOSC_PartyInternalID 381604 |
| | | | | | | | | | | | Employ-eeID 381606 | | | | NOSC_Employ-eeID 381608 |
| | | | | | | | | | | Produc-tReceipi-entParty 381610 | | | | | <MT>RtlTransacProdRcpntPty 381612 |

FIG. 38-93

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | Party-InternalID 381614 | | | | NOSC_PartyInternalID 381616 |
| | | | Total 381618 | | | | | | | Total 381620 | | | | | <MT>RtlTransacTot 381622 |
| | | | | | | | | | | | GrossTotalAmount 381624 | | | | Amount 381626 |
| | | | | | | | | | | | NetTotalAmount 381628 | | | | Amount 381630 |
| | | | | | | | | | | | TaxTotalAmount 381632 | | | | Amount 381634 |

FIG. 38-94

| Package | | | | | | | level1 | level2 | level3 | level4 | level5 | level6 | level7 | level8 | Data Type Name |
|---|---|---|---|---|---|---|---|---|---|---|---|---|---|---|---|
| | | FinancialTransaction 381636 | | | | | | | Financial Transac-tion 381638 | | | | | | <MT>FinTransac 381640 |
| | | | Item 381642 | | | | | | | Item 381644 | | | | | <MT>FinTransacItm 381646 |
| | | | | | | | | | | | PointOf-Sale-Transac-tio-nItemID 381648 | | | | PointOfSale-Transactio-nItemID 381650 |
| | | | | Deposit 381652 | | | | | | | Deposit 381654 | | | | <MT>FinTransacItmDep 381656 |

FIG. 38-95

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | BankAc-count-Stan-dardID 381658 | | | BankAccount-StandardID 381660 |
| | | | | | | | | | | | | BankAc-countInte rnalID 381662 | | | NOSC_BankAc-countInternalID 381664 |
| | | | | | | | | | | | | Amount 381666 | | | Amount 381668 |
| | | | | PaidIn 381670 | | | | | | | PaidIn 381672 | | | | <MT>FinTransa cItmPaidIn 381674 |

FIG. 38-96

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PointOf-Sale-Transac-tionTen-derType-Code 381676 | | | NOSC_PointOf-SaleTransac-tionTender-TypeCode 381678 |
| | | | | | | | | | | | | Amount 381680 | | | Amount 381682 |
| | | | | | | | | | | | | PointOf-Sale-Transac-tionFi-nancial-Transac-tionRea-sonCode 381684 | | | NOSC_PointOf-SaleTransac-tionFinancial-Transaction-ReasonCode 381686 |

FIG. 38-97

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | PaidOut | | 381688 | | | | | PaidOut 381690 | | | | <MT>FinTransacItmPaidOut 381692 |
| | | | | | | | | | | | | PointOf-Sale-Transac-tionTen-derType-Code 381694 | | | NOSC_PointOf-SaleTransac-tionTender-TypeCode 381696 |
| | | | | | | | | | | | | Amount 381698 | | | Amount 381700 |

FIG. 38-98

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PointOf-Sale-Transac-tionFi-nancial-Transac-tionRea-sonCode 381702 | | | NOSC_PointOf-SaleTransac-tionFinancial-Transaction-ReasonCode 381704 |
| | | | | TenderLoan 381706 | | | | | | | Tender-Loan 381708 | | | | <MT>FinTransacItmTndrLoan 381710 |
| | | | | | | | | | | | | PointOf-Sale-Transac-tionTen-derType-Code 381712 | | | NOSC_PointOf-SaleTransac-tionTender-TypeCode 381714 |

FIG. 38-99

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | Amount 381716 | | | Amount 381718 |
| | | | | | | | | | | | | PointOf-Sale-Transac-tionFi-nancial-Transac-tionRea-sonCode 381720 | | | NOSC_PointOf-SaleTransac-tionFinancial-Transaction-ReasonCode 381722 |
| | | | | Tender-Pickup 381724 | | | | | | | Tender-Pickup 381726 | | | | <MT>FinTransa cItmTndrPkup 381728 |

FIG. 38-100

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PointOf-Sale-Transac-tionTen-derType-Code 381730 | | | NOSC_PointOf-SaleTransac-tionTender-TypeCode 381732 |
| | | | | | | | | | | | | Amount 381734 | | | Amount 381736 |
| | | | | | | | | | | | | PointOf-Sale-Transac-tionFi-nancial-Transac-tionRea-sonCode 381738 | | | NOSC_PointOf-SaleTransac-tionFinancial-Transaction-ReasonCode 381740 |

FIG. 38-101

| Package | | | level1 | level2 | level3 | level4 | level5 | level6 | level7 | level8 | Data Type Name |
|---|---|---|---|---|---|---|---|---|---|---|---|
| TenderAdjustment 381742 | | | | | | | TenderAdjustment 381744 | | | | <MT>FinTransacItmTndrAdjmt 381746 |
| | | | | | | | | PointOfSaleTransactionTenderTypeCode 381748 | | | NOSC_PointOfSaleTransactionTenderTypeCode 381750 |
| | | | | | | | | Amount 381752 | | | Amount 381754 |

FIG. 38-102

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | | PointOf-Sale-Transac-tionFi-nancial-Transac-tionRea-sonCode 381756 | | | NOSC_PointOf-SaleTransac-tionFinancial-Transaction-ReasonCode 381758 |
| | | ControlTransaction 381760 | | | | | | | Control-Transac-tion 381762 | | | | | | <MT>CtrlTransac 381764 |
| | | | Item 381766 | | | | | | | Item 381768 | | | | | <MT>CtrlTransacItm 381770 |

FIG. 38-103

| Package | | | | | | | level1 | level2 | level3 | level4 | level5 | level6 | level7 | level8 | Data Type Name |
|---|---|---|---|---|---|---|---|---|---|---|---|---|---|---|---|
| | | | | | | | | | | | PointOf-Sale-Transac-tio-nItemID 381772 | | | | PointOfSale-Transactio-nItemID 381774 |
| | | | | | | | | | | | PointOf-Sale-Transac-tionCon-trol-Transac-tionRea-sonCode 381776 | | | | (1..2)NOSC_PointOfSaleTrans-actionControl-Transaction-ReasonCode 381778 |

FIG. 39-1

| Package | | | | level1 | level2 | level3 | level4 | level5 | level6 | level7 | level8 | level9 | Cardinality |
|---|---|---|---|---|---|---|---|---|---|---|---|---|---|
| PointOfSaleTransactionERPBulkCreateRequestMessage 39000 | | | | PointOfSaleTransactionERPBulkCreateRequestMessage 39002 | | | | | | | | | |
| | MessageHeader 39004 | | | | MessageHeader 39006 | | | | | | | | 1 39008 |

FIG. 39-2

| Package | | | | level1 | level2 | level3 | level4 | level5 | level6 | level7 | level8 | level9 | Cardinality |
|---|---|---|---|---|---|---|---|---|---|---|---|---|---|
| PointOfSaleTransactionERPCreateRequestMessage 39010 | | | | | PointOfSaleTransactionERPCreateRequestMessage 39012 | | | | | | | | 1..n 39014 |
| MessageHeader 39016 | | | | | | MessageHeader 39018 | | | | | | | 1 39020 |
| PointOfSaleTransaction 39022 | | | | | | PointOfSaleTransaction 39024 | | | | | | | 1 39026 |

FIG. 39-3

| Package | | | | level1 | level2 | level3 | level4 | level5 | level6 | level7 | level8 | level9 | Cardinality |
|---|---|---|---|---|---|---|---|---|---|---|---|---|---|
| | | | | | | | StoreInternalID 39028 | | | | | | 1 39030 |
| | | | | | | | DeviceID 39032 | | | | | | 1 39034 |
| | | | | | | | TillID 39036 | | | | | | 0..1 39038 |
| | | | | | | | ID 39040 | | | | | | 1 39042 |
| | | | | | | | BusinessDate 39044 | | | | | | 1 39046 |

FIG. 39-4

| Package | | | | level1 | level2 | level3 | level4 | level5 | level6 | level7 | level8 | level9 | Cardinality |
|---|---|---|---|---|---|---|---|---|---|---|---|---|---|
| | | | | | | | Processing-Period 39048 | | | | | | 0..1 39050 |
| | | | | | | | Currency-Code 39052 | | | | | | 0..1 39054 |
| | | | | | | | TrainingModeActiveIndicator 39056 | | | | | | 1 39058 |
| Operator 39060 | | | | | | | Operator 39062 | | | | | | 0..n 39064 |

FIG. 39-5

| Package | | | | | level1 | level2 | level3 | level4 | level5 | level6 | level7 | level8 | level9 | Cardinality |
|---|---|---|---|---|---|---|---|---|---|---|---|---|---|---|
| | | | | | | | | | Em-ployeeID 39066 | | | | | 1 39068 |
| RetailTransaction 39070 | | | | | | | | Retail-Trans-action 39072 | | | | | | 0..1 39074 |
| | | | | | | | | | LifeCy-cleS-tatus-Code 39076 | | | | | 1 39078 |
| | Item 39080 | | | | | | | | Item 39082 | | | | | 1..n 39084 |

FIG. 39-6

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | Poin-tOfSale-Trans-actio-nItemID 39086 | | | | 1 39088 |
| | | | | | | | | | Proc-essing-Period 39090 | | | | 0..1 39092 |
| | | | | | | | | | VoidIn-dicator 39094 | | | | 1 39096 |
| | Sale 39098 | | | | | | | | Sale 39100 | | | | 0..1 39102 |
| | | Common 39104 | | | | | | | | Com-mon 39106 | | | 1 39108 |

FIG. 39-7

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductInter-nalID 39110 | | 0..1 39112 |
| | | | | | | | | | | | Product Stan-dardID 39114 | | 0..1 39116 |
| | | | | | | | | | | | Pro-ductCat egory-Inter-nalID 39118 | | 0..1 39120 |

FIG. 39-8

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductCategory-Hierar-chyTypeCode 39122 | | 0..1 39124 |
| | | | | | | | | | | | ProductCategory-Hierar-chyID 39126 | | 0..1 39128 |
| | | | | | | | | | | | Descrip-tion 39130 | | 0..1 39132 |
| | | | | | | | | | | | Cost-Price 39134 | | 0..1 39136 |

FIG. 39-9

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | List-Price 39138 | | 0..1 39140 |
| | | | | | | | | | | | RegularSalesPrice 39142 | | 0..1 39144 |
| | | | | | | | | | | | Actual-SalesPrice 39146 | | 0..1 39148 |
| | | | | | | | | | | | Tota-lAmount 39150 | | 1 39152 |
| | | | | | | | | | | | DiscountAmount 39154 | | 0..1 39156 |

FIG. 39-10

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | TotalD-iscoun-tAmount 39158 | | 0..1 39160 |
| | | | | | | | | | | | Quantity 39162 | | 1 39164 |
| | | | PriceMo difica-tion 39166 | | | | | | | | PriceMo difica-tion 39168 | | 0..n 39170 |
| | | | | | | | | | | | | Poin-tOfSale-Trans-action-PriceMo difica-tionID 39172 | 1 39174 |

FIG. 39-11

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Poin-tOfSale-Trans-action-PriceModifier-Type-Code 39176 | 1 39178 |
| | | | | | | | | | | | | Poin-tOfSale-Trans-action-PriceModifierID 39180 | 0..1 39182 |
| | | | | | | | | | | | | Amount 39184 | 0..1 39186 |
| | | | | | | | | | | | | Percent 39188 | 0..1 39190 |

FIG. 39-12

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 39192 | 0..1 39194 |
| | | | | | | | | | | | | NewSalesPrice 39196 | 0..1 39198 |
| | | | | | | | | | | | | Poin-tOfSale-Trans-action-PriceModifica-tionReason-Code 39200 | 0..1 39202 |
| | | | Tax 39204 | | | | | | | | Tax 39206 | | 0..n 39208 |

FIG. 39-13

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Poin-tOfSale-Trans-action-TaxID 39210 | 1 39212 |
| | | | | | | | | | | | | Poin-tOfSale-Trans-action-Pro-ductTaxation-Charac-teristic-sCode 39214 | 1 39216 |
| | | | | | | | | | | | | Amount 39218 | 1 39220 |

FIG. 39-14

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | Item-Link 39222 | | | | | | | | Item-Link 39224 | | 0..n 39226 |
| | | | | | | | | | | | | | | | | Poin-tOfSale-Trans-actio-nItemID 39228 | 1 39230 |
| | | | | | | | Transac tionLink 39232 | | | | | | | | Transac tionLink 39234 | | 0..1 39236 |
| | | | | | | | | | | | | | | | | StoreIn-ternalID 39238 | 1 39240 |
| | | | | | | | | | | | | | | | | De-viceID 39242 | 1 39244 |

FIG. 39-15

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | TillID 39246 | 0..1 39248 |
| | | | | | | | | | | | | Poin-tOfSale-Trans-actionID 39250 | 1 39252 |
| | | | | | | | | | | | | Busi-ness-Date 39254 | 1 39256 |
| | | | | | | | | | | | | Proc-essing-Period 39258 | 0..1 39260 |

FIG. 39-16

| Package | | | | level1 | level2 | level3 | level4 | level5 | level6 | level7 | level8 | level9 | Cardinality |
|---|---|---|---|---|---|---|---|---|---|---|---|---|---|
| | | Party 39262 | | | | | | | | CommissionRecipientParty 39264 | | | 0..1 39266 |
| | | | | | | | | | | | PartyInternalID 39268 | | 1 39270 |
| | SaleForDelivery 39272 | | | | | | | | SaleForDelivery 39274 | | | | 0..1 39276 |
| | | Common 39278 | | | | | | | | Common 39280 | | | 1 39282 |

FIG. 39-17

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductInter-nalID 39284 | | 0..1 39286 |
| | | | | | | | | | | | Product Stan-dardID 39288 | | 0..1 39290 |
| | | | | | | | | | | | Pro-ductCat egory-Inter-nalID 39292 | | 0..1 39294 |

FIG. 39-18

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | Pro-ductCategory-Hierar-chyTypeCode 39296 | | 0..1 39298 |
| | | | | | | | | | | | | | | | Pro-ductCategory-Hierar-chyID 39300 | | 0..1 39302 |
| | | | | | | | | | | | | | | | Descrip-tion 39304 | | 0..1 39306 |
| | | | | | | | | | | | | | | | Cost-Price 39308 | | 0..1 39310 |

FIG. 39-19

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | List-Price 39312 | | 0..1 39314 |
| | | | | | | | | | | | | | | | RegularSalesPrice 39316 | | 0..1 39318 |
| | | | | | | | | | | | | | | | Actual-SalesPrice 39320 | | 0..1 39322 |
| | | | | | | | | | | | | | | | Tota-lAmount 39324 | | 1 39326 |
| | | | | | | | | | | | | | | | DiscountAmount 39328 | | 0..1 39330 |

FIG. 39-20

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | TotalDiscountAmount 39332 | | 0..1 39334 |
| | | | | | | | | | | | | | | | Quantity 39336 | | 1 39338 |
| | | | | | | | PriceModification 39340 | | | | | | | | PriceModification 39342 | | 0..n 39344 |
| | | | | | | | | | | | | | | | | PointOfSaleTransactionPriceModificationID 39346 | 1 39348 |

FIG. 39-21

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Poin-tOfSale-Trans-action-PriceModifier-Type-Code 39350 | 1 39352 |
| | | | | | | | | | | | | Poin-tOfSale-Trans-action-PriceModifierID 39354 | 0..1 39356 |
| | | | | | | | | | | | | Amount 39358 | 0..1 39360 |
| | | | | | | | | | | | | Percent 39362 | 0..1 39364 |

FIG. 39-22

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 39366 | 0..1 39368 |
| | | | | | | | | | | | | NewSalesPrice 39370 | 0..1 39372 |
| | | | | | | | | | | | | Poin-tOfSale-Trans-action-PriceModifica-tionRea son-Code 39374 | 0..1 39376 |
| | | | Tax 39378 | | | | | | | | Tax 39380 | | 0..n 39382 |

FIG. 39-23

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | PointOfSale-Transaction-TaxID 39384 | 1 39386 |
| | | | | | | | | | | | | PointOfSale-Transaction-ProductTaxation-Characteristics-Code 39388 | 1 39390 |
| | | | | | | | | | | | | Amount 39392 | 1 39394 |

FIG. 39-24

| Package | | | | level1 | level2 | level3 | level4 | level5 | level6 | level7 | level8 | level9 | Cardinality |
|---|---|---|---|---|---|---|---|---|---|---|---|---|---|
| | | | Item-Link 39396 | | | | | | | | Item-Link 39398 | | 0..n 39400 |
| | | | | | | | | | | | | Poin-tOfSale-Trans-actio-nItemID 39402 | 1 39404 |
| | | | Transac tionLink 39406 | | | | | | | | Transac tionLink 39408 | | 0..1 39410 |
| | | | | | | | | | | | | StoreIn-ternalID 39412 | 1 39414 |
| | | | | | | | | | | | | De-viceID 39416 | 1 39418 |

FIG. 39-25

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | | TillID 39420 | 0..1 39422 |
| | | | | | | | | | | | | | | | | PointOfSaleTransactionID 39424 | 1 39426 |
| | | | | | | | | | | | | | | | | BusinessDate 39428 | 1 39430 |
| | | | | | | | | | | | | | | | | ProcessingPeriod 39432 | 0..1 39434 |
| | | | | | | Party | 39436 | | | | | | | ProductRecipientParty 39438 | | | 1 39440 |

FIG. 39-26

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Party-InternalID 39442 | | 1 39444 |
| | | | | | | | | | | CommissionRecipient-Party 39446 | | | 0..1 39448 |
| | | | | | | | | | | | Party-InternalID 39450 | | 1 39452 |
| | | Location 39454 | | | | | | | | Ship-From-Location 39456 | | | 1 39458 |

FIG. 39-27

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Loca-tionIn-ternalID 39460 | | 1 39462 |
| | SaleFor Pickup 39464 | | | | | | | | SaleFor Pickup 39466 | | | | 0..1 39468 |
| | | Common 39470 | | | | | | | | Com-mon 39472 | | | 1 39474 |
| | | | | | | | | | | | ProductI nter-nalID 39476 | | 0..1 39478 |

FIG. 39-28

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductStandardID 39480 | | 0..1 39482 |
| | | | | | | | | | | | ProductCategoryInternalID 39484 | | 0..1 39486 |
| | | | | | | | | | | | ProductCategoryHierarchyTypeCode 39488 | | 0..1 39490 |

FIG. 39-29

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | ProductCategoryHierarchyID 39492 | | 0..1 39494 |
| | | | | | | | | | | | | | | | Description 39496 | | 0..1 39498 |
| | | | | | | | | | | | | | | | CostPrice 39500 | | 0..1 39502 |
| | | | | | | | | | | | | | | | ListPrice 39504 | | 0..1 39506 |

FIG. 39-30

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | RegularSalesPrice 39508 | | 0..1 39510 |
| | | | | | | | | | | | Actual-SalesPrice 39512 | | 0..1 39514 |
| | | | | | | | | | | | Tota-lAmount 39516 | | 1 39518 |
| | | | | | | | | | | | DiscountAmount 39520 | | 0..1 39522 |

FIG. 39-31

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | TotalD-iscoun-tAmount 39524 | | 0..1 39526 |
| | | | | | | | | | | | | | | | Quantity 39528 | | 1 39530 |
| | | | | | | | PriceMo difica-tion 39532 | | | | | | | | PriceMo difica-tion 39534 | | 0..n 39536 |
| | | | | | | | | | | | | | | | | Poin-tOfSale-Trans-action-PriceMo difica-tionID 39538 | 1 39540 |

FIG. 39-32

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | PointOfSale-Transaction-PriceModifier-Type-Code 39542 | 1 39544 |
| | | | | | | | | | | | | PointOfSale-Transaction-PriceModifierID 39546 | 0..1 39548 |
| | | | | | | | | | | | | Amount 39550 | 0..1 39552 |
| | | | | | | | | | | | | Percent 39554 | 0..1 39556 |

FIG. 39-33

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 39558 | 0..1 39560 |
| | | | | | | | | | | | | NewSalesPrice 39562 | 0..1 39564 |
| | | | | | | | | | | | | Poin-tOfSale-Trans-action-PriceModifica-tionRea-son-Code 39566 | 0..1 39568 |
| | | | Tax 39570 | | | | | | | | Tax 39572 | | 0..n 39574 |

FIG. 39-34

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Poin-tOfSale-Trans-action-TaxID 39576 | 1 39578 |
| | | | | | | | | | | | | Poin-tOfSale-Trans-action-Pro-ductTax ation-Charac-teristic-sCode 39580 | 1 39582 |
| | | | | | | | | | | | | Amount 39584 | 1 39586 |

FIG. 39-35

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | Item-Link 39588 | | | | | | | | Item-Link 39590 | | 0..n 39592 |
| | | | | | | | | | | | | | | | | Poin-tOfSale-Trans-actio-nItemID 39594 | 1 39596 |
| | | | | | | | TransactionLink 39598 | | | | | | | | TransactionLink 39600 | | 0..1 39602 |
| | | | | | | | | | | | | | | | | StoreIn-ternalID 39604 | 1 39606 |
| | | | | | | | | | | | | | | | | De-viceID 39608 | 1 39610 |

FIG. 39-36

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | TillID 39612 | 0..1 39614 |
| | | | | | | | | | | | | Poin-tOfSale-Trans-actionID 39616 | 1 39618 |
| | | | | | | | | | | | | Busi-ness-Date 39620 | 1 39622 |
| | | | | | | | | | | | | Proc-essing-Period 39624 | 0..1 39626 |
| | | Party 39628 | | | | | | | | Buyer-Party 39630 | | | 1 39632 |

FIG. 39-37

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Party-InternalID 39634 | | 1 39636 |
| | | | | | | | | | | CommissionRecipient-Party 39638 | | | 0..1 39640 |
| | | | | | | | | | | | Party-InternalID 39642 | | 1 39644 |
| | | Location 39646 | | | | | | | | Ship-From-Location 39648 | | | 1 39650 |

FIG. 39-38

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | LocationInternalID 39652 | | 1 39654 |
| | Return 39656 | | | | | | | | Return 39658 | | | | 0..1 39660 |
| | | | | | | | | | | PointOfSaleTransactionItemReturnReasonCode 39662 | | | 0..1 39664 |
| | | Common 39666 | | | | | | | | Common 39668 | | | 1 39670 |

FIG. 39-39

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | ProductInter-nalID 39672 | | 0..1 39674 |
| | | | | | | | | | | | | | | | ProductStan-dardID 39676 | | 0..1 39678 |
| | | | | | | | | | | | | | | | Pro-ductCategory-Inter-nalID 39680 | | 0..1 39682 |

FIG. 39-40

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductCategory-Hierar-chyTypeCode 39684 | | 0..1 39686 |
| | | | | | | | | | | | ProductCategory-Hierar-chyID 39688 | | 0..1 39690 |
| | | | | | | | | | | | Descrip-tion 39692 | | 0..1 39694 |
| | | | | | | | | | | | Cost-Price 39696 | | 0..1 39698 |

FIG. 39-41

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | List-Price 39700 | | 0..1 39702 |
| | | | | | | | | | | | | | | | RegularSalesPrice 39704 | | 0..1 39706 |
| | | | | | | | | | | | | | | | Actual-SalesPrice 39708 | | 0..1 39710 |
| | | | | | | | | | | | | | | | Tota-lAmount 39712 | | 1 39714 |
| | | | | | | | | | | | | | | | DiscountAmount 39716 | | 0..1 39718 |

FIG. 39-42

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | TotalDiscountAmount 39720 | | 0..1 39722 |
| | | | | | | | | | | | Quantity 39724 | | 1 39726 |
| | | | PriceModification 39728 | | | | | | | | PriceModification 39730 | | 0..n 39732 |
| | | | | | | | | | | | | PointOfSaleTransactionPriceModificationID 39734 | 1 39736 |

FIG. 39-43

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Poin-tOfSale-Trans-action-PriceModifier-Type-Code 39738 | 1 39740 |
| | | | | | | | | | | | | Poin-tOfSale-Trans-action-PriceModifierID 39742 | 0..1 39744 |
| | | | | | | | | | | | | Amount 39746 | 0..1 39748 |
| | | | | | | | | | | | | Percent 39750 | 0..1 39752 |

FIG. 39-44

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 39754 | 0..1 39756 |
| | | | | | | | | | | | | NewSalesPrice 39758 | 0..1 39760 |
| | | | | | | | | | | | | Poin-tOfSale-Trans-action-PriceModifica-tionRea son-Code 39762 | 0..1 39764 |
| | | | Tax 39766 | | | | | | | | Tax 39768 | | 0..n 39770 |

FIG. 39-45

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | | PointOfSaleTransactionTaxID 39772 | 1 39774 |
| | | | | | | | | | | | | | | | | PointOfSaleTransactionProductTaxationCharacteristicsCode 39776 | 1 39778 |
| | | | | | | | | | | | | | | | | Amount 39780 | 1 39782 |

FIG. 39-46

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | Item-Link 39784 | | | | | | | | Item-Link 39786 | | 0..n 39788 |
| | | | | | | | | | | | | | | | | PointOfSale-Transaction-ItemID 39790 | 1 39792 |
| | | | | | | | TransactionLink 39794 | | | | | | | | TransactionLink 39796 | | 0..1 39798 |
| | | | | | | | | | | | | | | | | StoreInternalID 39800 | 1 39802 |
| | | | | | | | | | | | | | | | | DeviceID 39804 | 1 39806 |

FIG. 39-47

| Package | | | | | level1 | level2 | level3 | level4 | level5 | level6 | level7 | level8 | level9 | Cardinality |
|---|---|---|---|---|---|---|---|---|---|---|---|---|---|---|
| | | | | | | | | | | | | | TillID 39808 | 0..1 39810 |
| | | | | | | | | | | | | | PointOfSale-Trans-actionID 39812 | 1 39814 |
| | | | | | | | | | | | | | Busi-ness-Date 39816 | 1 39818 |
| | | | | | | | | | | | | | Proc-essing-Period 39820 | 0..1 39822 |
| | | | Authorisation 39824 | | | | | | | | Authori-sation 39826 | | | 0..n 39828 |

FIG. 39-48

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Em-ployeeID 39830 | | 0..1 39832 |
| | | Party 39834 | | | | | | | | CommisionRe-cipient-Party 39836 | | | 0..1 39838 |
| | | | | | | | | | | | Party-Inter-nalID 39840 | | 1 39842 |
| | ReturnForDelivery 39844 | | | | | | | | Return-ForDe-livery 39846 | | | | 0..1 39848 |

FIG. 39-49

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | PointOfSale-Transaction-Item-Return-Reason Code 39850 | | | 0..1 39852 |
| | | Common 39854 | | | | | | | | Common 39856 | | | 1 39858 |
| | | | | | | | | | | | ProductInternalID 39860 | | 0..1 39862 |

FIG. 39-50

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | ProductStandardID 39864 | | 0..1 39866 |
| | | | | | | | | | | | | | | | ProductCategoryInternalID 39868 | | 0..1 39870 |
| | | | | | | | | | | | | | | | ProductCategoryHierarchyTypeCode 39872 | | 0..1 39874 |

FIG. 39-51

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | ProductCategory-Hierar-chyID 39876 | | 0..1 39878 |
| | | | | | | | | | | | | | | | Descrip-tion 39880 | | 0..1 39882 |
| | | | | | | | | | | | | | | | Cost-Price 39884 | | 0..1 39886 |
| | | | | | | | | | | | | | | | List-Price 39888 | | 0..1 39890 |

FIG. 39-52

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | RegularSalesPrice 39892 | | 0..1 39894 |
| | | | | | | | | | | | | | | | Actual-SalesPrice 39896 | | 0..1 39898 |
| | | | | | | | | | | | | | | | Tota-lAmount 39900 | | 1 39902 |
| | | | | | | | | | | | | | | | DiscountAmount 39904 | | 0..1 39906 |

FIG. 39-53

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | TotalD-iscoun-tAmount 39908 | | 0..1 39910 |
| | | | | | | | | | | | Quantity 39912 | | 1 39914 |
| | | | PriceMo difica-tion 39916 | | | | | | | | PriceMo difica-tion 39918 | | 0..n 39920 |
| | | | | | | | | | | | | Poin-tOfSale-Trans-action-PriceMo difica-tionID 39922 | 1 39924 |

FIG. 39-54

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | PointOfSale-Trans-action-PriceModifier-Type-Code 39926 | 1 39928 |
| | | | | | | | | | | | | PointOfSale-Trans-action-PriceModifierID 39930 | 0..1 39932 |
| | | | | | | | | | | | | Amount 39934 | 0..1 39936 |
| | | | | | | | | | | | | Percent 39938 | 0..1 39940 |

FIG. 39-55

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 39942 | 0..1 39944 |
| | | | | | | | | | | | | NewSalesPrice 39946 | 0..1 39948 |
| | | | | | | | | | | | | Poin-tOfSale-Trans-action-PriceModifica-tionReason-Code 39950 | 0..1 39952 |
| | | | Tax 39954 | | | | | | | | Tax 39956 | | 0..n 39958 |

FIG. 39-56

| Package | | | | | | | | | level1 | level2 | level3 | level4 | level5 | level6 | level7 | level8 | level9 | Cardinality |
|---|---|---|---|---|---|---|---|---|---|---|---|---|---|---|---|---|---|---|
| | | | | | | | | | | | | | | | | | PointOfSale-Transaction-TaxID 39960 | 1 39962 |
| | | | | | | | | | | | | | | | | | PointOfSale-Transaction-ProductTaxation-Characteristics-Code 39964 | 1 39966 |
| | | | | | | | | | | | | | | | | | Amount 39968 | 1 39970 |

FIG. 39-57

| Package | | | | level1 | level2 | level3 | level4 | level5 | level6 | level7 | level8 | level9 | Cardinality |
|---|---|---|---|---|---|---|---|---|---|---|---|---|---|
| | | | Item-Link 39972 | | | | | | | | Item-Link 39974 | | 0..n 39976 |
| | | | | | | | | | | | | Poin-tOfSale-Trans-actio-nItemID 39978 | 1 39980 |
| | | | Transac tionLink 39982 | | | | | | | | Transac tionLink 39984 | | 0..1 39986 |
| | | | | | | | | | | | | StoreIn-ternalID 39988 | 1 39990 |
| | | | | | | | | | | | | De-viceID 39992 | 1 39994 |

FIG. 39-58

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | TillID 39996 | 0..1 39998 |
| | | | | | | | | | | | | Poin-tOfSale-Trans-actionID 391000 | 1 391002 |
| | | | | | | | | | | | | Busi-ness-Date 391004 | 1 391006 |
| | | | | | | | | | | | | Proc-essing-Period 391008 | 0..1 391010 |
| | | Authorisation 391012 | | | | | | | | Authori-sation 391014 | | | 0..n 391016 |

FIG. 39-59

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Em-ployeeID 391018 | | 0..1 391020 |
| | | Party 391022 | | | | | | | | Produc-tRecipi-entParty 391024 | | | 1 391026 |
| | | | | | | | | | | | Party-Inter-nalID 391028 | | 1 391030 |
| | | | | | | | | | | CommissionRe-cipient-Party 391032 | | | 0..1 391034 |

FIG. 39-60

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Party-InternalID 391036 | | 1 391038 |
| | | Location 391040 | | | | | | | | Ship-ToLocation 391042 | | | 1 391044 |
| | | | | | | | | | | | Loca-tionInternalID 391046 | | 1 391048 |
| | ReturnForPickup 391050 | | | | | | | | Return-For-Pickup 391052 | | | | 0..1 391054 |

FIG. 39-61

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | PointOfSaleTransactionItemReturnReasonCode 391056 | | | 0..1 391058 |
| | | Common 391060 | | | | | | | | Common 391062 | | | 1 391064 |
| | | | | | | | | | | | ProductInternalID 391066 | | 0..1 391068 |

FIG. 39-62

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | ProductStandardID 391070 | | 0..1 391072 |
| | | | | | | | | | | | ProductCategory-InternalID 391074 | | 0..1 391076 |
| | | | | | | | | | | | ProductCategory-HierarchyTypeCode 391078 | | 0..1 391080 |

FIG. 39-63

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Pro-ductCat egory-Hierar-chyID 391082 | | 0..1 391084 |
| | | | | | | | | | | | Descrip-tion 391086 | | 0..1 391088 |
| | | | | | | | | | | | Cost-Price 391090 | | 0..1 391092 |
| | | | | | | | | | | | List-Price 391094 | | 0..1 391096 |

FIG. 39-64

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | RegularSalesPrice 391098 | | 0..1 391100 |
| | | | | | | | | | | | | | | | Actual-SalesPrice 391102 | | 0..1 391104 |
| | | | | | | | | | | | | | | | Tota-lAmount 391106 | | 1 391108 |
| | | | | | | | | | | | | | | | DiscountAmount 391110 | | 0..1 391112 |

FIG. 39-65

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | TotalD-iscoun-tAmount 391114 | | 0..1 391116 |
| | | | | | | | | | | | Quantity 391118 | | 1 391120 |
| | | | PriceMo difica-tion 391122 | | | | | | | | PriceMo difica-tion 391124 | | 0..n 391126 |
| | | | | | | | | | | | | Poin-tOfSale-Trans-action-PriceMo difica-tionID 391128 | 1 391130 |

FIG. 39-66

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | | Poin-tOfSale-Trans-action-PriceMo difier-Type-Code 391132 | 1 391134 |
| | | | | | | | | | | | | | | | | Poin-tOfSale-Trans-action-PriceMo difierID 391136 | 0..1 391138 |
| | | | | | | | | | | | | | | | | Amount 391140 | 0..1 391142 |
| | | | | | | | | | | | | | | | | Percent 391144 | 0..1 391146 |

FIG. 39-67

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | Previ-ous-SalesPrice 391148 | 0..1 391150 |
| | | | | | | | | | | | | NewSalesPrice 391152 | 0..1 391154 |
| | | | | | | | | | | | | Poin-tOfSale-Trans-action-PriceModifica-tionRea son-Code 391156 | 0..1 391158 |
| | | | Tax 391160 | | | | | | | | Tax 391162 | | 0..n 391164 |

FIG. 39-68

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | | | PointOfSaleTransactionTaxID 391166 | 1 391168 |
| | | | | | | | | | | | | | | | | PointOfSaleTransactionProductTaxationCharacteristicsCode 391170 | 1 391172 |
| | | | | | | | | | | | | | | | | Amount 391174 | 1 391176 |

FIG. 39-69

| Package | | | | level1 | level2 | level3 | level4 | level5 | level6 | level7 | level8 | level9 | Cardinality |
|---|---|---|---|---|---|---|---|---|---|---|---|---|---|
| | | | Item-Link 391178 | | | | | | | | Item-Link 391180 | | 0..n 391182 |
| | | | | | | | | | | | | Poin-tOfSale-Trans-actio-nItemID 391184 | 1 391186 |
| | | | TransactionLink 391188 | | | | | | | | TransactionLink 391190 | | 0..1 391192 |
| | | | | | | | | | | | | StoreIn-ternalID 391194 | 1 391196 |
| | | | | | | | | | | | | De-viceID 391198 | 1 391200 |

FIG. 39-70

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | | TillID 391202 | 0..1 391204 |
| | | | | | | | | | | | | Poin-tOfSale-Trans-actionID 391206 | 1 391208 |
| | | | | | | | | | | | | Busi-ness-Date 391210 | 1 391212 |
| | | | | | | | | | | | | Proc-essing-Period 391214 | 0..1 391216 |
| | | Authorisation 391218 | | | | | | | | Authori-sation 391220 | | | 0..n 391222 |

FIG. 39-71

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Em-ployeeID 391224 | | 0..1 391226 |
| | | Party 391228 | | | | | | | | Buyer-Party 391230 | | | 1 391232 |
| | | | | | | | | | | | Party-Inter-nalID 391234 | | 1 391236 |
| | | | | | | | | | | CommisionRe-cipient-Party 391238 | | | 0..1 391240 |

FIG. 39-72

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | | Party-InternalID 391242 | | 1 391244 |
| | | Location 391246 | | | | | | | | ShipToLocation 391248 | | | 1 391250 |
| | | | | | | | | | | | LocationInternalID 391252 | | 1 391254 |
| | Void 391256 | | | | | | | | Void 391258 | | | | 0..1 391260 |

FIG. 39-73

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Poin-tOfSale-Trans-actio-nItemID 391262 | | | 1 391264 |
| | | | | | | | | | | Quantity 391266 | | | 1 391268 |
| | Paymen tOnAc-count 391270 | | | | | | | | Paymen tOnAc-count 391272 | | | | 0..1 391274 |
| | | | | | | | | | | Busi-ness-Trans-action-Docu-mentID 391276 | | | 0..1 391278 |

FIG. 39-74

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Business-TransactionDocument-ProcessingTypeCode 391280 | | | 0..1 391282 |
| | | | | | | | | | | CustomerID 391284 | | | 0..1 391286 |
| | | | | | | | | | | Amount 391288 | | | 0..1 391290 |

FIG. 39-75

| Package | | | | level1 | level2 | level3 | level4 | level5 | level6 | level7 | level8 | level9 | Cardinality |
|---|---|---|---|---|---|---|---|---|---|---|---|---|---|
| | | Party 391292 | | | | | | | | CommissionRe-cipient-Party 391294 | | | 0..1 391296 |
| | | | | | | | | | | | Party-Inter-nalID 391298 | | 1 391300 |
| | PriceModification 391302 | | | | | | | PriceMo dification 391304 | | | | | 0..n 391306 |

FIG. 39-76

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | PointOfSale-Trans-action-PriceModifica-tionID 391308 | | | | 1 391310 |
| | | | | | | | | | | | | | PointOfSale-Trans-action-PriceModifier-Type-Code 391312 | | | | 1 391314 |

FIG. 39-77

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | Poin-tOfSale-Trans-action-PriceModifierID 391316 | | | | 0..1 391318 |
| | | | | | | | | | Amount 391320 | | | | 0..1 391322 |
| | | | | | | | | | Percent 391324 | | | | 0..1 391326 |
| | | | | | | | | | Previ-ous-SalesPrice 391328 | | | | 0..1 391330 |
| | | | | | | | | | NewSalesPrice 391332 | | | | 0..1 391334 |

FIG. 39-78

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | PointOfSale-Transaction-PriceModificationReason-Code 391336 | | | | 0..1 391338 |
| Tax 391340 | | | | | | | | Tax 391342 | | | | | 0..n 391344 |
| | | | | | | | | | PointOfSale-Transaction-TaxID 391346 | | | | 1 391348 |

FIG. 39-79

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | PointOfSale-Transaction-ProductTaxation-Characteristic-sCode 391350 | | | | 1 391352 |
| | | | | | | | | | Amount 391354 | | | | 1 391356 |
| | Tender 391358 | | | | | | | Tender 391360 | | | | | 0..n 391362 |

FIG. 39-80

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | PointOfSaleTransactionTenderID 391364 | | | | 1 391366 |
| | | | | | | | | | PointOfSaleTransactionTenderTypeCode 391368 | | | | 1 391370 |
| | | | | | | | | | VoidIndicator 391372 | | | | 1 391374 |
| | | | | | | | | | Amount 391376 | | | | 1 391378 |

FIG. 39-81

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | Ti-pAmount 391380 | | | | 0..1 391382 |
| | | | | | | | | | CashbackA-mount 391384 | | | | 0..1 391386 |
| | Change 391388 | | | | | | | | Change 391390 | | | | 0..n 391392 |
| | | | | | | | | | | Poin-tOfSale-Trans-action-Ten-derType Code 391394 | | | 1 391396 |

FIG. 39-82

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Amount 391398 | | | 1 391400 |
| | Authori-sation 391402 | | | | | | | | Authori-sation 391404 | | | | 0..n 391406 |
| | | | | | | | | | | Pay-ment-CardAu-thorisa-tion-Method Code 391408 | (2nd'Pa yment'is miss-inginele ment-name!) 391410 | | 0..1 391412 |
| | | | | | | | | | | Con-firmedIn dicator 391414 | | | 1 391416 |

FIG. 39-83

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Re-queste-dA-mount 391418 | | | 0..1 391420 |
| | | | | | | | | | | Author-isedA-mount 391422 | | | 0..1 391424 |
| | | | | | | | | | | Pay-ment-Card-Pay-mentID 391426 | | | 0..1 391428 |
| | | | | | | | | | | Authori-sation-Time-Point 391430 | | | 0..1 391432 |

FIG. 39-84

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Pay-ment-Card-PaymentAu-thorisa-tion-PartyID 391434 | | | 0..1 391436 |
| | | | | | | | | | | Mag-netStripeReaderDe-viceID 391438 | | | 0..1 391440 |
| | Cheque 391442 | | | | | | | | Cheque 391444 | | | | 0..n 391446 |

FIG. 39-85

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Bank-Stan-dardID 391448 | | | 0..1 391450 |
| | | | | | | | | | | BankInternalID 391452 | | | 0..1 391454 |
| | | | | | | | | | | BankAccount-Stan-dardID 391456 | | | 0..1 391458 |
| | | | | | | | | | | BankAccountInternalID 391460 | | | 0..1 391462 |
| | | | | | | | | | | ID 391464 | | | 0..1 391466 |

FIG. 39-86

| Package | | | | level1 | level2 | level3 | level4 | level5 | level6 | level7 | level8 | level9 | Cardinality |
|---|---|---|---|---|---|---|---|---|---|---|---|---|---|
| | CreditCard 391468 | | | | | | | | Credit-Card 391470 | | | | 0..n 391472 |
| | | | | | | | | | | Pay-ment-CardID 391474 | | | 0..1 391476 |
| | | | | | | | | | | Pay-ment-Card-Type-Code 391478 | | | 0..1 391480 |
| | | | | | | | | | | Pay-ment-Card-Holder-Name 391482 | | | 0..1 391484 |

FIG. 39-87

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Valid-ityPe-riod 391486 | | | 0..1 391488 |
| | | | | | | | | | | Pay-ment-Card-DataO-rigin-Type-Code 391490 | | | 0..1 391492 |
| | | DebitCard 391494 | | | | | | | Debit-Card 391496 | | | | 0..n 391498 |
| | | | | | | | | | | Bank-Stan-dardID 391500 | | | 0..1 391502 |

FIG. 39-88

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | BankInternalID 391504 | | | 0..1 391506 |
| | | | | | | | | | | | | | | BankAccount-StandardID 391508 | | | 0..1 391510 |
| | | | | | | | | | | | | | | BankAccountInternalID 391512 | | | 0..1 391514 |
| | | | | | | | | | | | | | | Payment-Card-Holder-Name 391516 | | | 0..1 391518 |

FIG. 39-89

| Package | | | | level1 | level2 | level3 | level4 | level5 | level6 | level7 | level8 | level9 | Cardinality |
|---|---|---|---|---|---|---|---|---|---|---|---|---|---|
| | TravellersCheque 391520 | | | | | | | | Traveller-sCheque 391522 | | | | 0..n 391524 |
| | | | | | | | | | | BankStandardID 391526 | | | 0..1 391528 |
| | | | | | | | | | | BankInternalID 391530 | | | 0..1 391532 |
| | | | | | | | | | | BankAccountStandardID 391534 | | | 0..1 391536 |

FIG. 39-90

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | BankAccountInternalID 391538 | | | 0..1 391540 |
| | | | | | | | | | | ID 391542 | | | 0..1 391544 |
| | GiftCard 391546 | | | | | | | | GiftCard 391548 | | | | 0..n 391550 |
| | | | | | | | | | | Pay-ment-CardID 391552 | | | 0..1 391554 |
| | | | | | | | | | | Expira-tionDate 391556 | | | 0..1 391558 |

FIG. 39-91

| Package | | | | level1 | level2 | level3 | level4 | level5 | level6 | level7 | level8 | level9 | Cardinality |
|---|---|---|---|---|---|---|---|---|---|---|---|---|---|
| | TransactionLink 391560 | | | | | | | TransactionLink 391562 | | | | | 0..1 391564 |
| | | | | | | | | | StoreInternalID 391566 | | | | 1 391568 |
| | | | | | | | | | DeviceID 391570 | | | | 1 391572 |
| | | | | | | | | | TillID 391574 | | | | 0..1 391576 |
| | | | | | | | | | PointOfSaleTransactionID 391578 | | | | 1 391580 |

FIG. 39-92

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | Business-Date 391582 | | | | 1 391584 |
| | | | | | | | | | Processing-Period 391586 | | | | 0..1 391588 |
| | Party 391590 | | | | | | | BuyerParty 391592 | | | | | 0..1 391594 |
| | | | | | | | | | PartyInternalID 391596 | | | | 0..1 391598 |
| | | | | | | | | | EmployeeID 391600 | | | | 0..1 391602 |

FIG. 39-93

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | ProductReceipientParty 391604 | | | | | 0..1 391606 |
| | | | | | | | | | PartyInternalID 391608 | | | | 1 391610 |
| Total 391612 | | | | | | | | Total 391614 | | | | | 0..1 391616 |
| | | | | | | | | | GrossTotalAmount 391618 | | | | 0..1 391620 |
| | | | | | | | | | NetTotalAmount 391622 | | | | 0..1 391624 |

FIG. 39-94

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | TaxTotalAmount 391626 | | | | 0..1 391628 |
| FinancialTransaction 391630 | | | | | | | Finan-cial-Trans-action 391632 | | | | | | 0..1 391634 |
| | Item 391636 | | | | | | | Item 391638 | | | | | 1..n 391640 |
| | | | | | | | | | Poin-tOfSale-Trans-actio-nItemID 391642 | | | | 1 391644 |
| | | Deposit 391646 | | | | | | | Deposit 391648 | | | | 0..1 391650 |

FIG. 39-95

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | BankAccount-StandardID 391652 | | | 0..1 391654 |
| | | | | | | | | | | | | | | BankAccountInternalID 391656 | | | 0..1 391658 |
| | | | | | | | | | | | | | | Amount 391660 | | | 1 391662 |
| | | | | | PaidIn 391664 | | | | | | | | PaidIn 391666 | | | | 0..1 391668 |

FIG. 39-96

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | Poin-tOfSale-Trans-action-Ten-derType Code 391670 | | | 0..1 391672 |
| | | | | | | | | | | Amount 391674 | | | 1 391676 |
| | | | | | | | | | | Poin-tOfSale-Trans-action-Finan-cial-Trans-action-Reason Code 391678 | | | 0..1 391680 |

FIG. 39-97

| Package | | | | level1 | level2 | level3 | level4 | level5 | level6 | level7 | level8 | level9 | Cardinality |
|---|---|---|---|---|---|---|---|---|---|---|---|---|---|
| | PaidOut 391682 | | | | | | | | PaidOut 391684 | | | | 0..1 391686 |
| | | | | | | | | | | PointOfSale-Transaction-TenderType Code 391688 | | | 0..1 391690 |
| | | | | | | | | | | Amount 391692 | | | 1 391694 |

FIG. 39-98

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | PointOfSale-Transaction-Financial-Transaction-Reason Code 391696 | | | 0..1 391698 |
| | TenderLoan 391700 | | | | | | | | TenderLoan 391702 | | | | 0..1 391704 |
| | | | | | | | | | | PointOfSale-Transaction-TenderType Code 391706 | | | 0..1 391708 |

FIG. 39-99

| Package | | | | | | | | level1 | level2 | level3 | level4 | level5 | level6 | level7 | level8 | level9 | Cardinality |
|---|---|---|---|---|---|---|---|---|---|---|---|---|---|---|---|---|---|
| | | | | | | | | | | | | | | Amount 391710 | | | 1 391712 |
| | | | | | | | | | | | | | | PointOf-SaleTransaction Finan-cial-Trans-action-Reason Code 391714 | | | 0..1 391716 |
| | | | | | Tender-Pickup 391718 | | | | | | | | Tender-Pickup 391720 | | | | 0..1 391722 |

FIG. 39-100

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | | PointOf-SaleTransactionTender-Type-Code 391724 | | | 0..1 391726 |
| | | | | | | | | | | Amount 391728 | | | 1 391730 |
| | | | | | | | | | | PointOf-SaleTransactionFinan-cial-Trans-action-ReasonCode 391732 | | | 0..1 391734 |

FIG. 39-101

| Package | | | | level1 | level2 | level3 | level4 | level5 | level6 | level7 | level8 | level9 | Cardinality |
|---|---|---|---|---|---|---|---|---|---|---|---|---|---|
| | TenderAdjustment 391736 | | | | | | | | TenderAdjustment 391738 | | | | 0..1 391740 |
| | | | | | | | | | | PointOfSaleTransactionTenderTypeCode 391742 | | | 0..1 391744 |
| | | | | | | | | | | Amount 391746 | | | 1 391748 |

FIG. 39-102

| Package | | | | | level1 | level2 | level3 | level4 | level5 | level6 | level7 | level8 | level9 | Cardinality |
|---|---|---|---|---|---|---|---|---|---|---|---|---|---|---|
| | | | | | | | | | | | PointOf-SaleTransaction Finan-cial-Trans-action-Reason Code 391750 | | | 0..1 391752 |
| ControlTransaction 391754 | | | | | | | | Control-Trans-action 391756 | | | | | | 0..1 391758 |
| | Item 391760 | | | | | | | | Item 391762 | | | | | 1..n 391764 |

FIG. 39-103

| Package | | | | level1 | level2 | level3 | level4 | level5 | level6 | level7 | level8 | level9 | Cardinality |
|---|---|---|---|---|---|---|---|---|---|---|---|---|---|
| | | | | | | | | | PointOf-SaleTra nsactio-nItemID 391766 | | | | 1 391768 |
| | | | | | | | | | PointOf-SaleTra nsaction Control-Trans-action-Reason Code 391770 | | | | 1 391772 |

MANAGING CONSISTENT INTERFACES FOR MERCHANDISING BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer readable medium includes program code for providing a message-based interface for exchanging comprehensive merchandise information, including product, bill of material, configuration, sales price information and purchase price information. The medium comprises program code for receiving a first message and program code for sending a second message. Receipt of the first message is via a message-based interface that exposes at least one service as defined in a service registry. The first message is received from a heterogeneous application executing in an environment of computer systems providing message-based services. The first message provides a notification that includes information for a comprehensive merchandise view for a product including bill of material, configuration, sales price information and purchase price information. The notification includes a message package. The message package is hierarchically organized as a merchandise ERP replication bulk request message entity and a merchandise ERP replication request message package. The merchandise ERP replication request message package comprises a merchandise ERP replication request message entity and a merchandise package. The merchandise package comprises a merchandise entity and a receiving store package. The merchandise entity includes an internal ID. The receiving store package includes at least one receiving store entity. Each receiving store entity includes a store internal ID. The second message is sent to the heterogeneous application responsive to the first message.

Implementations can include any, all or none of these features. The merchandise package further comprises at least one of the following: a point of sale processing condition package, a description package, a global trade item number package, a quantity unit package, a quantity conversion package, a product category package, a configurable material assignment package, a configuration property valuation package, a measure unit code specific description package, a tax classification package, an empties bill of material package, a material merchandise bill of material package, a procurement price information package, and a sale price information package. The merchandise entity further includes an action code, a material type code, and a material merchandise type code.

In a second aspect, a computer readable medium includes program code for providing a message-based interface for exchanging information for business activity that is performed in a retail store, including retail transactions, financial movements and goods movements. The medium comprises program code for receiving a first message and program code for sending a second message. Receipt of the first message is via a message-based interface that exposes at least one service as defined in a service registry. The first message is received from a heterogeneous application executing in an environment of computer systems providing message-based services. The first message provides a notification of one or more point of sale transactions. The notification includes a message package. The message package is hierarchically organized as a point of sale transaction ERP bulk create request message entity and a point of sale transaction ERP create request message package. The point of sale transaction ERP create request message package comprises a point of sale transaction ERP create request message entity and a point of sale transaction package. The point of sale transaction package comprises a point of sale transaction entity. The point of sale transaction entity includes a store internal ID, a device ID, an ID, a business date, and a training mode active indicator. The second message is sent to the heterogeneous application responsive to the first message.

Implementations can include any, all or none of these features. The point of sale transaction package further comprises at least one of the following: an operator package, a retail transaction package, a financial transaction package, and a control transaction package. The point of sale transaction entity further includes a till ID, a processing period, and a currency code.

In a third aspect, a distributed system operating in a landscape of computer systems provides message-based services defined in a service registry. The system comprises a graphical user interface, a first memory, and a second memory. The graphical user interface comprises computer readable instructions, embedded on tangible media. The instructions are used for exchanging comprehensive merchandise information, including product, bill of material, configuration, sales price information and purchase price information. The first memory stores a user interface controller for processing the request and involving a message including a message package. The message package is hierarchically organized as a merchandise ERP replication bulk request message entity and a merchandise ERP replication request message package. The merchandise ERP replication request message package comprises a merchandise ERP replication request message entity and a merchandise package. The merchandise package comprises a merchandise entity and a receiving store package. The merchandise entity includes an internal ID. The receiving store package includes at least one receiving store entity. Each receiving store entity includes a store internal ID. The second memory, remote from the graphical user interface, stores a plurality of service interfaces. One of the service interfaces is operable to process the message via the service interface.

Implementations can include any, all or none of these features. The first memory is remote from the graphical user interface. The first memory is remote from the second memory.

In a fourth aspect, a distributed system operating in a landscape of computer systems provides message-based services defined in a service registry. The system comprises a graphical user interface, a first memory, and a second memory. The graphical user interface comprises computer readable instructions, embedded on tangible media. The instructions are used for exchanging information for business activity that is performed in a retail store, including retail transactions, financial movements and goods movements. The first memory stores a user interface controller for processing the request and involving a message including a message package. The message package is hierarchically organized as a point of sale transaction ERP bulk create request message entity and a point of sale transaction ERP create request message package. The point of sale transaction ERP create request message package comprises a point of sale transaction ERP create request message entity and a point of sale transaction package. The point of sale transaction package comprises a point of sale transaction entity. The point of sale transaction entity includes a store internal ID, a device ID, an ID, a business date, and a training mode active indicator. The second memory, remote from the graphical user interface, stores a plurality of service interfaces. One of the service interfaces is operable to process the message via the service interface.

Implementations can include any, all or none of these features. The first memory is remote from the graphical user interface. The first memory is remote from the second memory.

BRIEF DESCRIPTION OF THE DRAWINGS

FIGS. 33-1 through 33-14 depict an example MerchandiseERPReplicationBulkRequestMessage Message Data Type.

FIGS. 34-1 through 34-25 depict an example MerchandiseERPReplicationBulkRequestMessage Element Structure.

FIGS. 35-1 through 35-28 depict an example MerchandiseERPReplicationBulkRequestMessage Element Structure.

FIGS. 37-1 through 37-60 depict an example PointOfSaleTransactionERPBulkCreateRequestMessage Message Data Type.

FIGS. 38-1 through 38-103 depict an example PointOfSaleTransactionMessage Element Structure.

FIGS. 39-1 through 39-103 depict an example PointOfSaleTransactionERPBulkCreateRequestMessage Element Structure.

DETAILED DESCRIPTION

A. Overview

Figure 1:
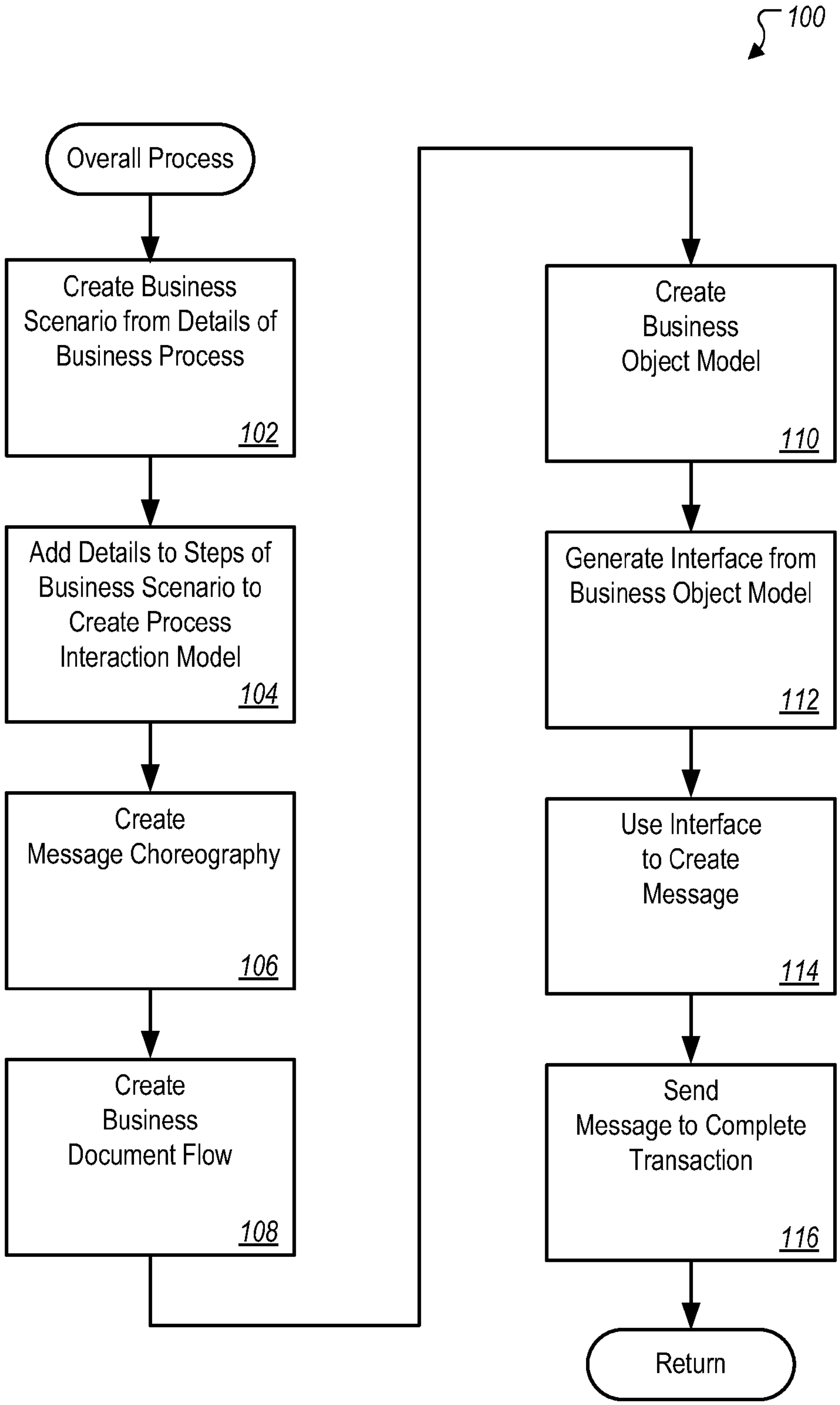
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g., hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a “business scenario” (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a “business transaction,” and each business entity is referred to as a “component” of the business transaction. The developers also identify the messages that are transmitted between the components. A “process interaction model” represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
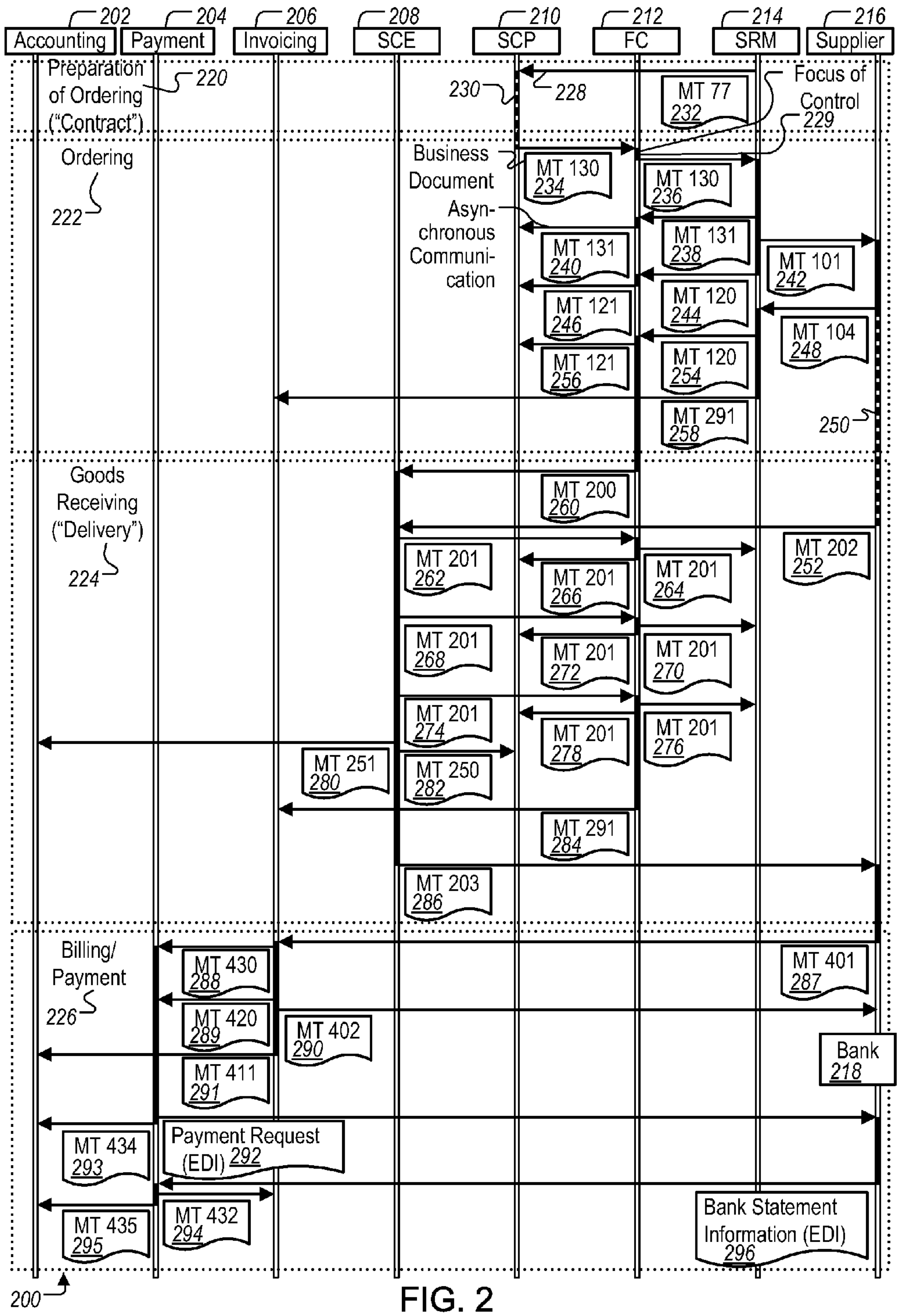
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
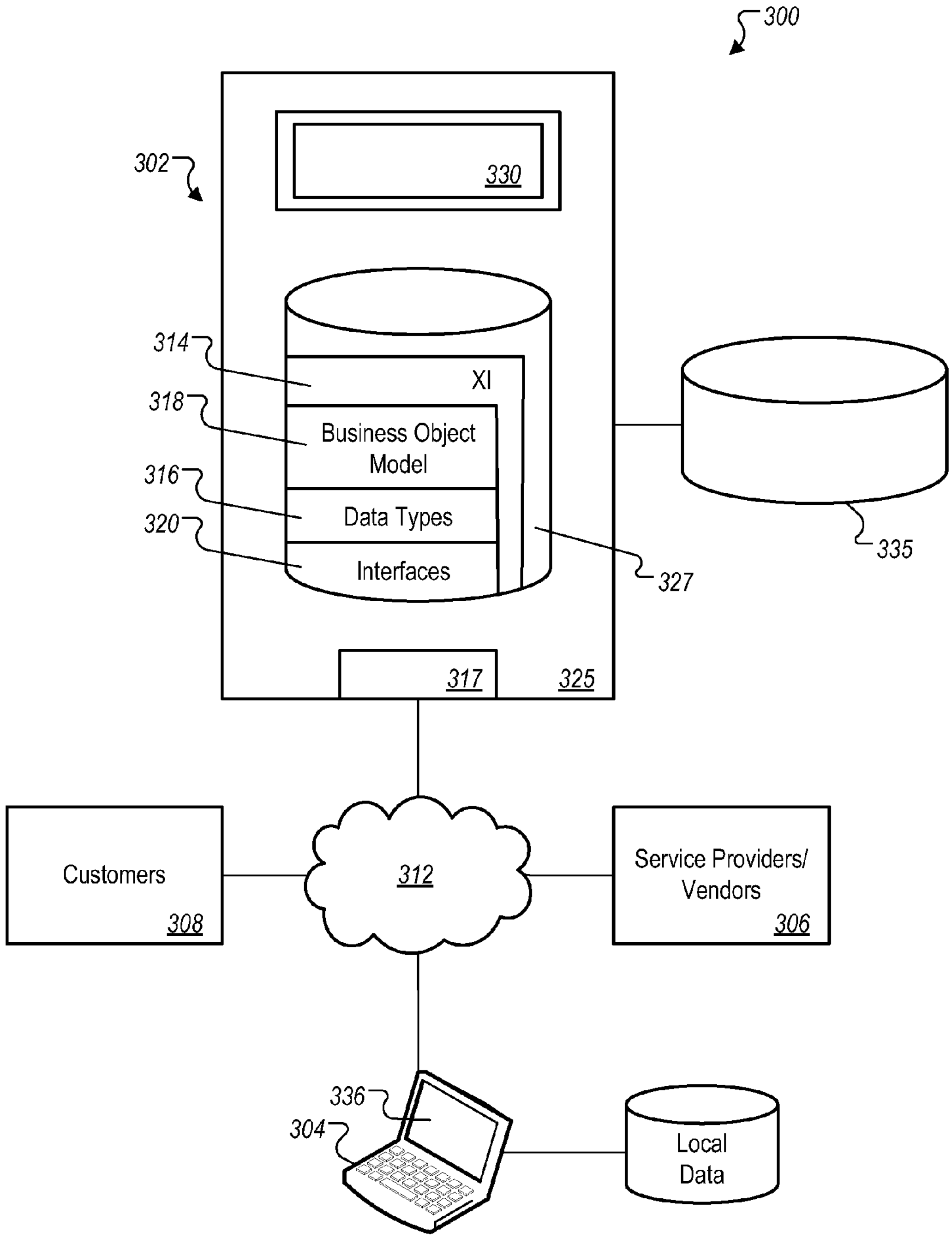
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
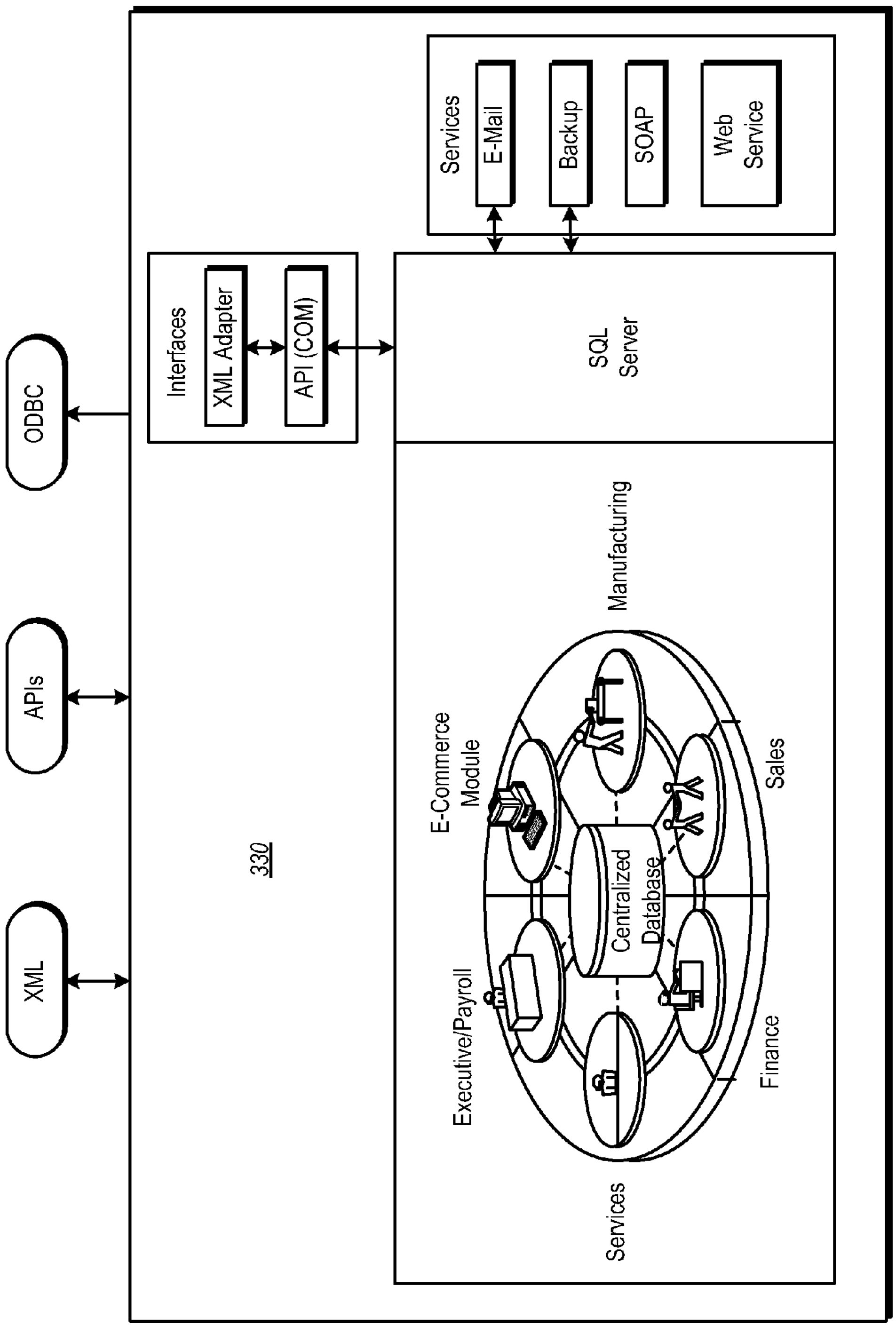
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
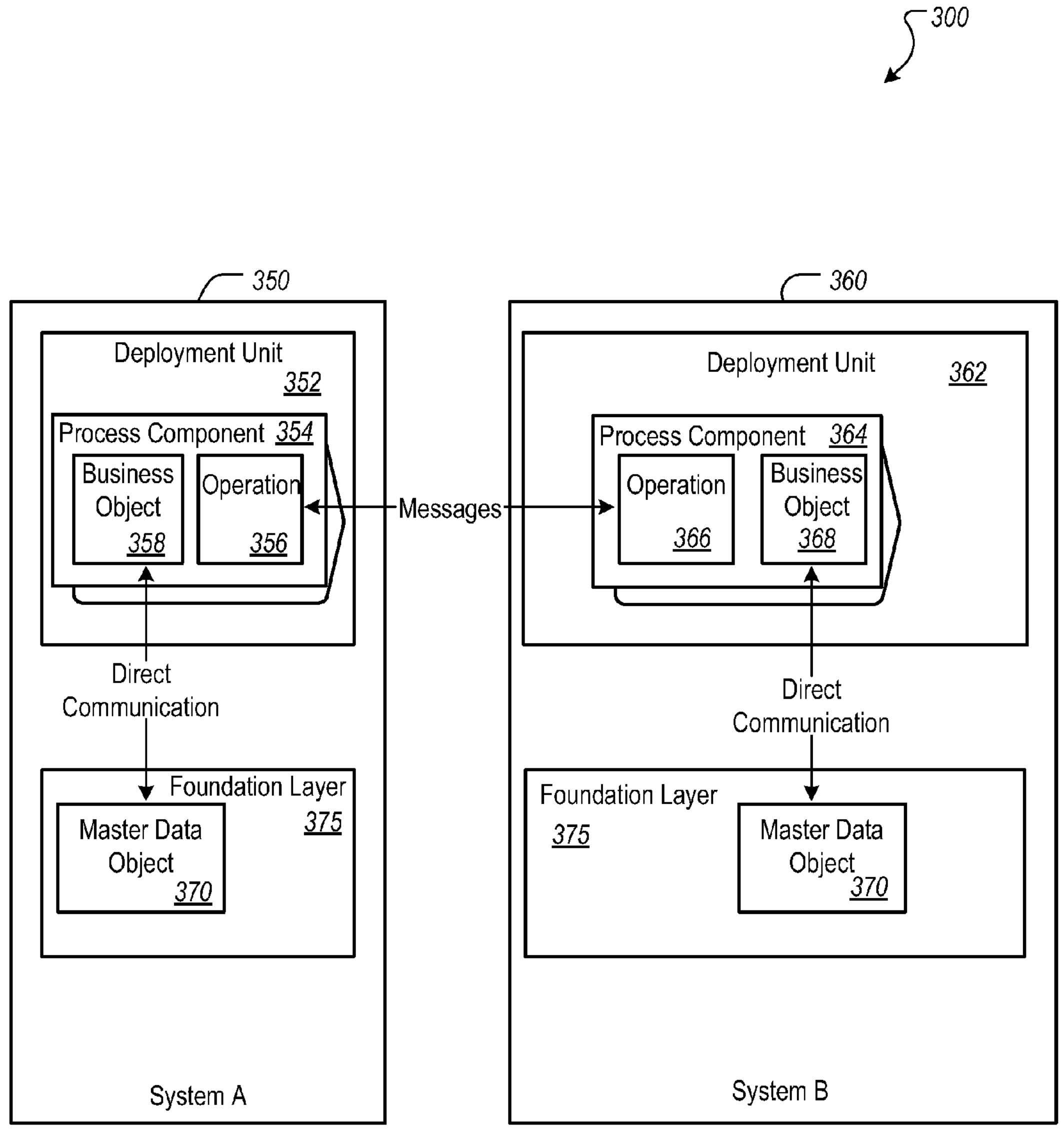

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
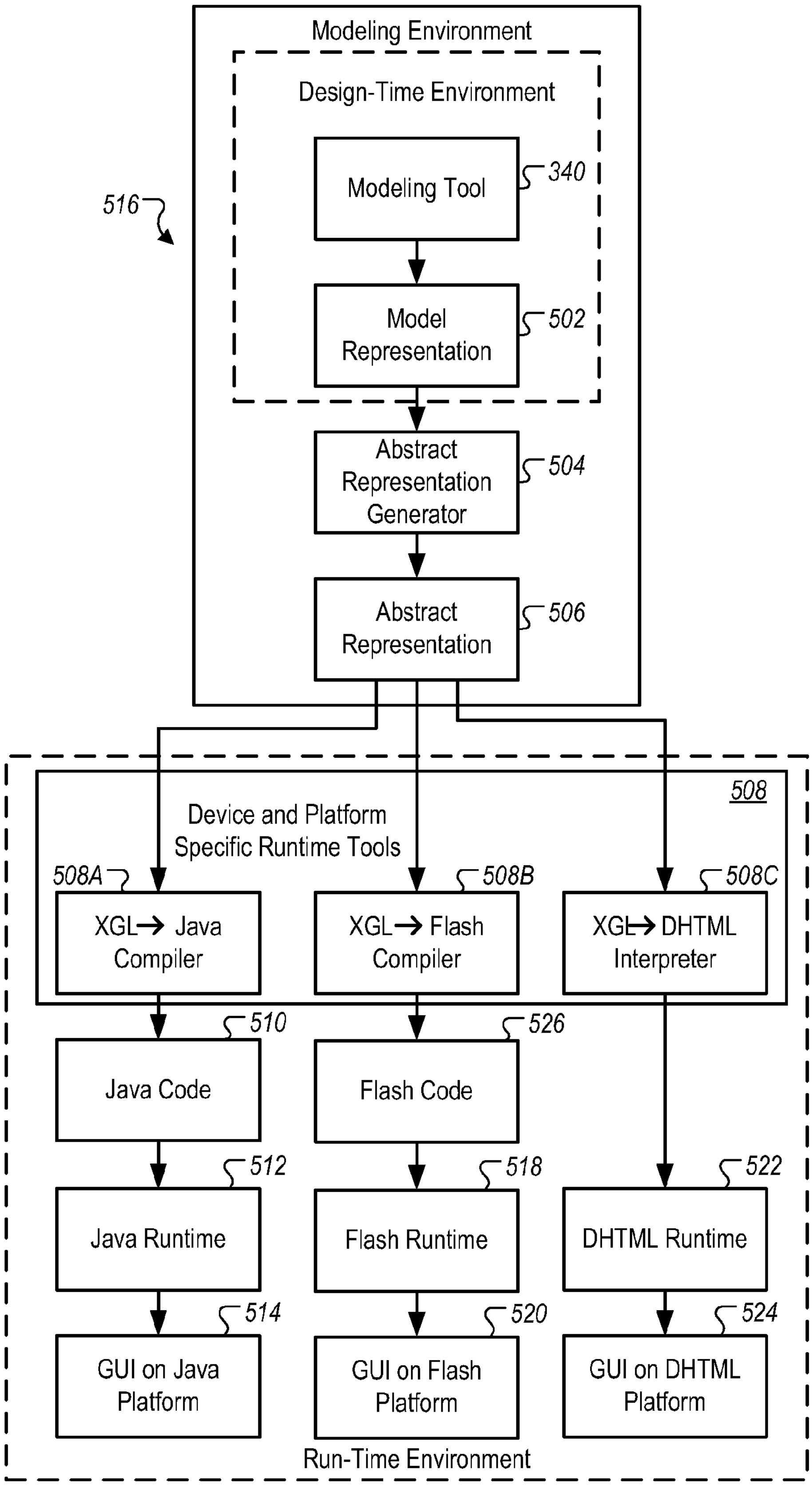
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific.

The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
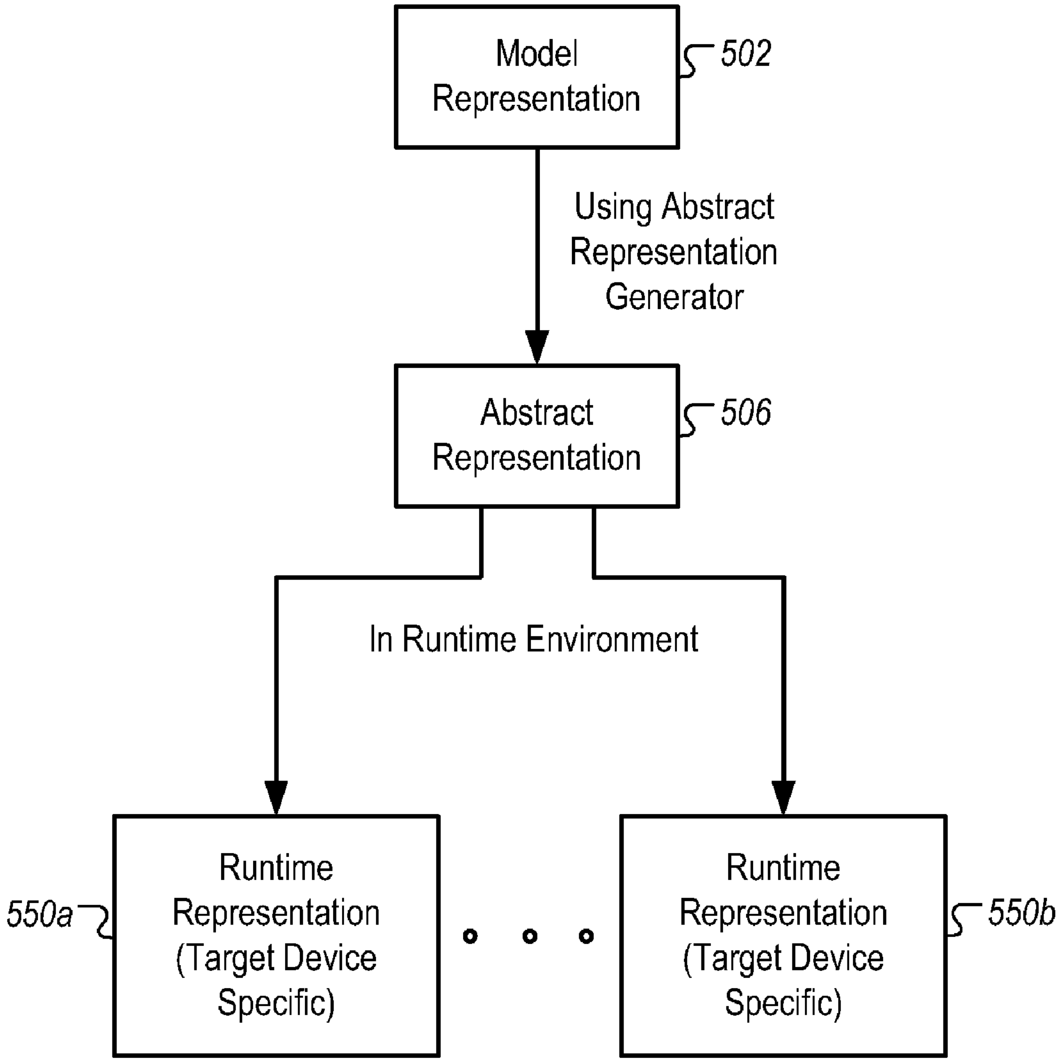
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
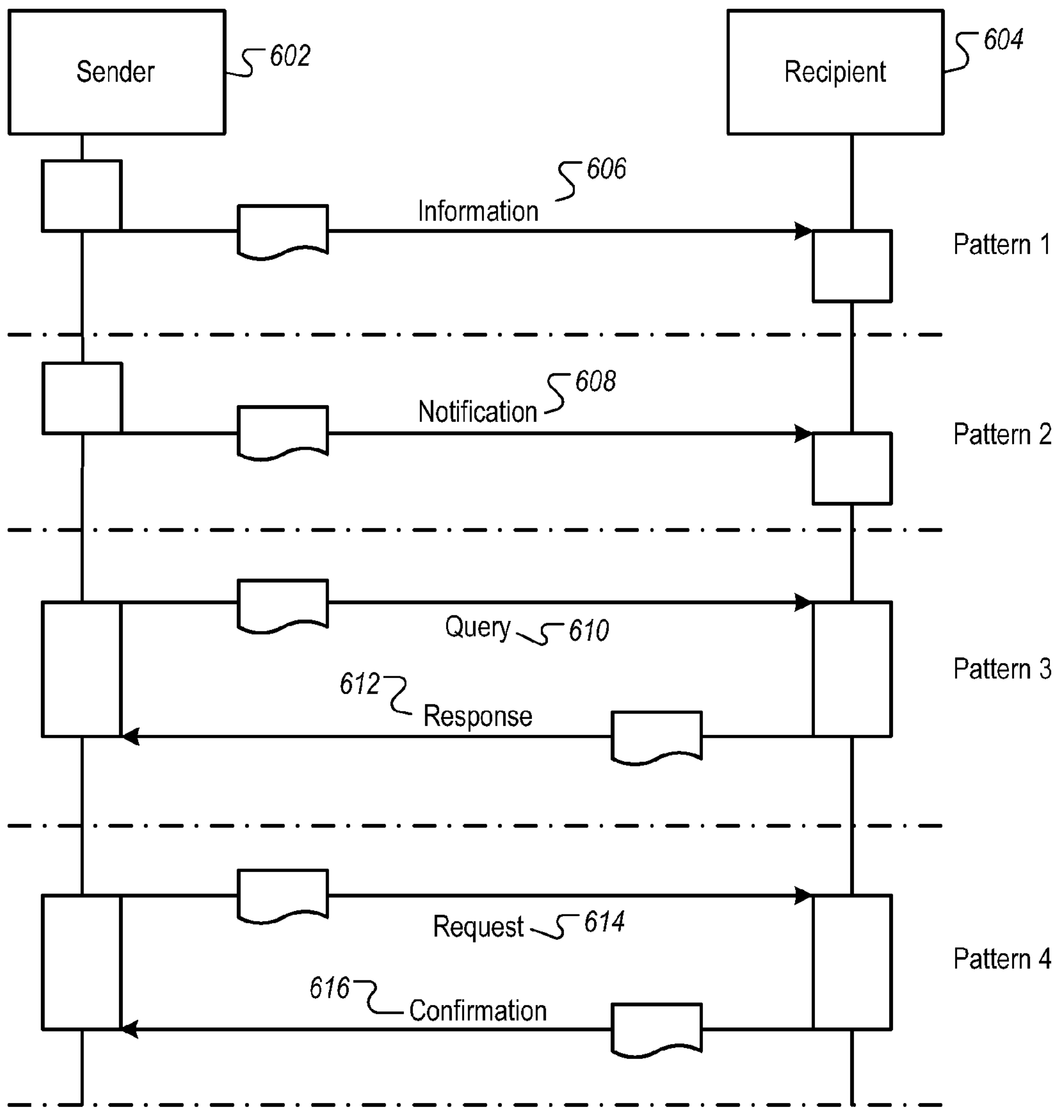
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
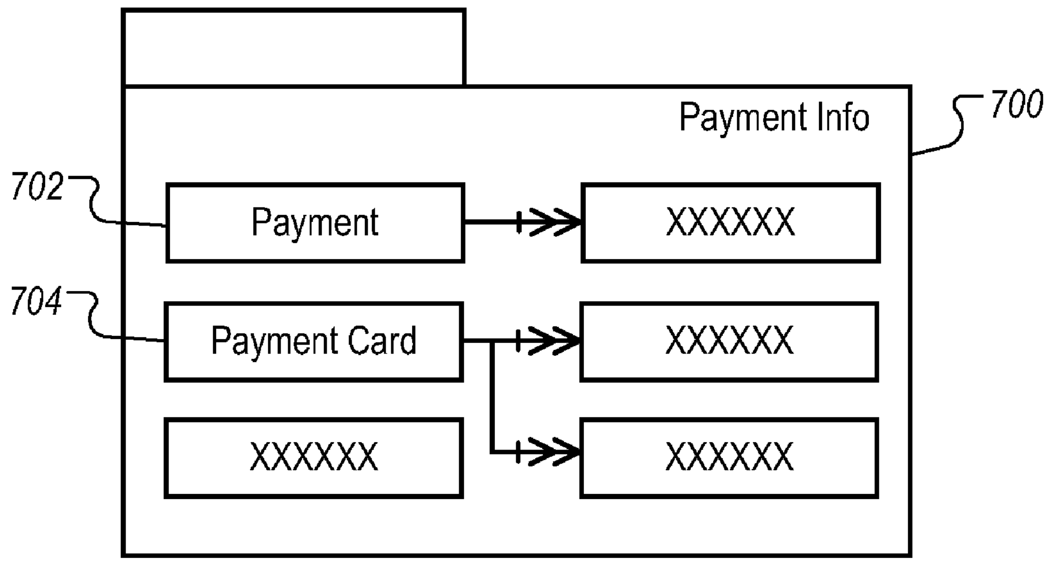
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
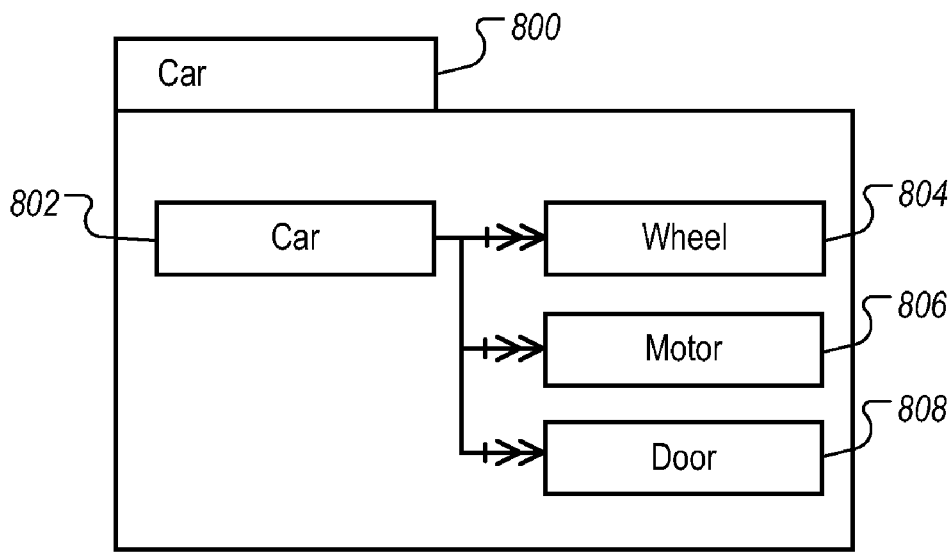
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
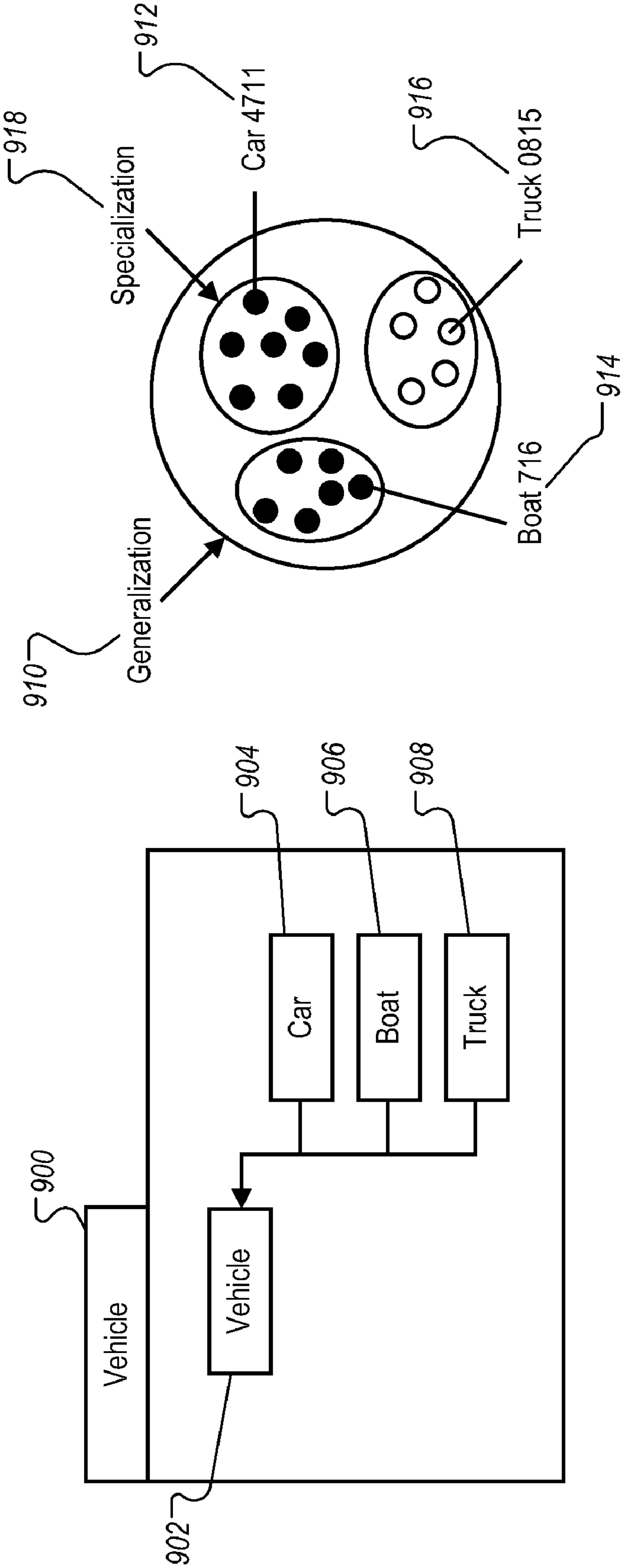
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
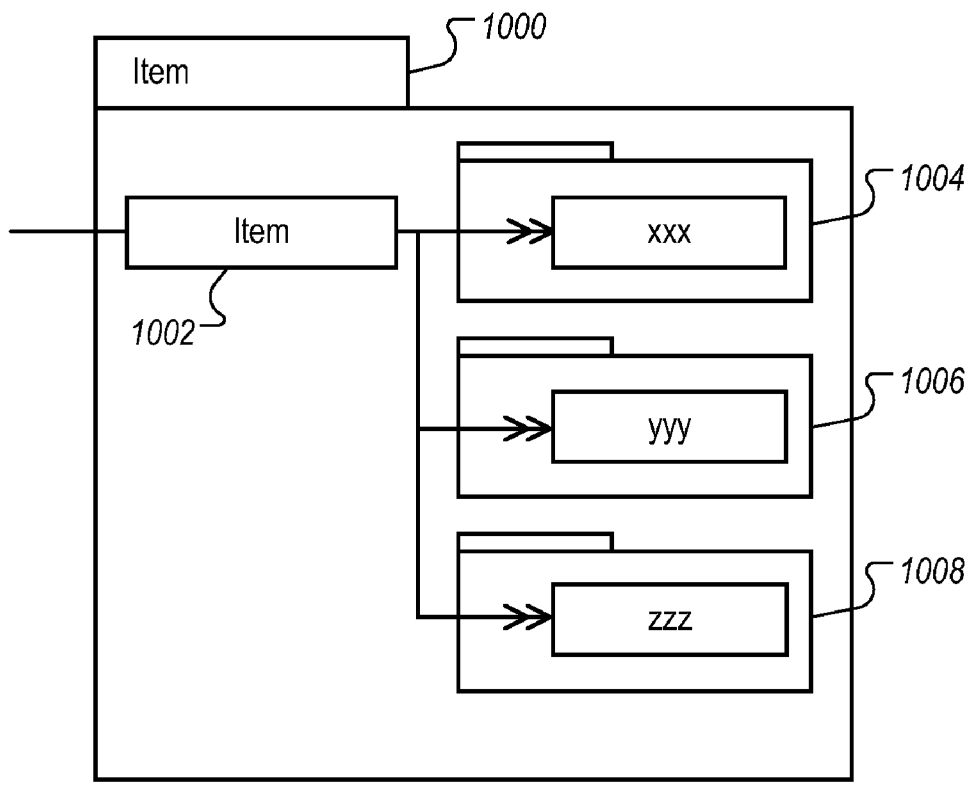
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
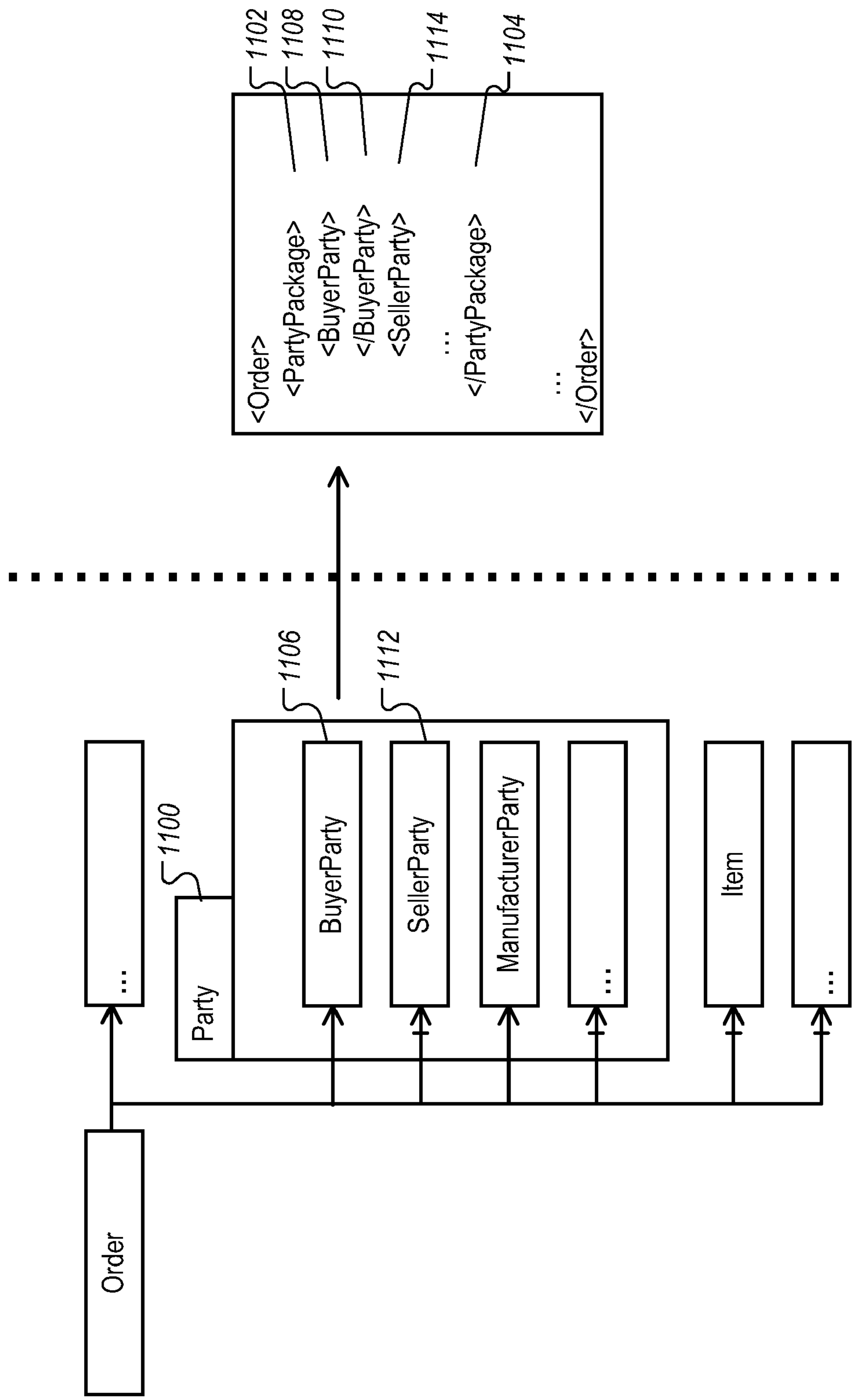
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
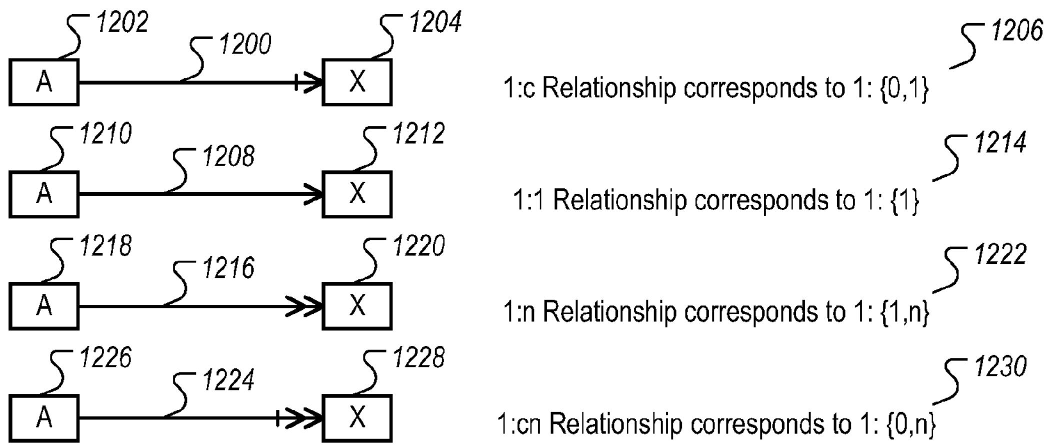
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
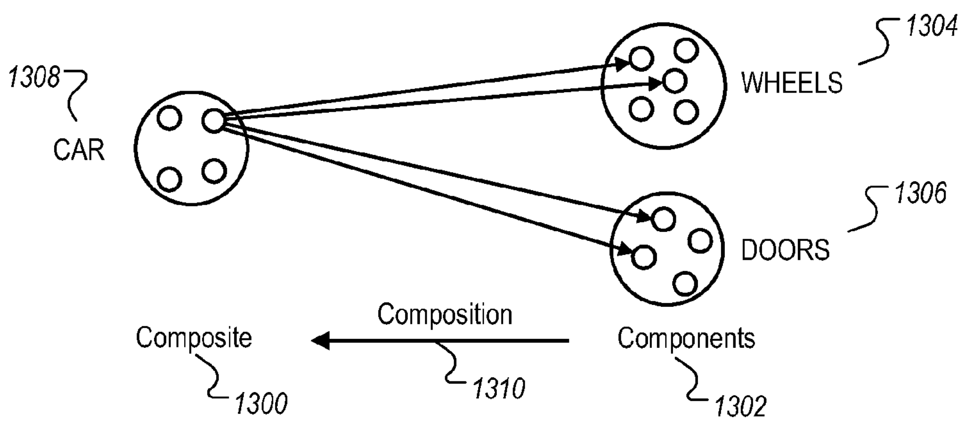
FIG. 13 depicts an example of a composition in accordance with methods and systems consistent with the subject matter described herein.
Figure 14:
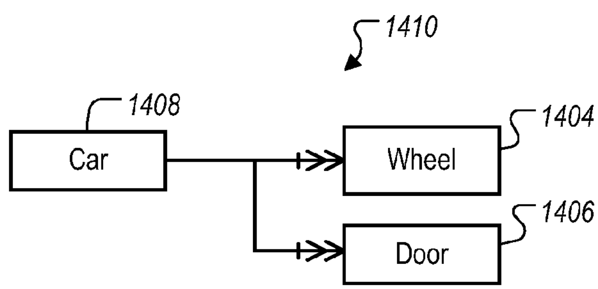
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
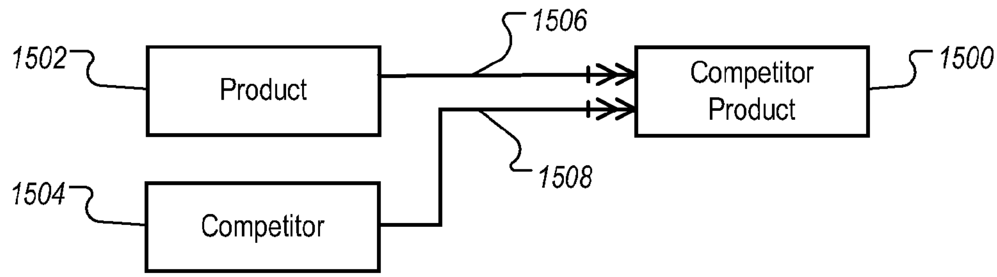
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
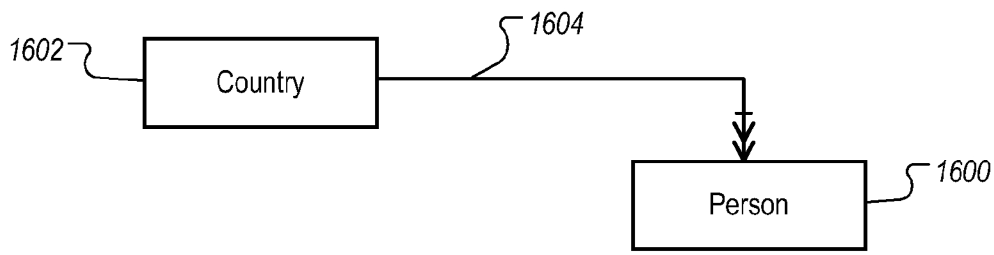
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
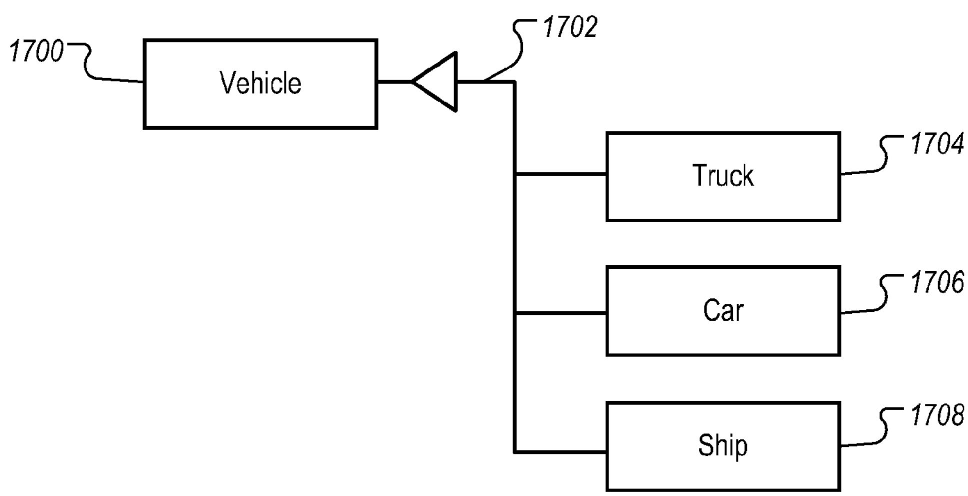
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
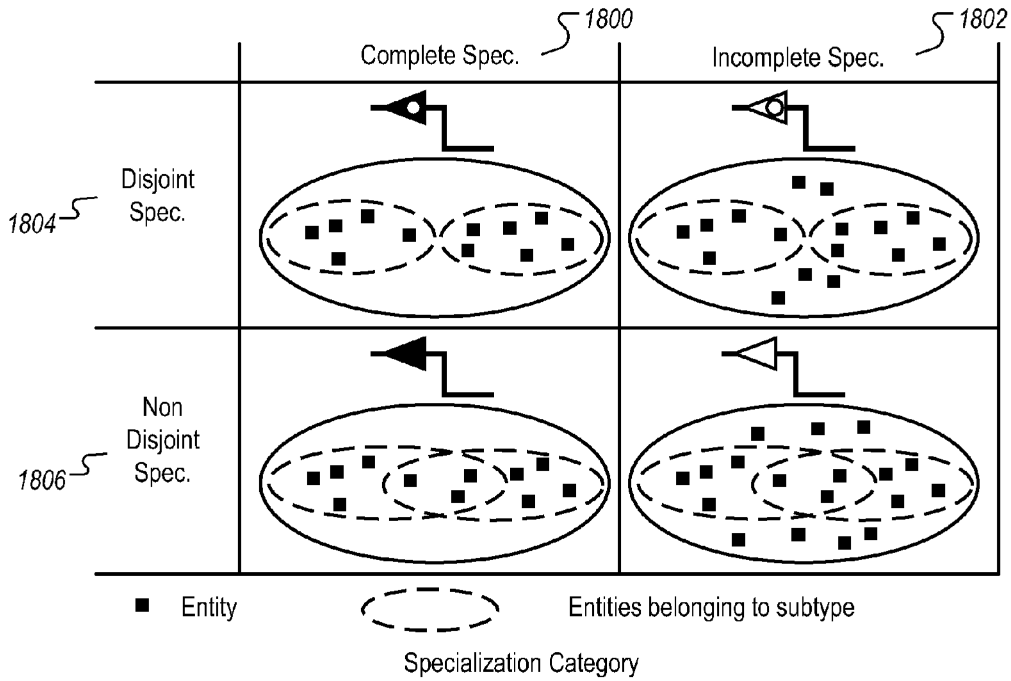
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
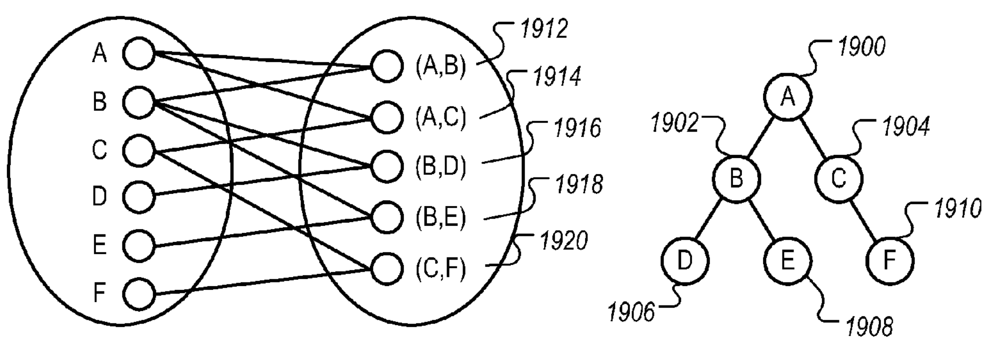
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
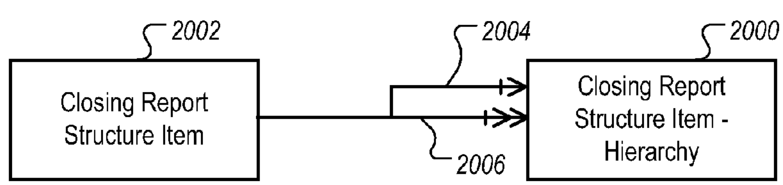
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
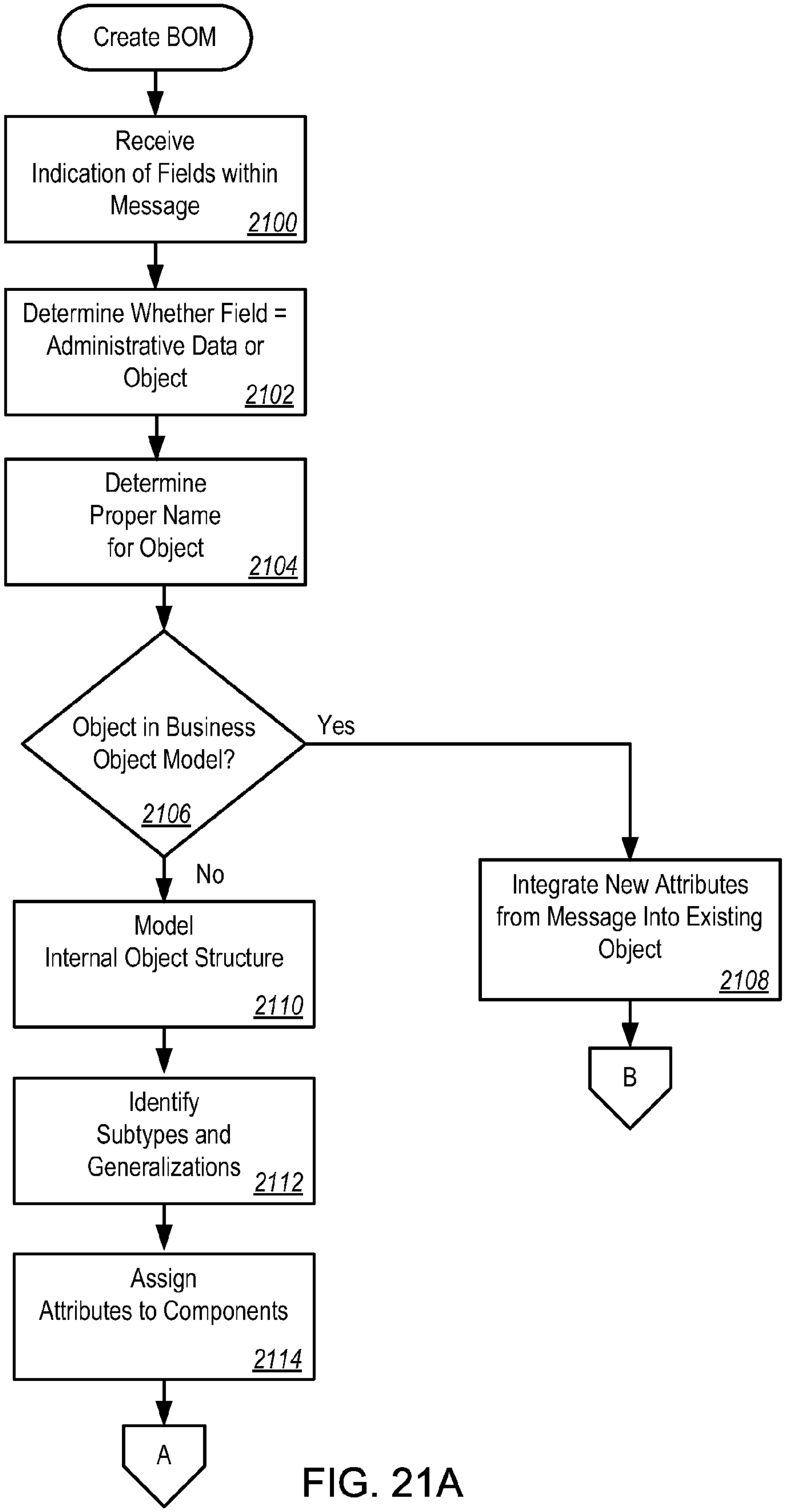
FIGS. 21A-B depict a flow diagram of the steps performed to create a business object model in accordance with methods and systems consistent with the subject matter described herein.
Figure 21B:
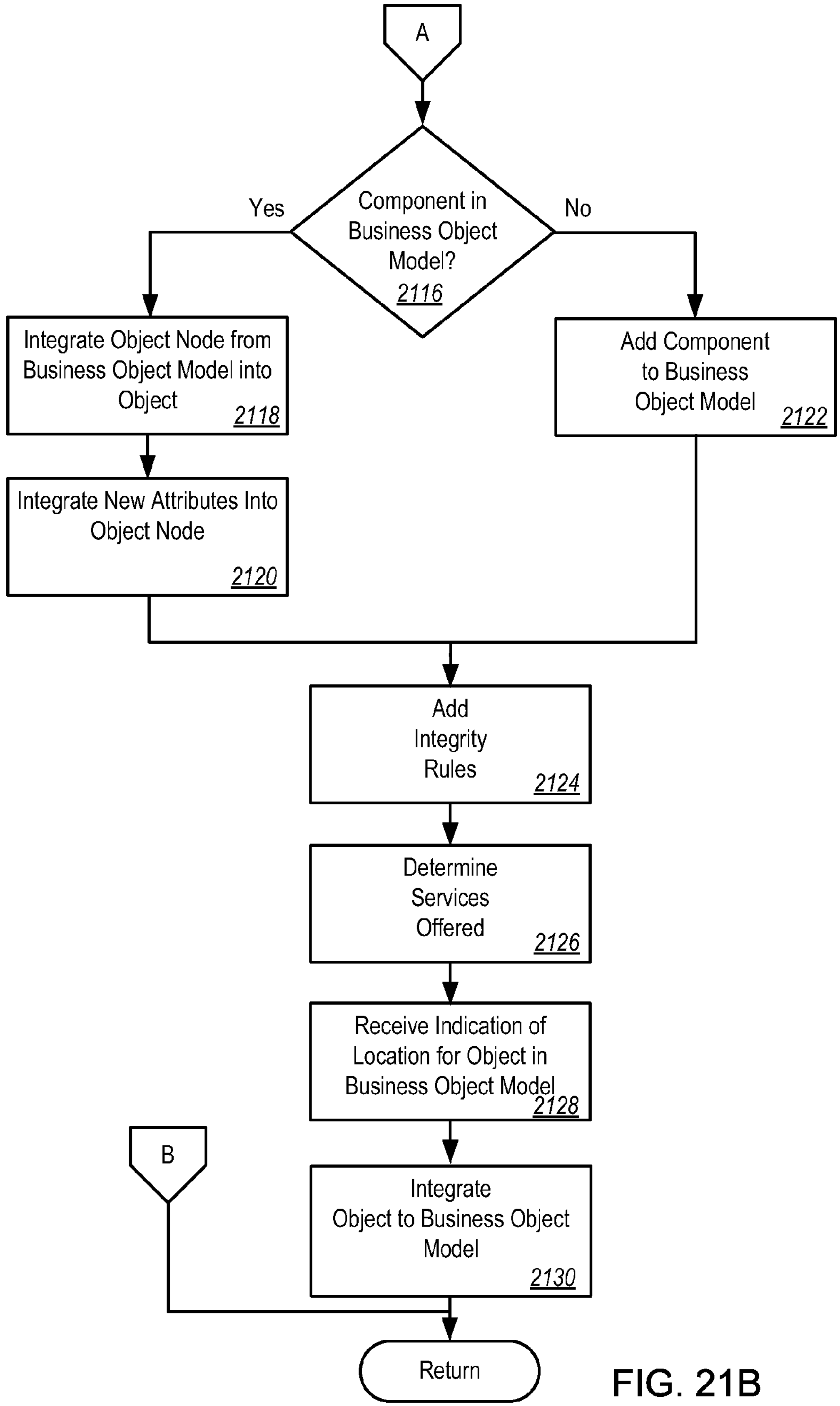

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |

-continued

| | |
|---|---|
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |

-continued

| | |
|---|---|
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |
| ItemLocationType | |
| ItemDeliveryItemGroupID | |
| ItemDeliveryPriority | |
| ItemDeliveryCondition | |
| ItemTransferLocation | |
| ItemNumberofPartialDelivery | |
| ItemQuantityTolerance | |
| ItemMaximumLeadTime | |
| ItemTransportServiceLevel | |
| ItemTranportCondition | |
| ItemTransportDescription | |
| ContractReference | |
| QuoteReference | |
| CatalogueReference | |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | |
|---|---|
| ID | Purchase Order |
| AdditionalID | |
| PostingDate | |
| LastChangeDate | |
| AcceptanceStatus | |
| Note | |
| CompleteTransmission | |

-continued

| | | |
|---|---|---|
| Indicator | | |
| Buyer | Buyer | |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery- | |
| DeliveryPriority | Terms | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase | |
| ParentItemID | Order | |
| HierarchyType | Item | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |

-continued

| | |
|---|---|
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |

-continued

| | | | | |
|---|---|---|---|---|
| | Transport | | | 0 . . . 1 |
| CashDiscount Terms | | | | 0 . . . 1 |
| | MaximumCash Discount | | | 0 . . . 1 |
| | NormalCashDiscount | | | 0 . . . 1 |
| PaymentForm | | | | 0 . . . 1 |
| | PaymentCard | | | 0 . . . 1 |
| Attachment | | | | 0 . . . n |
| Description | | | | 0 . . . 1 |
| Confirmation Description | | | | 0 . . . 1 |
| Item | | | | 0 . . . n |
| | HierarchyRelationship | | | 0 . . . 1 |
| | Product | | | 0 . . . 1 |
| | ProductCategory | | | 0 . . . 1 |
| | Price | | | 0 . . . 1 |
| | | NetunitPrice | | 0 . . . 1 |
| | ConfirmedPrice | | | 0 . . . 1 |
| | | NetunitPrice | | 0 . . . 1 |
| | Party | | | |
| | | BuyerParty | | 0 . . . 1 |
| | | SellerParty | | 0 . . . 1 |
| | Location | | | |
| | | ShipTo Location | | 0 . . . 1 |
| | | ShipFrom Location | | 0 . . . 1 |
| | DeliveryTerms | | | 0 . . . 1 |
| | Attachment | | | 0 . . . n |
| | Description | | | 0 . . . 1 |
| | Confirmation Description | | | 0 . . . 1 |
| | ScheduleLine | | | 0 . . . n |
| | | Delivery Period | | 1 |
| | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product | | | 0 . . . 1 |

-continued

| | | |
|---|---|---|
| RecipientParty | | |
| VendorParty | | 0 . . . 1 |
| Manufacturer Party | | 0 . . . 1 |
| BillToParty | | 0 . . . 1 |
| PayerParty | | 0 . . . 1 |
| CarrierParty | | 0 . . . 1 |
| ShipTo Location | | 0 . . . 1 |
| | StandardID | 0 . . . n |
| | BuyerID | 0 . . . 1 |
| | SellerID | 0 . . . 1 |
| | Address | 0 . . . 1 |
| ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an arrow into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
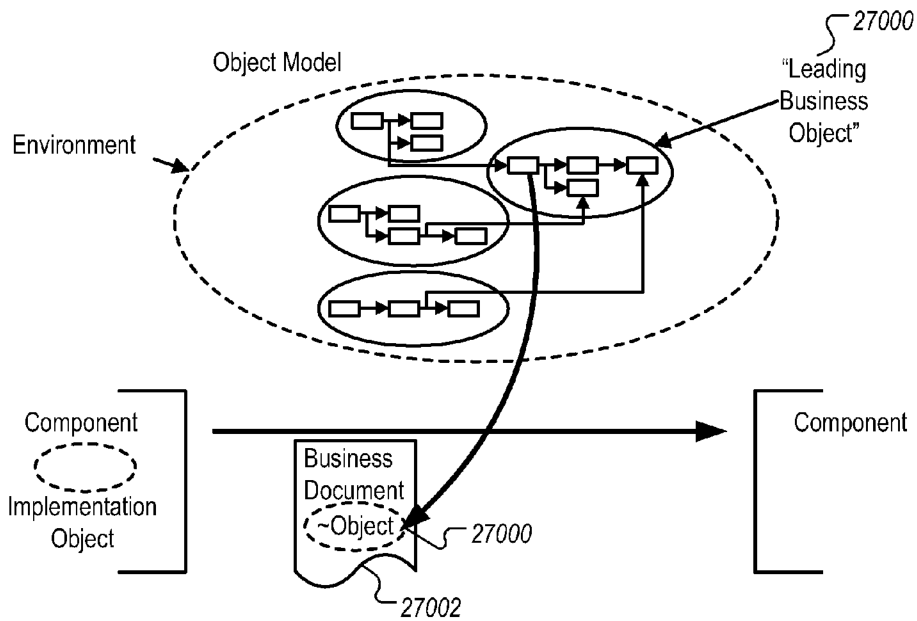
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
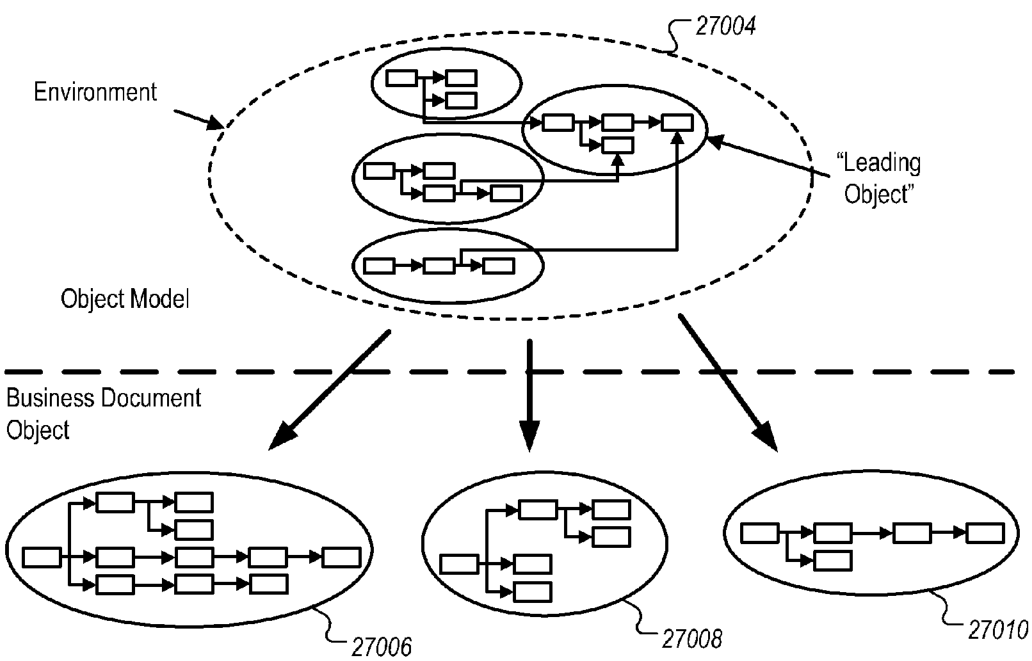

As illustrated in FIG. 27B, several business document objects 27006, 27008, and 27010 as overlapping views may be derived for a given leading object 27004. Each business document object results from the object model by hierarchization.

Figure 27C:
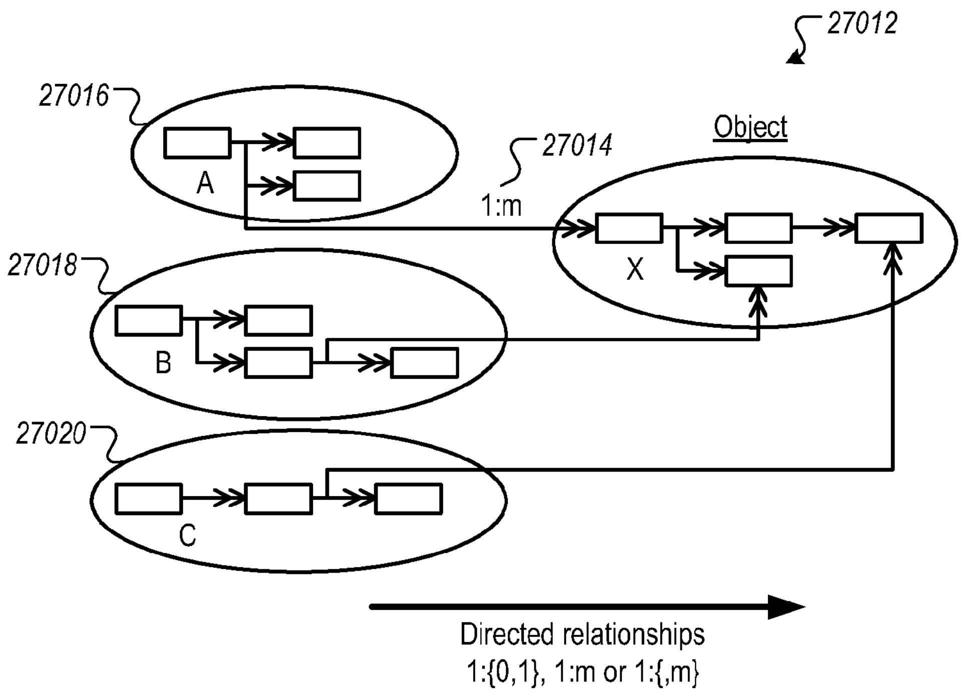

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. Accordingly, the direction of the dependency changes. The required parts of this referenced object are adopted identically, both in their cardinality and in their dependency arrangement.

Figure 27D:
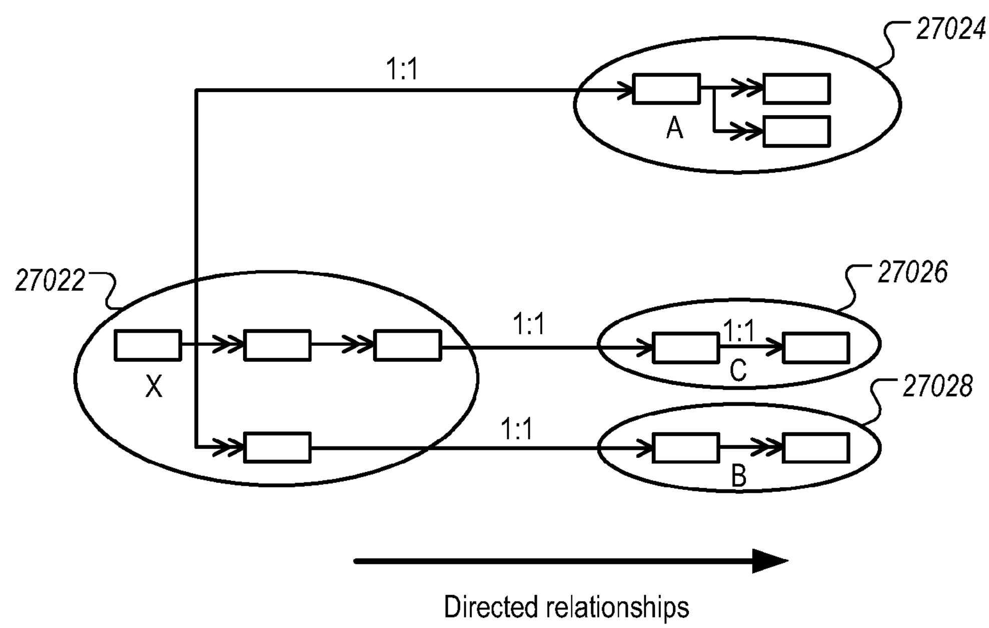

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
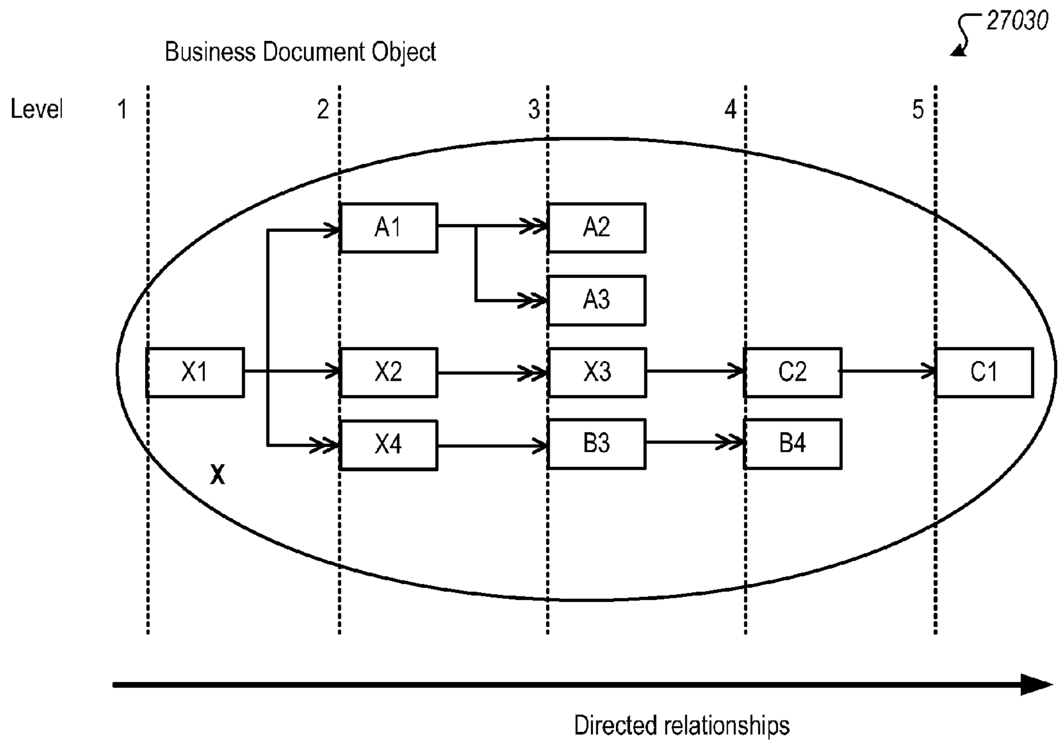
Figure 27E:
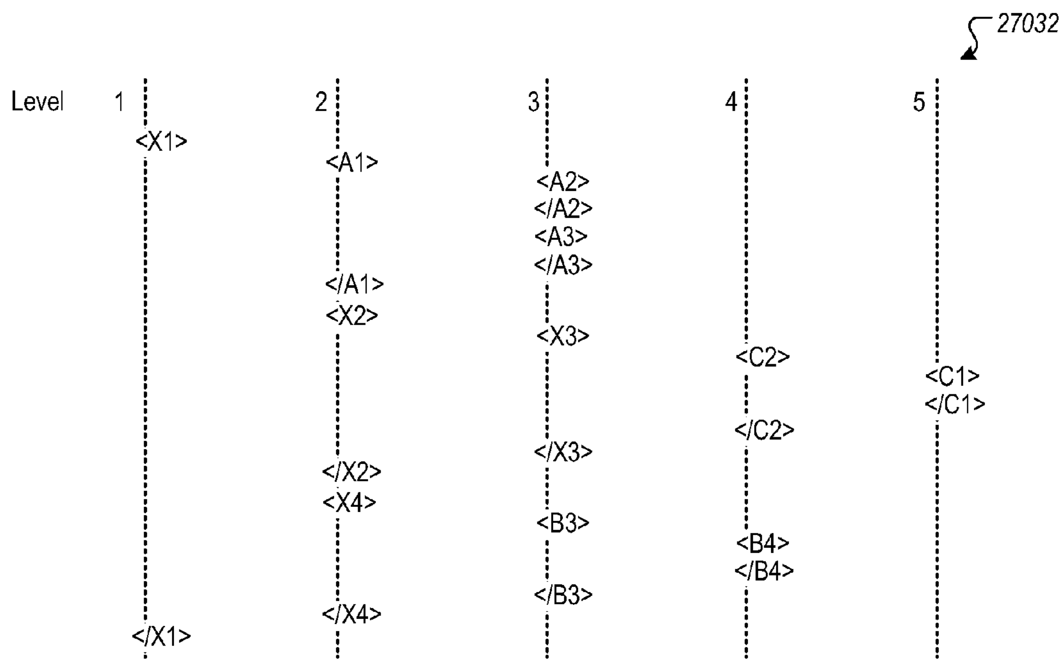

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) is hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object, which are relevant for the service, may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
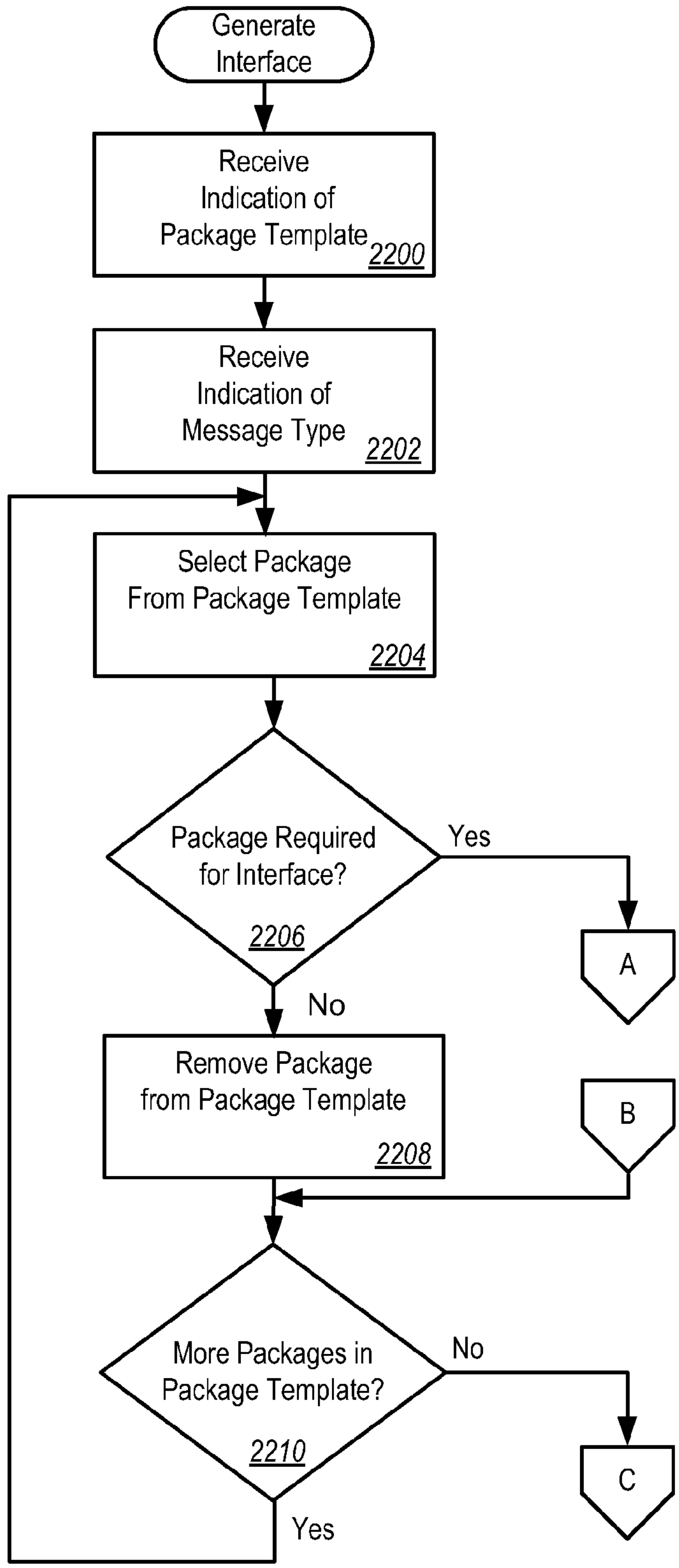
FIGS. 22A-F depict a flow diagram of the steps performed to generate an interface from the business object model in accordance with methods and systems consistent with the subject matter described herein.
Figure 22B:
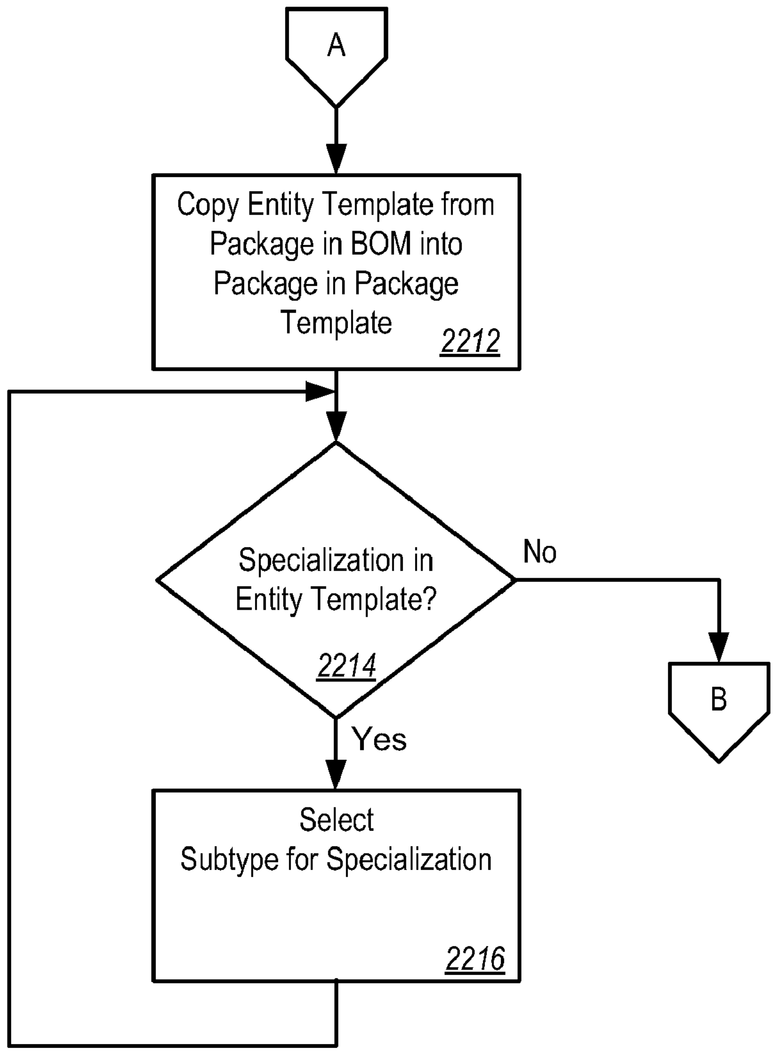
Figure 22C:
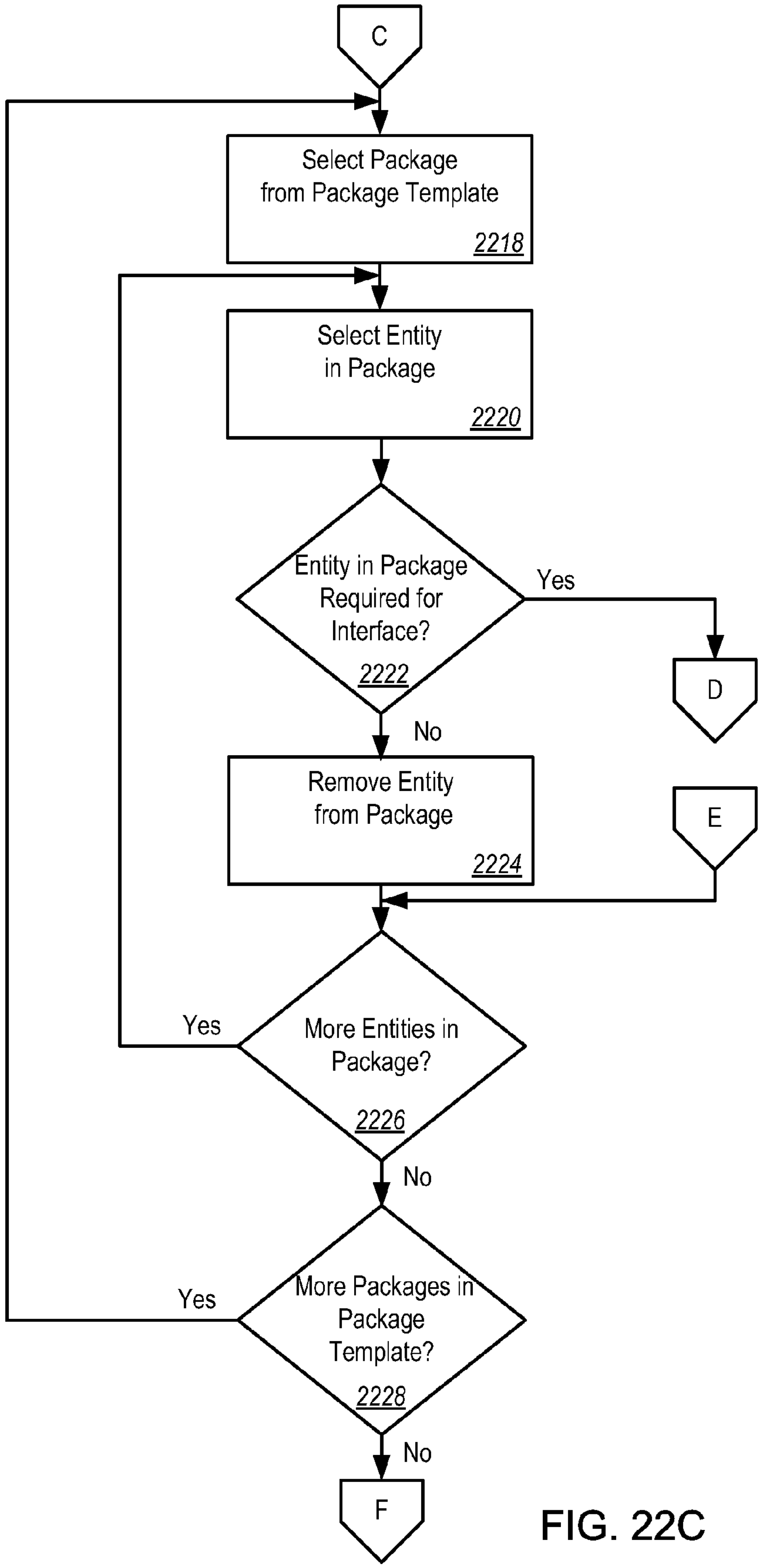

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
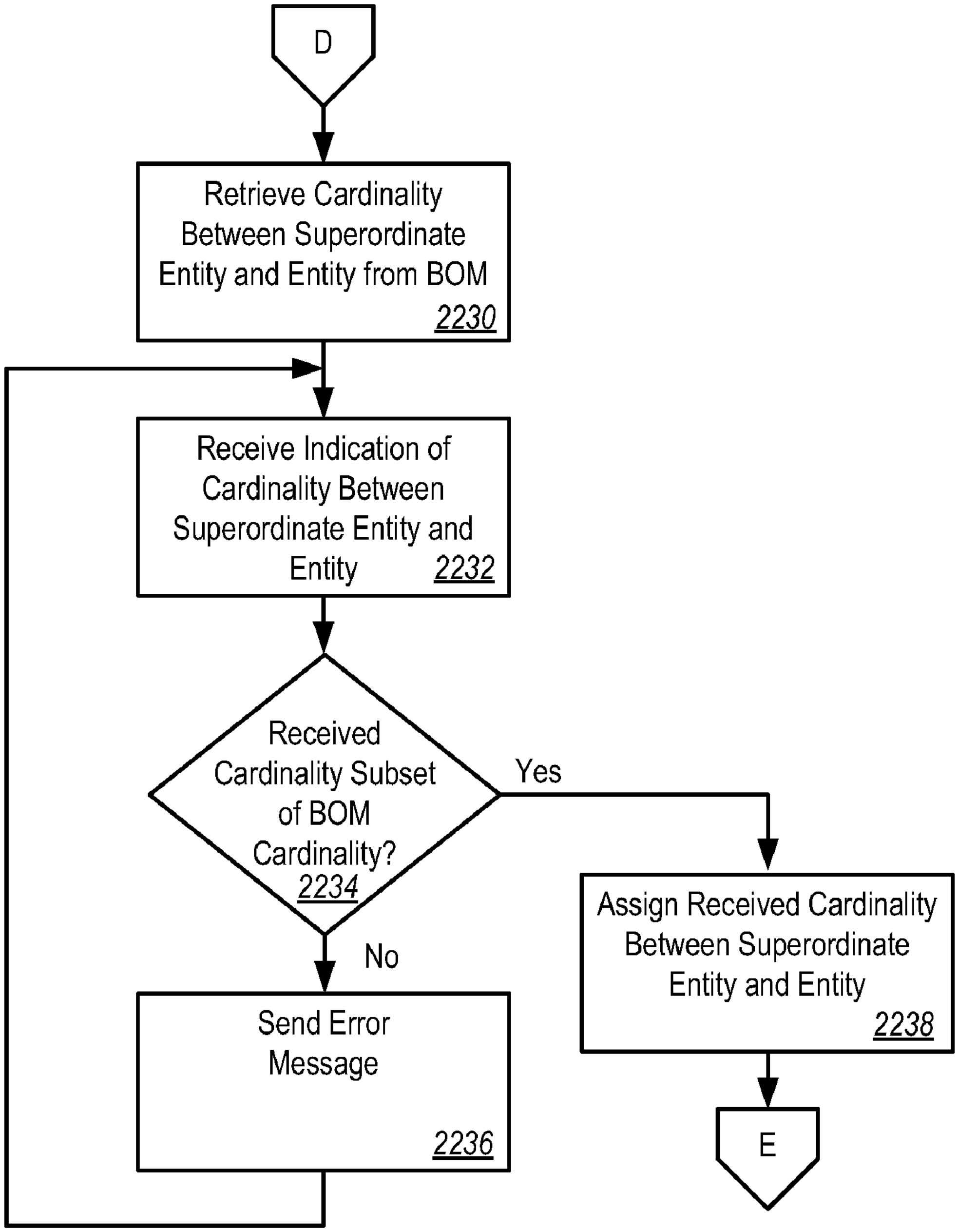

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
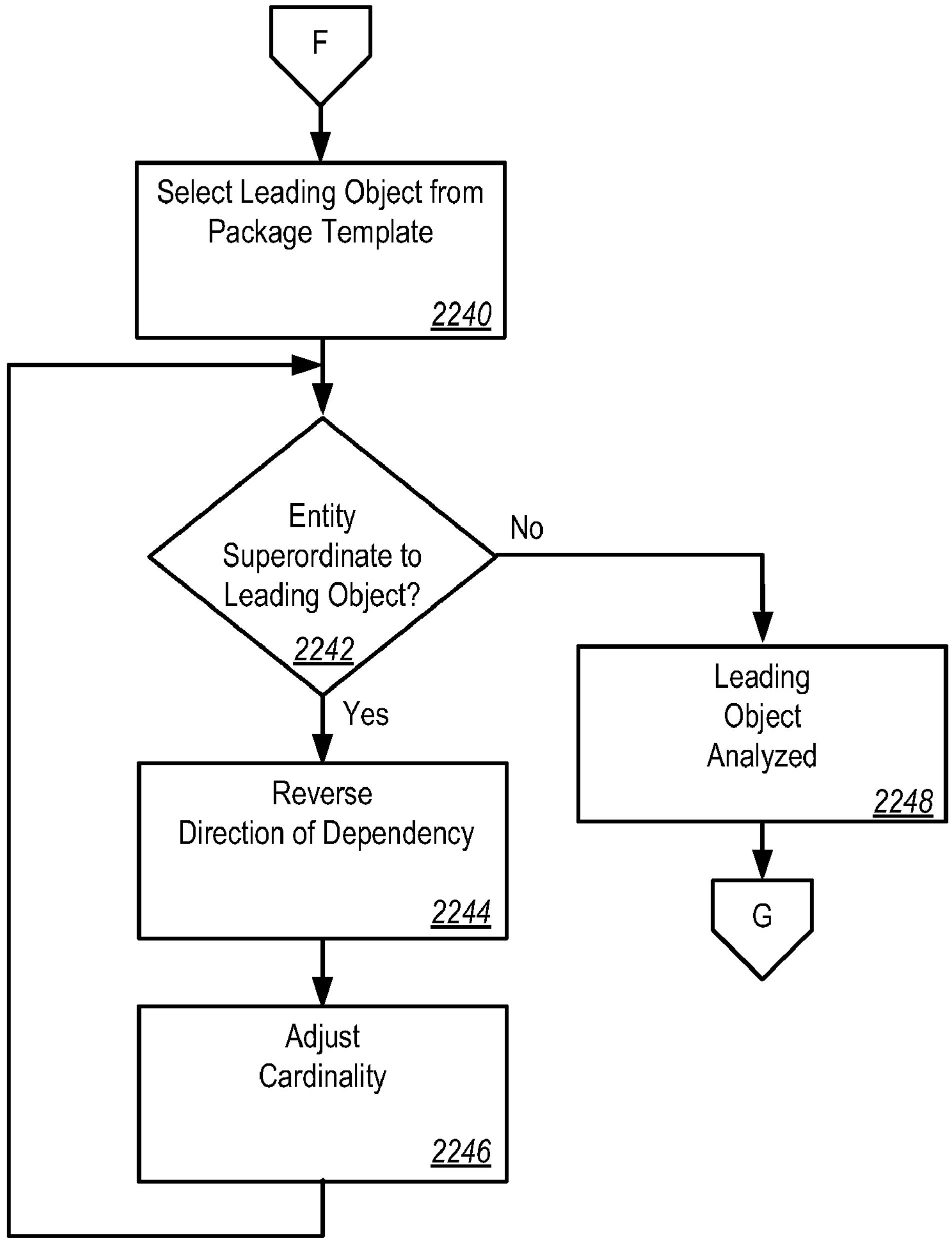

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
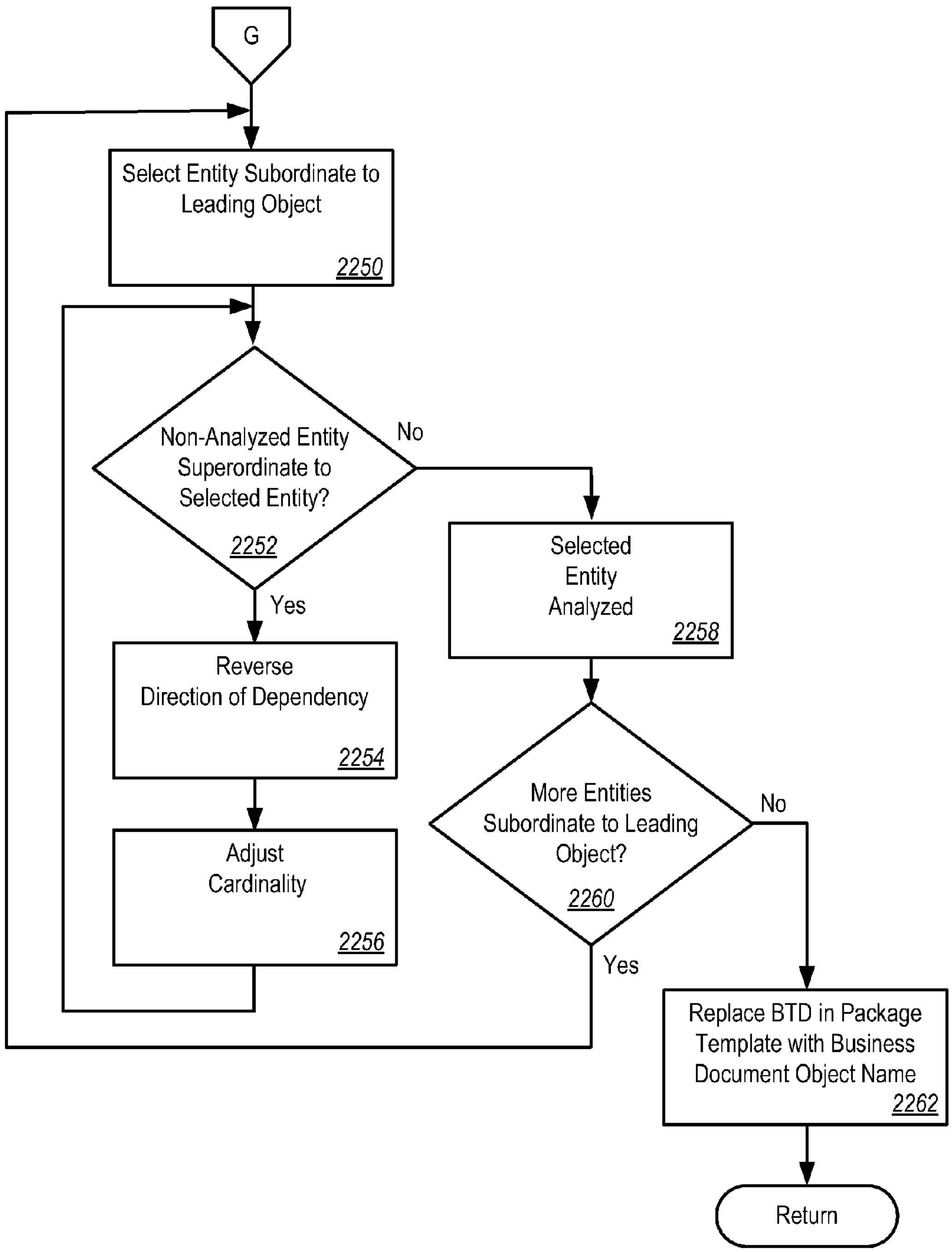

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
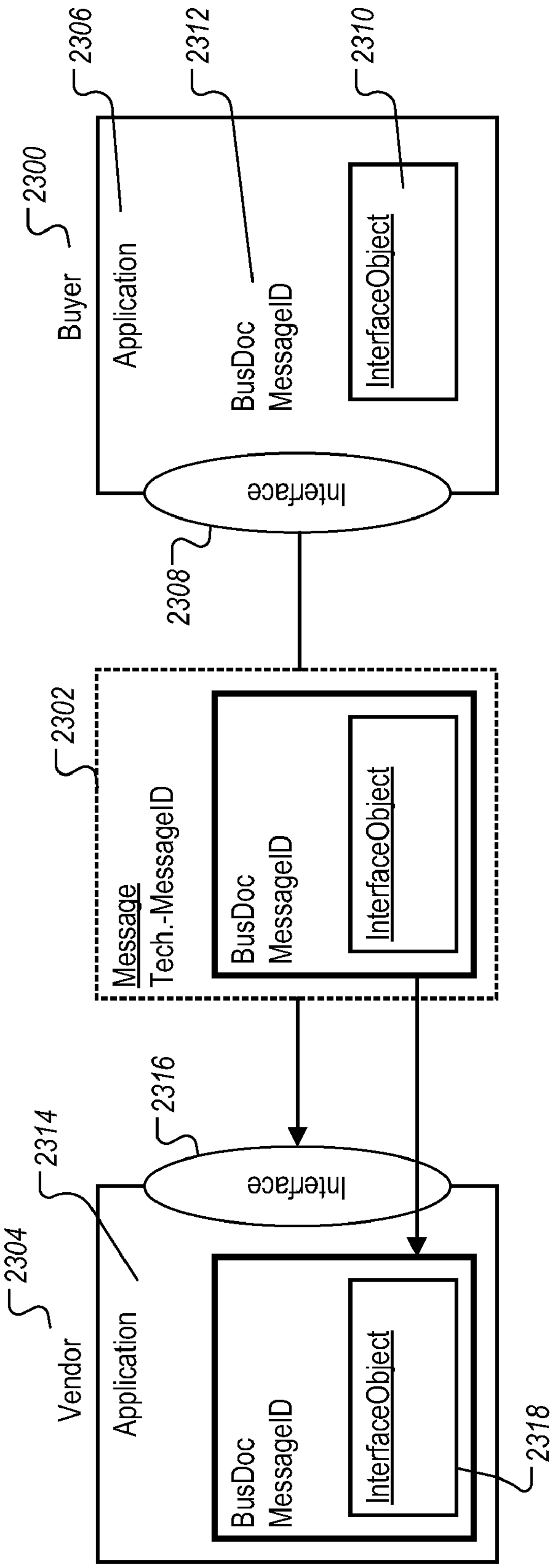
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
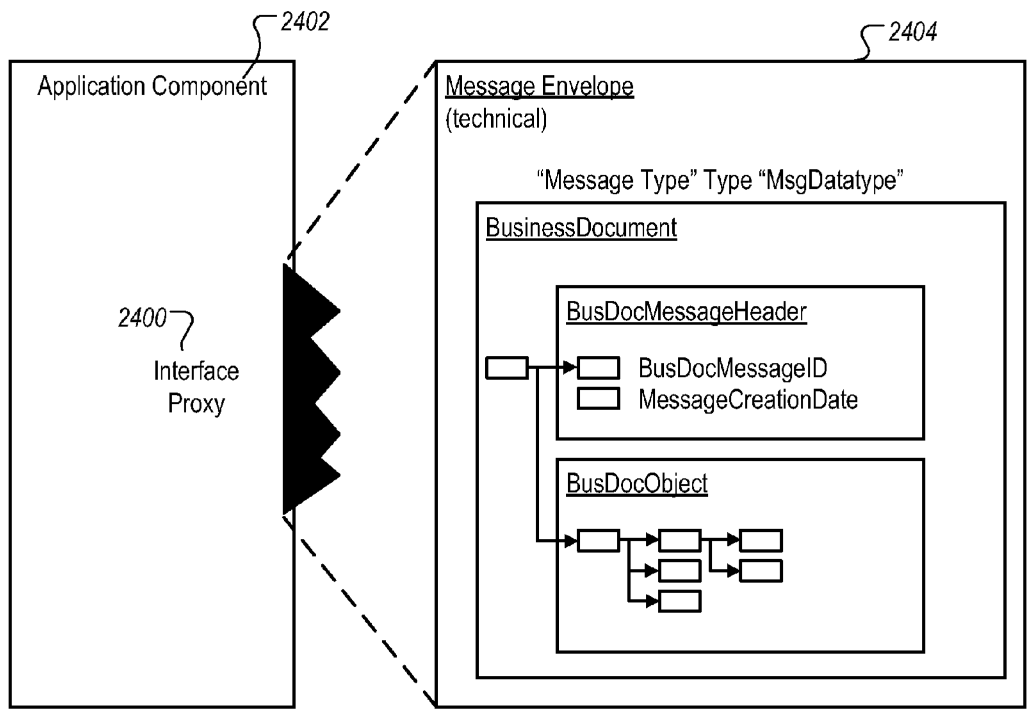
FIG. 24 depicts an interface proxy in accordance with methods and systems consistent with the subject matter described herein.
Figure 25:
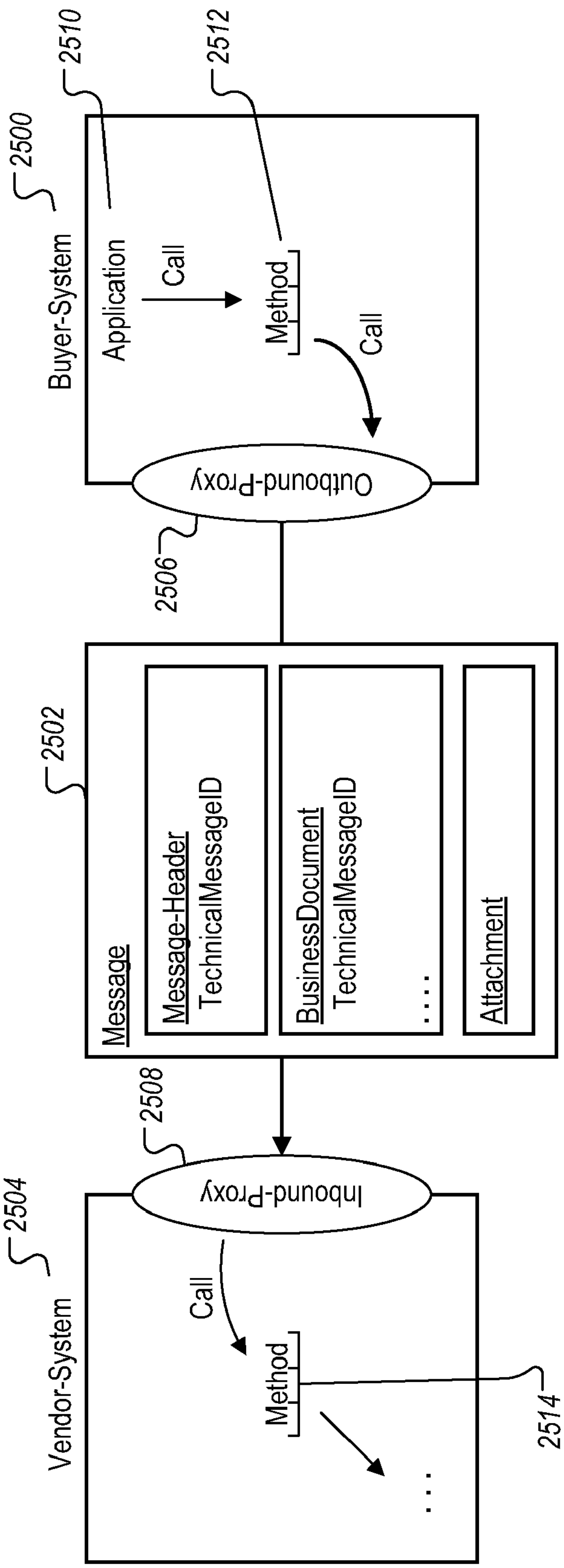
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
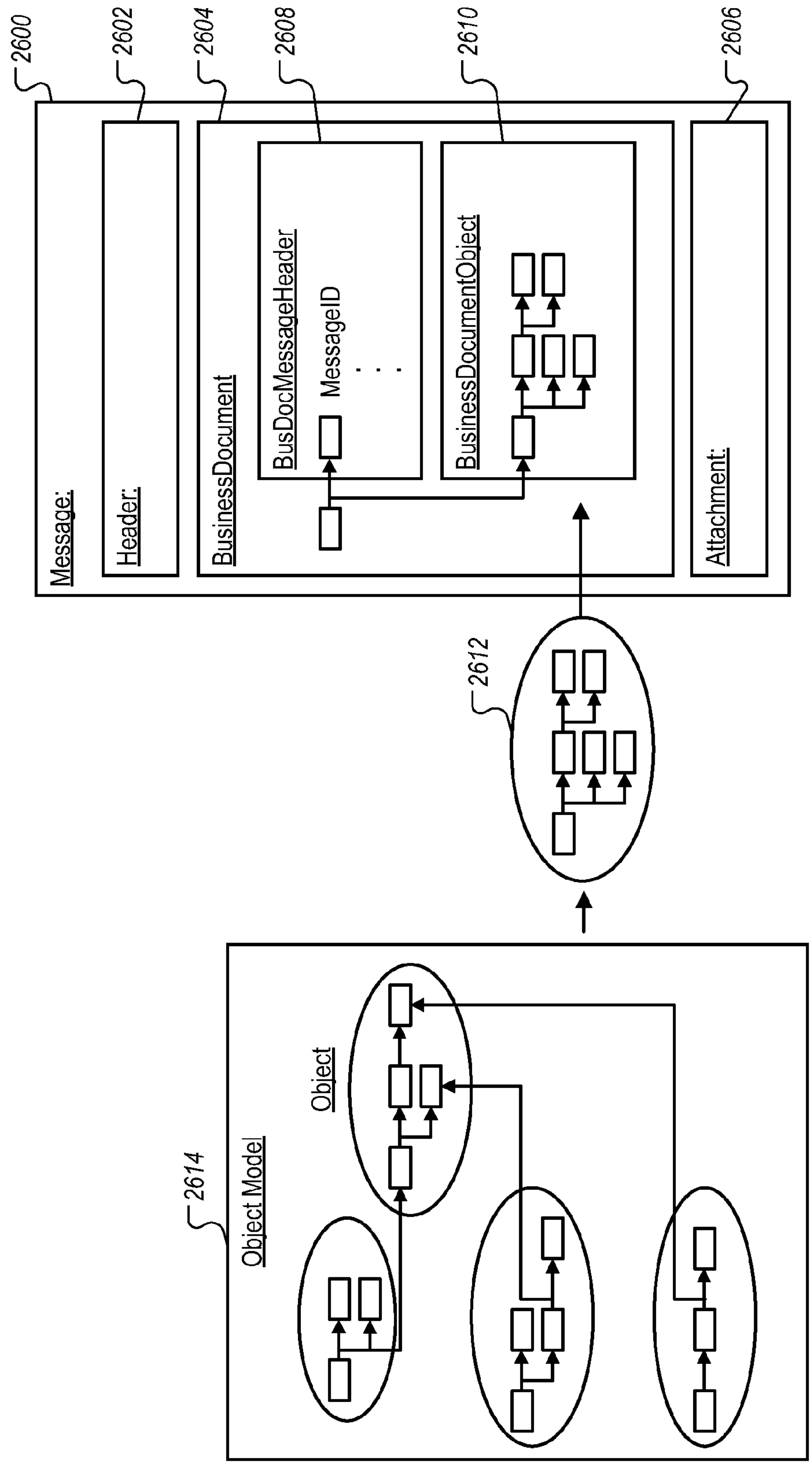
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
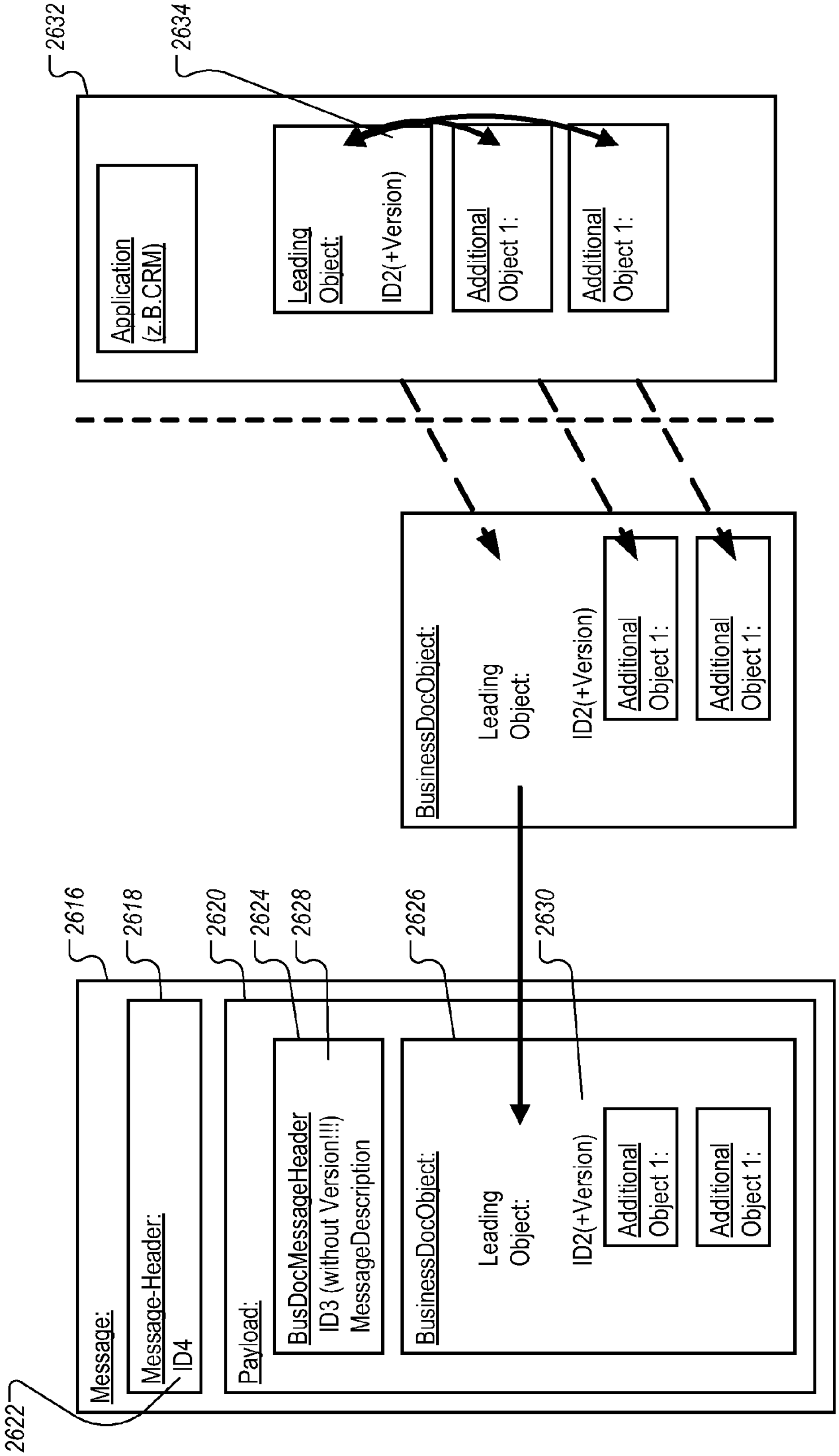
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
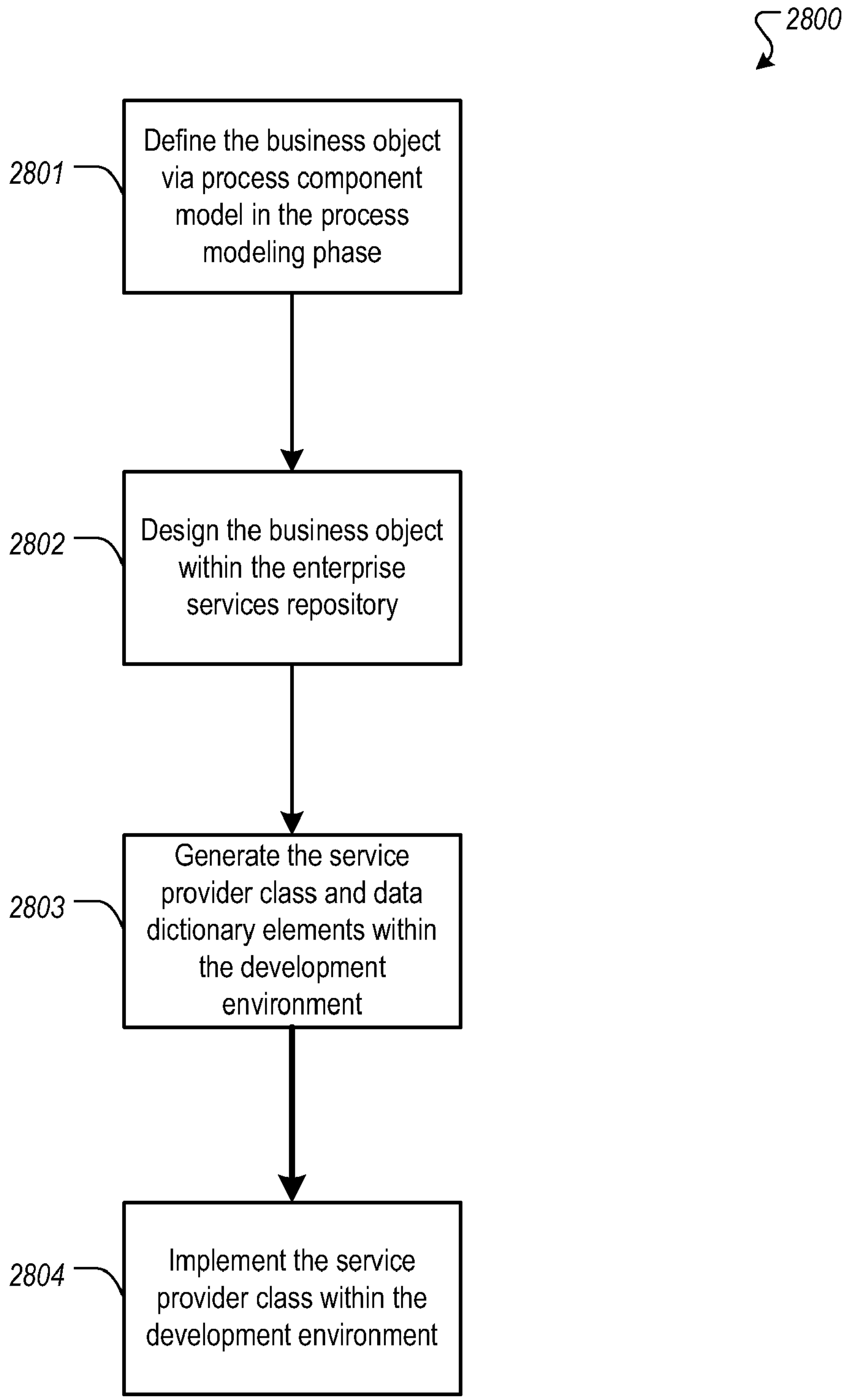
FIG. 28 illustrates an example method for service enabling in accordance with one embodiment of the present disclosure.
Figure 29:
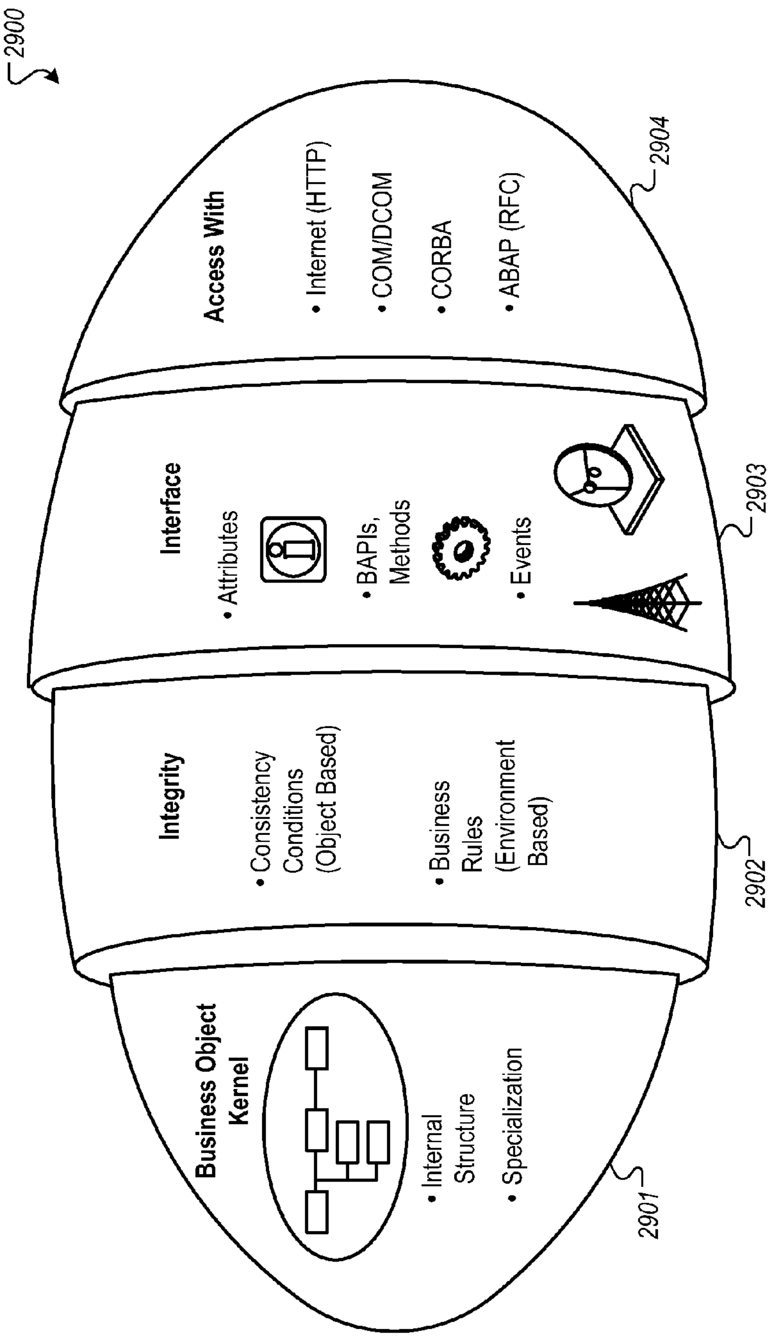
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
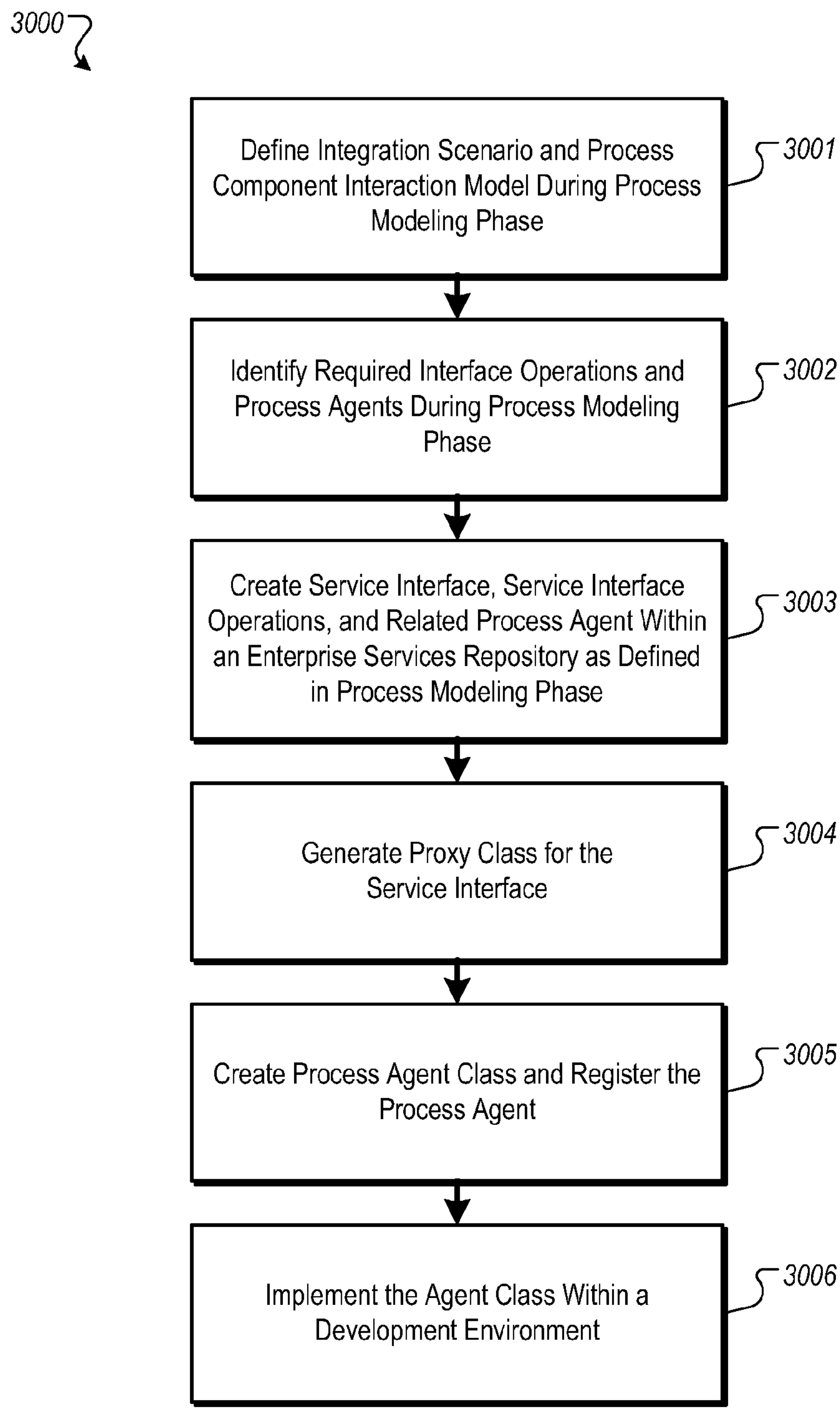
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
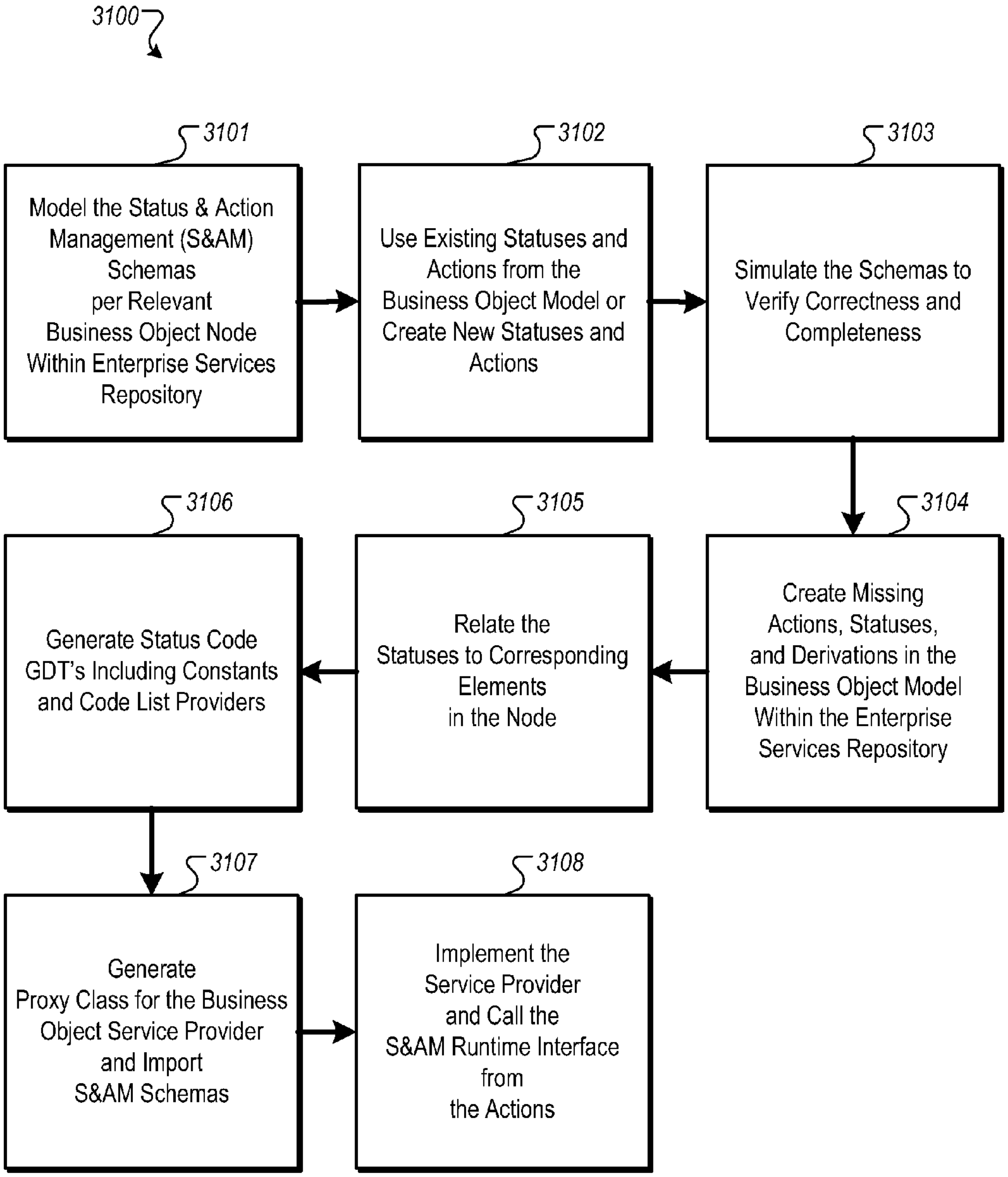
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Merchandise Interfaces

Figure 32:
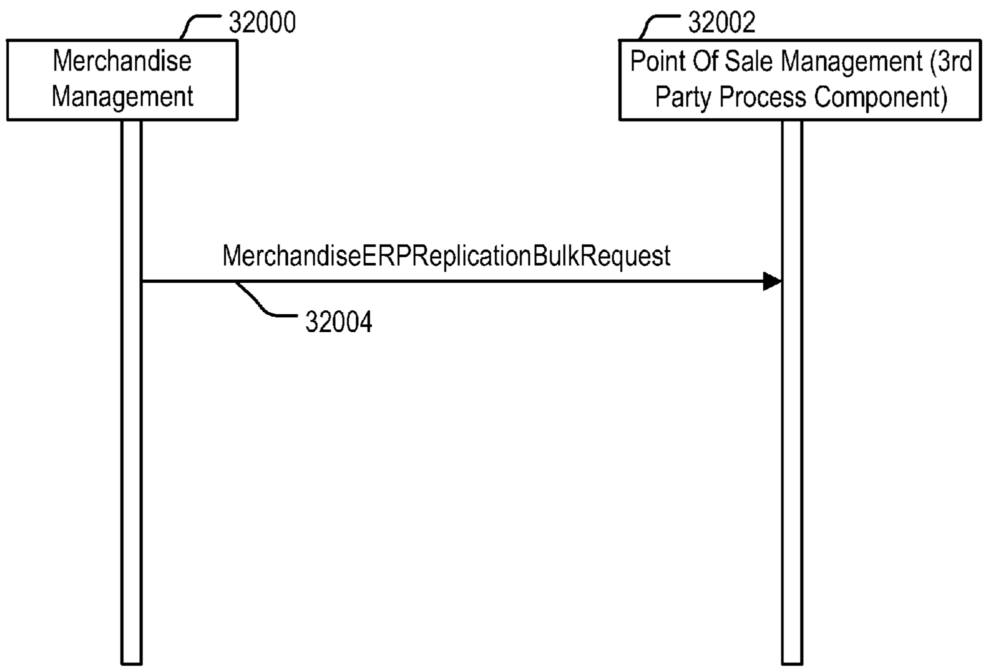
FIG. 32 depicts an example Merchandise Message Choreography.

The message choreography of FIG. 32 describes a possible logical sequence of messages that can be used to realize a Merchandise business scenario, such as in Enterprise Resource Planning (ERP) and Point of Sale (POS) systems.

A "Merchandise Management" system 32000 can send a request to align material-related master data to a "Point Of Sale Management (3rd Party Process Component)" system 32002, using a MerchandiseERPReplicationBulkRequest message 32004 as shown, for example, in FIG. 32. The MerchandiseERPReplicationBulkRequest message 32004 can be sent by a MerchandiseERPReplicationBulkRequest_Out operation that is included in a Merchandising_Out interface. The MerchandiseERPReplicationBulkRequest_Out operation can be used in trading industries to provide a 3rd-party system (e.g., a POS system) with material related master data in a comprehensive way (according to the receiver system's capabilities).

Figures 1, 33:
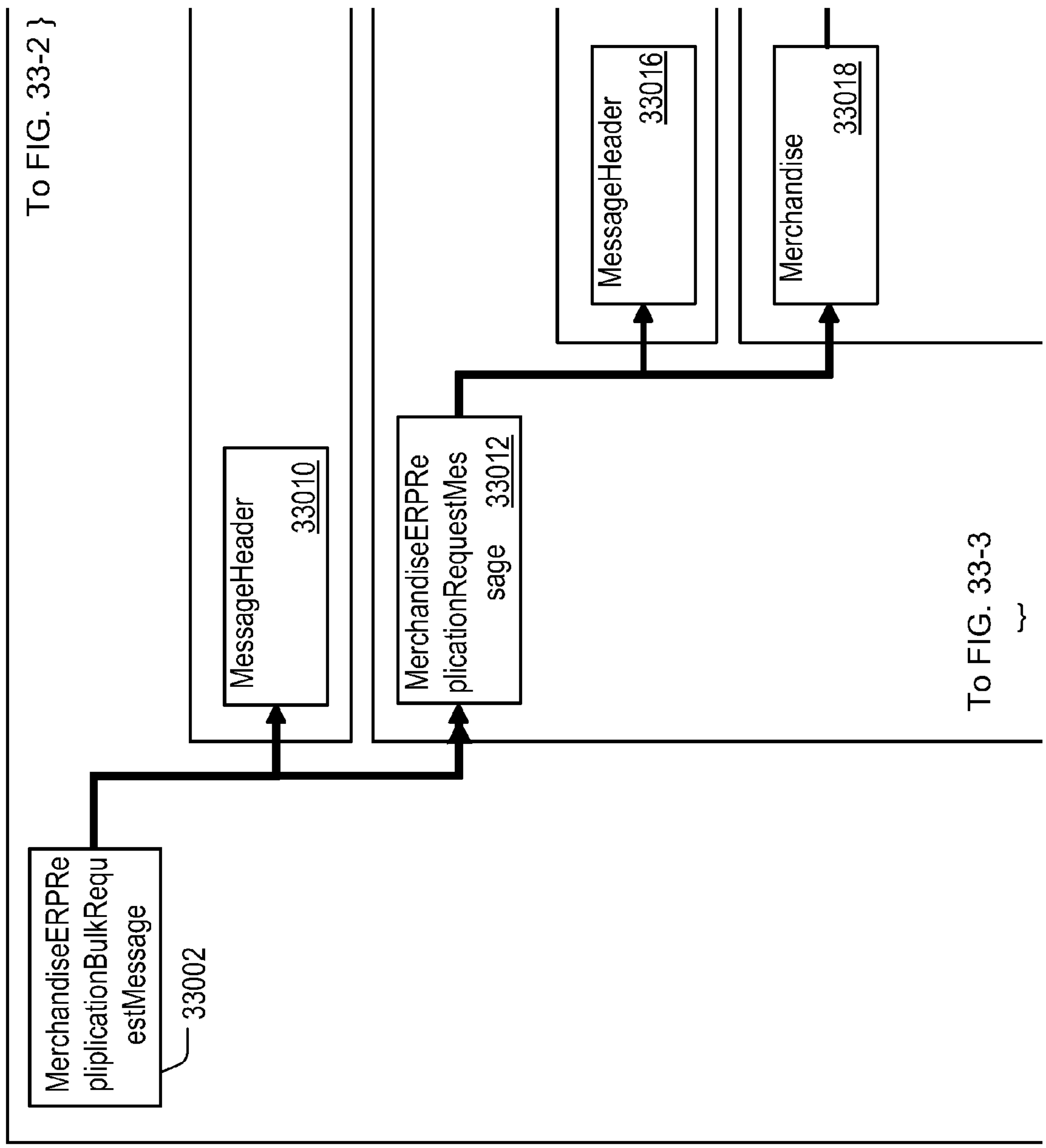
Figures 2, 33:
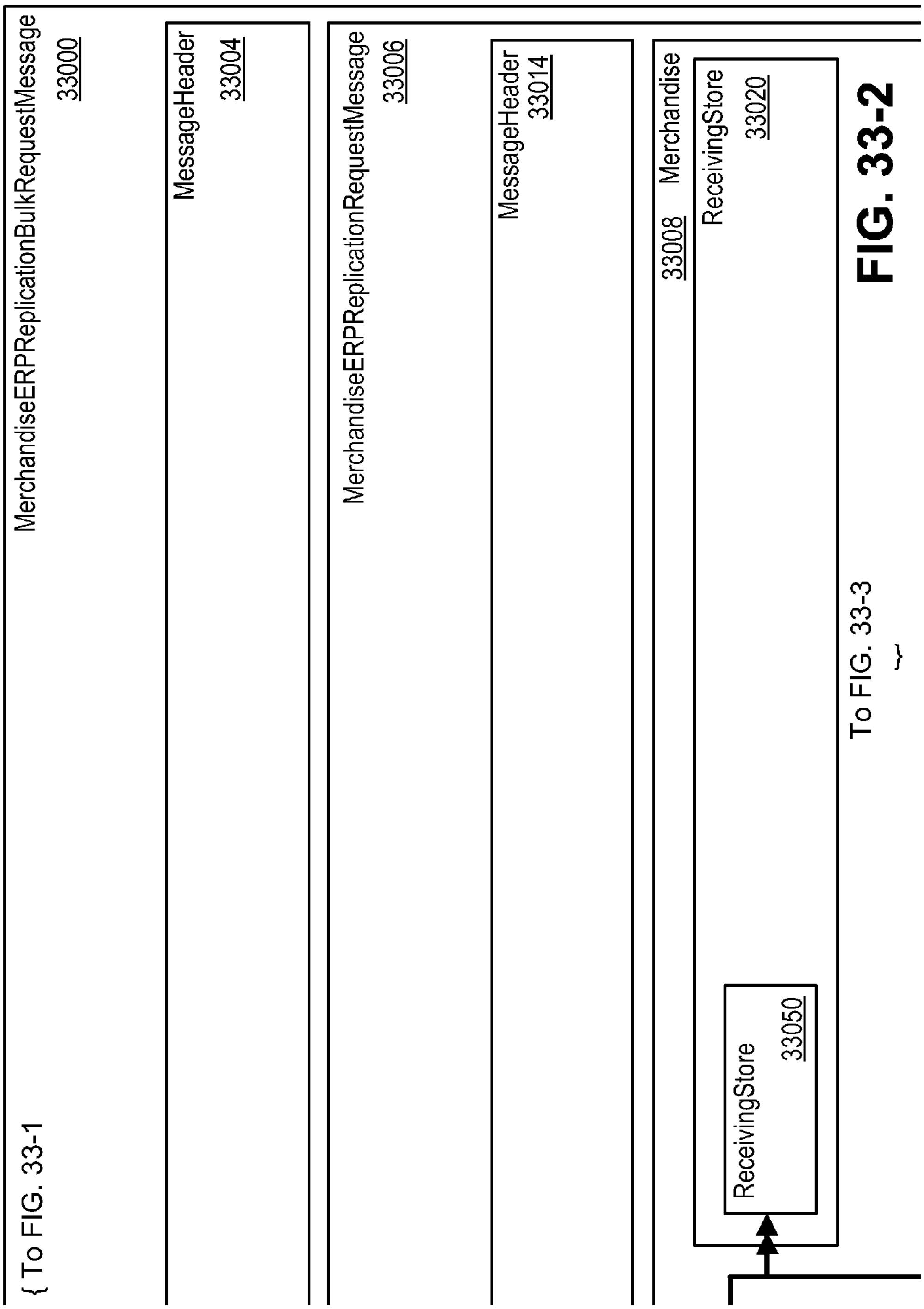
Figures 3, 33:
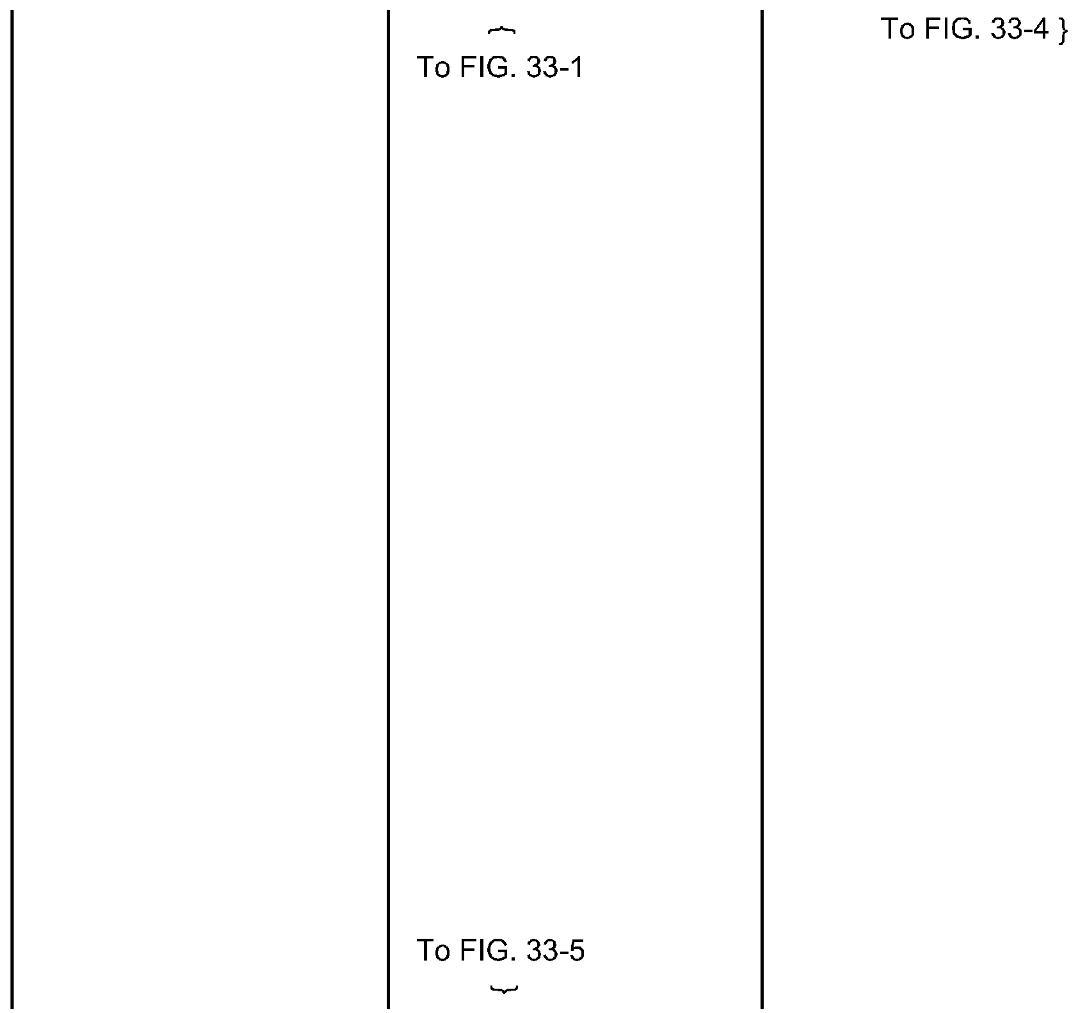
Figures 4, 33:
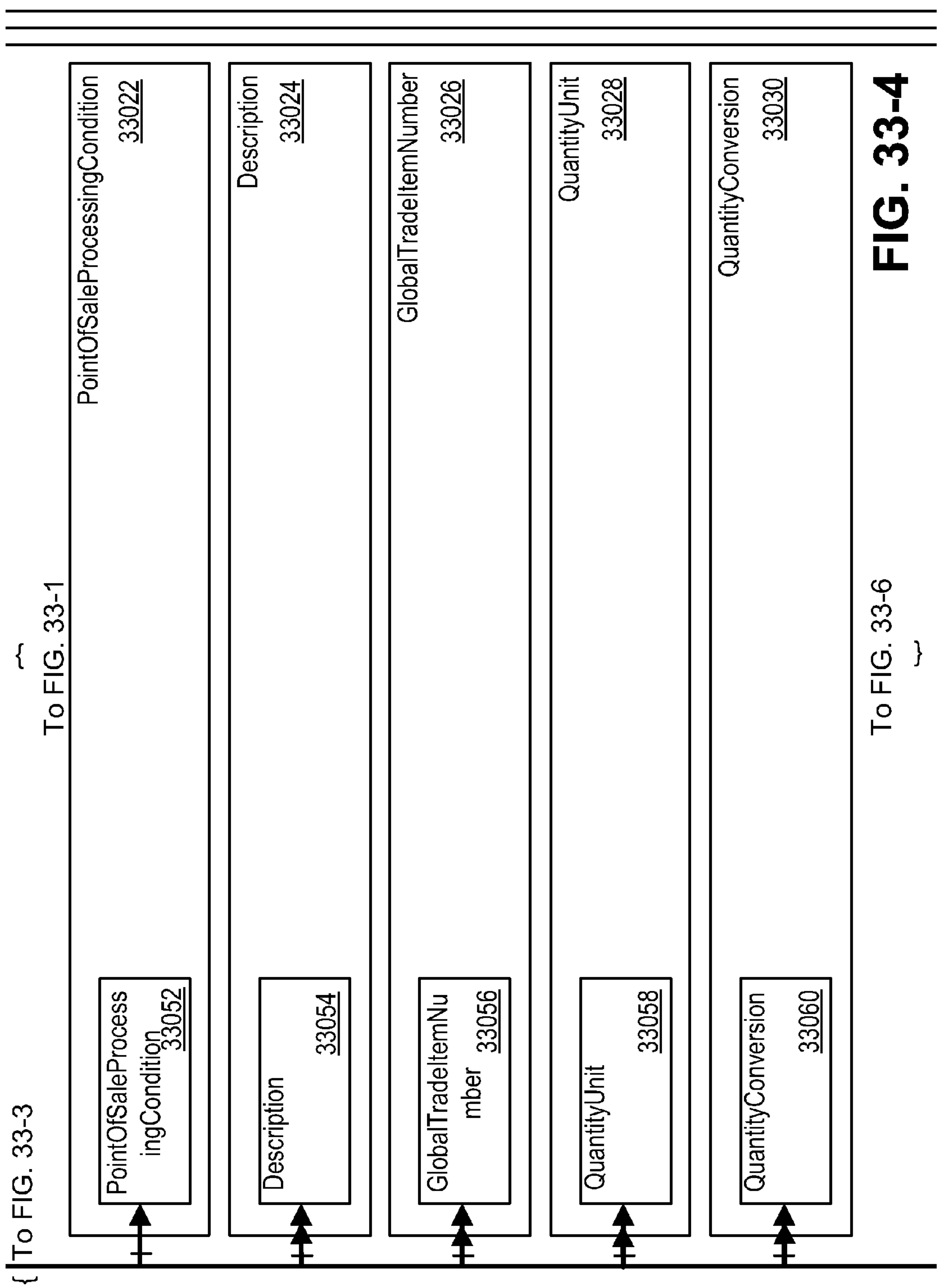
Figures 5, 33:
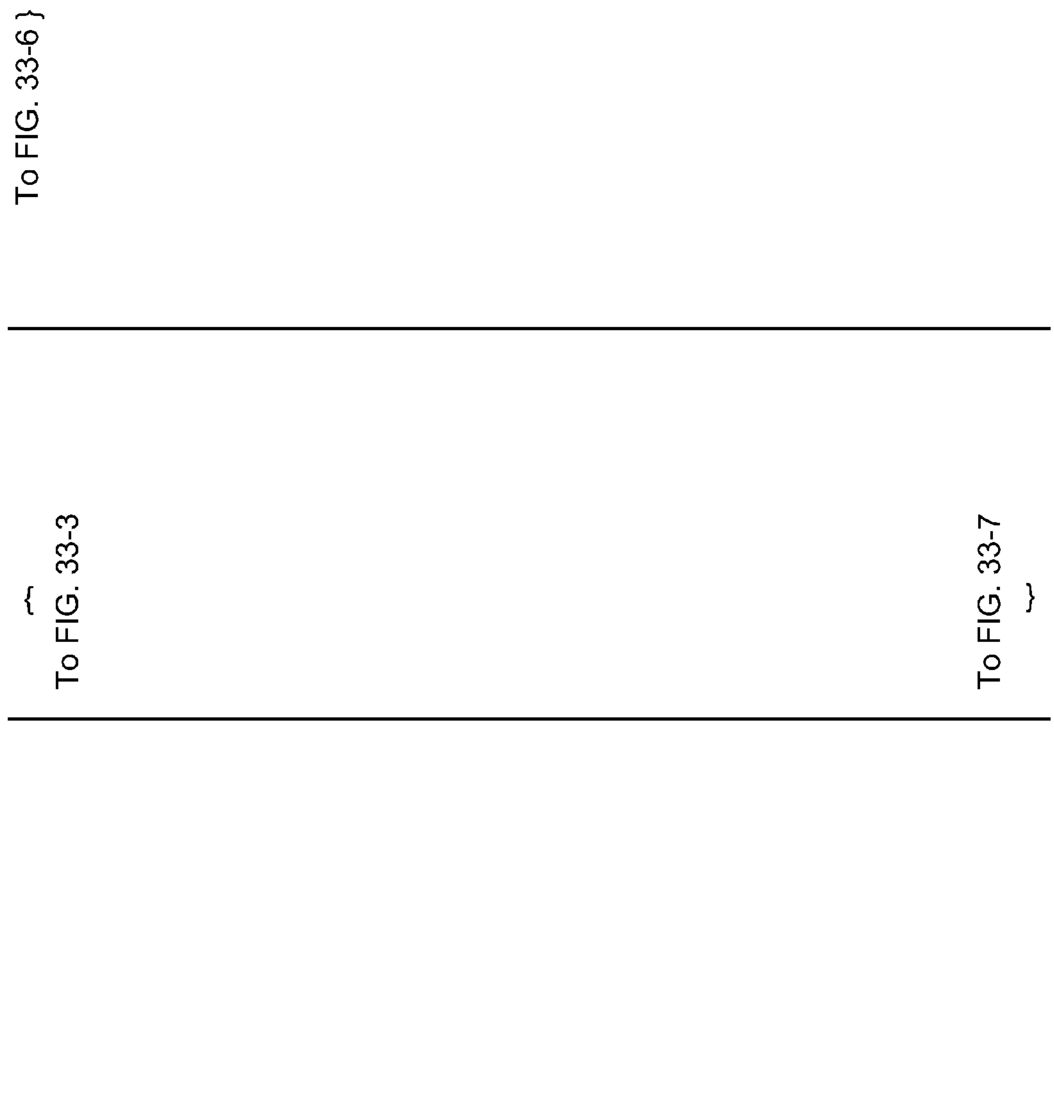
Figures 6, 33:
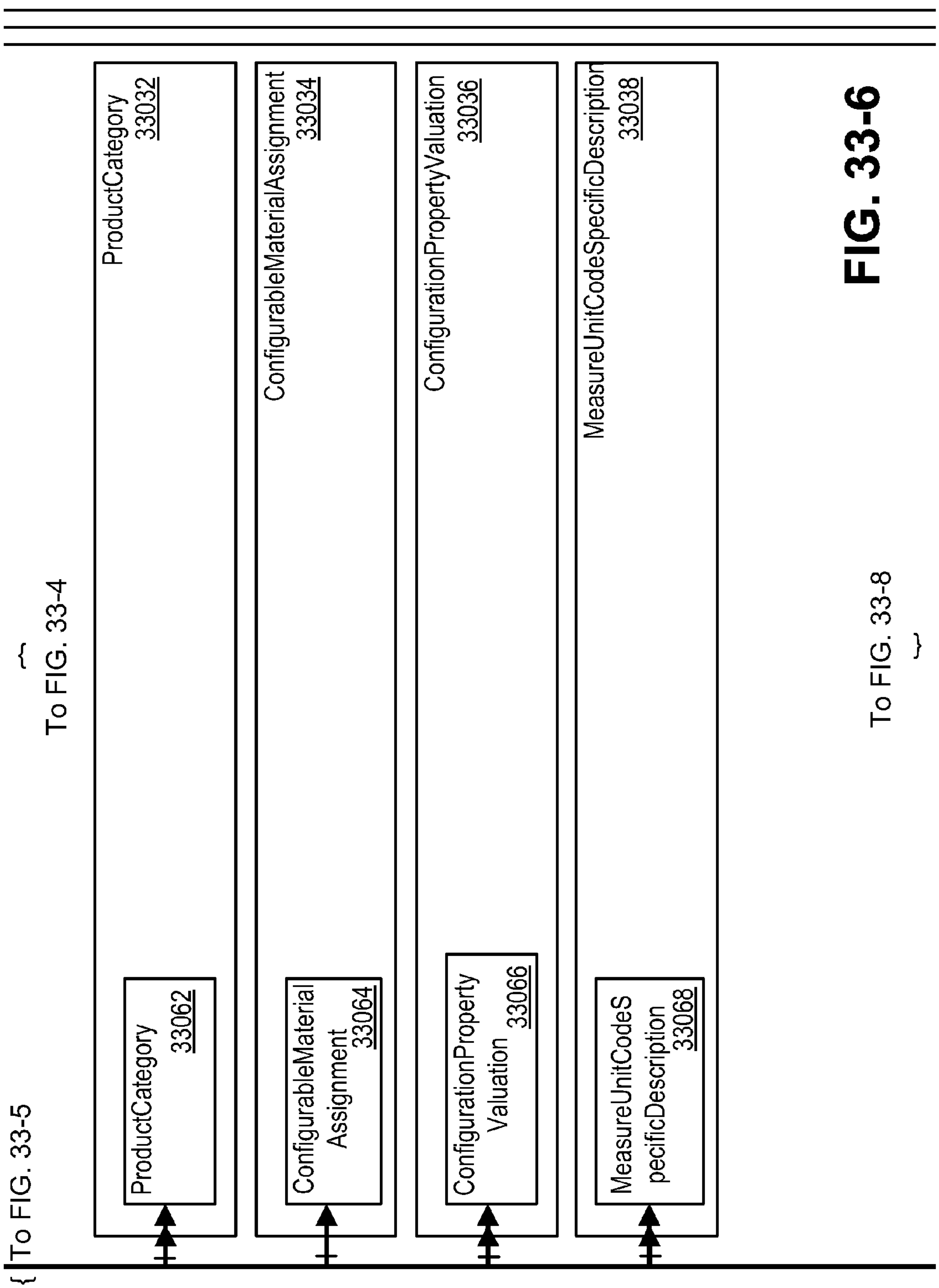
Figures 8, 33:
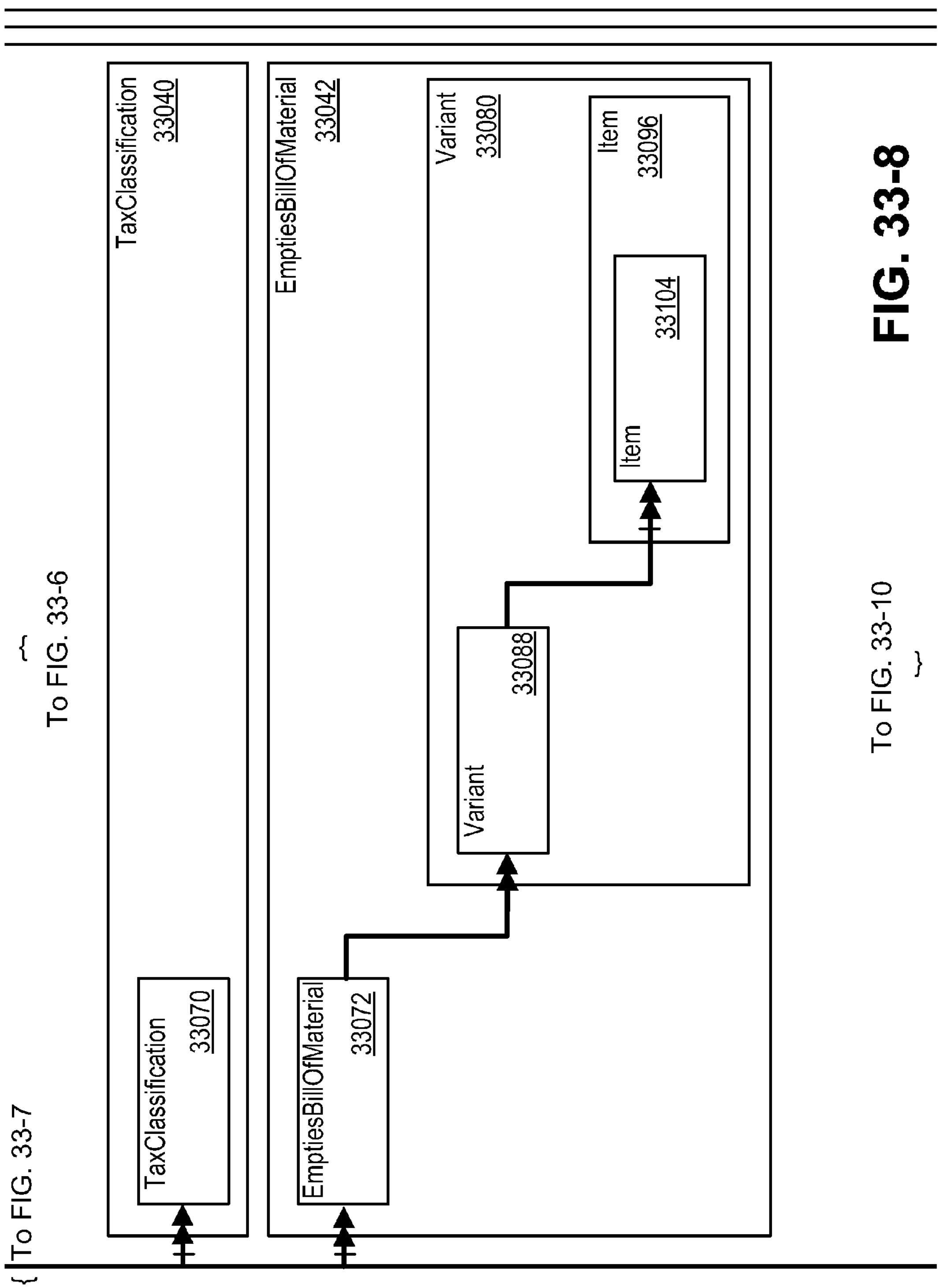
Figures 10, 33:
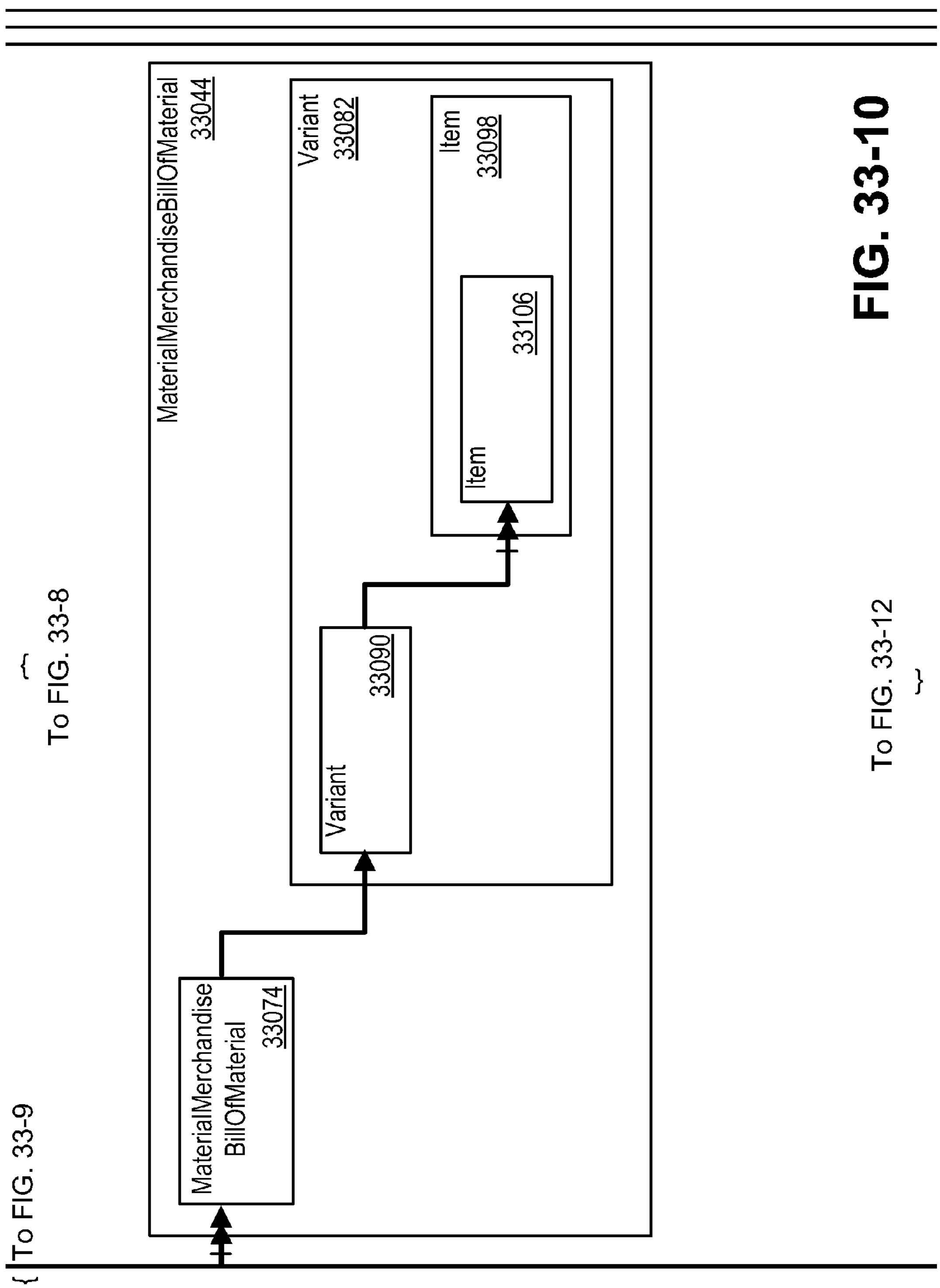
Figures 12, 33:
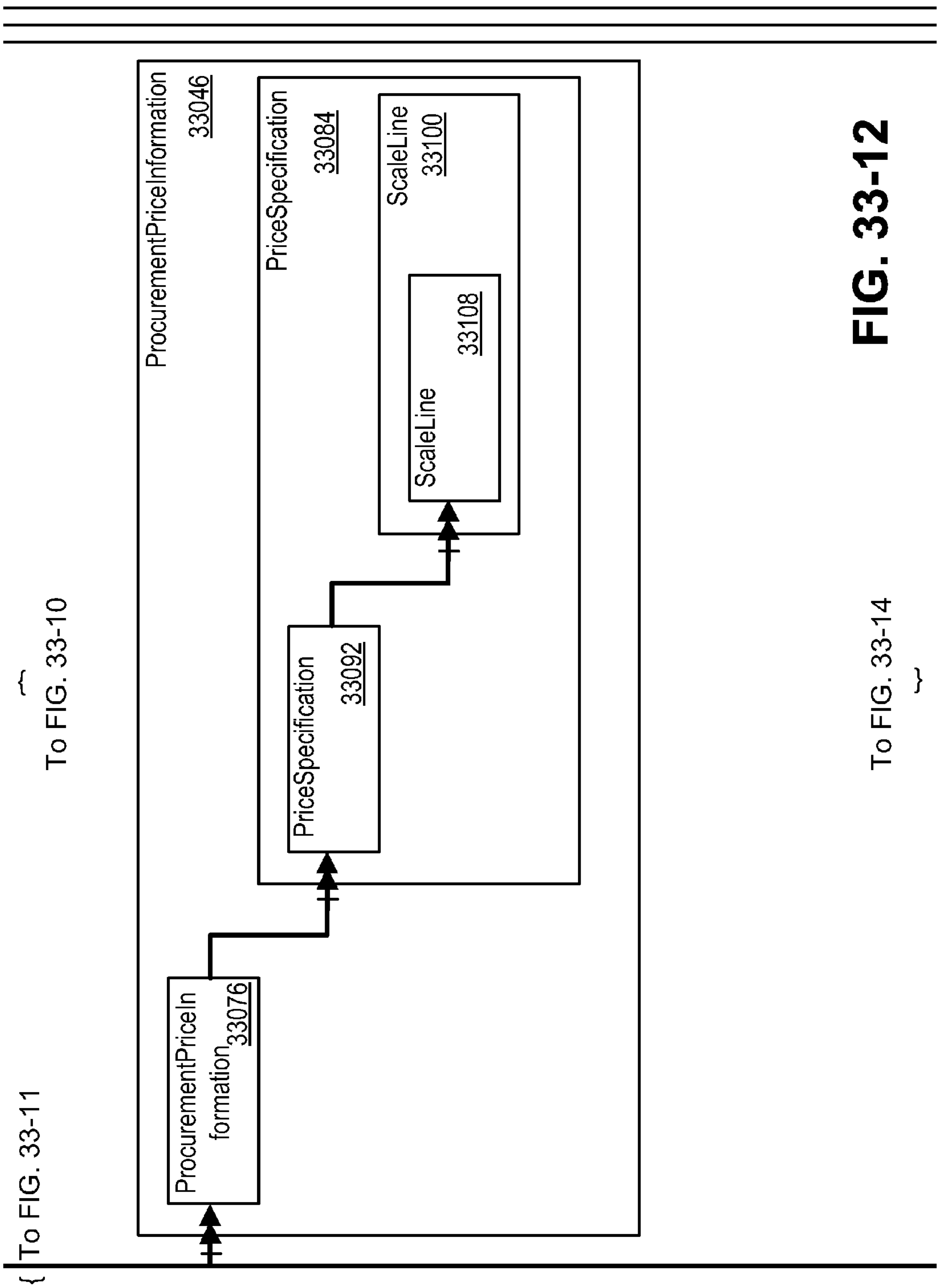
Figures 13, 33:
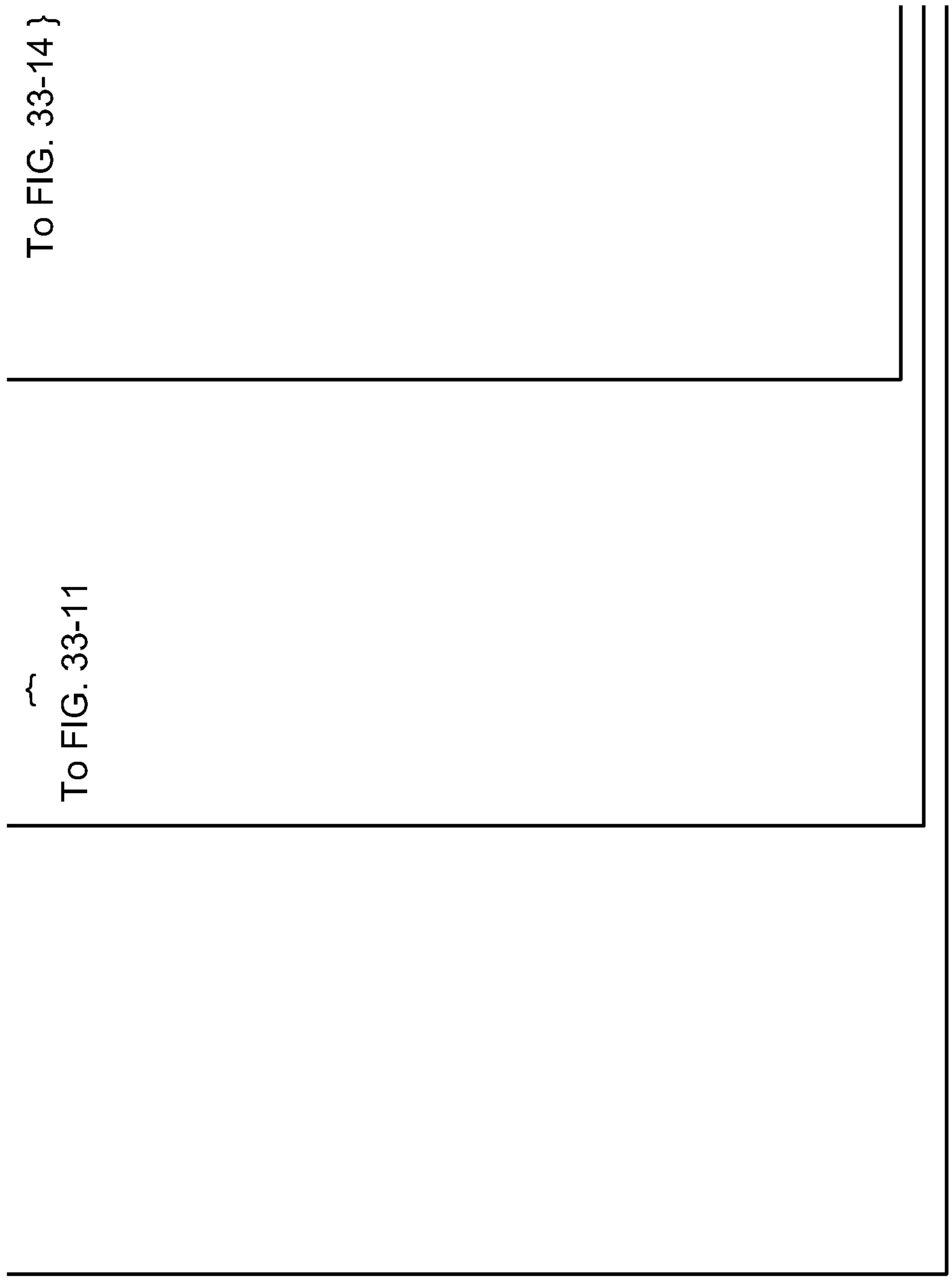
Figures 14, 33:
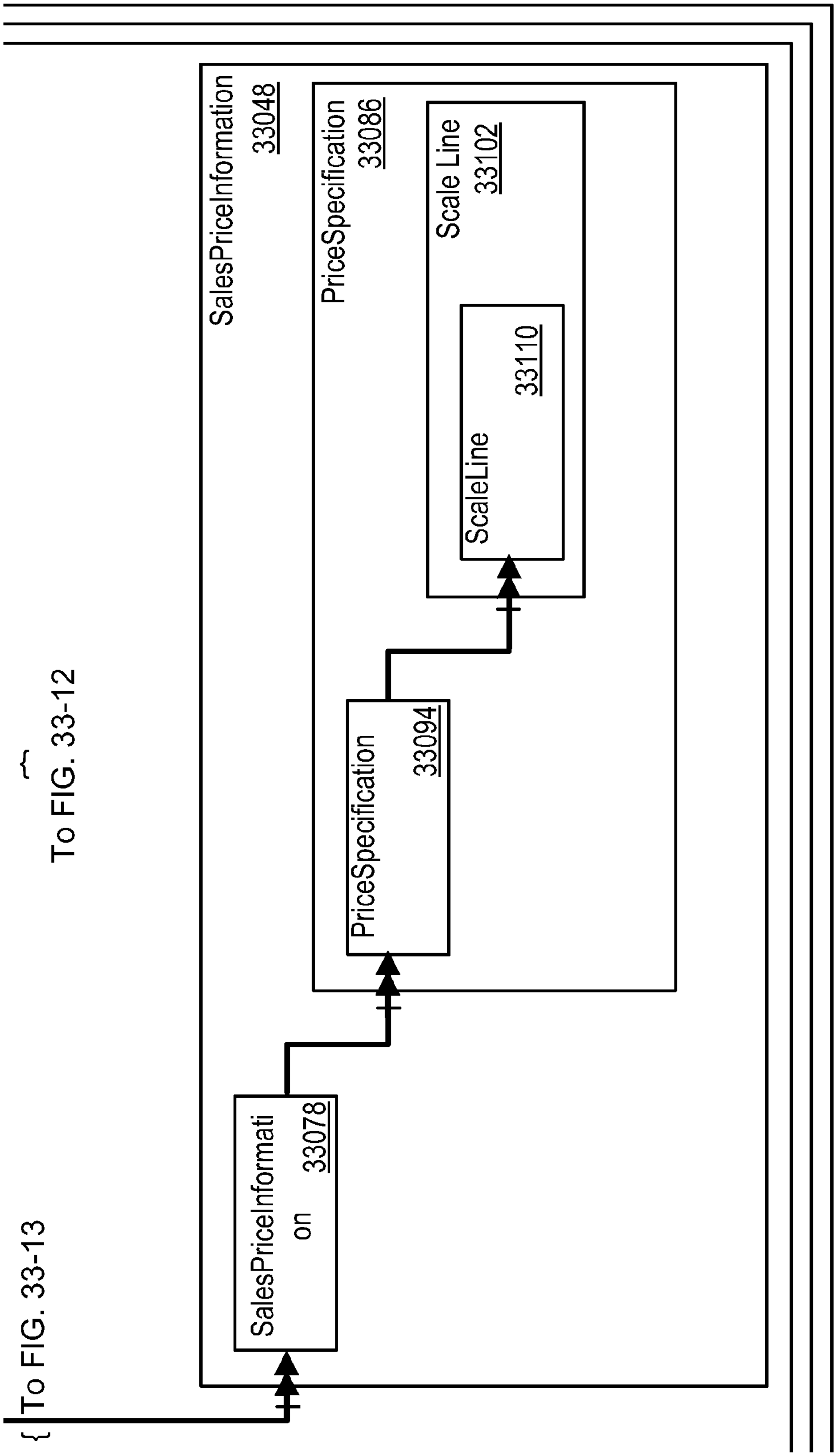

FIGS. 33-1 to 33-14 illustrate one example logical configuration of MerchandiseERPReplicationBulkRequestMessage message 33000. Specifically, this figure depicts the arrangement and hierarchy of various components such as one or more levels of packages, entities, and datatypes, shown here as 33002 through 33110. As described above, packages may be used to represent hierarchy levels. Entities are discrete business elements that are used during a business transaction. Data types are used to type object entities and interfaces with a structure. For example, MerchandiseERPReplicationBulkRequestMessage message 33000 includes, among other things, MerchandiseERPReplicationRequestMessage 33006. Accordingly, heterogeneous applications may communicate using this consistent message configured as such.

FIGS. 34-1 through 34-25 show an example configuration of an Element Structure that includes a MerchandiseMessage 34000 package. The MerchandiseMessage 34000 package is a MrchdsMsg 34004 data type. The MerchandiseMessage 34000 package includes a MerchandiseMessage 34002 entity. The MerchandiseMessage 34000 package includes various packages, namely a MessageHeader 34006 and a Merchandise 34012.

The MessageHeader 34006 package is a BusinessDocumentMessageHeader 34010 data type. The MessageHeader 34006 package includes a MessageHeader 34008 entity. A MessageHeader includes business information from the perspective of the sender application for identifying processing of a business document (e.g., an instance) within a message (e.g., a technical message). If applicable, it includes a reference to a previous instance of a business document within a previous message (e.g., a technical message), information about the sender, and information about the receiver.

The Merchandise 34012 package is a <MT>Mrchds (Mrchds) 34016 data type. The Merchandise 34012 package includes a Merchandise 34014 entity. The Merchandise 34012 package includes various packages, namely a ReceivingStore 34034, a PointOfSaleProcessingCondition 34044, a Description 34074, a GlobalTradeItemNumber 34084, a QuantityUnit 34102, a QuantityConversion 34120, a ProductCategory 34134, a ConfigurableMaterialAssignment 34152, a ConfigurationPropertyValuation 34166, a MeasureUnitCodeSpecificDescription 34184, a TaxClassification 34198, an EmptiesBillOfMaterial 34248, a MaterialMerchandiseBillOfMaterial 34306, a ProcurementPriceInformation 34360 and a SalesPriceInformation 34438.

The Merchandise 34014 entity includes various attributes, namely an @actionCode 34018, an InternalID 34022, a MaterialTypeCode 34026 and a MaterialMerchandiseTypeCode 34030. The @actionCode 34018 attribute is an ActionCode 34020 data type. The InternalID 34022 attribute is a NOSC_ProductInternalID 34024 data type. An InternalID is a proprietary identifier for a product. The MaterialTypeCode 34026 attribute is a NOSC_MaterialTypeCode 34028 data type. A MaterialTypeCode is a coded representation of a material type. A MaterialType groups together materials with the same basic attributes. The MaterialMerchandiseTypeCode 34030 attribute is a MaterialMerchandiseTypeCode 34032 data type. A MaterialMerchandiseTypeCode is a coded representation of the type of a material with regard to merchandising and retailing processes. MaterialMerchandiseTypeCode realizes a distinction between materials being produced and sold based on raw materials or traded (e.g., buying and selling the same material) in a company or organization.

The ReceivingStore 34034 package is a <MT>RcvgStore 34038 data type. The ReceivingStore 34034 package includes a ReceivingStore 34036 entity. The ReceivingStore 34036 entity includes a StoreInternalID 34040 attribute. The StoreInternalID 34040 attribute is a NOSC_StoreInternalID 34042 data type. A StoreInternalID is an identifier of a store.

The PointOfSaleProcessingCondition 34044 package is a <MT>PtOfSlProcgCndn 34048 data type. The PointOfSaleProcessingCondition 34044 package includes a PointOfSaleProcessingCondition 34046 entity. The PointOfSaleProcessingCondition 34046 entity includes various attributes, namely a PointOfSaleRepeatKeyUsageCode 34050, a PriceRequiredIndicator 34054, a DiscountAllowedIndicator 34058, a WeightingForPricingRequiredIndicator 34062, a TaxIncludedIndicator 34066 and a TextOnPointOfSaleRegisterVisibleIndicator 34070. The PointOfSaleRepeatKeyUsageCode 34050 attribute is a PointOfSaleRepeatKeyUsageCode 34052 data type. A PointOfSaleRepeatKeyUsageCode is a coded representation of the usage type of a repeat key at the point of sale. The PriceRequiredIndicator 34054 attribute is an Indicator 34056 data type. A PriceRequiredIndicator indicates whether something is required or not. The DiscountAllowedIndicator 34058 attribute is an Indicator 34060 data type. A DiscountAllowedIndicator indicates whether something is allowed or not. The WeightingForPricingRequiredIndicator 34062 attribute is an Indicator 34064 data type. A WeightingForPricingRequiredIndicator indicates whether something is required or not. The TaxIncludedIndicator 34066 attribute is an Indicator 34068 data type. A TaxIncludedIndicator indicates whether something is included or not. The TextOnPointOfSaleRegisterVisibleIndicator 34070 attribute is an Indicator 34072 data type. A TextOnPointOfSaleRegisterVisibleIndicator indicates whether something is visible or not.

The Description 34074 package is a <MT>Desc 34078 data type. The Description 34074 package includes a Description 34076 entity. The Description 34076 entity includes a Description 34080 attribute. The Description 34080 attribute is a SHORT_Description 34082 data type. A Description is a natural-language representation of the properties of a product.

The GlobalTradeItemNumber 34084 package is an <MT>GlobTrdItmNo 34088 data type. The GlobalTradeItemNumber 34084 package includes a GlobalTradeItemNumber 34086 entity. The GlobalTradeItemNumber 34086 entity includes various attributes, namely a ProductStandardID 34090, a MeasureUnitCode 34094 and a ProductStandardMainIndicator 34098. The ProductStandardID 34090 attribute is an NOSC_ProductStandardID 34092 data type. A ProductStandardID is a standardized identifier for a product. In this case, the AgencySchemeID is fixed by Provider and Consumer (e.g., typically, nine characters (International Article Number, or EAN) and does not need to be specified). The MeasureUnitCode 34094 attribute is a MeasureUnitCode 34096 data type. A MeasureUnitCode is a coded representation of a non-monetary unit of measurement. The ProductStandardMainIndicator 34098 attribute is an Indicator 34100 data type. A ProductStandardMainIndicator indicates whether a given ProductStandardID is the main ProductStandardID. For example, in the case of EANs (International Article Numbers), there can be several identifiers with one main EAN.

The QuantityUnit 34102 package is an <MT>QtyUnit 34106 data type. The QuantityUnit 34102 package includes a QuantityUnit 34104 entity. The QuantityUnit 34104 entity includes various attributes, namely a MeasureUnitCode 34108, a BaseQuantityUnitIndicator 34112 and a SupplementaryQuantityUnitUsageCode 34116. The MeasureUnitCode 34108 attribute is a MeasureUnitCode 34110 data type. A MeasureUnitCode is a coded representation of a non-monetary unit of measurement. The BaseQuantityUnitIndicator 34112 attribute is an Indicator 34114 data type. A BaseQuantityUnitIndicator specifies whether a quantity unit is the base unit of quantity. A base unit of quantity is the unit to which all alternative units of quantity (for example, of a product) can be converted. The SupplementaryQuantityUnitUsageCode 34116 attribute is a SupplementaryQuantityUnitUsageCode 34118 data type. A SupplementaryQuantityUnitUsageCode is a coded representation of the usage of a supplementary quantity unit.

The QuantityConversion 34120 package is an <MT>QtyCnvrsn 34124 data type. The QuantityConversion 34120 package includes a QuantityConversion 34122 entity. The QuantityConversion 34122 entity includes various attributes, namely a Quantity 34126 and a CorrespondingQuantity 34130. The Quantity 34126 attribute is a Quantity 34128 data type. A Quantity is the non-monetary numerical specification of an amount in a unit of measurement. The CorrespondingQuantity 34130 attribute is a Quantity 34132 data type. A CorrespondingQuantity is the non-monetary numerical specification of an amount in a unit of measurement.

The ProductCategory 34134 package is an <MT>ProdCat 34138 data type. The ProductCategory 34134 package includes a ProductCategory 34136 entity. The ProductCategory 34136 entity includes various attributes, namely an InternalID 34140, a ProductCategoryHierarchyID 34144 and a ProductCategoryHierarchyTypeCode 34148. The InternalID 34140 attribute is a NOSC_ProductCategoryInternalID 34142 data type. An InternalID is a proprietary identifier for a product category. The ProductCategoryHierarchyID 34144 attribute is a NOSC_ProductCategoryHierarchyID 34146 data type. A ProductCategoryHierarchyID is a unique identifier for a product category hierarchy. The ProductCategoryHierarchyTypeCode 34148 attribute is a ProductCategoryHierarchyTypeCode 34150 data type. A ProductCategoryHierarchyTypeCode is a form of a code that represents the type of a product category hierarchy.

The ConfigurableMaterialAssignment 34152 package is an <MT>ConfigblMtlAssgmt 34156 data type. The ConfigurableMaterialAssignment 34152 package includes a ConfigurableMaterialAssignment 34154 entity. The ConfigurableMaterialAssignment 34154 entity includes various attributes, namely a ProductInternalID 34158 and a ProductStandardID 34162. The ProductInternalID 34158 attribute is an NOSC_ProductIntenalID 34160 data type. A ProductInternalID is a proprietary identifier for a configurable material. The ProductStandardID 34162 attribute is an NOSC_ProductStandardID 34164 data type. A ProductStandardID is a standardized identifier for a product. The AgencySchemeID may be fixed by Provider and Consumer, (e.g., typically, characters (EAN) and does not need to be specified).

The ConfigurationPropertyValuation 34166 package is an <MT>ConfignPrptyValn 34170 data type. The ConfigurationPropertyValuation 34166 package includes a ConfigurationPropertyValuation 34168 entity. The ConfigurationPropertyValuation 34168 entity includes various attributes, namely a PropertyValuation 34172, a Description 34176 and an OrganisationalAreaName 34180. The PropertyValuation 34172 attribute is an NOSC_PropertyValuation 34174 data type. A PropertyValuation includes allowed values for a given property. The Description 34176 attribute is a SHORT_Description 34178 data type. A Description is a natural-language representation of the properties of a product. The OrganisationalAreaName 34180 attribute is a LANGUAGEINDEPENDENT_SHORTName 34182 data type. An OrganisationalAreaName is an organizational area of a material class.

The MeasureUnitCodeSpecificDescription 34184 package is an <MT>MsrUnitCodeSpcfcDesc 34188 data type. The MeasureUnitCodeSpecificDescription 34184 package includes a MeasureUnitCodeSpecificDescription 34186 entity. The MeasureUnitCodeSpecificDescription 34186 entity includes various attributes, namely a MeasureUnitCode 34190 and a Description 34194. The MeasureUnitCode 34190 attribute is a MeasureUnitCode 34192 data type. A MeasureUnitCode is a coded representation of a non-monetary unit of measurement. The Description 34194 attribute is a SHORT_Description 34196 data type. A Description is a natural-language representation of the properties of a product.

The TaxClassification 34198 package is an <MT>TxClass 34202 data type. The TaxClassification 34198 package includes a TaxClassification 34200 entity. The TaxClassification 34200 entity includes various attributes, namely a CountryCode 34204, a RegionCode 34208, a TaxJurisdictionCode 34212, a TaxJurisdictionSubdivisionCode 34216, a TaxJurisdictionSubdivisionTypeCode 34220, a ProductTaxEventTypeCode 34224, a TaxTypeCode 34228, a TaxRateTypeCode 34232, a TaxDeductibilityCode 34236, a Percent 34240 and a ProductTaxationCharacteristicsCode 34244. The CountryCode 34204 attribute is a CountryCode 34206 data type. A CountryCode is a coded representation of a country defined by either national, administrative, or political borders. The RegionCode 34208 attribute is a RegionCode 34210 data type. A RegionCode is a coded representation of logically or physically linked geographical or political regions that have one or more attributes in common. The TaxJurisdictionCode 34212 attribute is a TaxJurisdictionCode 34214 data type. A TaxJurisdictionCode is a coded representation of tax jurisdiction. Tax jurisdiction is a geographical area where certain political or administrative authorities levy taxes. The TaxJurisdictionSubdivisionCode 34216 attribute is a TaxJurisdictionSubdivisionCode 34218 data type. A TaxJurisdictionSubdivisionCode is a coded representation of a subdivision of tax jurisdiction. The TaxJurisdictionSubdivisionTypeCode 34220 attribute is a TaxJurisdictionSubdivisionTypeCode 34222 data type. A TaxJurisdictionSubdivisionTypeCode is a coded representation of a type of a subdivision of tax jurisdiction. The ProductTaxEventTypeCode 34224 attribute is a ProductTaxEventTypeCode 34226 data type. A ProductTaxEventTypeCode is a coded representation of a type of taxable event that is connected with the purchase, sale, or consumption of products. A taxable event is understood to be a combination of characteristics that constitute a tax liability, a tax concession, or a tax exemption of a specific type and at a specific level for the purpose of country-specific tax legislation. The TaxTypeCode 34228 attribute is a TaxTypeCode 34230 data type. A TaxTypeCode is a coded representation of the type of a tax that is incurred during the sale, purchase, or consumption of products and during other related business transactions. The TaxRateTypeCode 34232 attribute is a TaxRateTypeCode 34234 data type. A TaxRateTypeCode is a coded representation of a type of tax rate as defined by law for the classification of tax rates. The TaxDeductibilityCode 34236 attribute is a TaxDeductibilityCode 34238 data type. A TaxDeductibilityCode is a coded representation of tax deductibility. Deductibility specifies the portion of value added tax (VAT) that can be deducted from purchases. The Percent 34240 attribute is a Percent 34242 data type. A Percent represents a tax rate for percentage taxes (e.g., tax level in percent). A percent is a number that relates to the comparison figure one hundred. The ProductTaxationCharacteristicsCode 34244 attribute is a ProductTaxationCharacteristicsCode 34246 data type. A ProductTaxationCharacteristicsCode is a coded representation of the main characteristics that form the basis of a product taxation. Main characteristics may include the type of product tax (e.g., ProductTaxEventTypeCode), and the type of tax rate (e.g., TaxRateTypeCode) for each type of tax (e.g., TaxTypeCode) related thereto, and, if applicable, the tax deductibility (e.g., TaxDeductibilityCode).

The EmptiesBillOfMaterial 34248 package is an <MT>EmptsBillOfMtl 34252 data type. The EmptiesBillOfMaterial 34248 package includes an EmptiesBillOfMaterial 34250 entity. The EmptiesBillOfMaterial 34248 package includes a Variant 34262 package. The EmptiesBillOfMaterial 34250 entity includes various attributes, namely an InternalID 34254 and an UsageCode 34258. The InternalID 34254 attribute is an NOSC_BillOfMaterialInternalID 34256 data type. The UsageCode 34258 attribute is an NOSC_BillOfMaterialUsageCode 34260 data type.

The Variant 34262 package is an <MT>EmptsBillOFMtlVar 34266 data type. The Variant 34262 package includes a Variant 34264 entity. The Variant 34262 package includes an Item 34284 package. The Variant 34264 entity includes various attributes, namely an ID 34268, a ProductInternalID 34272, a ProductStandardID 34276 and a MeasureUnitCode 34280. The ID 34268 attribute is a BillOfMaterialVariantID 34270 data type. An ID is an identifier for a material merchandise bill of material. The ProductInternalID 34272 attribute is an NOSC_ProductIntenalID 34274 data type. A ProductInternalID is a proprietary identifier for an empties bill of material. The ProductStandardID 34276 attribute is an NOSC_ProductStandardID 34278 data type. A ProductStandardID is an ID for a base quantity unit. The MeasureUnitCode 34280 attribute is a MeasureUnitCode 34282 data type. A MeasureUnitCode is a coded representation of a non-monetary unit of measurement.

The Item 34284 package is an <MT>EmptsBillOFMtlItm 34288 data type. The Item 34284 package includes an Item 34286 entity. The Item 34286 entity includes various attributes, namely an ID 34290, a ProductInternalID 34294, a ProductStandardID 34298 and a Quantity 34302. The ID 34290 attribute is a BillOfMaterialItemID 34292 data type. An ID is an identifier for a material merchandise bill of material. The ProductInternalID 34294 attribute is an NOSC_ProductIntenalID 34296 data type. A ProductInternalID is a proprietary identifier for an empties bill of material. The ProductStandardID 34298 attribute is an NOSC_ProductStandardID 34300 data type. A ProductStandardID is an ID for a base quantity unit. The Quantity 34302 attribute is a Quantity 34304 data type. A Quantity is a non-monetary unit of measurement.

The MaterialMerchandiseBillOfMaterial 34306 package is an <MT>MtlMrchdsBillOfMtl 34310 data type. The MaterialMerchandiseBillOfMaterial 34306 package includes a MaterialMerchandiseBillOfMaterial 34308 entity. The MaterialMerchandiseBillOfMaterial 34306 package includes a Variant 34320 package. The MaterialMerchandiseBillOfMaterial 34308 entity includes various attributes, namely an InternalID 34312 and a UsageCode 34316. The InternalID 34312 attribute is an NOSC_BillOfMateriaInternalID 34314 data type. The UsageCode 34316 attribute is an NOSC_BillOfMaterialUsageCode 34318 data type.

The Variant 34320 package is an <MT>MtlMrchdsBillOfMtlVar 34324 data type. The Variant 34320 package includes a Variant 34322 entity. The Variant 34320 package includes an Item 34338 package. The Variant 34322 entity includes various attributes, namely an ID 34326, a ProductInternalID 34330 and a ProductStandardID 34334. The ID 34326 attribute is a BillOfMaterialVariantID 34328 data type. An ID is an identifier for a material merchandise bill of material. The ProductInternalID 34330 attribute is an NOSC_ProductIntenalID 34332 data type. A ProductInternalID is a proprietary identifier for a material merchandise bill of material. The ProductStandardID 34334 attribute is an NOSC_ProductStandardID 34336 data type. A ProductStandardID is an ID for a base quantity unit.

The Item 34338 package is an <MT>MtlMrchdsBillOfMtlItm 34342 data type. The Item 34338 package includes an Item 34340 entity. The Item 34340 entity includes various attributes, namely an ID 34344, a ProductInternalID 34348, a ProductStandardID 34352 and a Quantity 34356. The ID 34344 attribute is a BillOfMaterialItemID 34346 data type. An ID is an identifier for a material merchandise bill of material. The ProductInternalID 34348 attribute is a NOSC_ProductIntenalID 34350 data type. A ProductInternalID is a proprietary identifier for a material merchandise bill of material. The ProductStandardID 34352 attribute is an NOSC_ProductStandardID 34354 data type. A ProductStandardID is an ID for a base quantity unit. The Quantity 34356 attribute is a Quantity 34358 data type. A Quantity is a non-monetary unit of measurement.

The ProcurementPriceInformation 34360 package is an <MT>ProcmtPrcInfo 34364 data type. The ProcurementPriceInformation 34360 package includes a ProcurementPriceInformation 34362 entity. The ProcurementPriceInformation 34360 package includes a PriceSpecification 34390 package. The ProcurementPriceInformation 34362 entity includes various attributes, namely a ProductStandardID 34366, an OrderMeasureUnitCode 34370, an OrderTransactionCurrencyCode 34374, a StrategicPurchasingOrganisationID 34378, a SupplierInternalID 34382 and a ValidityPeriod 34386. The ProductStandardID 34366 attribute is an NOSC_ProductStandardID 34368 data type. A ProductStandardID is a standardized identifier for a product. The AgencySchemeID may be fixed by Provider and Consumer (e.g., typically, nine characters (International Article Number, or EAN) and does not need to be specified). The OrderMeasureUnitCode 34370 attribute is a MeasureUnitCode 34372 data type. An OrderMeasureUnitCode is a coded representation of a non-monetary unit of measurement. A unit of measurement is a quantity that is either defined by a standard or established by conventions as a particular type of unit. A unit quantity is a standard of comparison for determining and specifying other quantities of the same type. The OrderTransactionCurrencyCode 34374 attribute is a CurrencyCode 34376 data type. An OrderTransactionCurrencyCode is a coded representation of a currency. The StrategicPurchasingOrganisationID 34378 attribute is an NOSC_OrganisationalCentreID 34380 data type. A StrategicPurchasingOrganisationID is a unique identifier of an organizational unit. The SupplierInternalID 34382 attribute is an NOSC_PartyID 34384 data type. A SupplierInternalID is a unique identifier for a party. The ValidityPeriod 34386 attribute is a CLOSED_DatePeriod 34388 data type. A ValidityPeriod represents a period the sales price information is valid for.

The PriceSpecification 34390 package is an <MT>ProcmtPrInfoPrSpec 34394 data type. The PriceSpecification 34390 package includes a PriceSpecification 34392 entity. The PriceSpecification 34390 package includes a ScaleLine 34424 package. The PriceSpecification 34392 entity includes various attributes, namely a PriceSpecificationElementTypeCode 34396, a PriceSpecificationElementCategoryCode 34400, a ValidityPeriod 34404, an Amount 34408, a BaseQuantity 34412, an OrderPriceAmount 34416 and an OrderBaseQuantity 34420. The PriceSpecificationElementTypeCode 34396 attribute is an NOSC_PriceSpecificationElementTypeCode 34398 data type. A PriceSpecificationElementTypeCode is a coded representation of the type of a PriceSpecificationElement. The PriceSpecificationElementCategoryCode 34400 attribute is an NOSCPriceSpecificationElementCategoryCode 34402 data type. A PriceSpecificationElementCategoryCode is a coded representation of a category of a PriceSpecificationElement. A PriceSpecificationElement is the specification of a price, a discount, a surcharge, or a tax. The ValidityPeriod 34404 attribute is a TimePointPeriod 34406 data type. A ValidityPeriod is a period defined by two points in time of the same type. The time period may be determined by a start time-point and an end time-point, duration and a start time point, or duration with an end timepoint. The Amount 34408 attribute is an Amount 34410 data type. An Amount is an amount with a corresponding currency unit. The BaseQuantity 34412 attribute is a Quantity 34414 data type. A BaseQuantity is a non-monetary numerical specification of an amount in a unit of measurement. The OrderPriceAmount 34416 attribute is an Amount 34418 data type. An OrderPriceAmount is an amount with a corresponding currency unit. If the Price Specification has a different CurrencyCode than the Price Information OrderTransactionCurrencyCode, the Price Specification OrderPriceAmount may include the conversion of the Price Specification Amount into the Price Information OrderTransactionCurrencyCode. Otherwise, Amount and OrderPriceAmount may be identical. The OrderBaseQuantity 34420 attribute is a Quantity 34422 data type. An OrderBaseQuantity is a non-monetary numerical specification of an amount in a unit of measurement. If the Price Specification has a different MeasureUnitCode than the Price Information OrderMeasureUnitCode, the Price Specification OrderBaseQuantity may include a conversion of the Price Specification BaseQuantity into the Price Information OrderMeasureUnitCode. Otherwise, BaseQuantity and OrderBaseQuantity may be identical.

The ScaleLine 34424 package is an <MT>ProcmtPrcInfoPrSpecScLine 34428 data type. The ScaleLine 34424 package includes a ScaleLine 34426 entity. The ScaleLine 34426 entity includes various attributes, namely a ScaleAxisStep 34430 and an Amount 34434. The ScaleAxisStep 34430 attribute is an NOSC_ScaleAxisStep 34432 data type. A ScaleAxisStep is a step (scale dimension value) of a scale axis. The Amount 34434 attribute is an Amount 34436 data type. An Amount is an amount with a corresponding currency unit.

The SalesPriceInformation 34438 package is an <MT>SlsPrInfo 34442 data type. The SalesPriceInformation 34438 package includes a SalesPriceInformation 34440 entity. The SalesPriceInformation 34438 package includes a PriceSpecification 34464 package. The SalesPriceInformation 34440 entity includes various attributes, namely a ProductStandardID 34444, a MeasureUnitCode 34448, a SalesOrganisationID 34452, a DistributionChannelCode 34456 and a ValidityPeriod 34460. The ProductStandardID 34444 attribute is an NOSC_ProductStandardID 34446 data type. A ProductStandardID is a standardized identifier for a product. The AgencySchemeID may be fixed by Provider and Consumer (e.g., typically, nine characters (International Article Number, or EAN) and does not need to be specified). The MeasureUnitCode 34448 attribute is a MeasureUnitCode 34450 data type. A MeasureUnitCode is a coded representation of a non-monetary unit of measurement. A unit of measurement is a quantity that is either defined by a standard or established by conventions as a particular type of unit. The SalesOrganisationID 34452 attribute is an NOSC_OrganisationalCentreID 34454 data type. A SalesOrganisationID is a unique identifier of an organizational unit. The DistributionChannelCode 34456 attribute is a DistributionChannelCode 34458 data type. A DistributionChannelCode is a coded representation of a distribution channel. A distribution channel is a channel via which goods or services reach a customer. The ValidityPeriod 34460 attribute is a CLOSED_DatePeriod 34462 data type. A ValidityPeriod represents a period the sales price information is valid for.

The PriceSpecification 34464 package is an <MT>SlsPrInfoPrSpec 34468 data type. The PriceSpecification 34464 package includes a PriceSpecification 34466 entity. The PriceSpecification 34464 package includes a ScaleLine 34486 package. The PriceSpecification 34466 entity includes various attributes, namely a PriceSpecificationElementTypeCode 34470, a PriceSpecificationElementCategoryCode 34474, an Amount 34478 and a BaseQuantity 34482. The PriceSpecificationElementTypeCode 34470 attribute is an NOSC_PriceSpecificationElementTypeCode 34472 data type. A PriceSpecificationElementTypeCode is a coded representation of the type of a PriceSpecificationElement. A PriceSpecificationElement is the specification of a price, a discount, a surcharge, or a tax. The PriceSpecificationElementCategoryCode 34474 attribute is an NOSC_PriceSpecificationElementCategoryCode 34476 data type. A PriceSpecificationElementCategoryCode is a coded representation of a category of a PriceSpecificationElement. A PriceSpecificationElement is a specification of a price, a discount, a surcharge, or a tax. The Amount 34478 attribute is an Amount 34480 data type. An Amount is an amount with a corresponding currency unit. The BaseQuantity 34482 attribute is a Quantity 34484 data type. A BaseQuantity is a non-monetary numerical specification of an amount in a unit of measurement.

The ScaleLine 34486 package is an <MT>SlsPrInfoPrSpecScLine 34490 data type. The ScaleLine 34486 package includes a ScaleLine 34488 entity. The ScaleLine 34488 entity includes various attributes, namely a ScaleAxisStep 34492 and an Amount 34496. The ScaleAxisStep 34492 attribute is an NOSC_ScaleAxisStep 34494 data type. A ScaleAxisStep is a step (e.g., scale dimension value) of a scale axis. The Amount 34496 attribute is an Amount 34498 data type. An Amount is an amount with a corresponding currency unit.

Figures 1, 37:
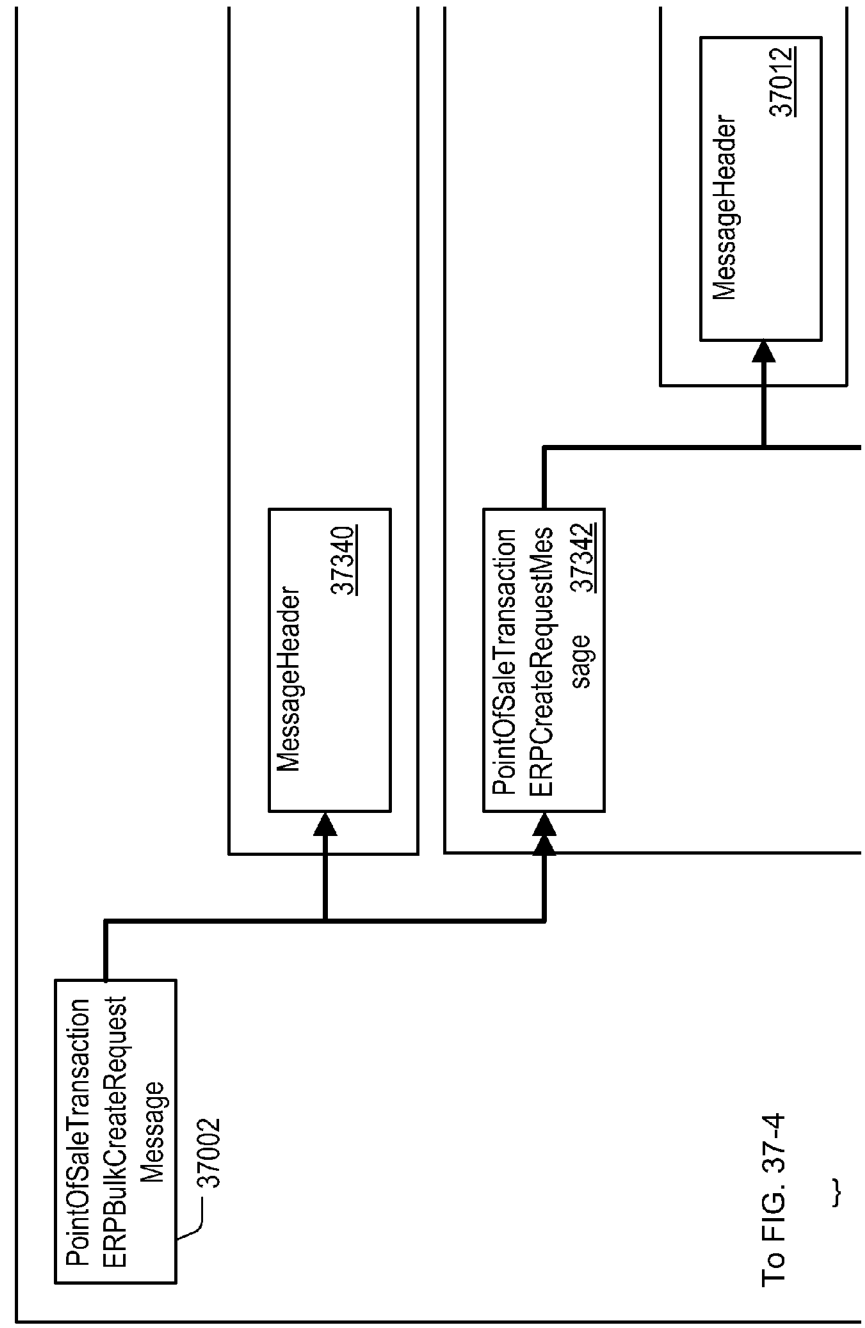
Figures 3, 37:
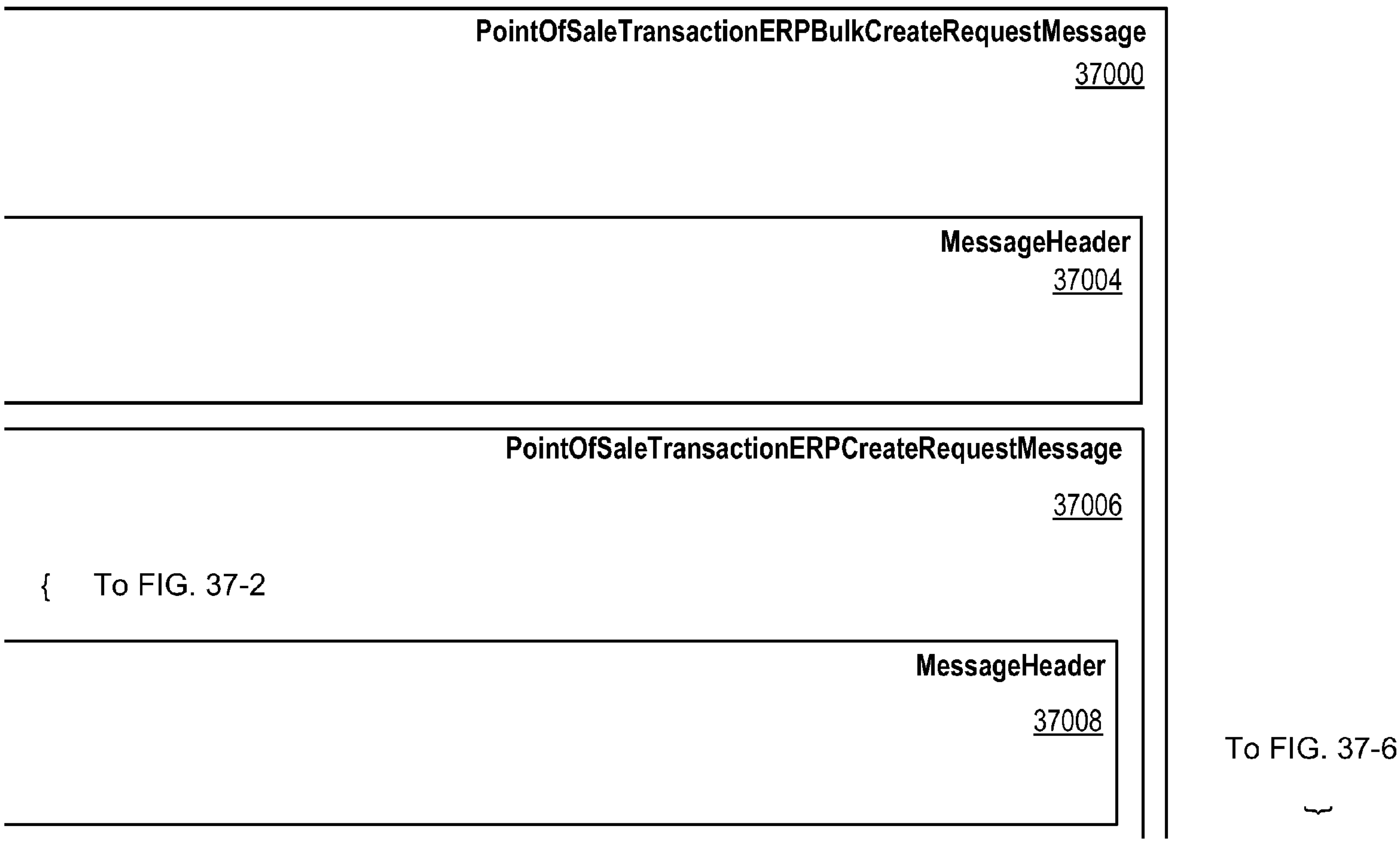
Figures 4, 37:
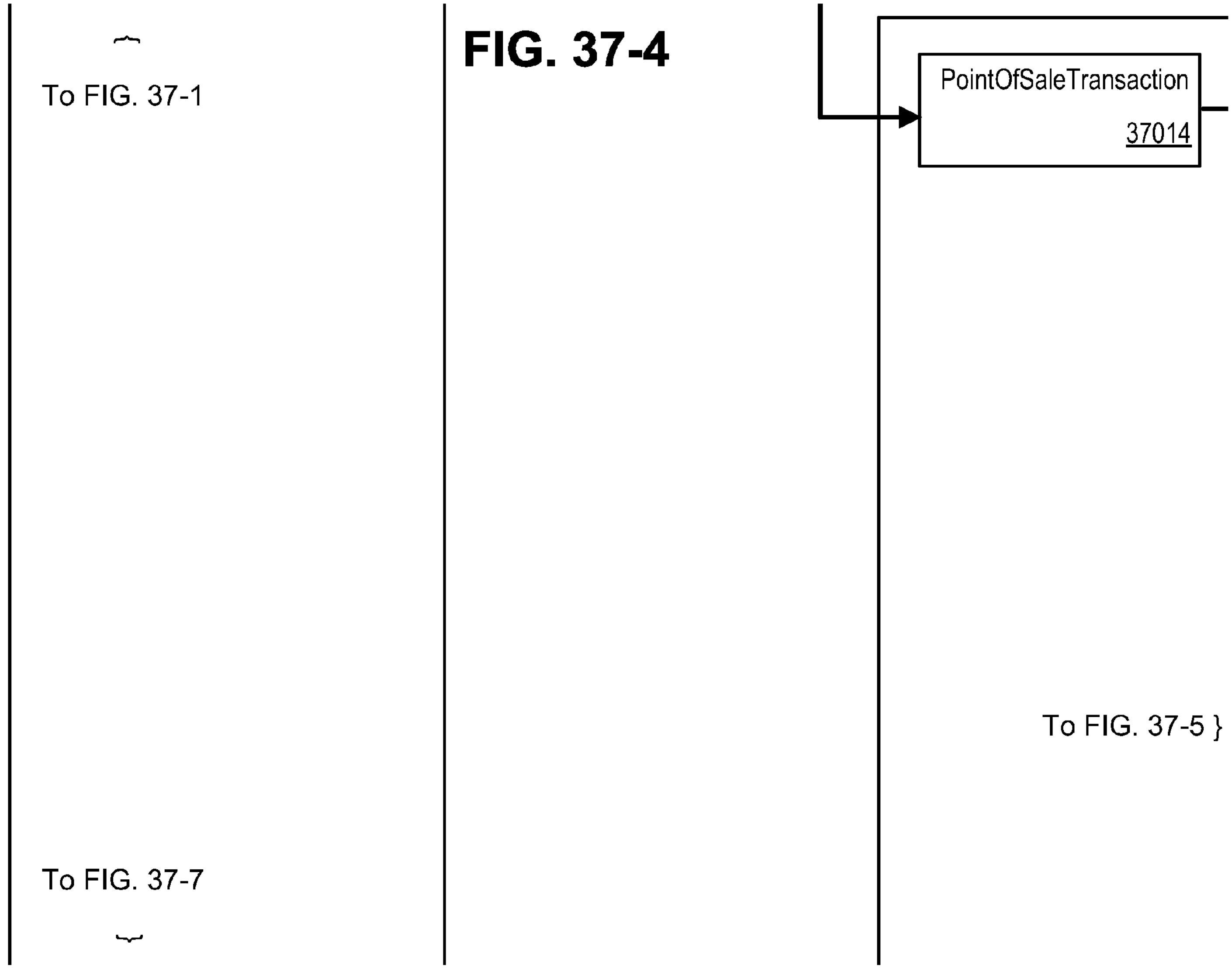
Figures 5, 37:
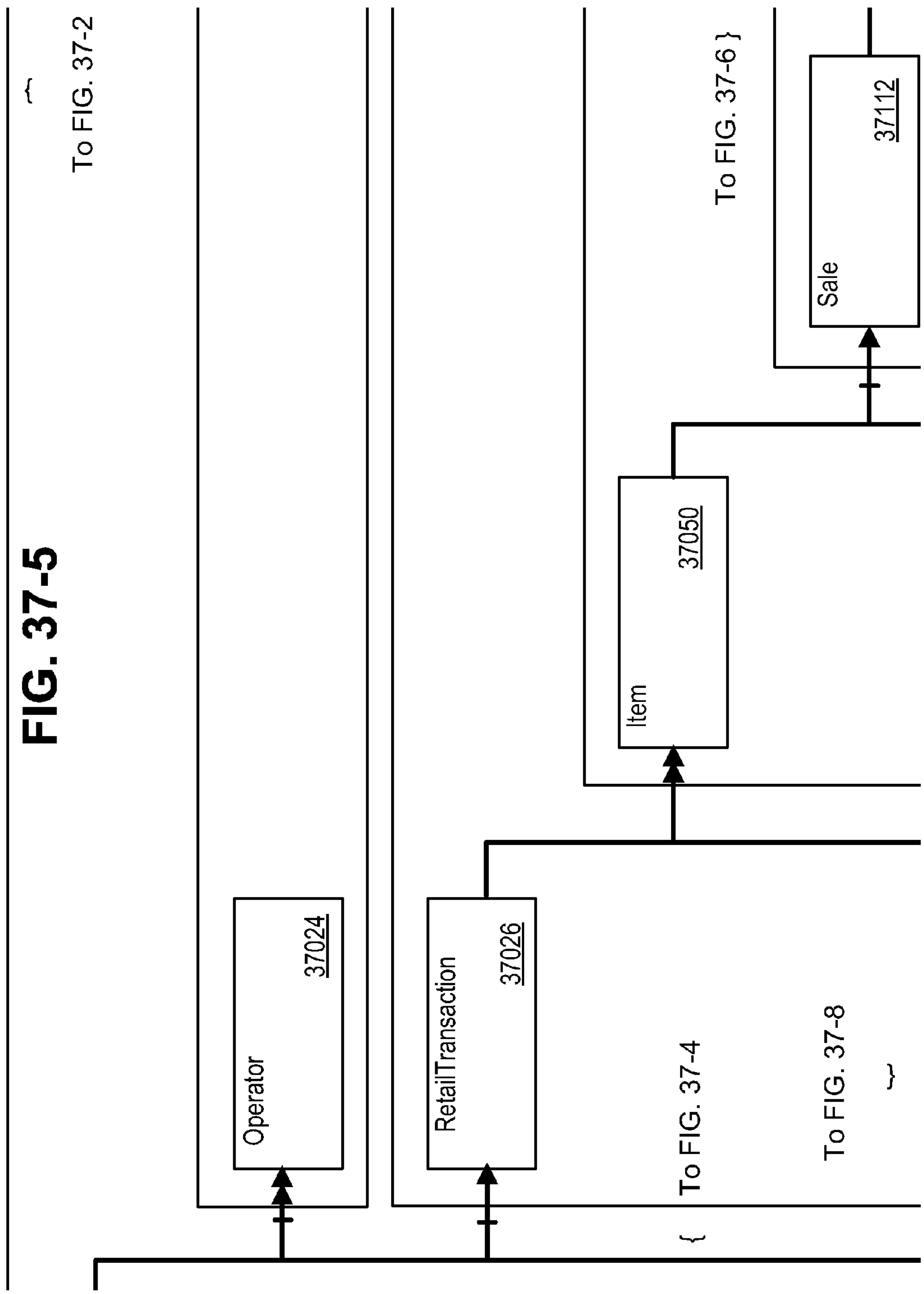
Figures 6, 37:
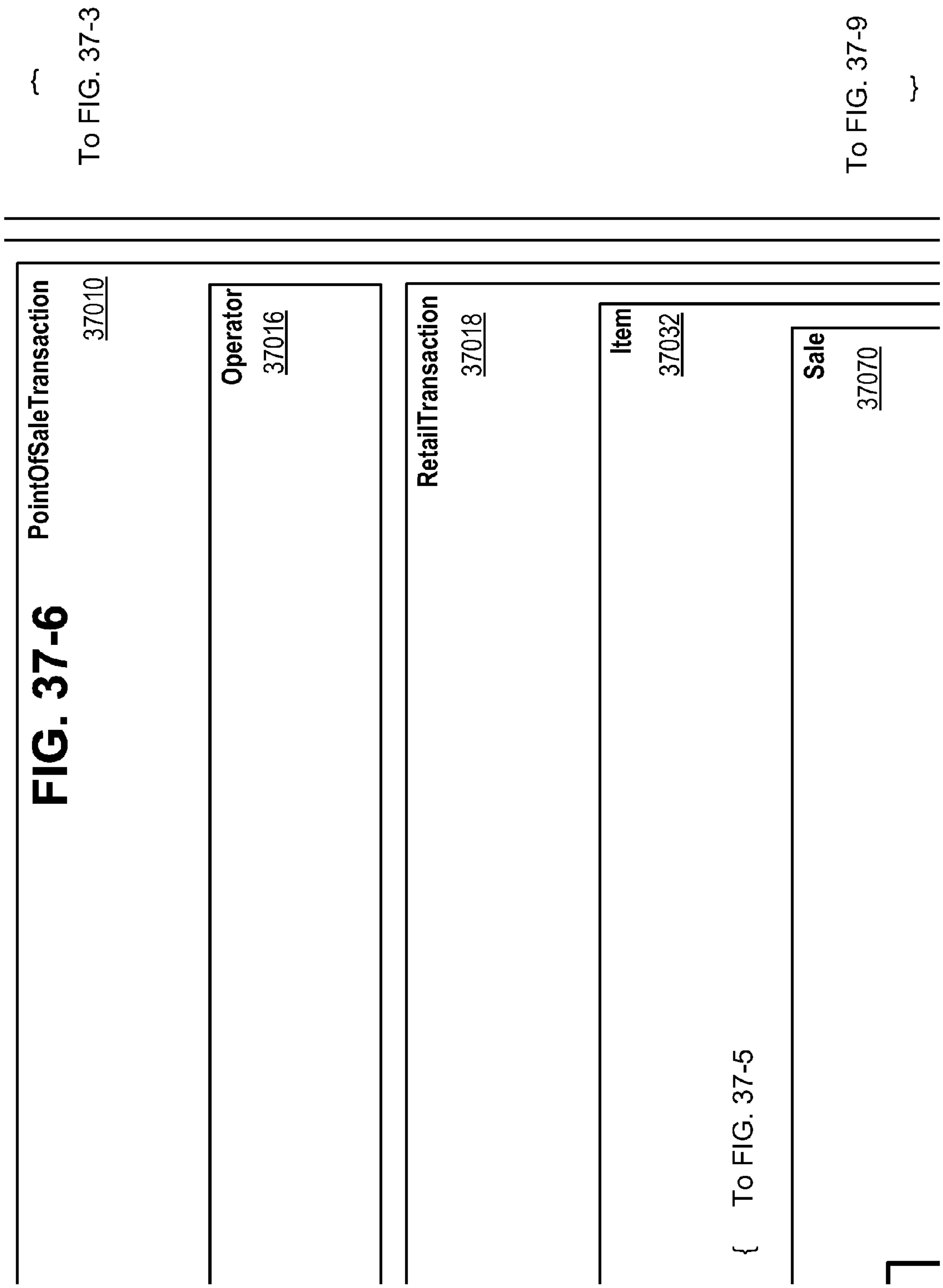
Figures 9, 37:
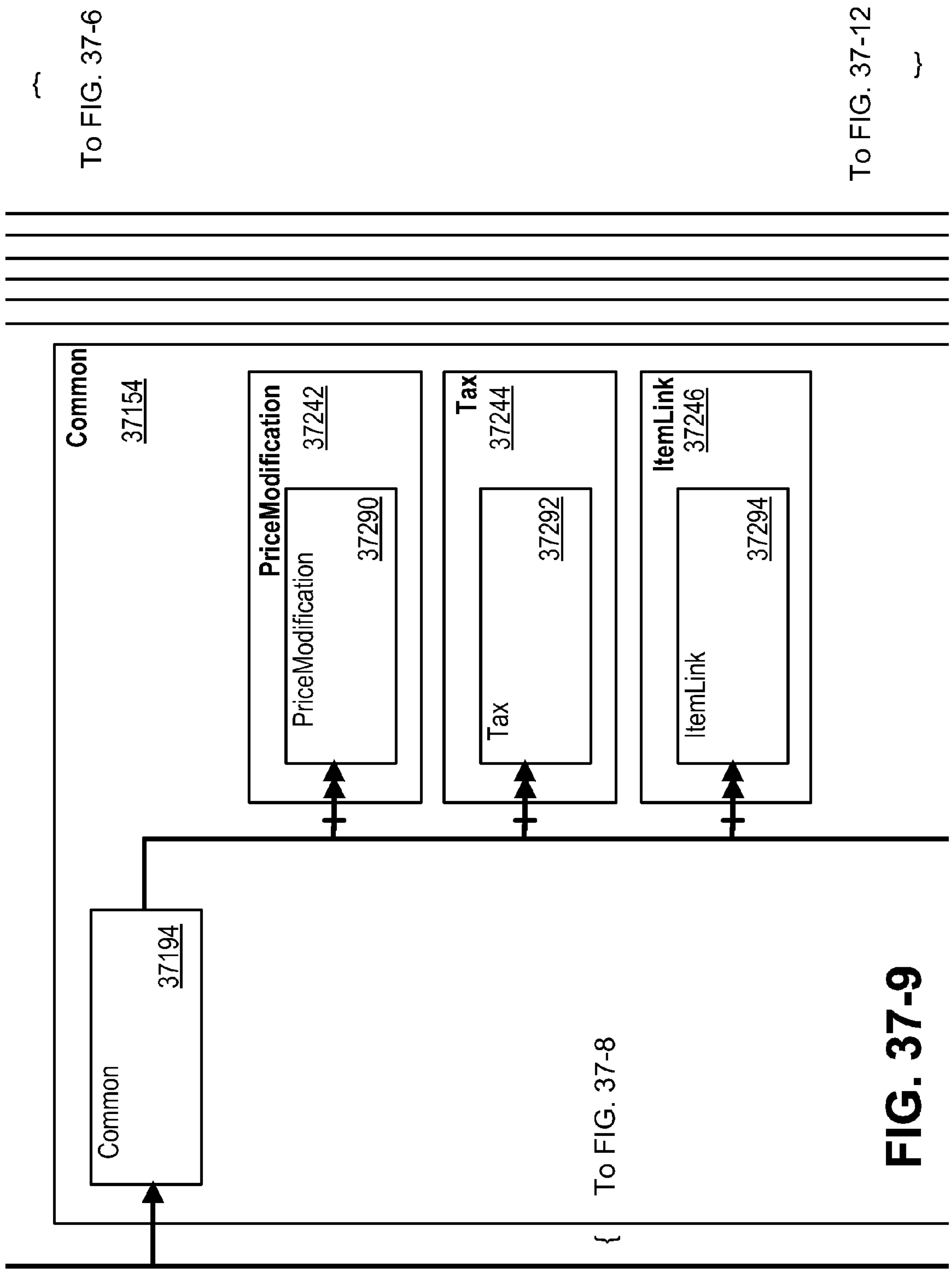
Figures 11, 37:
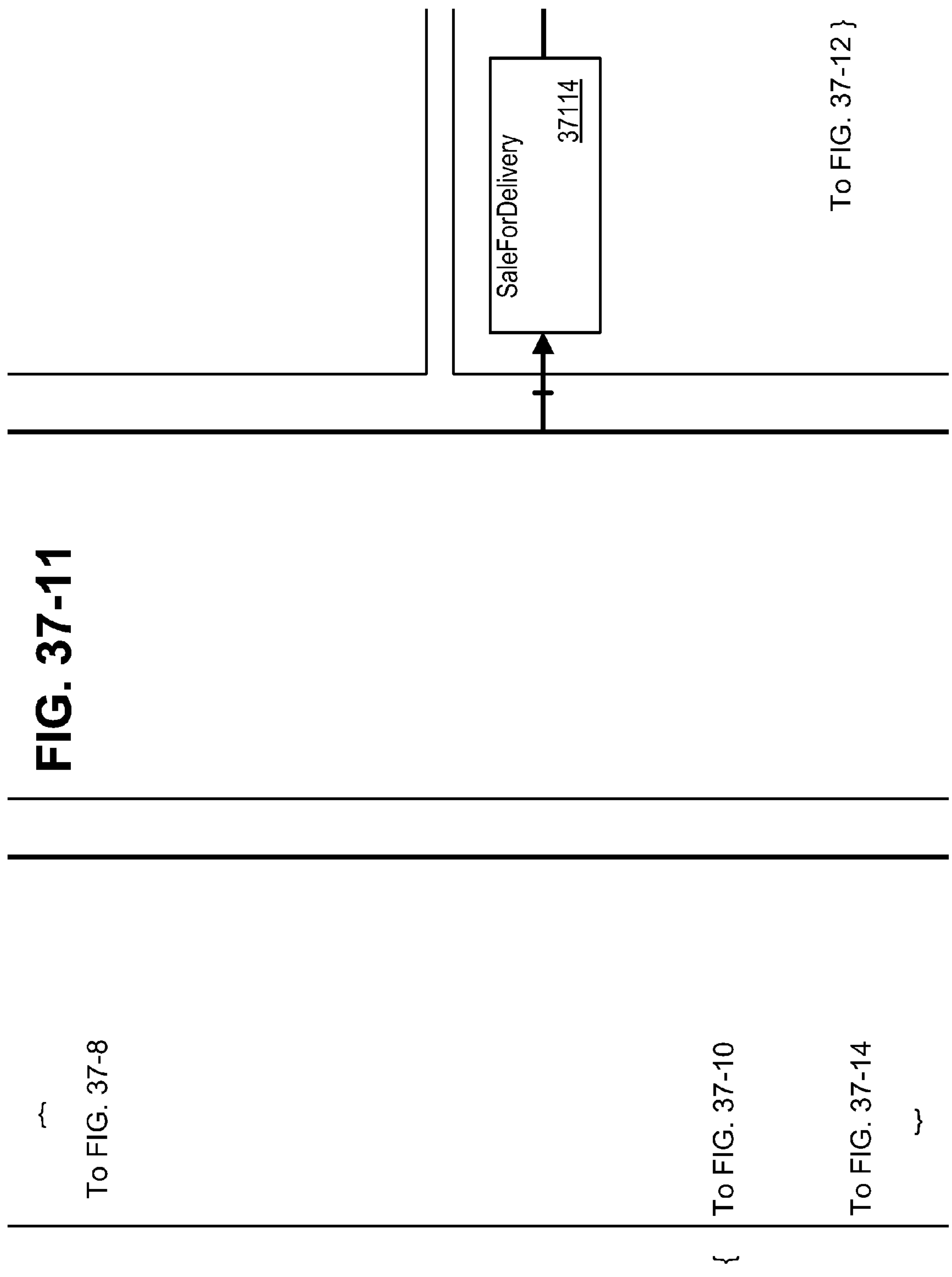
Figures 12, 37:
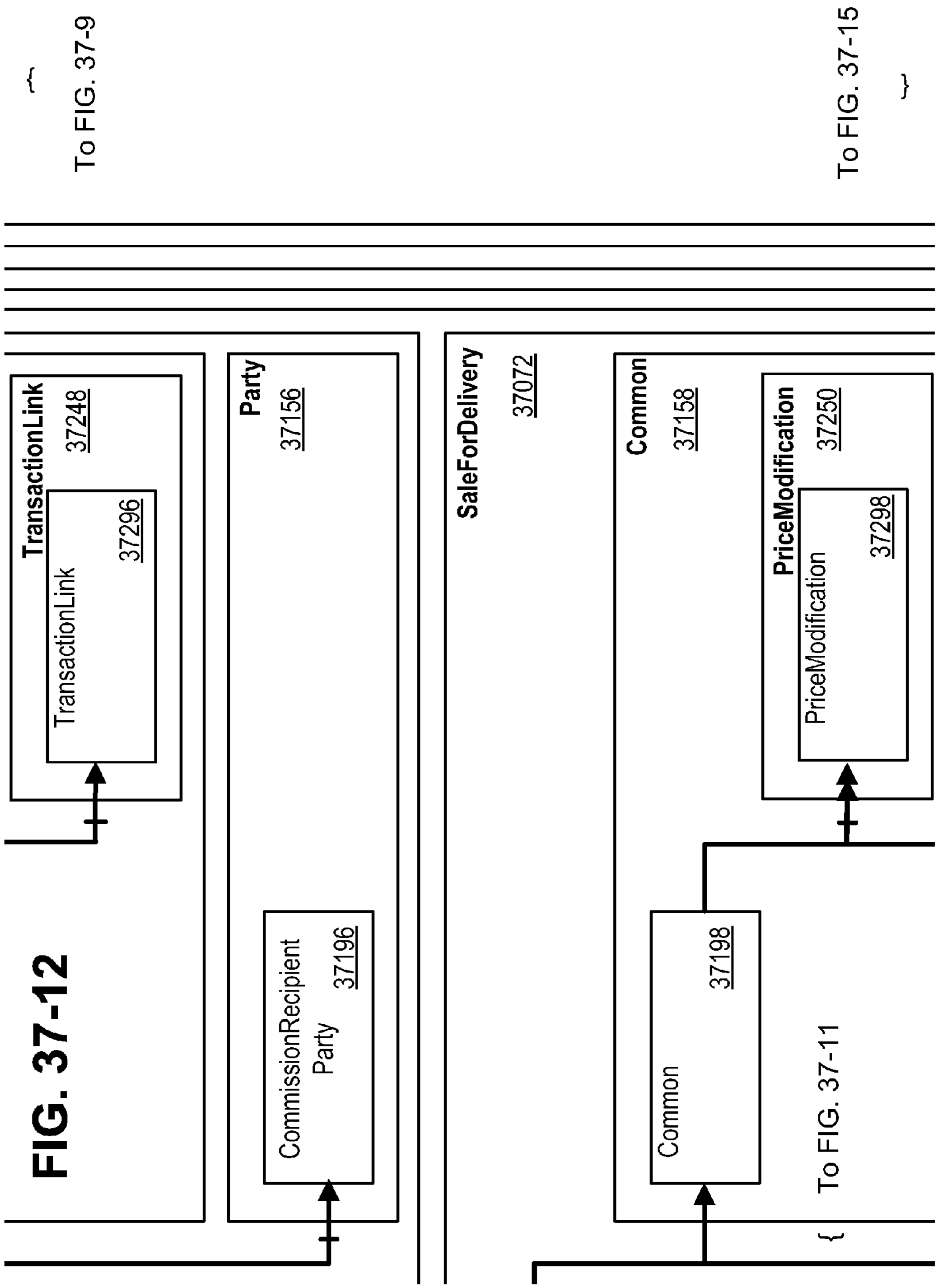
Figures 15, 37:
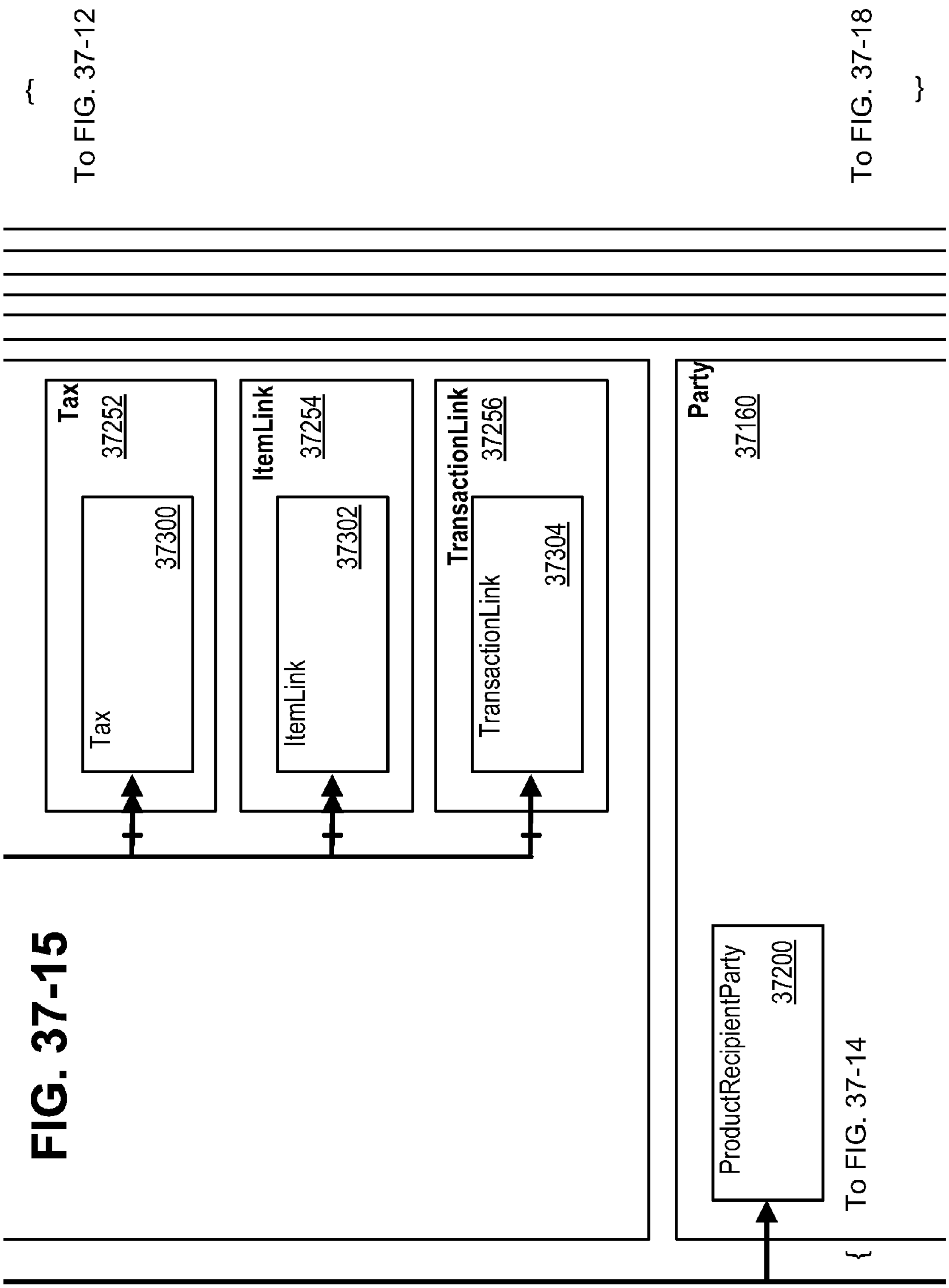
Figures 17, 37:
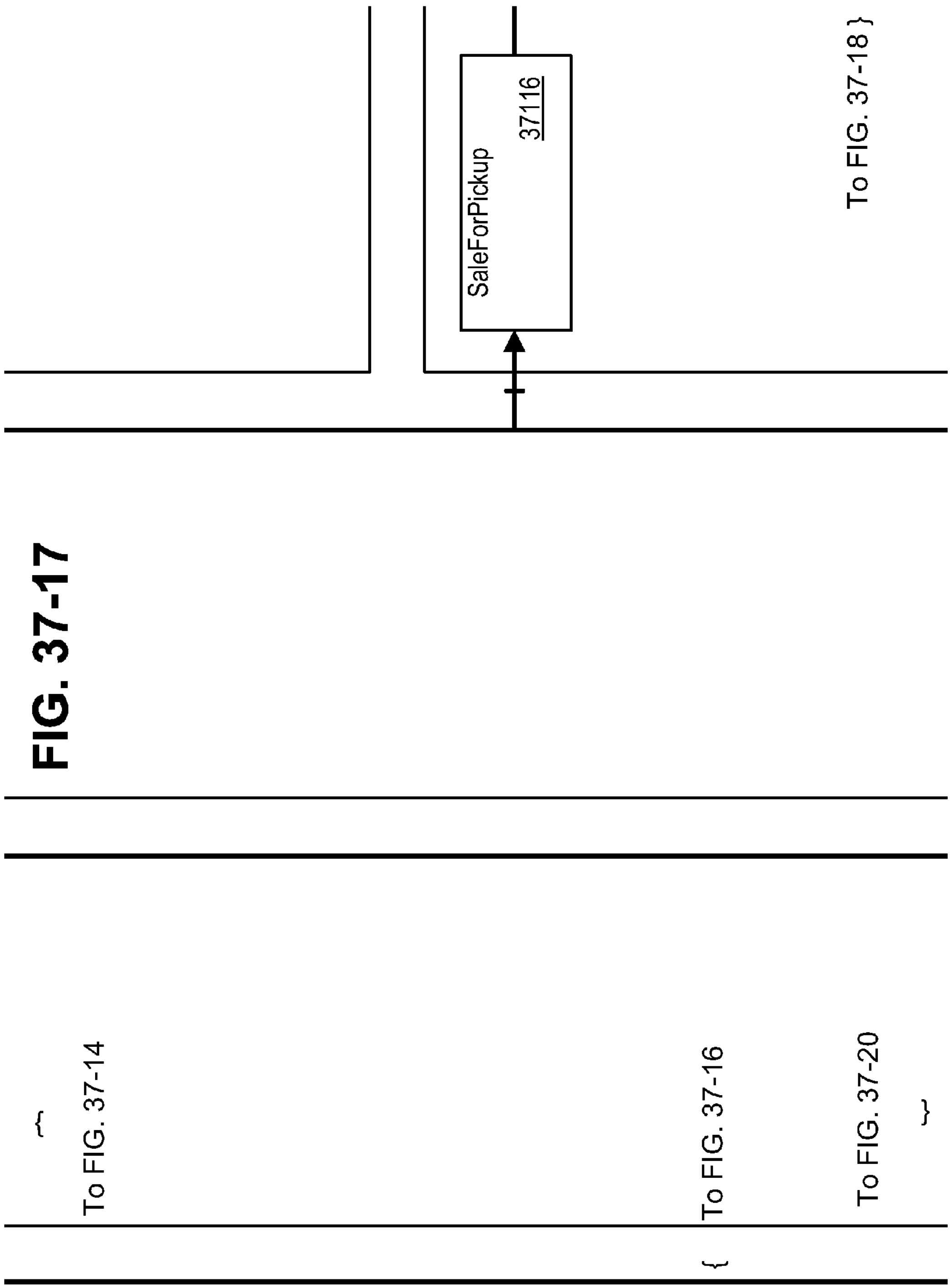
Figures 18, 37:
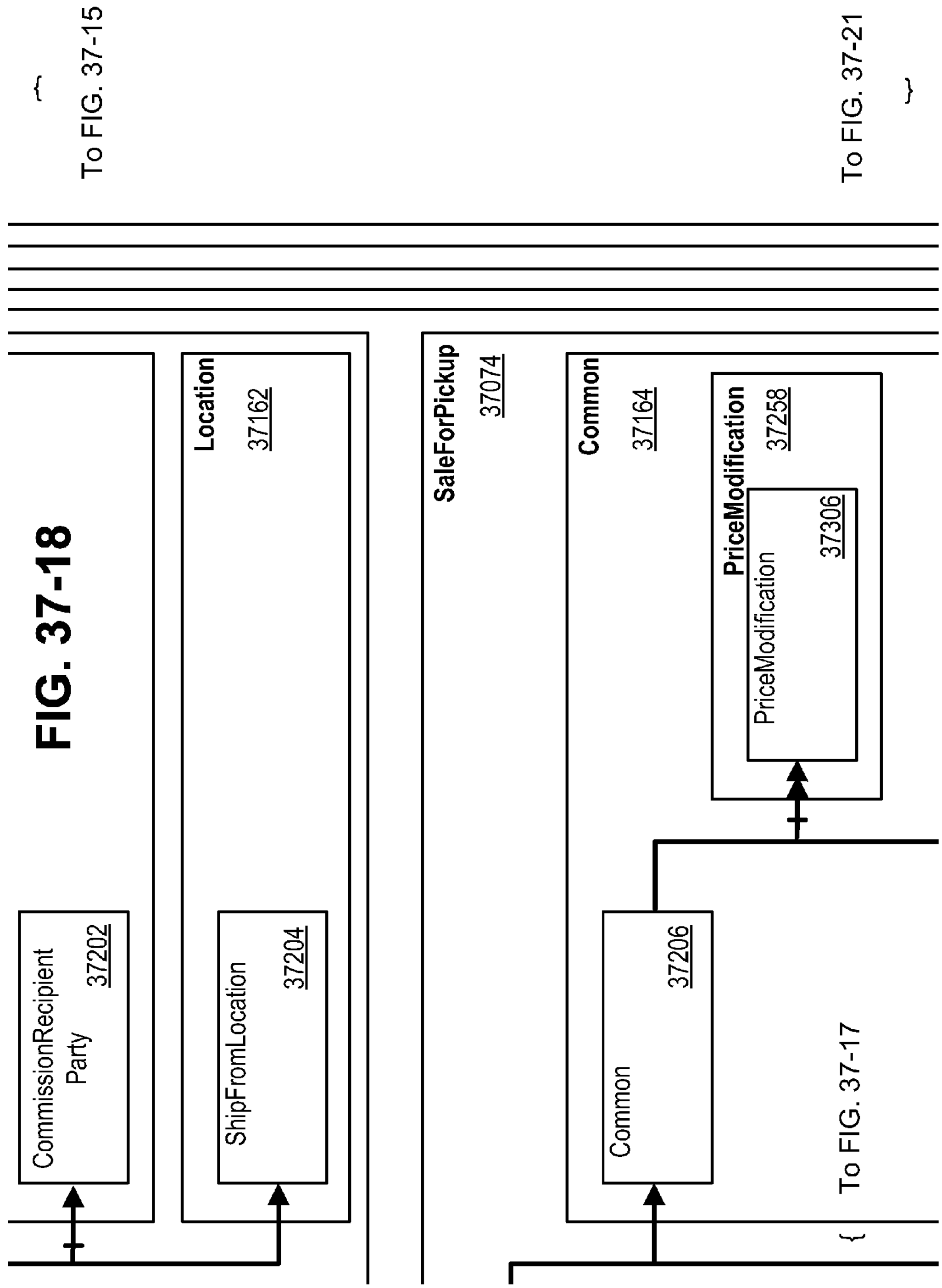
Figures 21, 37:
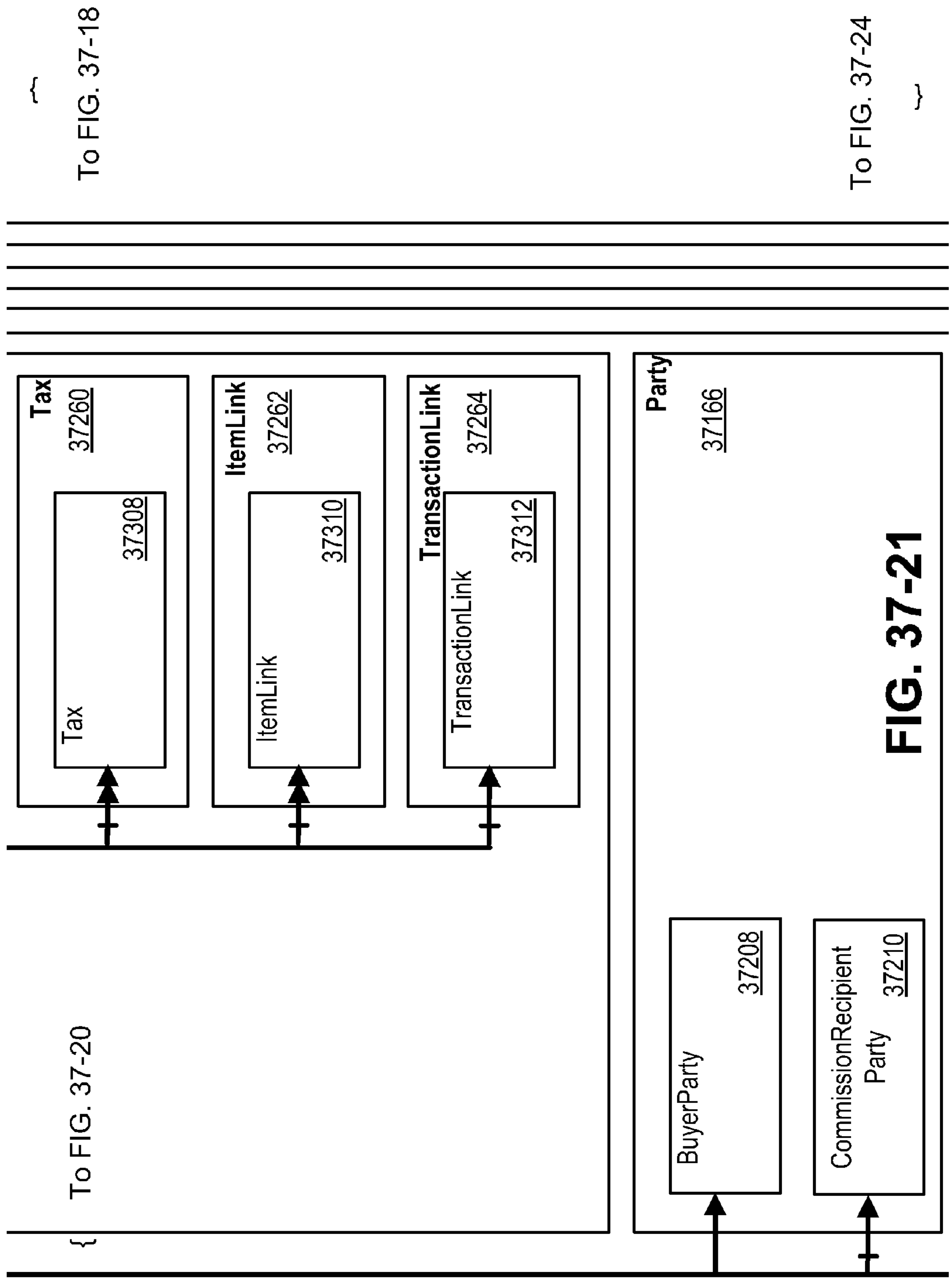
Figures 23, 37:
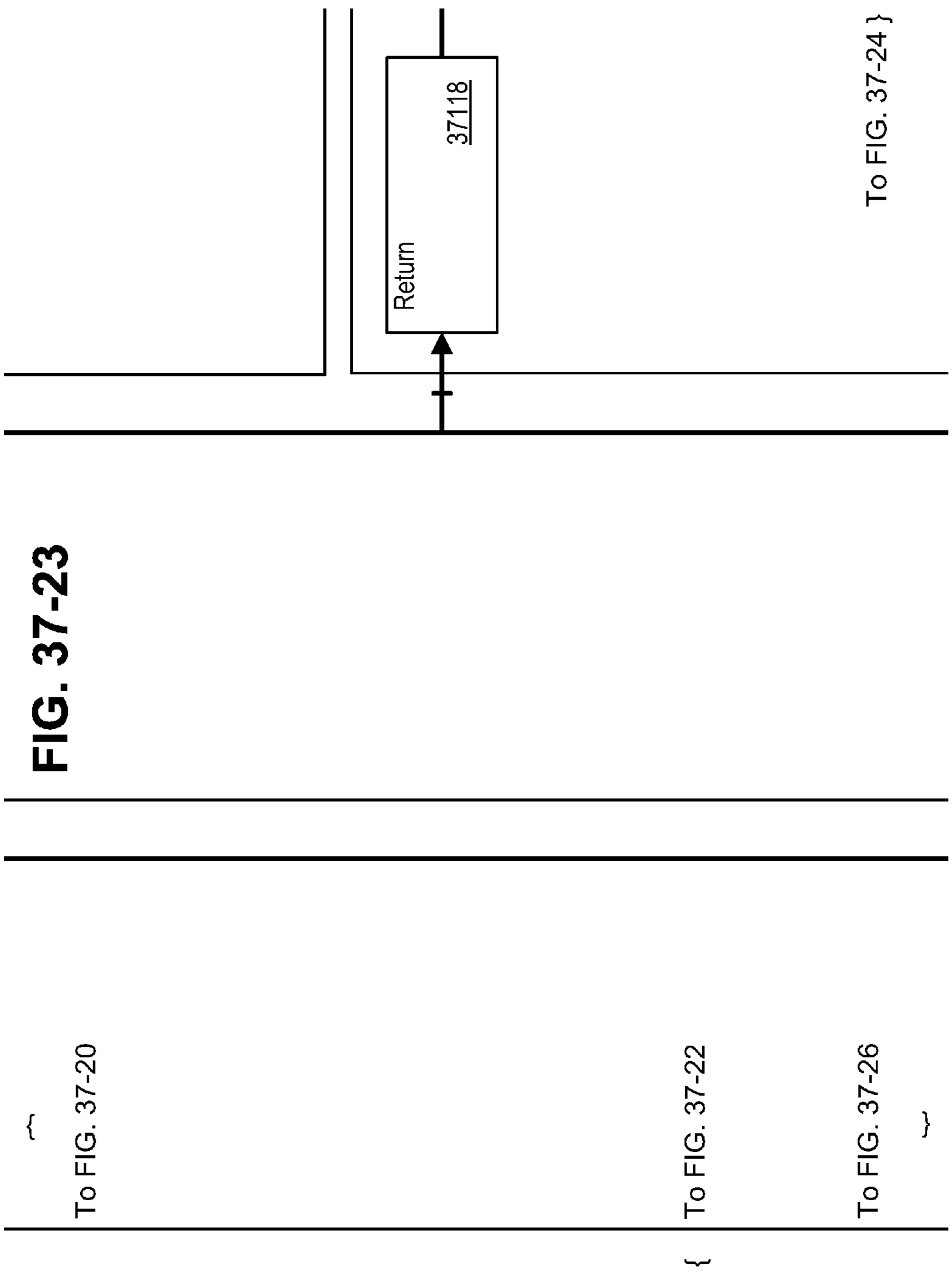
Figures 24, 37:
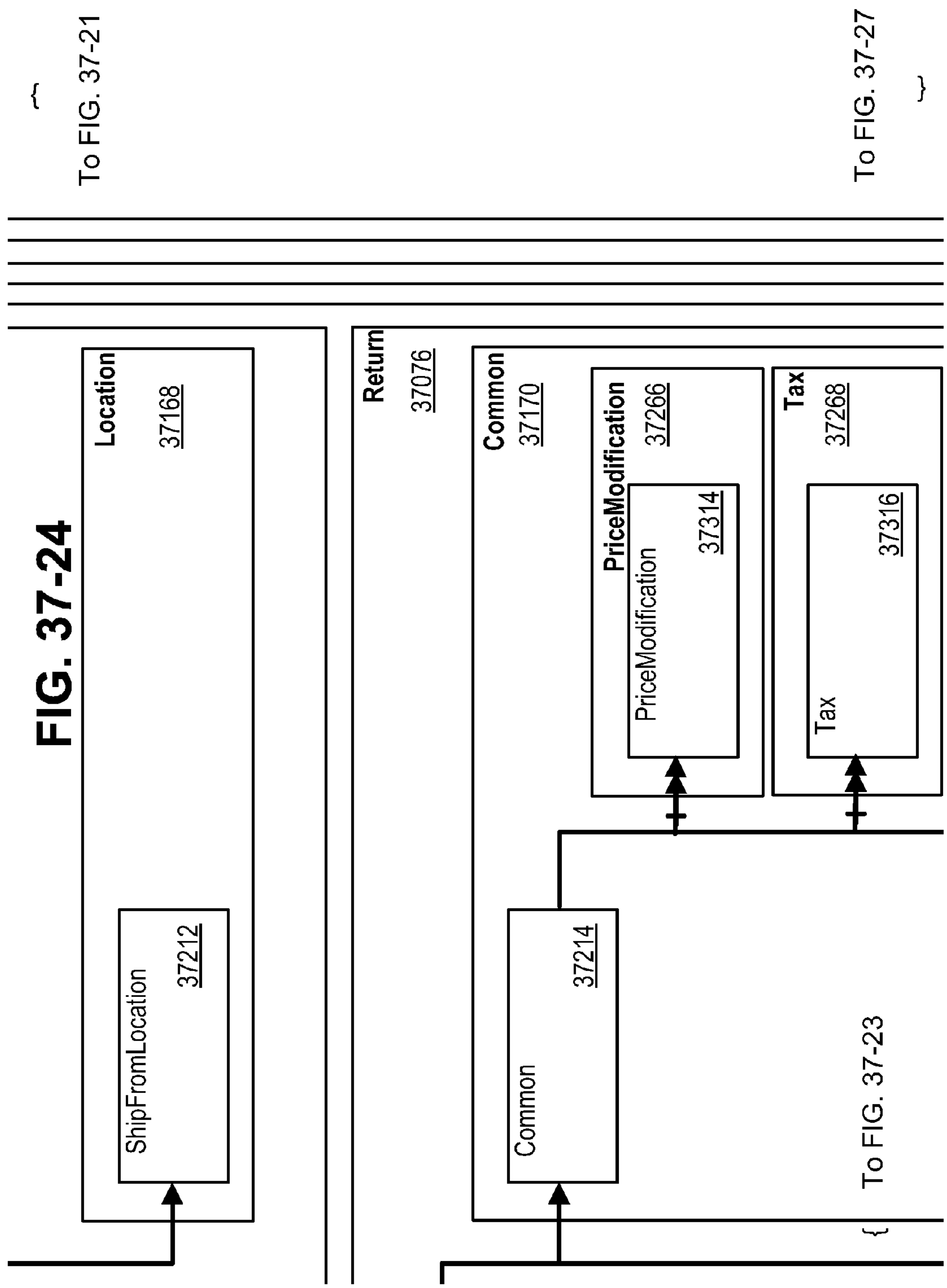
Figures 27, 37:
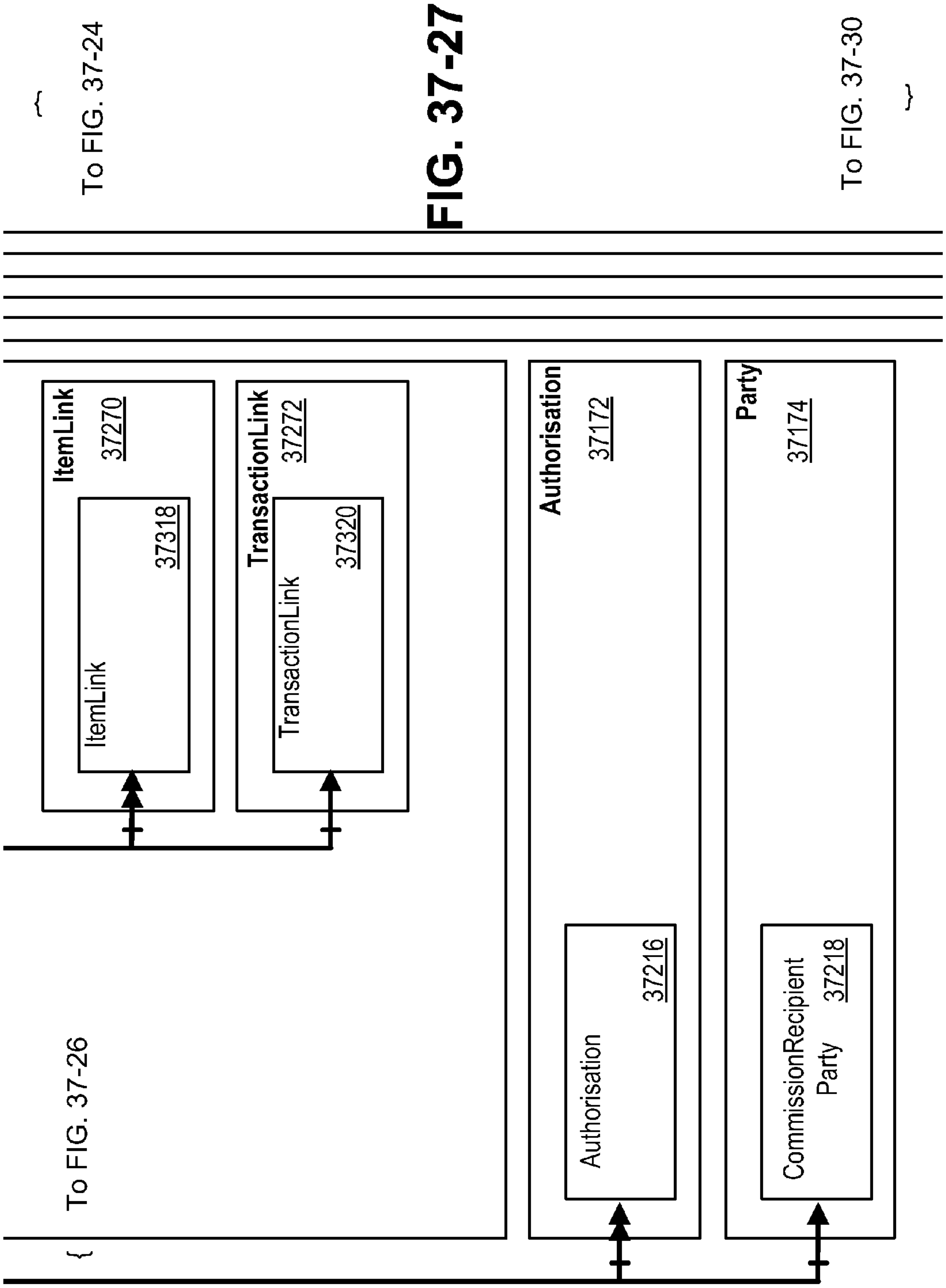
Figures 29, 37:
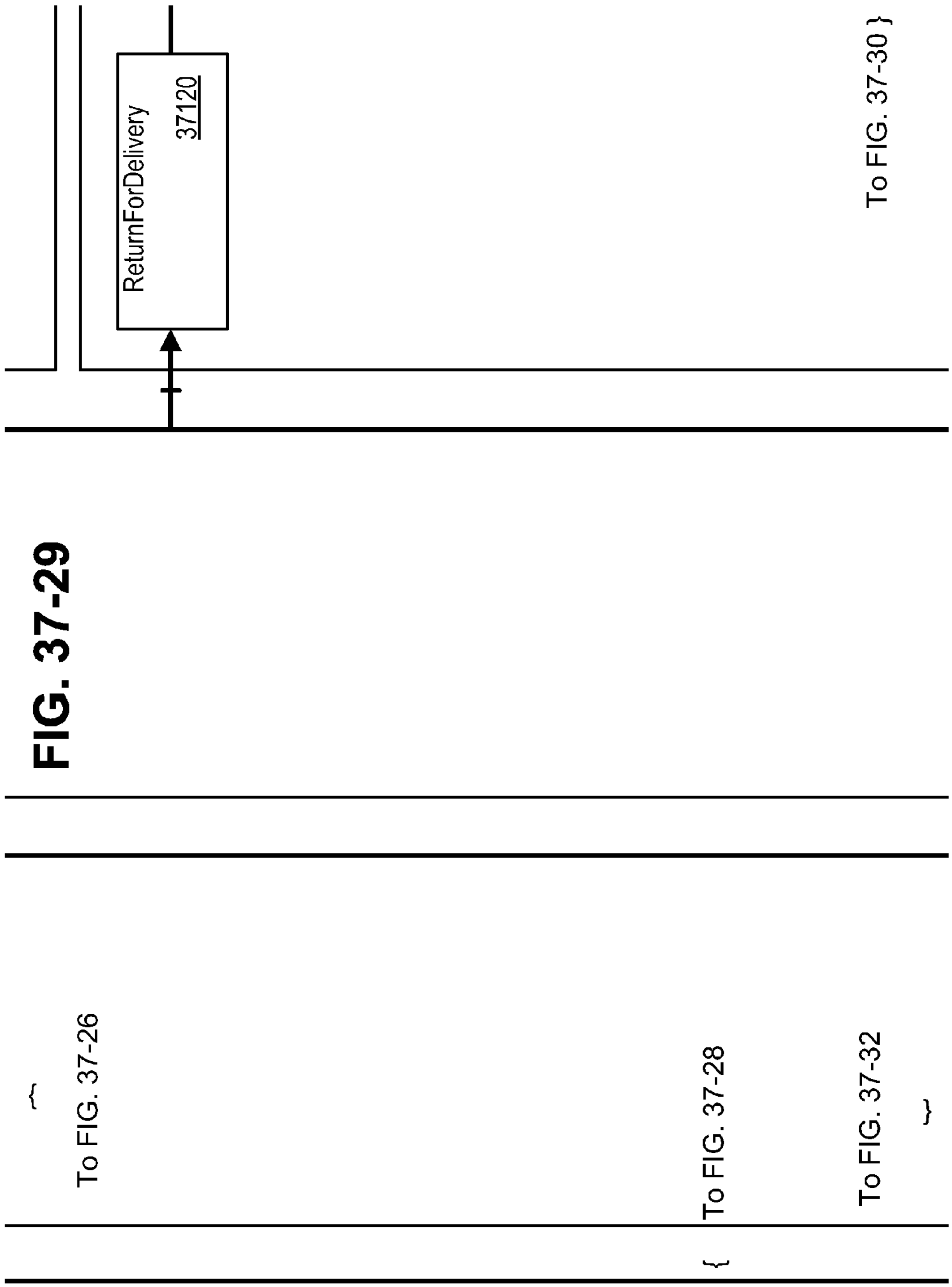
Figures 30, 37:
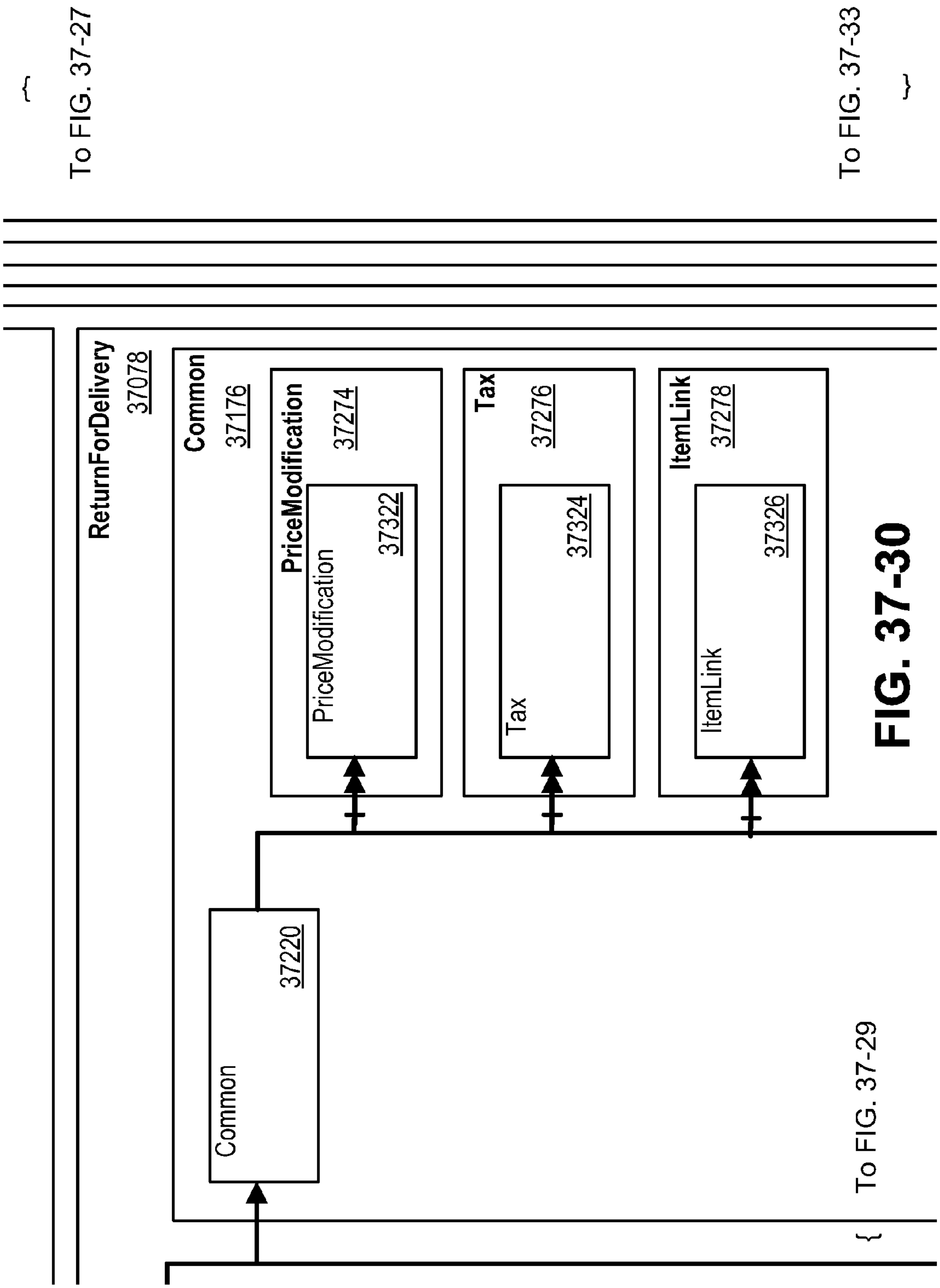
Figures 33, 37:
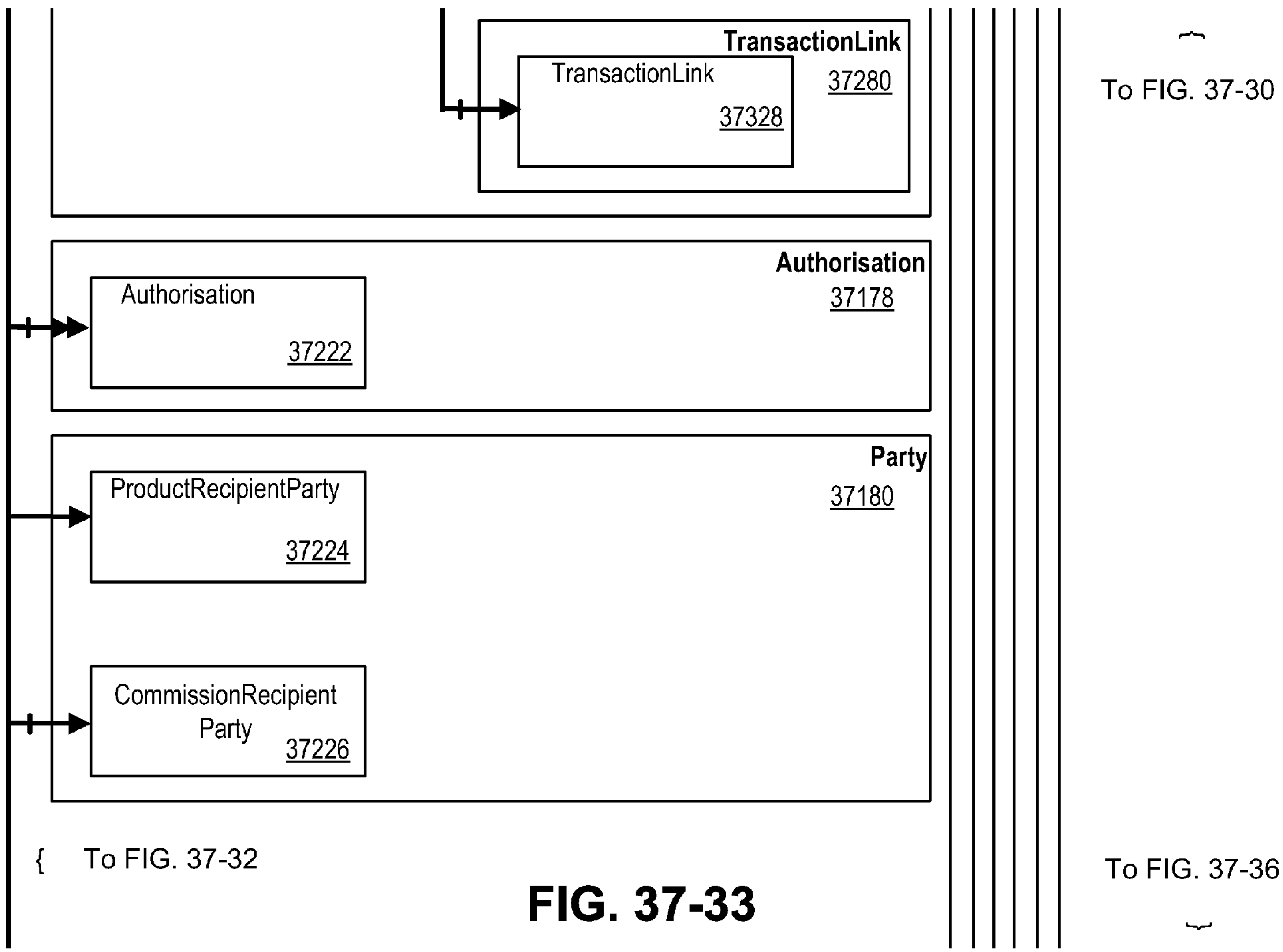
Figures 35, 37:
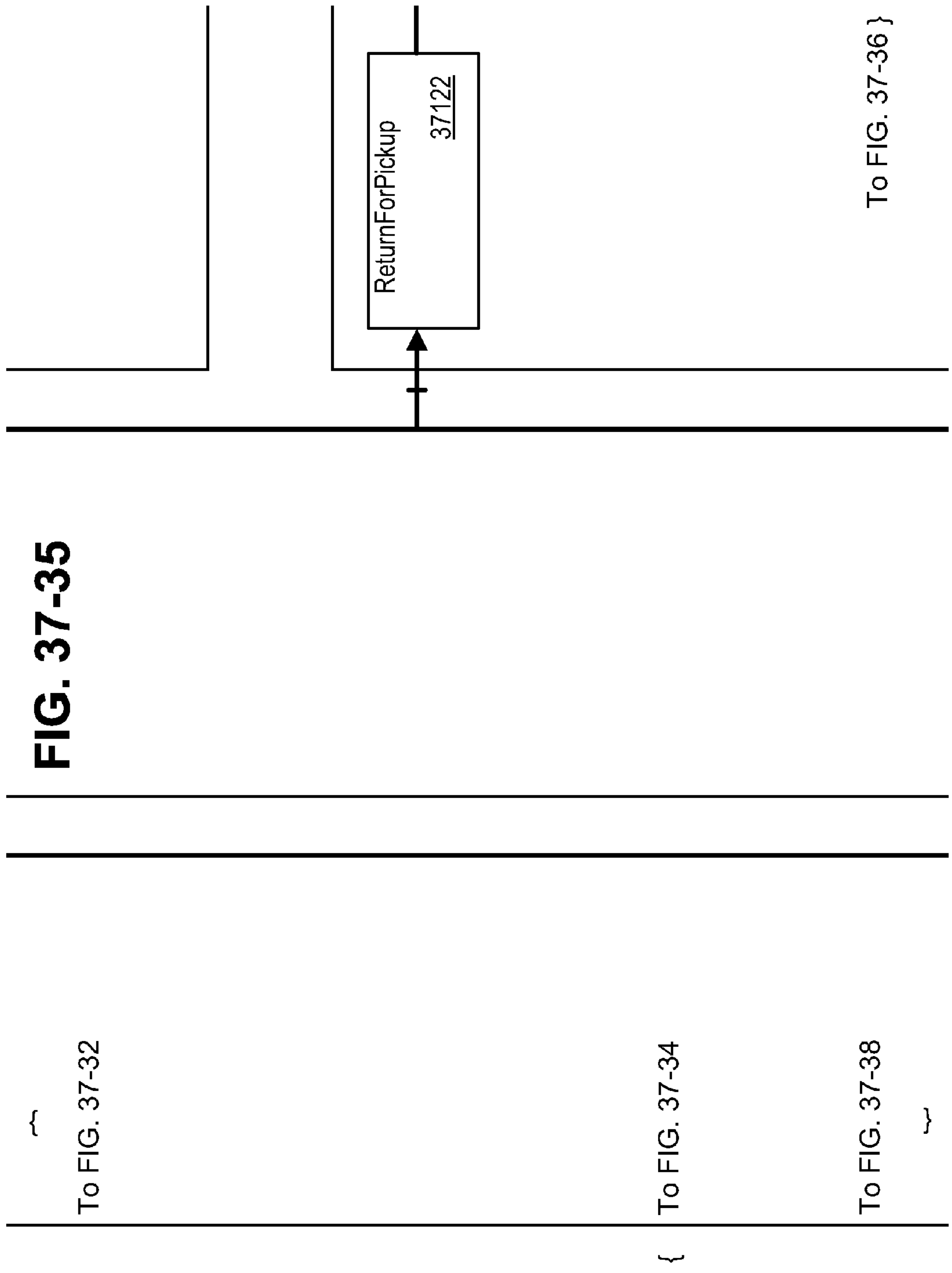
Figures 36, 37:
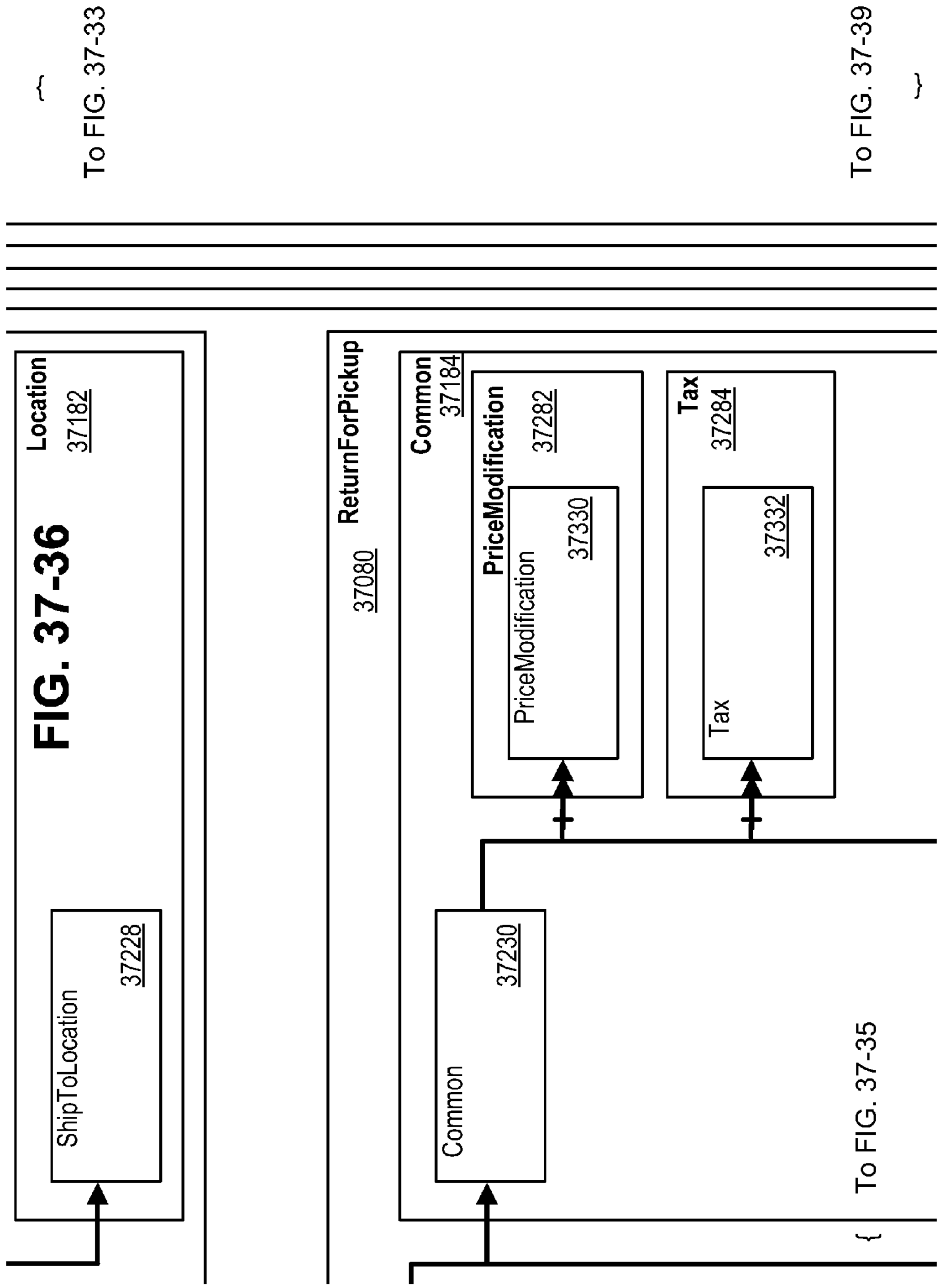

FIGS. 35-1 through 35-28 show an example configuration of an Element Structure that includes a MerchandiseERPReplicationBulkRequestMessage 35000 package. The data types of the various packages, entities, and attributes of FIGS. 35-1 through 35-8 are described with respect to FIG. 34. The MerchandiseERPReplicationBulkRequestMessage 35000 package is a MrchdsERPRplctnBulkReqMsg 35004 data type. The MerchandiseERPReplicationBulkRequestMessage 35000 package includes a MerchandiseERPReplicationBulkRequestMessage 35002 entity. The MerchandiseERPReplicationBulkRequestMessage 35000 package includes various packages, namely a MessageHeader 35006 and a MerchandiseERPReplicationRequestMessage 35014.

The MessageHeader 35006 package is a BusinessDocumentMessageHeader 35012 data type. The MessageHeader 35006 package includes a MessageHeader 35008 entity. The MessageHeader 35008 entity has a cardinality of 1 35010 meaning that for each instance of the MessageHeader 35006 package there is one MessageHeader 35008 entity. The MerchandiseERPReplicationRequestMessage 35014 package is a MrchdsERPRplctnReqMsg 35020 data type.

The MerchandiseERPReplicationRequestMessage 35014 package includes a MerchandiseERPReplicationRequestMessage 35016 entity. The MerchandiseERPReplicationRequestMessage 35014 package includes various packages, namely a MessageHeader 35022 and a Merchandise 35030. The MerchandiseERPReplicationRequestMessage 35016 entity has a cardinality of 1 . . . n 35018 meaning that for each instance of the MerchandiseERPReplicationRequestMessage 35014 package there are one or more MerchandiseERPReplicationRequestMessage 35016 entities. The MessageHeader 35022 package is a BusinessDocumentMessageHeader 35028 data type. The MessageHeader 35022 package includes a MessageHeader 35024 entity. The MessageHeader 35024 entity has a cardinality of 1 35026 meaning that for each instance of the MessageHeader 35022 package there is one MessageHeader 35024 entity.

The Merchandise 35030 package is an <MT>MrchdsMT=MrchdsERPRplctnReq 35036 data type. The Merchandise 35030 package includes a Merchandise 35032 entity. The Merchandise 35030 package includes various packages, namely a ReceivingStore 35062, a PointOfSaleProcessingCondition 35076, a Description 35120, a GlobalTradeItemNumber 35134, a QuantityUnit 35160, a QuantityConversion 35186, a ProductCategory 35206, a ConfigurableMaterialAssignment 35232, a ConfigurationPropertyValuation 35252, a MeasureUnitCodeSpecificDescription 35278, a TaxClassification 35298, an EmptiesBillOfMaterial 35372, a MaterialMerchandiseBillOfMaterial

35456, a ProcurementPriceInformation 35534, and a SalesPriceInformation 35648. The Merchandise 35032 entity has a cardinality of 1 35034 meaning that for each instance of the Merchandise 35030 package there is one Merchandise 35032 entity. The Merchandise 35032 entity includes various attributes, namely an @actionCode 35038, an InternalID 35044, a MaterialTypeCode 35050 and a MaterialMerchandiseTypeCode 35056. The @actionCode 35038 attribute is an ActionCode 35042 data type. The @actionCode 35038 attribute has a cardinality of 0 . . . 1 35040 meaning that for each instance of the Merchandise 35032 entity there may be one @actionCode 35038 attribute. The InternalID 35044 attribute is an NOSC_ProductInternalID 35048 data type. The InternalID 35044 attribute has a cardinality of 1 35046 meaning that for each instance of the Merchandise 35032 entity there is one InternalID 35044 attribute. The MaterialTypeCode 35050 attribute is an NOSC_MaterialTypeCode 35054 data type. The MaterialTypeCode 35050 attribute has a cardinality of 0 . . . 1 35052 meaning that for each instance of the Merchandise 35032 entity there may be one MaterialTypeCode 35050 attribute. The MaterialMerchandiseTypeCode 35056 attribute is a MaterialMerchandiseTypeCode 35060 data type. The MaterialMerchandiseTypeCode 35056 attribute has a cardinality of 0 . . . 1 35058 meaning that for each instance of the Merchandise 35032 entity there may be one MaterialMerchandiseTypeCode 35056 attribute.

The ReceivingStore 35062 package is an <MT>RcvgStore 35068 data type. The ReceivingStore 35062 package includes a ReceivingStore 35064 entity. The ReceivingStore 35064 entity has a cardinality of 1 . . . n 35066 meaning that for each instance of the ReceivingStore 35062 package there are one or more ReceivingStore 35064 entities. The ReceivingStore 35064 entity includes a StoreInternalID 35070 attribute. The StoreInternalID 35070 attribute is an NOSC_StoreInternalID 35074 data type. The StoreInternalID 35070 attribute has a cardinality of 1 35072 meaning that for each instance of the ReceivingStore 35064 entity there is one StoreInternalID 35070 attribute.

The PointOfSaleProcessingCondition 35076 package is an <MT>PtOfSlProcgCndn 35082 data type. The PointOfSaleProcessingCondition 35076 package includes a PointOfSaleProcessingCondition 35078 entity. The PointOfSaleProcessingCondition 35078 entity has a cardinality of 0 . . . 1 35080 meaning that for each instance of the PointOfSaleProcessingCondition 35076 package there may be one PointOfSaleProcessingCondition 35078 entity. The PointOfSaleProcessingCondition 35078 entity includes various attributes, namely a PointOfSaleRepeatKeyUsageCode 35084, a PriceRequiredIndicator 35090, a DiscountAllowedIndicator 35096, a WeightingForPricingRequiredIndicator 35102, a TaxIncludedIndicator 35108 and a TextOnPointOfSaleRegisterVisibleIndicator 35114. The PointOfSaleRepeatKeyUsageCode 35084 attribute is a PointOfSaleRepeatKeyUsageCode 35088 data type. The PointOfSaleRepeatKeyUsageCode 35084 attribute has a cardinality of 0 . . . 1 35086 meaning that for each instance of the PointOfSaleProcessingCondition 35078 entity there may be one PointOfSaleRepeatKeyUsageCode 35084 attribute. The PriceRequiredIndicator 35090 attribute is an Indicator 35094 data type. The PriceRequiredIndicator 35090 attribute has a cardinality of 1 35092 meaning that for each instance of the PointOfSaleProcessingCondition 35078 entity there is one PriceRequiredIndicator 35090 attribute. The DiscountAllowedIndicator 35096 attribute is an Indicator 35100 data type. The DiscountAllowedIndicator 35096 attribute has a cardinality of 1 35098 meaning that for each instance of the PointOfSaleProcessingCondition 35078 entity there is one DiscountAllowedIndicator 35096 attribute. The WeightingForPricingRequiredIndicator 35102 attribute is an Indicator 35106 data type. The WeightingForPricingRequiredIndicator 35102 attribute has a cardinality of 1 35104 meaning that for each instance of the PointOfSaleProcessingCondition 35078 entity there is one WeightingForPricingRequiredIndicator 35102 attribute. The TaxIncludedIndicator 35108 attribute is an Indicator 35112 data type. The TaxIncludedIndicator 35108 attribute has a cardinality of 1 35110 meaning that for each instance of the PointOfSaleProcessingCondition 35078 entity there is one TaxIncludedIndicator 35108 attribute. The TextOnPointOfSaleRegisterVisibleIndicator 35114 attribute is an Indicator 35118 data type. The TextOnPointOfSaleRegisterVisibleIndicator 35114 attribute has a cardinality of 1 35116 meaning that for each instance of the PointOfSaleProcessingCondition 35078 entity there is one TextOnPointOfSaleRegisterVisibleIndicator 35114 attribute.

The Description 35120 package is an <MT>Desc 35126 data type. The Description 35120 package includes a Description 35122 entity. The Description 35122 entity has a cardinality of 0 . . . n 35124 meaning that for each instance of the Description 35120 package there may be one or more Description 35122 entities. The Description 35122 entity includes a Description 35128 attribute. The Description 35128 attribute is a SHORT_Description 35132 data type. The Description 35128 attribute has a cardinality of 1 35130 meaning that for each instance of the Description 35122 entity there is one Description 35128 attribute. The GlobalTradeItemNumber 35134 package is an <MT>GlobTrdItmNo 35140 data type. The GlobalTradeItemNumber 35134 package includes a GlobalTradeItemNumber 35136 entity. The GlobalTradeItemNumber 35136 entity has a cardinality of 0 . . . n 35138 meaning that for each instance of the GlobalTradeItemNumber 35134 package there may be one or more GlobalTradeItemNumber 35136 entities. The GlobalTradeItemNumber 35136 entity includes various attributes, namely a ProductStandardID 35142, a MeasureUnitCode 35148 and a ProductStandardMainIndicator 35154. The ProductStandardID 35142 attribute is an NOSC_ProductStandardID 35146 data type. The ProductStandardID 35142 attribute has a cardinality of 1 35144 meaning that for each instance of the GlobalTradeItemNumber 35136 entity there is one ProductStandardID 35142 attribute. The MeasureUnitCode 35148 attribute is a MeasureUnitCode 35152 data type. The MeasureUnitCode 35148 attribute has a cardinality of 1 35150 meaning that for each instance of the GlobalTradeItemNumber 35136 entity there is one MeasureUnitCode 35148 attribute. The ProductStandardMainIndicator 35154 attribute is an Indicator 35158 data type. The ProductStandardMainIndicator 35154 attribute has a cardinality of 1 35156 meaning that for each instance of the GlobalTradeItemNumber 35136 entity there is one ProductStandardMainIndicator 35154 attribute.

The QuantityUnit 35160 package is an <MT>QtyUnit 35166 data type. The QuantityUnit 35160 package includes a QuantityUnit 35162 entity. The QuantityUnit 35162 entity has a cardinality of 0 . . . n 35164 meaning that for each instance of the QuantityUnit 35160 package there may be one or more QuantityUnit 35162 entities. The QuantityUnit 35162 entity includes various attributes, namely a MeasureUnitCode 35168, a BaseQuantityUnitIndicator 35174 and a SupplementaryQuantityUnitUsageCode 35180. The MeasureUnitCode 35168 attribute is a MeasureUnitCode 35172 data type. The MeasureUnitCode 35168 attribute has a cardinality of 1 35170 meaning that for each instance of the QuantityUnit 35162 entity there is one MeasureUnitCode 35168 attribute. The BaseQuantityUnitIndicator 35174 attribute is an Indicator 35178 data type. The BaseQuantityUnitIndicator 35174 attribute has a cardinality of 1 35176 meaning that for each instance of the QuantityUnit 35162 entity there is one BaseQuantityUnitIndicator 35174 attribute. The SupplementaryQuantityUnitUsageCode 35180 attribute is a SupplementaryQuantityUnitUsageCode 35184 data type. The SupplementaryQuantityUnitUsageCode 35180 attribute has a cardinality of 1 35182 meaning that for each instance of the QuantityUnit 35162 entity there is one SupplementaryQuantityUnitUsageCode 35180 attribute.

The QuantityConversion 35186 package is an <MT>QtyCnvrsn 35192 data type. The QuantityConversion 35186 package includes a QuantityConversion 35188 entity. The QuantityConversion 35188 entity has a cardinality of 0 . . . n 35190 meaning that for each instance of the QuantityConversion 35186 package there may be one or more QuantityConversion 35188 entities. The QuantityConversion 35188 entity includes various attributes, namely a Quantity 35194 and a CorrespondingQuantity 35200. The Quantity 35194 attribute is a Quantity 35198 data type. The Quantity 35194 attribute has a cardinality of 1 35196 meaning that for each instance of the QuantityConversion 35188 entity there is one Quantity 35194 attribute. The CorrespondingQuantity 35200 attribute is a Quantity 35204 data type. The CorrespondingQuantity 35200 attribute has a cardinality of 1 35202 meaning that for each instance of the QuantityConversion 35188 entity there is one CorrespondingQuantity 35200 attribute.

The ProductCategory 35206 package is an <MT>ProdCat 35212 data type. The ProductCategory 35206 package includes a ProductCategory 35208 entity. The ProductCategory 35208 entity has a cardinality of 0 . . . n 35210 meaning that for each instance of the ProductCategory 35206 package there may be one or more ProductCategory 35208 entities. The ProductCategory 35208 entity includes various attributes, namely an InternalID 35214, a ProductCategoryHierarchyID 35220 and a ProductCategoryHierarchyTypeCode 35226. The InternalID 35214 attribute is an NOSC_ProductCategoryInternalID 35218 data type. The InternalID 35214 attribute has a cardinality of 1 35216 meaning that for each instance of the ProductCategory 35208 entity there is one InternalID 35214 attribute. The ProductCategoryHierarchyID 35220 attribute is an NOSC_ProductCategoryHierarchyID 35224 data type. The ProductCategoryHierarchyID 35220 attribute has a cardinality of 0 . . . 1 35222 meaning that for each instance of the ProductCategory 35208 entity there may be one ProductCategoryHierarchyID 35220 attribute. The ProductCategoryHierarchyTypeCode 35226 attribute is a ProductCategoryHierarchyTypeCode 35230 data type. The ProductCategoryHierarchyTypeCode 35226 attribute has a cardinality of 1 35228 meaning that for each instance of the ProductCategory 35208 entity there is one ProductCategoryHierarchyTypeCode 35226 attribute.

The ConfigurableMaterialAssignment 35232 package is an <MT>ConfigblMtlAssgmt 35238 data type. The ConfigurableMaterialAssignment 35232 package includes a ConfigurableMaterialAssignment 35234 entity. The ConfigurableMaterialAssignment 35234 entity has a cardinality of 0 . . . 1 35236 meaning that for each instance of the ConfigurableMaterialAssignment 35232 package there may be one ConfigurableMaterialAssignment 35234 entity. The ConfigurableMaterialAssignment 35234 entity includes various attributes, namely a ProductInternalID 35240 and a ProductStandardID 35246. The ProductInternalID 35240 attribute is an NOSC_ProductIntenalID 35244 data type. The ProductInternalID 35240 attribute has a cardinality of 1 35242 meaning that for each instance of the ConfigurableMaterialAssignment 35234 entity there is one ProductInternalID 35240 attribute. The ProductStandardID 35246 attribute is an NOSC_ProductStandardID 35250 data type. The ProductStandardID 35246 attribute has a cardinality of 1 35248 meaning that for each instance of the ConfigurableMaterialAssignment 35234 entity there is one ProductStandardID 35246 attribute.

The ConfigurationPropertyValuation 35252 package is an <MT>ConfignPrptyValn 35258 data type. The ConfigurationPropertyValuation 35252 package includes a ConfigurationPropertyValuation 35254 entity. The ConfigurationPropertyValuation 35254 entity has a cardinality of 0 . . . n 35256 meaning that for each instance of the ConfigurationPropertyValuation 35252 package there may be one or more ConfigurationPropertyValuation 35254 entities. The ConfigurationPropertyValuation 35254 entity includes various attributes, namely a PropertyValuation 35260, a Description 35266 and an OrganisationalAreaName 35272. The PropertyValuation 35260 attribute is an NOSC_PropertyValuation 35264 data type. The PropertyValuation 35260 attribute has a cardinality of 1 35262 meaning that for each instance of the ConfigurationPropertyValuation 35254 entity there is one PropertyValuation 35260 attribute. The Description 35266 attribute is a SHORT_Description 35270 data type. The Description 35266 attribute has a cardinality of 1 35268 meaning that for each instance of the ConfigurationPropertyValuation 35254 entity there is one Description 35266 attribute. The OrganisationalAreaName 35272 attribute is a LANGUAGEINDEPENDENT_SHORT_Name 35276 data type. The OrganisationalAreaName 35272 attribute has a cardinality of 1 35274 meaning that for each instance of the ConfigurationPropertyValuation 35254 entity there is one OrganisationalAreaName 35272 attribute.

The MeasureUnitCodeSpecificDescription 35278 package is an <MT>MsrUnitCodeSpcfcDesc 35284 data type. The MeasureUnitCodeSpecificDescription 35278 package includes a MeasureUnitCodeSpecificDescription 35280 entity. The MeasureUnitCodeSpecificDescription 35280 entity has a cardinality of 0 . . . n 35282 meaning that for each instance of the MeasureUnitCodeSpecificDescription 35278 package there may be one or more MeasureUnitCodeSpecificDescription 35280 entities. The MeasureUnitCodeSpecificDescription 35280 entity includes various attributes, namely a MeasureUnitCode 35286 and a Description 35292. The MeasureUnitCode 35286 attribute is a MeasureUnitCode 35290 data type. The MeasureUnitCode 35286 attribute has a cardinality of 1 35288 meaning that for each instance of the MeasureUnitCodeSpecificDescription 35280 entity there is one MeasureUnitCode 35286 attribute. The Description 35292 attribute is a SHORT_Description 35296 data type. The Description 35292 attribute has a cardinality of 1 35294 meaning that for each instance of the MeasureUnitCodeSpecificDescription 35280 entity there is one Description 35292 attribute.

The TaxClassification 35298 package is an <MT>TxClass 35304 data type. The TaxClassification 35298 package includes a TaxClassification 35300 entity. The TaxClassification 35300 entity has a cardinality of 0 . . . n 35302 meaning that for each instance of the TaxClassification 35298 package there may be one or more TaxClassification 35300 entities. The TaxClassification 35300 entity includes various attributes, namely a CountryCode 35306, a RegionCode 35312, a TaxJurisdictionCode 35318, a TaxJurisdictionSubdivisionCode 35324, a TaxJurisdictionSubdivisionTypeCode 35330, a ProductTaxEventTypeCode 35336, a TaxTypeCode 35342, a TaxRateTypeCode 35348, a TaxDeductibilityCode 35354, a Percent 35360 and a ProductTaxationCharacteristicsCode 35366. The CountryCode 35306 attribute is a CountryCode 35310 data type. The CountryCode 35306 attribute has a cardinality of 0 . . . 1 35308 meaning that for each instance of the TaxClassification 35300 entity there may be one CountryCode 35306 attribute. The RegionCode 35312 attribute is a RegionCode 35316 data type. The RegionCode 35312 attribute has a cardinality of 0 . . . 1 35314 meaning that for each instance of the TaxClassification 35300 entity there may be one RegionCode 35312 attribute. The TaxJurisdictionCode 35318 attribute is a TaxJurisdictionCode 35322 data type. The TaxJurisdictionCode 35318 attribute has a cardinality of 0 . . . 1 35320 meaning that for each instance of the TaxClassification 35300 entity there may be one TaxJurisdictionCode 35318 attribute. The TaxJurisdictionSubdivisionCode 35324 attribute is a TaxJurisdictionSubdivisionCode 35328 data type. The TaxJurisdictionSubdivisionCode 35324 attribute has a cardinality of 0 . . . 1 35326 meaning that for each instance of the TaxClassification 35300 entity there may be one TaxJurisdictionSubdivisionCode 35324 attribute. The TaxJurisdictionSubdivisionTypeCode 35330 attribute is a TaxJurisdictionSubdivisionTypeCode 35334 data type. The TaxJurisdictionSubdivisionTypeCode 35330 attribute has a cardinality of 0 . . . 1 35332 meaning that for each instance of the TaxClassification 35300 entity there may be one TaxJurisdictionSubdivisionTypeCode 35330 attribute. The ProductTaxEventTypeCode 35336 attribute is a ProductTaxEventTypeCode 35340 data type. The ProductTaxEventTypeCode 35336 attribute has a cardinality of 0 . . . 1 35338 meaning that for each instance of the TaxClassification 35300 entity there may be one ProductTaxEventTypeCode 35336 attribute. The TaxTypeCode 35342 attribute is a TaxTypeCode 35346 data type. The TaxTypeCode 35342 attribute has a cardinality of 0 . . . 1 35344 meaning that for each instance of the TaxClassification 35300 entity there may be one TaxTypeCode 35342 attribute. The TaxRateTypeCode 35348 attribute is a TaxRateTypeCode 35352 data type. The TaxRateTypeCode 35348 attribute has a cardinality of 0 . . . 1 35350 meaning that for each instance of the TaxClassification 35300 entity there may be one TaxRateTypeCode 35348 attribute. The TaxDeductibilityCode 35354 attribute is a TaxDeductibilityCode 35358 data type. The TaxDeductibilityCode 35354 attribute has a cardinality of 0 . . . 1 35356 meaning that for each instance of the TaxClassification 35300 entity there may be one TaxDeductibilityCode 35354 attribute. The Percent 35360 attribute is a Percent 35364 data type. The Percent 35360 attribute has a cardinality of 0 . . . 1 35362 meaning that for each instance of the TaxClassification 35300 entity there may be one Percent 35360 attribute. The ProductTaxationCharacteristicsCode 35366 attribute is a ProductTaxationCharacteristicsCode 35370 data type. The ProductTaxationCharacteristicsCode 35366 attribute has a cardinality of 0 . . . 1 35368 meaning that for each instance of the TaxClassification 35300 entity there may be one ProductTaxationCharacteristicsCode 35366 attribute.

The EmptiesBillOfMaterial 35372 package is an <MT>EmptsBillOfMtl 35378 data type. The EmptiesBillOfMaterial 35372 package includes an EmptiesBillOfMaterial 35374 entity. The EmptiesBillOfMaterial 35374 entity has a cardinality of 0 . . . n 35376 meaning that for each instance of the EmptiesBillOfMaterial 35372 package there may be one or more EmptiesBillOfMaterial 35374 entities. The EmptiesBillOfMaterial 35374 entity includes various attributes, namely an InternalID 35380 and a UsageCode 35386. The InternalID 35380 attribute is an NOSC_BillOfMaterialInternalID 35384 data type. The InternalID 35380 attribute has a cardinality of 1 35382 meaning that for each instance of the EmptiesBillOfMaterial 35374 entity there is one InternalID 35380 attribute. The UsageCode 35386 attribute is an NOSC_BillOfMaterialUsageCode 35390 data type. The UsageCode 35386 attribute has a cardinality of 1 35388 meaning that for each instance of the EmptiesBillOfMaterial 35374 entity there is one UsageCode 35386 attribute.

The MaterialMerchandiseBillOfMaterial 35456 package is an <MT>MtlMrchdsBillOfMtl 35462 data type. The MaterialMerchandiseBillOfMaterial 35456 package includes a MaterialMerchandiseBillOfMaterial 35458 entity. The MaterialMerchandiseBillOfMaterial 35458 entity has a cardinality of 0 . . . n 35460 meaning that for each instance of the MaterialMerchandiseBillOfMaterial 35456 package there may be one or more MaterialMerchandiseBillOfMaterial 35458 entities. The MaterialMerchandiseBillOfMaterial 35458 entity includes various attributes, namely an InternalID 35464 and an UsageCode 35470. The InternalID 35464 attribute is a NOSC_BillOfMaterialInternalID 35468 data type. The InternalID 35464 attribute has a cardinality of 1 35466 meaning that for each instance of the MaterialMerchandiseBillOfMaterial 35458 entity there is one InternalID 35464 attribute. The UsageCode 35470 attribute is an NOSC_BillOfMaterialUsageCode 35474 data type. The UsageCode 35470 attribute has a cardinality of 1 35472 meaning that for each instance of the MaterialMerchandiseBillOfMaterial 35458 entity there is one UsageCode 35470 attribute.

The ProcurementPriceInformation 35534 package is an <MT>ProcmtPrcInfo 35540 data type. The ProcurementPriceInformation 35534 package includes a ProcurementPriceInformation 35536 entity. The ProcurementPriceInformation 35536 entity has a cardinality of 0 . . . n 35538 meaning that for each instance of the ProcurementPriceInformation 35534 package there may be one or more ProcurementPriceInformation 35536 entities. The ProcurementPriceInformation 35536 entity includes various attributes, namely a ProductStandardID 35542, an OrderMeasureUnitCode 35548, an OrderTransactionCurrencyCode 35554, a StrategicPurchasingOrganisationID 35560, a SupplierInternalID 35566 and a ValidityPeriod 35572. The ProductStandardID 35542 attribute is an NOSC_ProductStandardID 35546 data type. The ProductStandardID 35542 attribute has a cardinality of 0 . . . 1 35544 meaning that for each instance of the ProcurementPriceInformation 35536 entity there may be one ProductStandardID 35542 attribute. The OrderMeasureUnitCode 35548 attribute is a MeasureUnitCode 35552 data type. The OrderMeasureUnitCode 35548 attribute has a cardinality of 0 . . . 1 35550 meaning that for each instance of the ProcurementPriceInformation 35536 entity there may be one OrderMeasureUnitCode 35548 attribute. The OrderTransactionCurrencyCode 35554 attribute is a CurrencyCode 35558 data type. The OrderTransactionCurrencyCode 35554 attribute has a cardinality of 0 . . . 1 35556 meaning that for each instance of the ProcurementPriceInformation 35536 entity there may be one OrderTransactionCurrencyCode 35554 attribute. The StrategicPurchasingOrganisationID 35560 attribute is an NOSC_OrganisationalCentreID 35564 data type. The StrategicPurchasingOrganisationID 35560 attribute has a cardinality of 1 35562 meaning that for each instance of the ProcurementPriceInformation 35536 entity there is one StrategicPurchasingOrganisationID 35560 attribute. The SupplierInternalID 35566 attribute is an NOSC_PartyID 35570 data type. The SupplierInternalID 35566 attribute has a cardinality of 1 35568 meaning that for each instance of the ProcurementPriceInformation 35536 entity there is one SupplierInternalID 35566 attribute. The ValidityPeriod 35572 attribute is a CLOSED_DatePeriod 35576 data type. The ValidityPeriod 35572 attribute has a cardinality of 0 . . . 1 35574 meaning that for each instance of the ProcurementPriceInformation 35536 entity there may be one ValidityPeriod 35572 attribute.

The SalesPriceInformation 35648 package is an <MT>SlsPrInfo 35654 data type. The SalesPriceInformation 35648 package includes a SalesPriceInformation 35650 entity. The SalesPriceInformation 35650 entity has a cardinality of 0 . . . n 35652 meaning that for each instance of the SalesPriceInformation 35648 package there may be one or more SalesPriceInformation 35650 entities. The SalesPriceInformation 35650 entity includes various attributes, namely a ProductStandardID 35656, a MeasureUnitCode 35662, a SalesOrganisationID 35668, a DistributionChannelCode 35674 and a ValidityPeriod 35680. The ProductStandardID 35656 attribute is a NOSC_ProductStandardID 35660 data type. The ProductStandardID 35656 attribute has a cardinality of 0 . . . 1 35658 meaning that for each instance of the SalesPriceInformation 35650 entity there may be one ProductStandardID 35656 attribute. The MeasureUnitCode 35662 attribute is a MeasureUnitCode 35666 data type. The MeasureUnitCode 35662 attribute has a cardinality of 1 35664 meaning that for each instance of the SalesPriceInformation 35650 entity there is one MeasureUnitCode 35662 attribute. The SalesOrganisationID 35668 attribute is an NOSC_OrganisationalCentreID 35672 data type. The SalesOrganisationID 35668 attribute has a cardinality of 1 35670 meaning that for each instance of the SalesPriceInformation 35650 entity there is one SalesOrganisationID 35668 attribute. The DistributionChannelCode 35674 attribute is a DistributionChannelCode 35678 data type. The DistributionChannelCode 35674 attribute has a cardinality of 1 35676 meaning that for each instance of the SalesPriceInformation 35650 entity there is one DistributionChannelCode 35674 attribute. The ValidityPeriod 35680 attribute is a CLOSED_DatePeriod 35684 data type. The ValidityPeriod 35680 attribute has a cardinality of 0 . . . 1 35682 meaning that for each instance of the SalesPriceInformation 35650 entity there may be one ValidityPeriod 35680 attribute.

The PriceSpecification 35686 package is an <MT>SlsPrInfoPrSpec 35692. The PriceSpecification 35686 package includes a PriceSpecification 35688 entity. The PriceSpecification 35688 entity has a cardinality of 0 . . . n 35538 meaning that for each instance of the PriceSpecification 35686 package there may be one or more PriceSpecification 35688 entities. The PriceSpecification 35688 entity includes various attributes, namely a PriceSpecificationElementTypeCode 35694, a PriceSpecificationElementCategoryCode 35700, an Amount 35706 and a BaseQuantity 35712. The PriceSpecificationElementTypeCode 35694 attribute is an NOSC_PriceSpecificationElementTypeCode 35698 data type. The PriceSpecificationElementTypeCode 35694 attribute has a cardinality of 0 . . . 1 35696 meaning that for each instance of the PriceSpecification 35688 entity there may be one PriceSpecificationElementTypeCode 35694 attribute. The PriceSpecificationElementCategoryCode 35700 attribute is an NOSC_PriceSpecificationElementCategoryCode 35704 data type. The PriceSpecificationElementCategoryCode 35700 attribute has a cardinality of 0 . . . 1 35702 meaning that for each instance of the PriceSpecification 35688 entity there may be one PriceSpecificationElementCategoryCode 35700 attribute. The Amount 35706 attribute is an Amount 35710 data type. The Amount 35706 attribute has a cardinality of 1 35708 meaning that for each instance of the ProductStandardMainIndicator 35154 entity there is one Amount 35706 attribute. The BaseQuantity 35712 attribute is a Quantity 35716 data type. The BaseQuantity 35712 attribute has a cardinality of 1 35714 meaning that for each instance of the PriceSpecification 35688 entity there is one BaseQuantity 35712 attribute.

The ScaleLine 35718 package is an <MT>SlsPrInfoPrSpecScLine 35724 data type. The ScaleLine 35718 package includes a ScaleLine 35720 entity. The ScaleLine 35720 entity has a cardinality of 0 . . . n 35722 meaning that for each instance of the ScaleLine 35718 package there may be one or more ScaleLine 35720 entities. The ScaleLine 35720 entity includes various attributes, namely a ScaleAxisStep 35726 and an Amount 35732. The ScaleAxisStep 35726 attribute is a NOSC_ScaleAxisStep 35730 data type. The ScaleAxisStep 35726 attribute has a cardinality of 1 35728 meaning that for each instance of the ScaleLine 35720 entity there may be one ScaleAxisStep 35726 attribute. The Amount 35732 attribute is an Amount 35736 data type. The ScaleAxisStep 35726 attribute has a cardinality of 0 . . . 1 35734 meaning that for each instance of the ScaleLine 35720 entity there may be one Amount 35732 attribute.

PointOfSaleTransaction Interfaces

Figure 36:
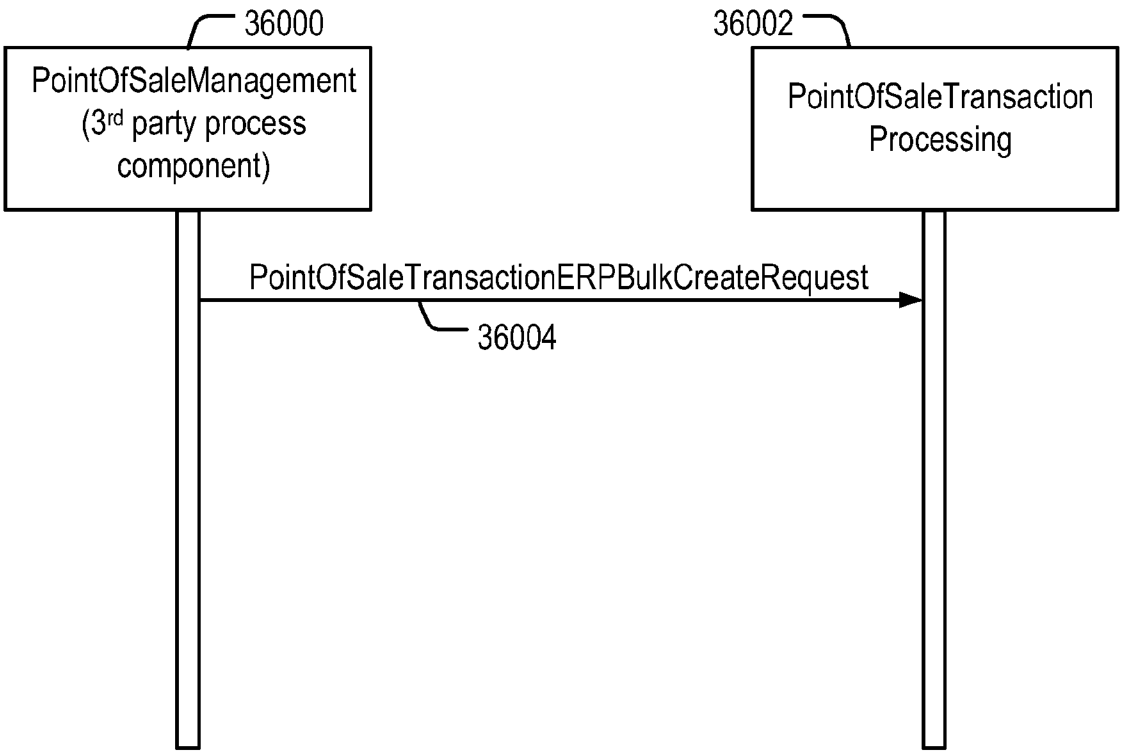
FIG. 36 depicts an example PointOfSaleTransaction Message Choreography.

The message choreography of FIG. 36 describes a possible logical sequence of messages that can be used to realize a Point of Sale Transaction business scenario.

A "PointOfSaleManagement ($3^{rd}$-party process component)" system 36000 can send a request to create Point Of Sale Transactions to a "PointOfSaleTransaction Processing" system 36002, using a PointOfSaleTransactionERPBulkCreateRequest message 36004 as shown, for example, in FIG. 36. The PointOfSaleTransactionERPBulkCreateRequest message 36004 can be sent by a PointOfSaleTransactionERPBulkCreateRequest_In operation that is included in a PointOfSaleTransaction_In interface. The PointOfSaleTransactionERPBulkCreateRequest_In operation can be used in trading industries to transfer transactions that have been created in a Point Of Sale system to the backend for further processing as, for instance, aggregation and auditing.

FIGS. 37-1 to 37-60 illustrate one example logical configuration of PointOfSaleTransactionERPBulkCreateRequestMessage message 37000. Specifically, this figure depicts the arrangement and hierarchy of various components such as one or more levels of packages, entities, and datatypes, shown here as 37002 through 37342. As described above, packages may be used to represent hierarchy levels. Entities are discrete business elements that are used during a business transaction. Data types are used to type object entities and interfaces with a structure. For example, PointOfSaleTransactionERPBulkCreateRequestMessage message 37000 includes, among other things, PointOfSaleTransactionERPCreateRequestMessage 37006. Accordingly, heterogeneous applications may communicate using this consistent message configured as such.

Figures 37, 38, 39:
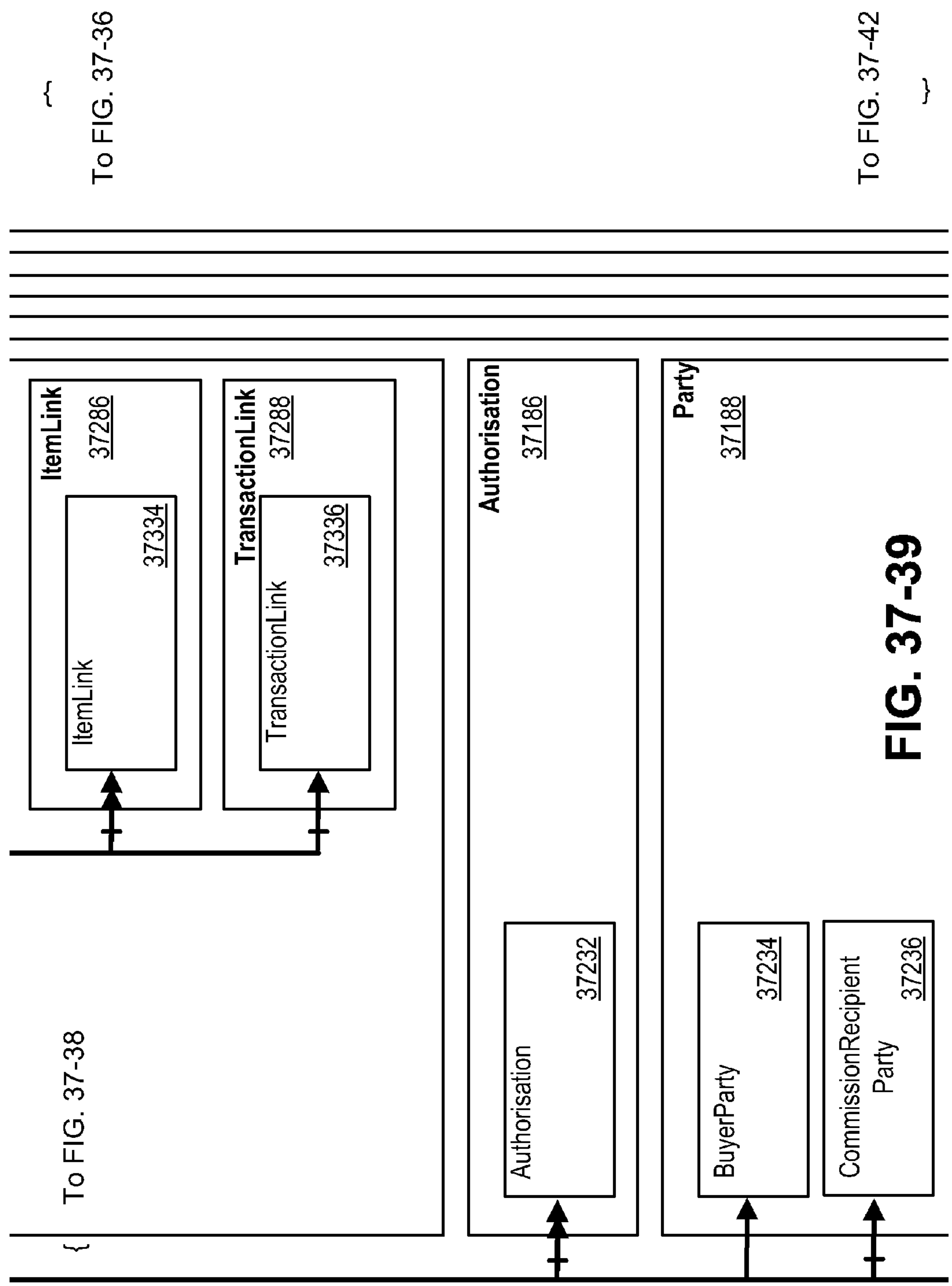
Figures 37, 38, 39, 40, 41:
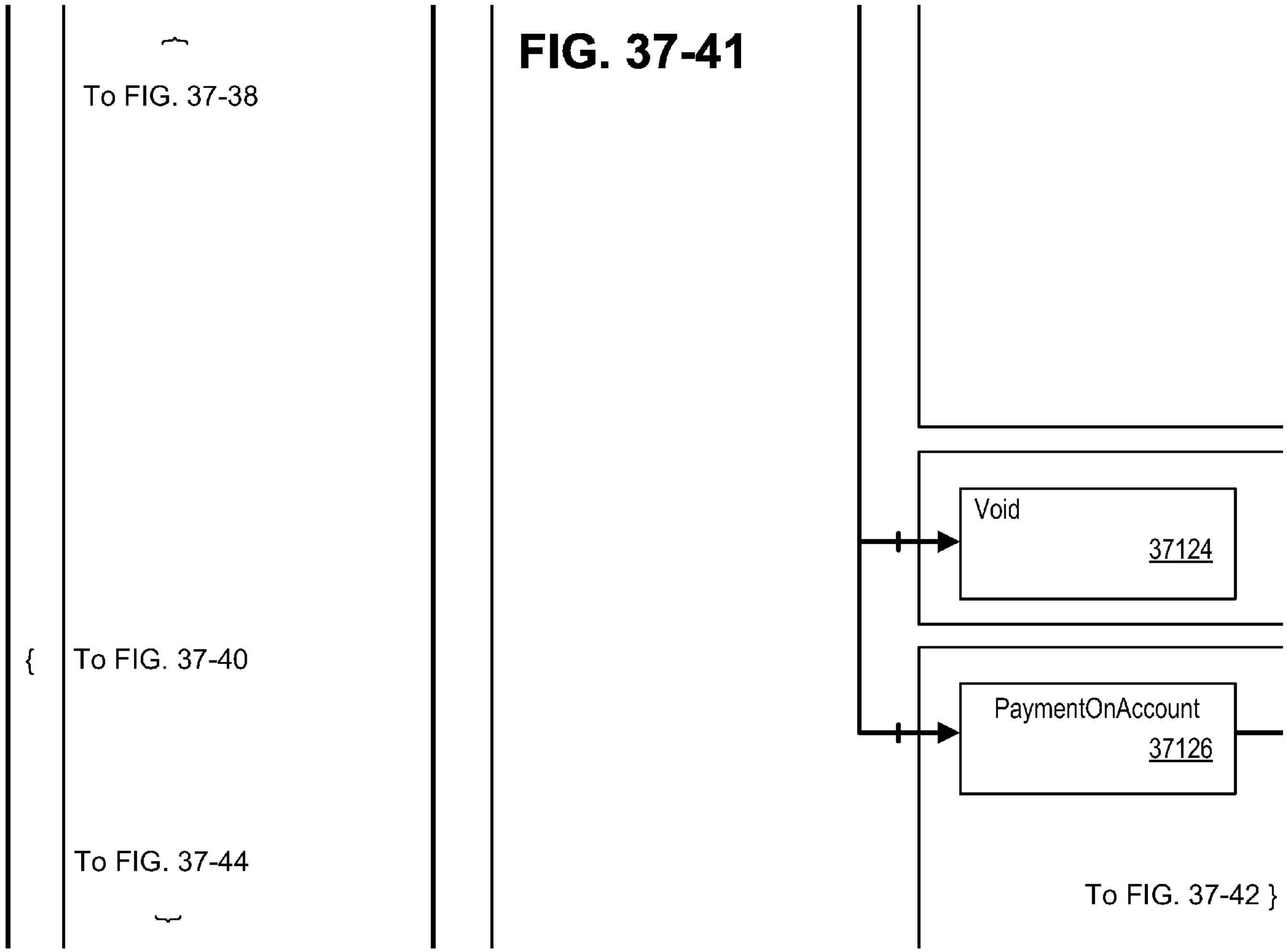
Figures 37, 38, 39, 40, 41, 42:
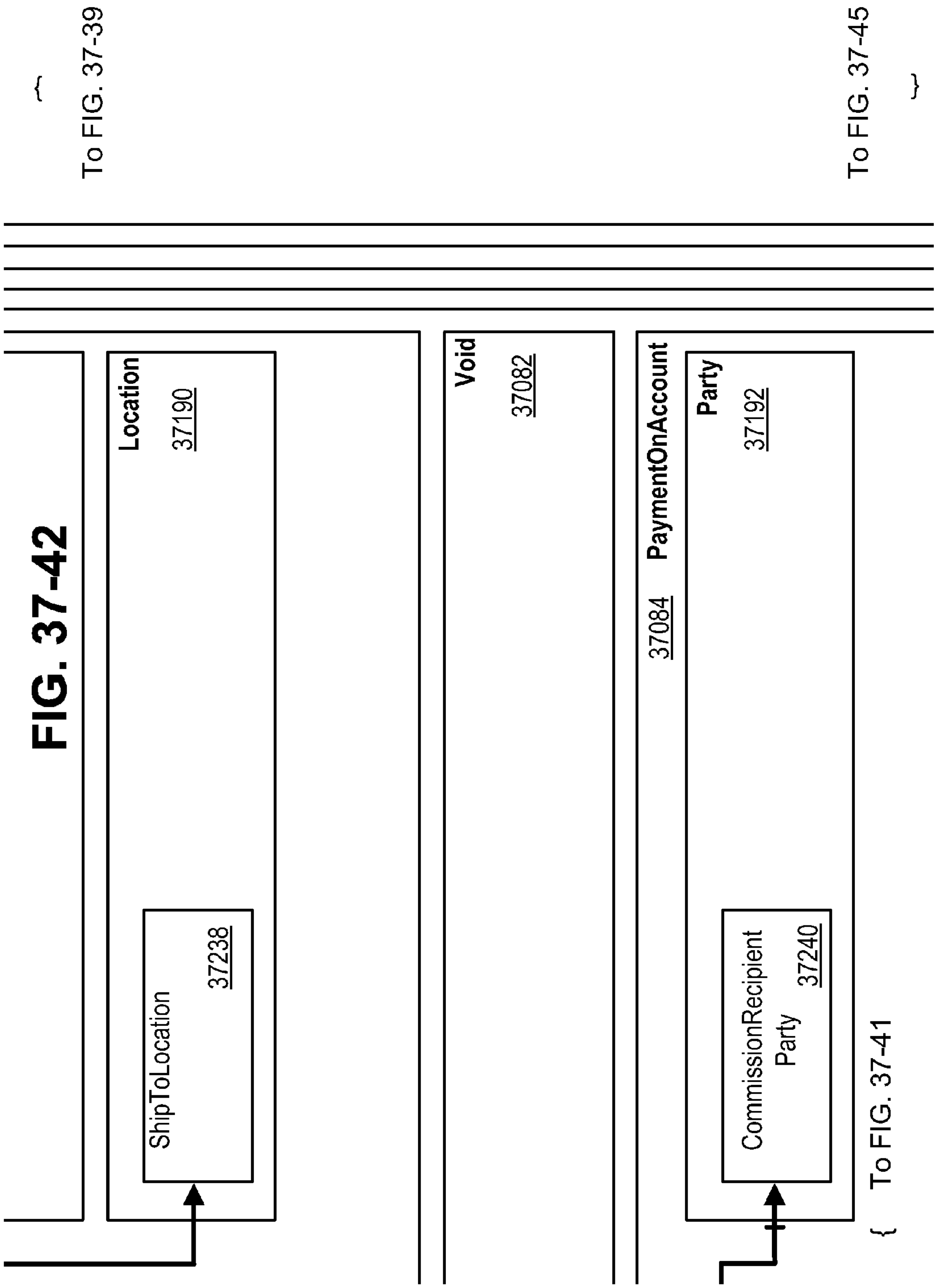
Figures 37, 38, 39, 40, 41, 42, 43, 44:
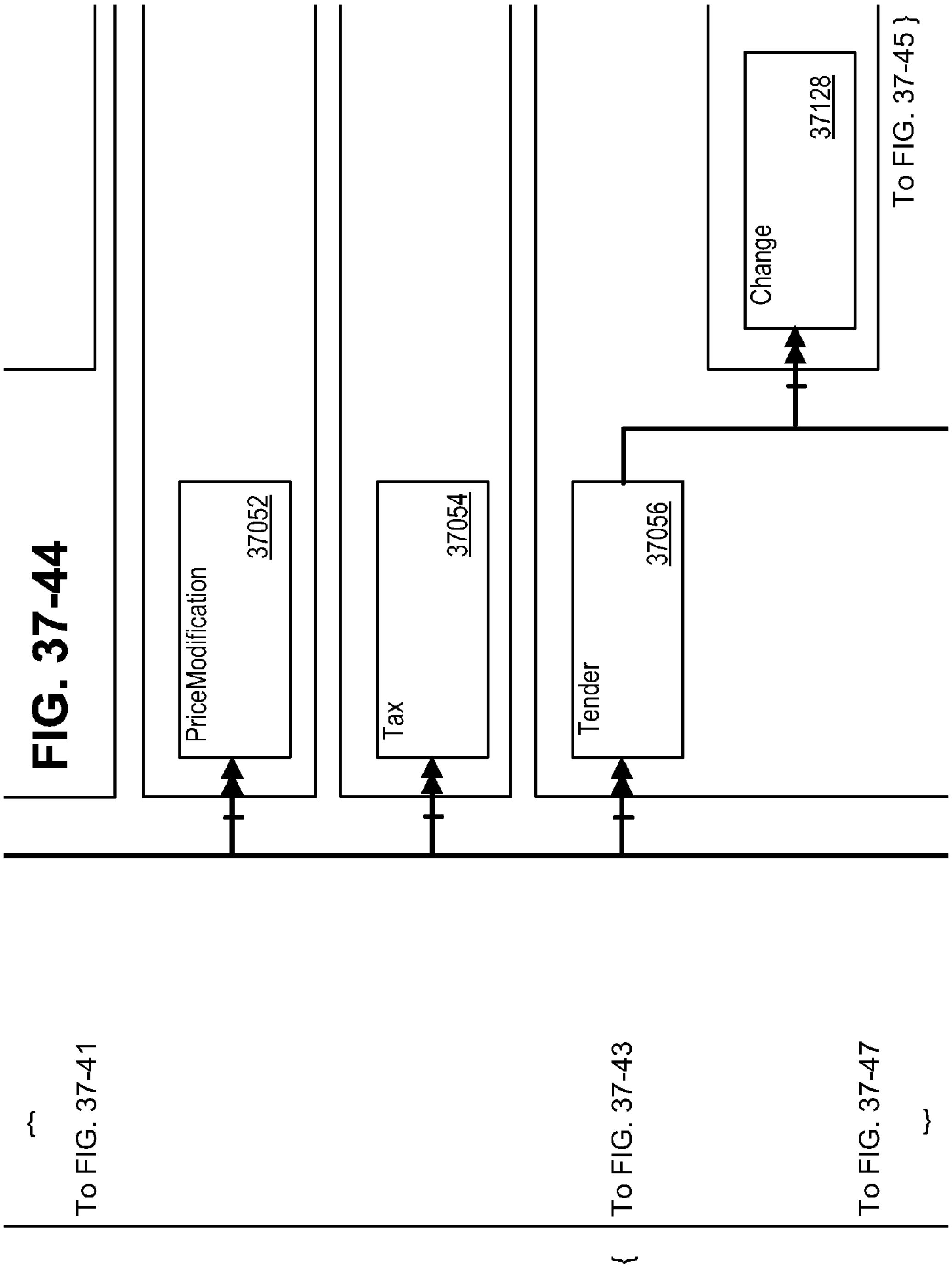
Figures 37, 38, 39, 40, 41, 42, 43, 44, 45:
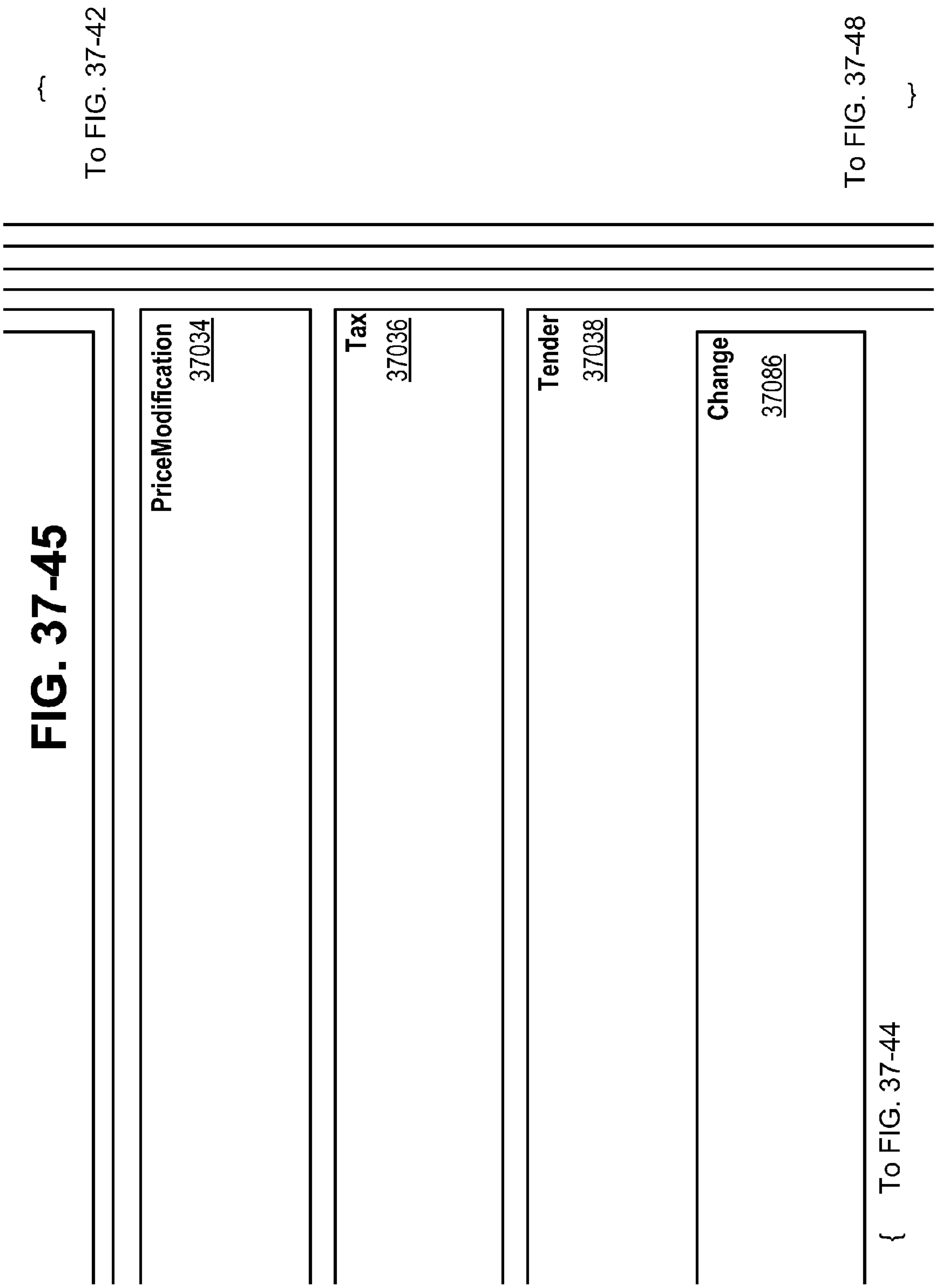
Figures 37, 38, 39, 40, 41, 42, 43, 44, 45, 46, 47:
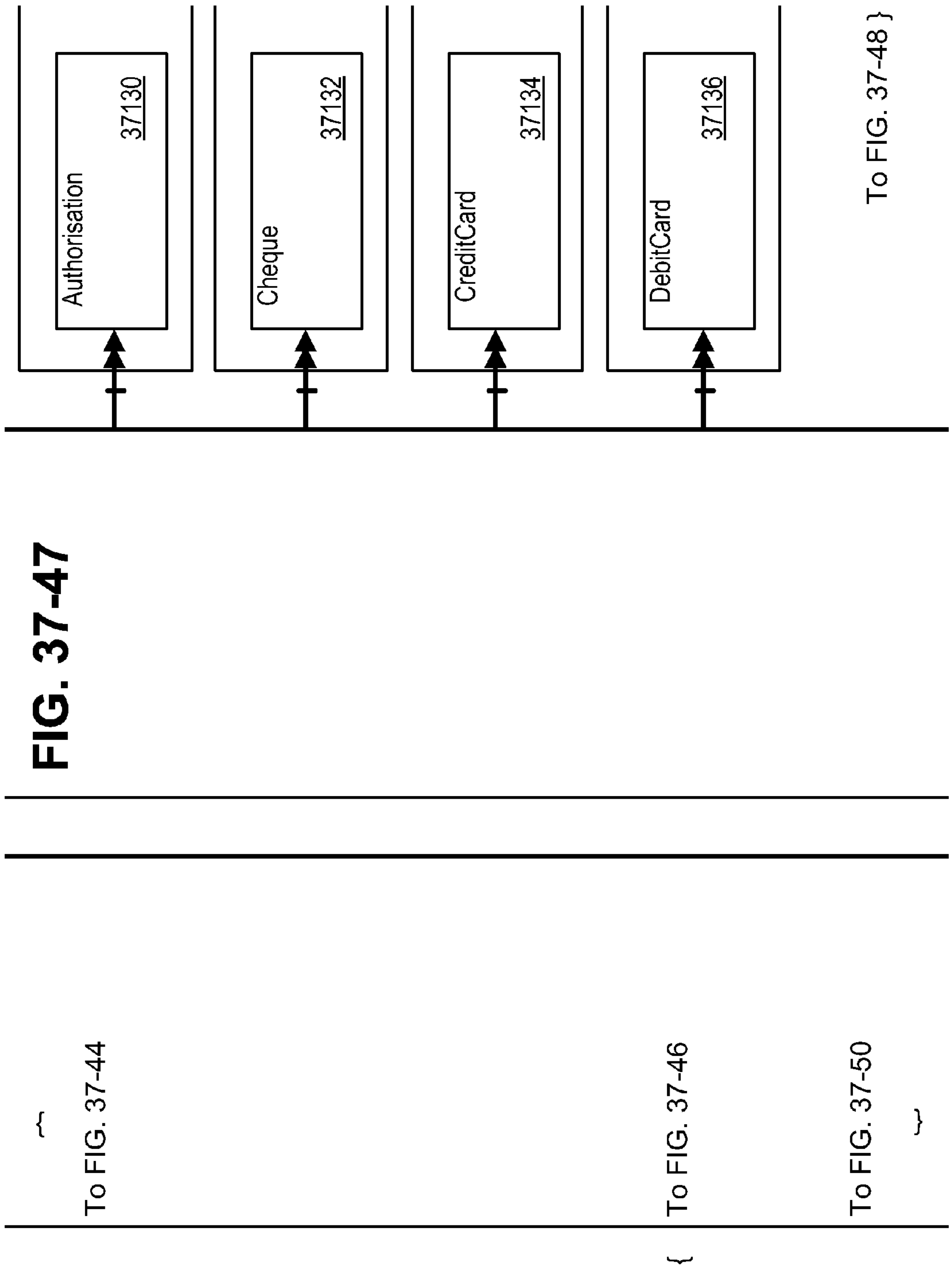
Figures 37, 38, 39, 40, 41, 42, 43, 44, 45, 46, 47, 48:
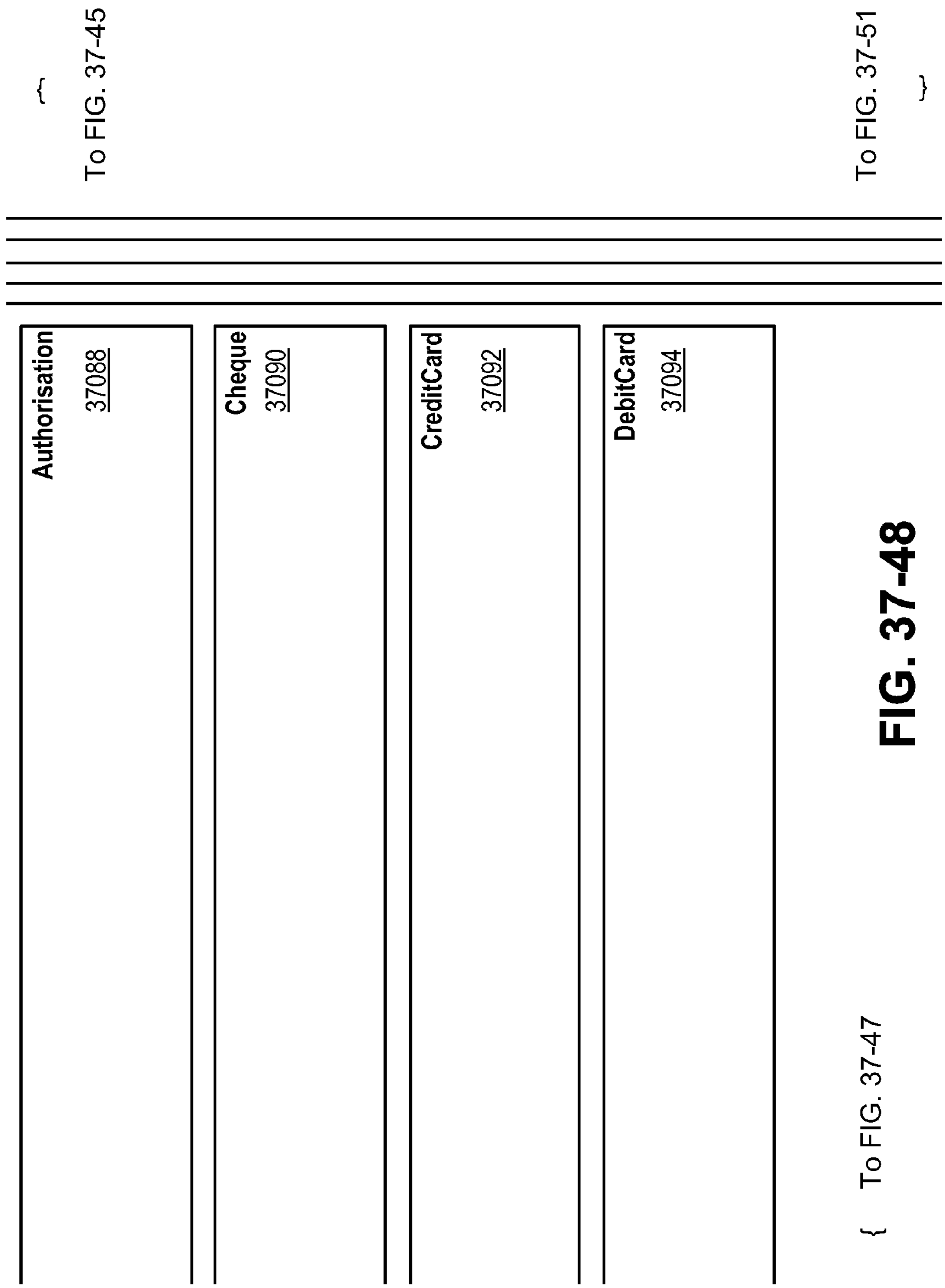
Figures 37, 38, 39, 40, 41, 42, 43, 44, 45, 46, 47, 48, 49, 50:
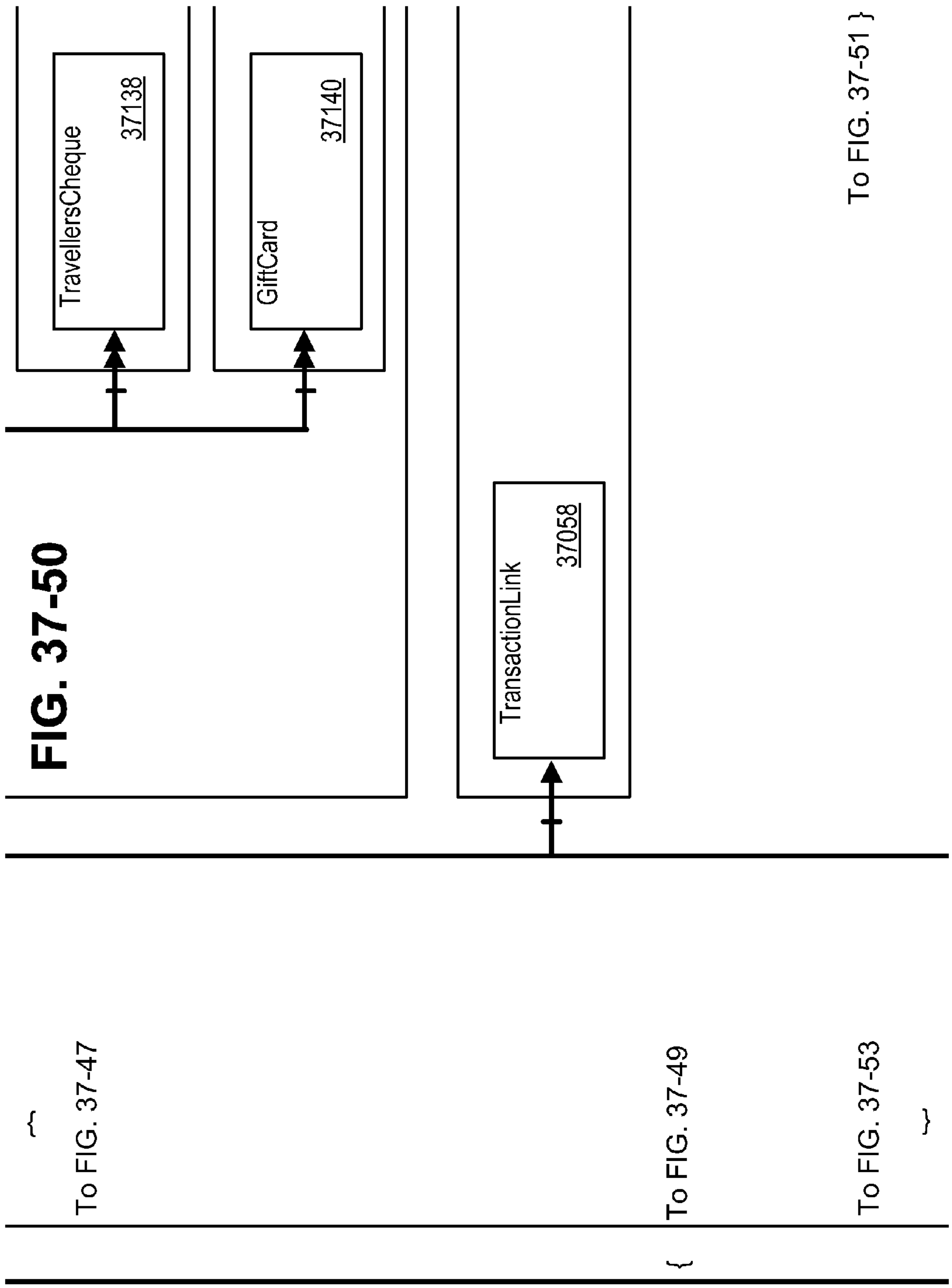
Figures 37, 38, 39, 40, 41, 42, 43, 44, 45, 46, 47, 48, 49, 50, 51:
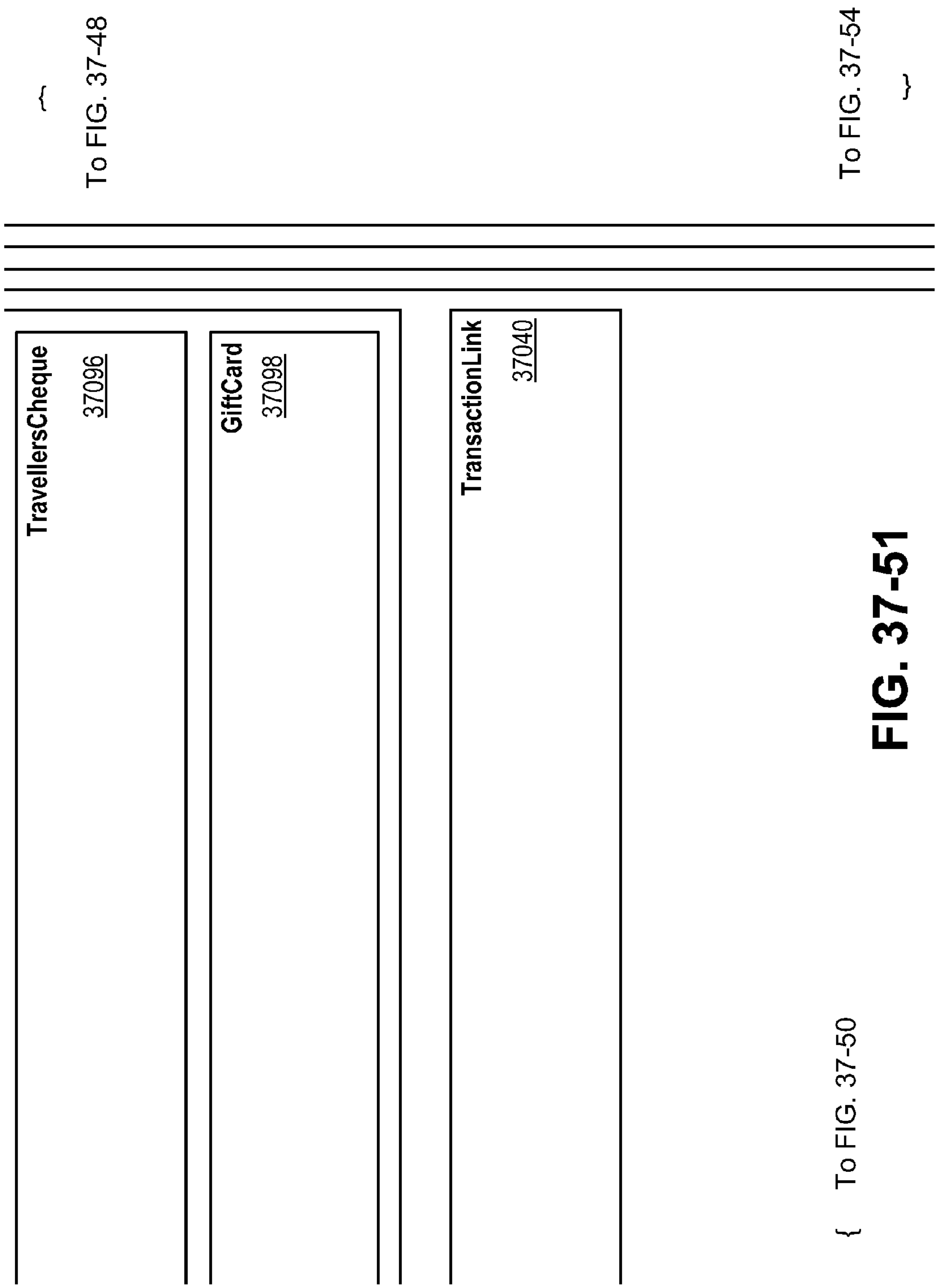
Figures 37, 38, 39, 40, 41, 42, 43, 44, 45, 46, 47, 48, 49, 50, 51, 52, 53:
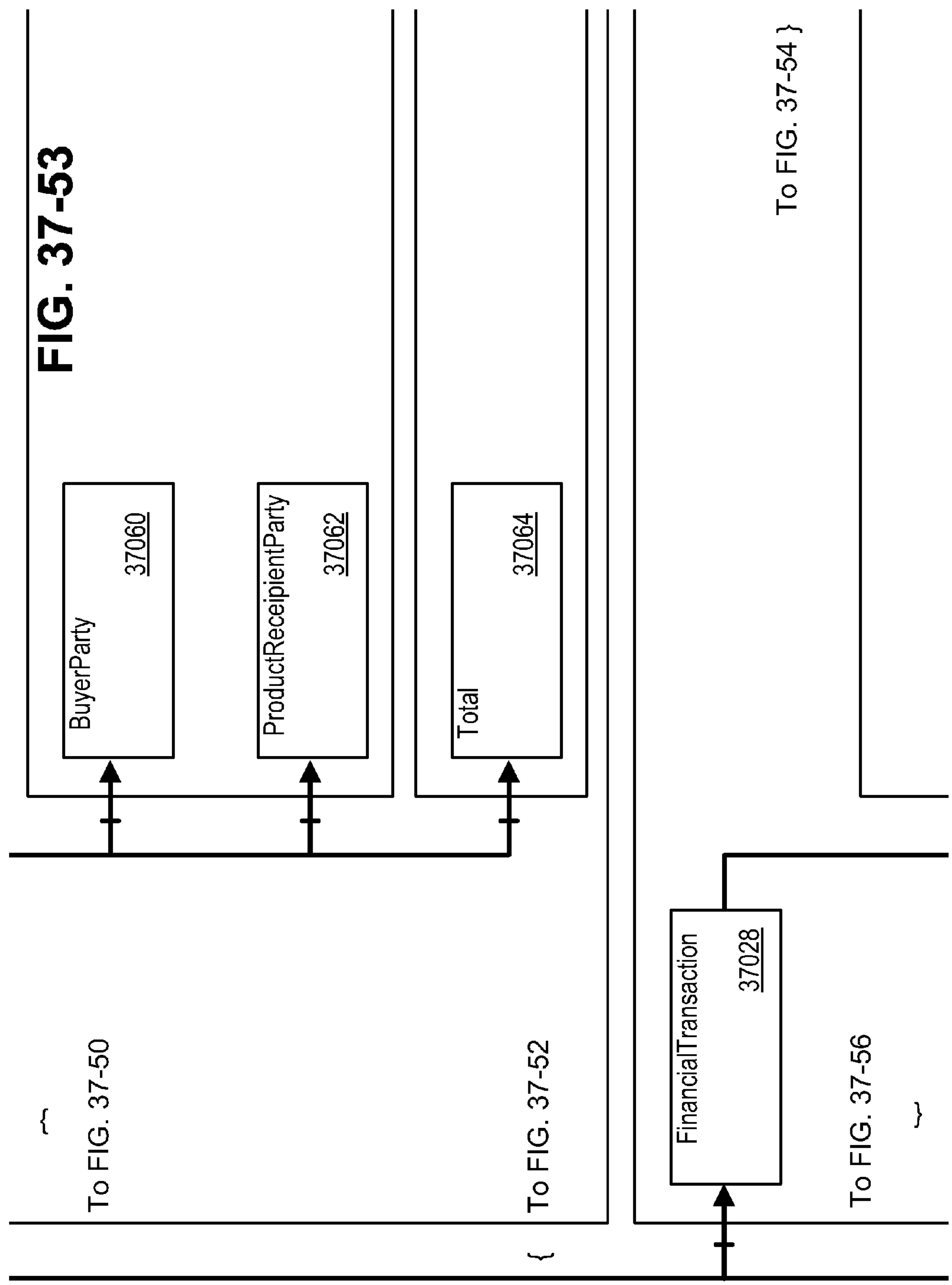
Figures 37, 38, 39, 40, 41, 42, 43, 44, 45, 46, 47, 48, 49, 50, 51, 52, 53, 54:
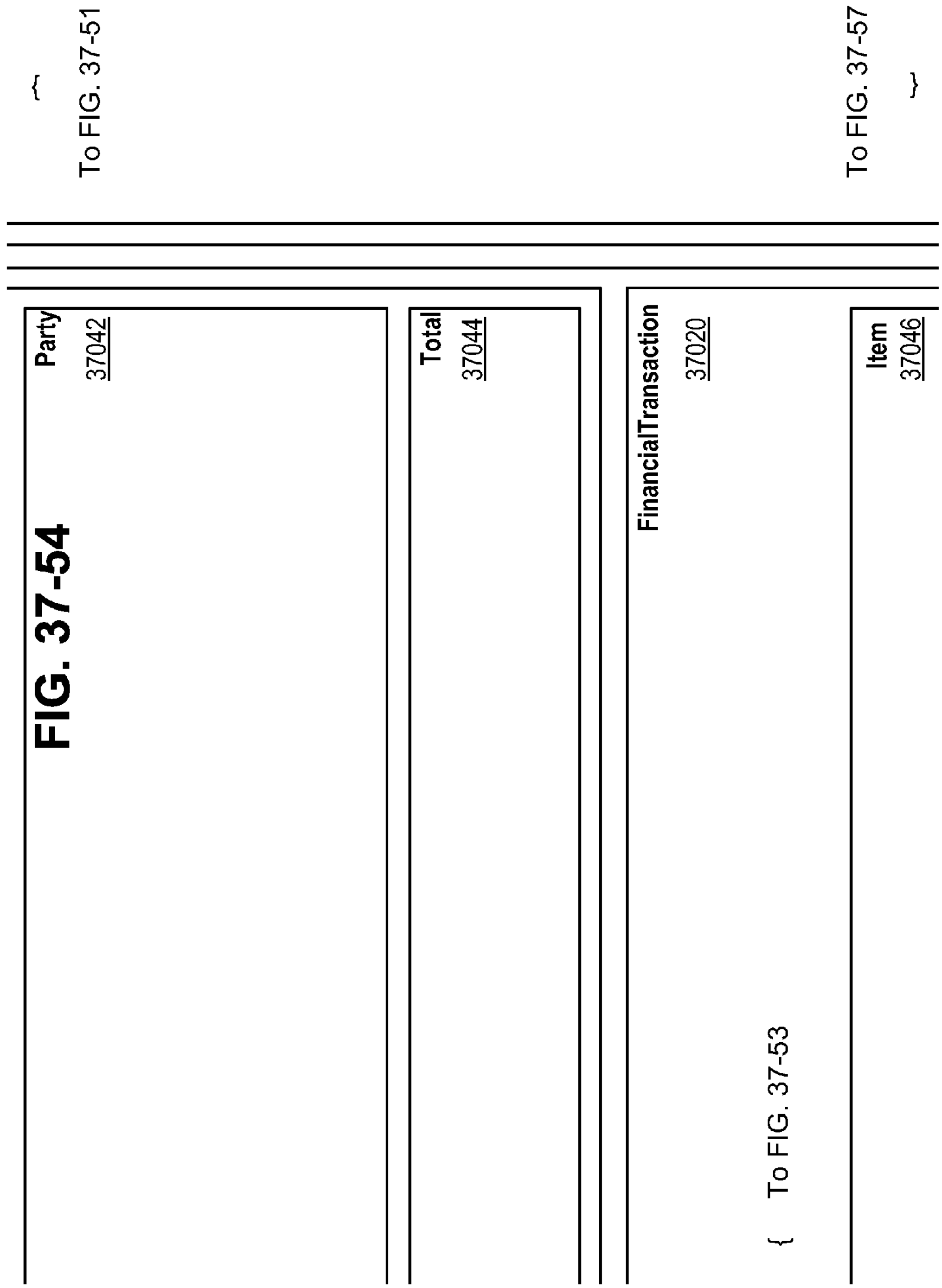
Figures 37, 38, 39, 40, 41, 42, 43, 44, 45, 46, 47, 48, 49, 50, 51, 52, 53, 54, 55, 56:
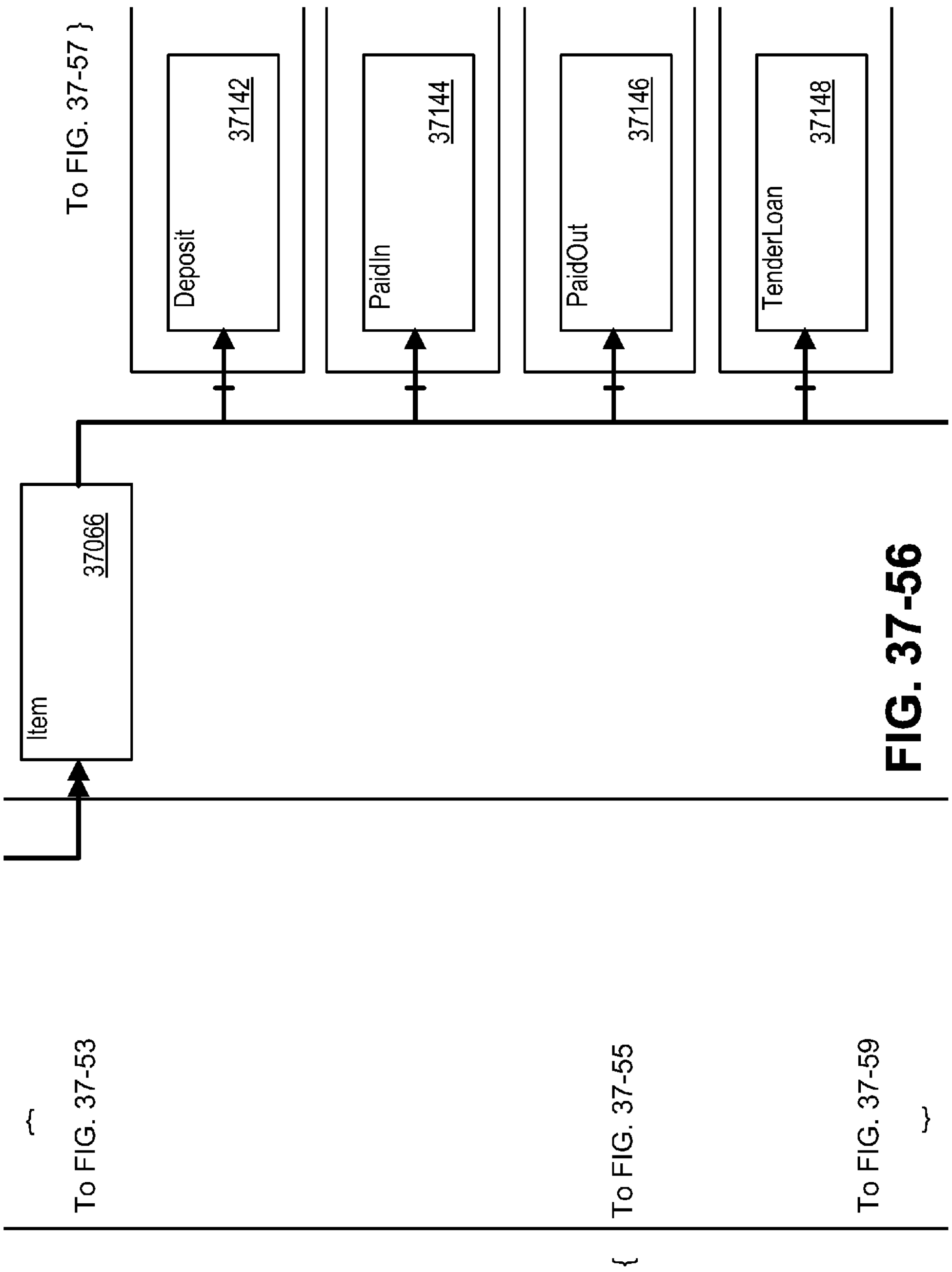
Figures 37, 38, 39, 40, 41, 42, 43, 44, 45, 46, 47, 48, 49, 50, 51, 52, 53, 54, 55, 56, 57:
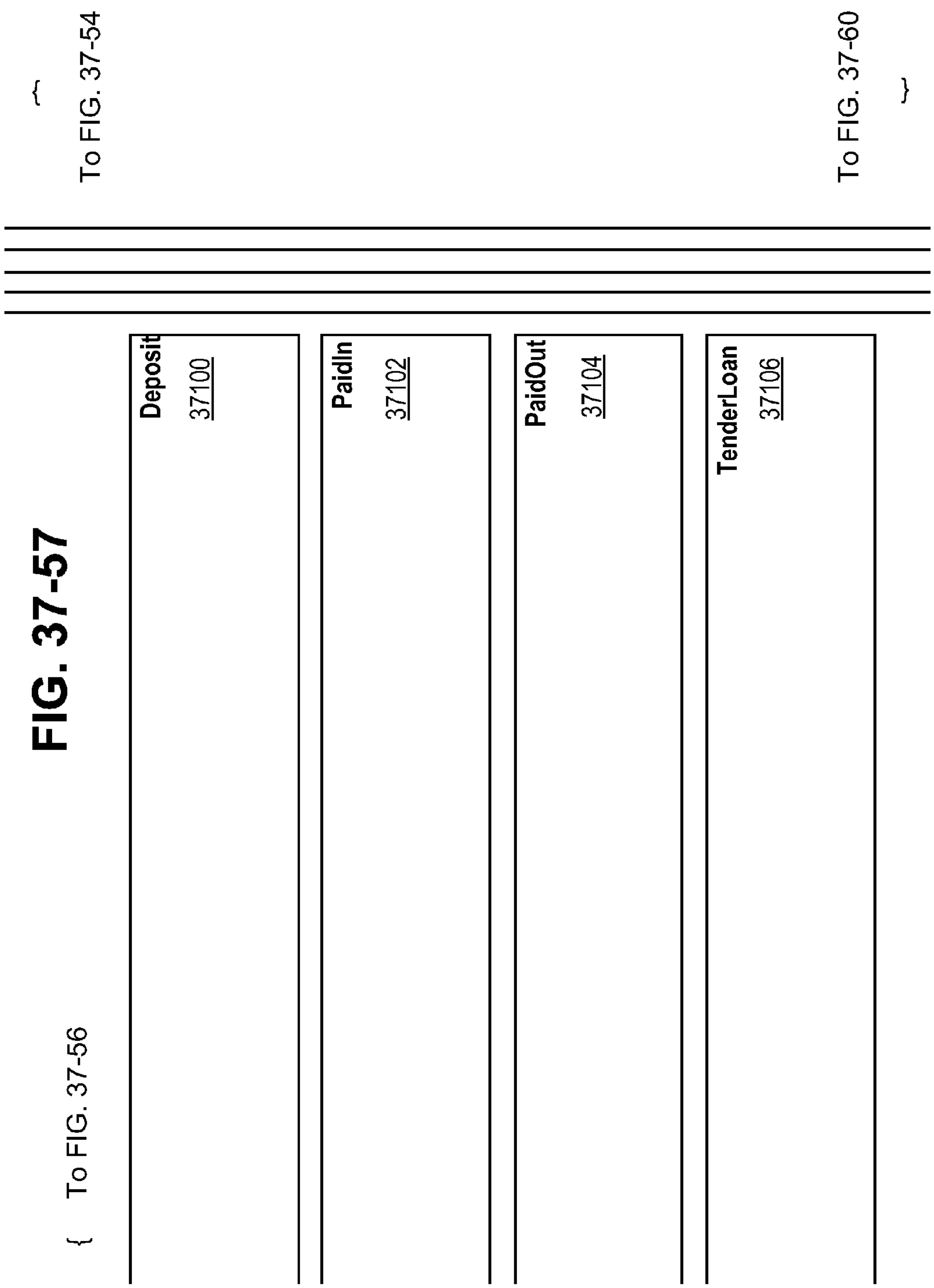
Figures 37, 38, 39, 40, 41, 42, 43, 44, 45, 46, 47, 48, 49, 50, 51, 52, 53, 54, 55, 56, 57, 58, 59:
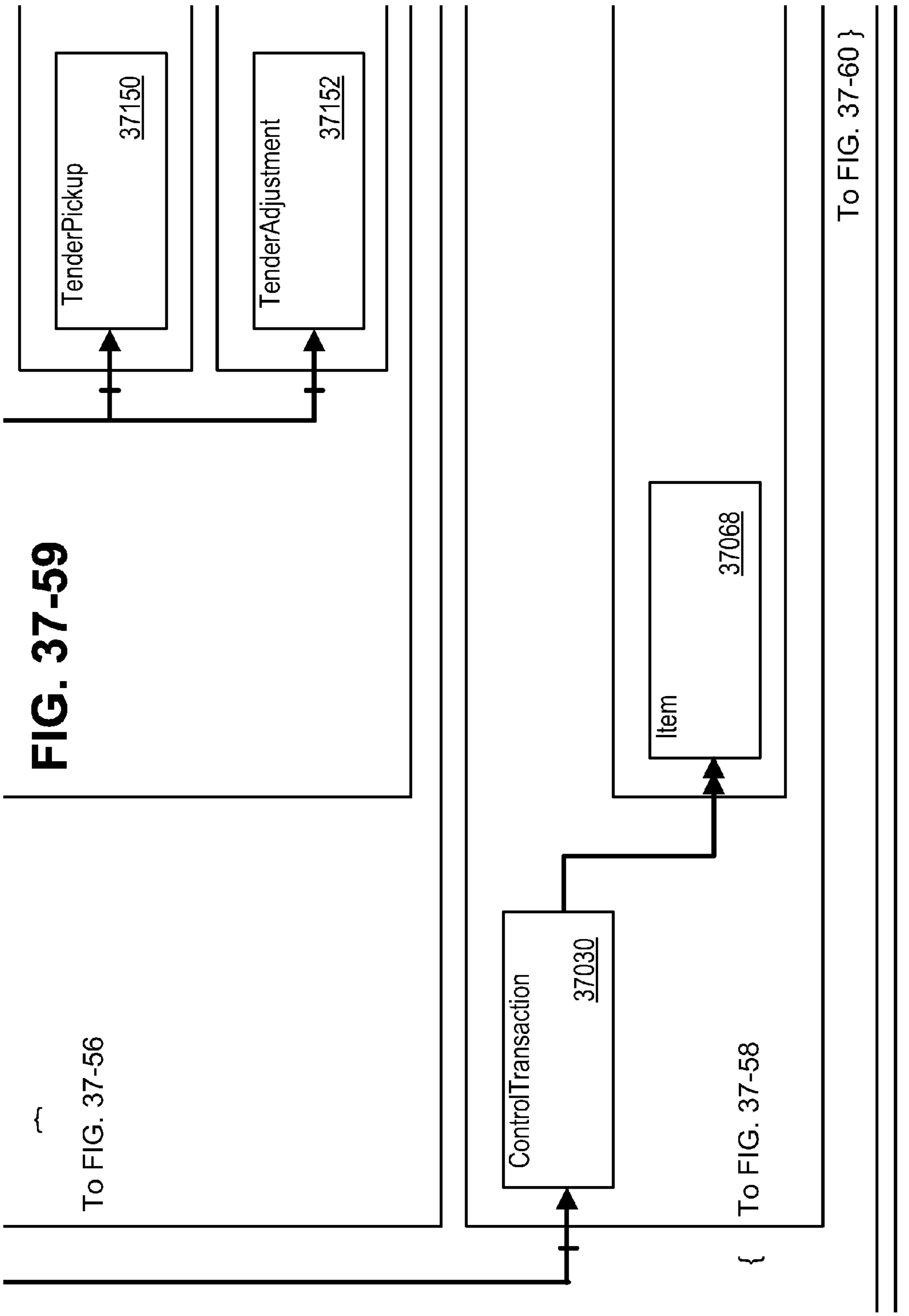
Figures 37, 38, 39, 40, 41, 42, 43, 44, 45, 46, 47, 48, 49, 50, 51, 52, 53, 54, 55, 56, 57, 58, 59, 60:
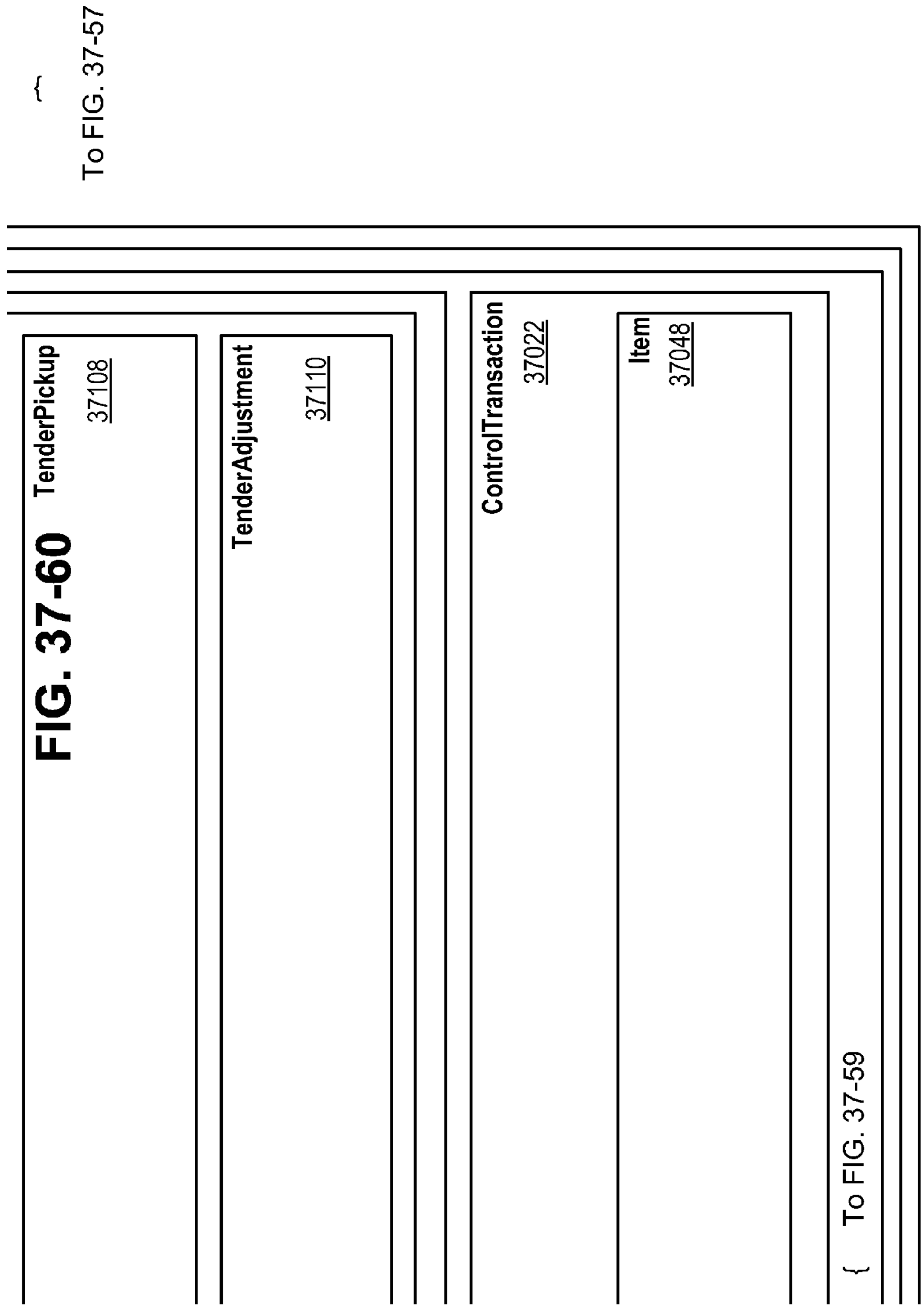

FIGS. 38-1 through 38-103 show an example configuration of an Element Structure that includes a PointOfSaleTransactionMessage 38000 package. The PointOfSaleTransactionMessage 38000 package is a PtOfSlTransacMsg 38004 data type. The PointOfSaleTransactionMessage 38000 package includes a PointOfSaleTransactionMessage 38002 entity. The PointOfSaleTransactionMessage 38000 package includes various packages, namely a MessageHeader 38006 and a PointOfSaleTransaction 38012.

The MessageHeader 38006 package is a BusinessDocumentMessageHeader 38010 data type. The MessageHeader 38006 package includes a MessageHeader 38008 entity.

The PointOfSaleTransaction 38012 package is an <MT>PtOfSlTransac 38018 data type. The PointOfSaleTransaction 38012 package includes a PointOfSaleTransaction 38014 entity. The PointOfSaleTransaction 38012 package includes various packages, namely an Operator 38066, a RetailTransaction 38076, a FinancialTransaction 381636 and a ControlTransaction 381760. The PointOfSaleTransaction 38014 entity includes various attributes, namely a CurrencyCode 38056 and a TrainingModeActiveIndicator 38062. The PointOfSaleTransaction 38014 entity includes various subordinate entities, namely a StoreInternalID 38020, a DeviceID 38026, a TillID 38032, an ID 38038, a BusinessDate 38044 and a ProcessingPeriod 38050. The CurrencyCode 38056 attribute is a CurrencyCode 38060 data type. A CurrencyCode is a coded representation of a currency. The TrainingModeActiveIndicator 38062 attribute is an Indicator 38064 data type. A TrainingModeActiveIndicator indicates whether the training mode was active in the point of sale system. A StoreInternalIDRETAILSTOREID is a proprietary identifier for a store. A store is an operational unit at a location where retail processes with respect to consumers are executed. A DeviceIDWORKSTATIONID is an identifier (e.g., 1 to 65 characters) for an input or output device in computing. The device can include, for example, a cash register, mobile device or backoffice computer, where a point of sale transaction occurred. A point of sale transaction workstation is the place where a point of sale transaction occurs. A TillID is an identifier (e.g., 1 to 20 characters) for a till. A till is a drawer in a cash register used to hold money. An IDTRANSNUMBER is an identifier for a point of sale transaction. A Point Of Sale Transaction is a business activity that is performed in a retail store, usually at a point-of-sale. A Point of Sale Transaction can be, for example, a retail transaction, a financial transaction, an inventory transaction, a control transaction, or a summary transaction. A BusinessDate is a date during which a business occurs in a store. A ProcessingPeriod is a period that is defined by two points in time. These points in time may be expressed by accurate-to-the-second time stamps together with calendar days. The DateTimePeriod may be determined by a start time and an end time; a start time with a duration; or a duration with an end time.

The Operator 38066 package is an <MT>Optr 38070 data type. The Operator 38066 package includes an Operator 38068 entity. The Operator 38068 entity includes an EmployeeID 38072 attribute. The EmployeeID 38072 attribute is an NOSC_EmployeeID 38074 data type. An EmployeeID is a proprietary identifier (e.g., 1 to 36 characters) for a party, such as an employee, being involved in a sale. An Employee can be a person who contributes or has contributed to the creation of goods or services for a company. This term can be used to describe "internal" employees but can also include "external" employees, or externals. Unlike externals, an internal employee is in a position of subordination to another's authority.

The RetailTransaction 38076 package is an <MT>RtlTransac 38080 data type. The RetailTransaction 38076 package includes a RetailTransaction 38078 entity. The RetailTransaction 38076 package includes various packages, namely an Item 38086, a PriceModification 381308, a Tax 381346, a Tender 381364, a TransactionLink 381566, a Party 381596 and a Total 381618. The RetailTransaction 38078 entity includes a LifeCycleStatusCode 38082 attribute. The LifeCycleStatusCode 38082 attribute is an NOSC_RetailTransactionLifeCycleStatusCode 38084 data type. A LifeCycleStatusCode is a coded representation (e.g., 1 to 2 characters) of the status of a life cycle of a retail transaction. A status can be, for example, Failed, Finished, InProcess, PostVoided, Suspended, SuspendedDeleted, SuspendedRetrieved, Totaled, Voided, Waste, or Unknown.

The Item 38086 package is an <MT>RtlTransacItm 38090 data type. The Item 38086 package includes an Item 38088 entity. The Item 38086 package includes various packages, namely a Sale 38104, a SaleForDelivery 38278, a SaleForPickup 38470, a Return 38662, a ReturnForDelivery 38850, a ReturnForPickup 381056, a Void 381262 and a PaymentOnAccount 381276. The Item 38088 entity includes various attributes, namely a PointOfSaleTransactionItemID 38092, a ProcessingPeriod 38096 and a VoidIndicator 38100. The PointOfSaleTransactionItemID 38092 attribute is a PointOfSaleTransactionItemID 38094 data type. A PointOfSaleTransactionItemID is an identifier (e.g., 1 to 30 characters) for an item within a point of sale transaction. The ProcessingPeriod 38096 attribute is a DateTimePeriod 38098 data type. A ProcessingPeriod is a period that is defined by two points in time. These points in time may be expressed by accurate-to-the-second time stamps together with calendar days. The DateTimePeriod may be determined, for example, by a start time and an end time; a start time with a duration; or a duration with an end time. The VoidIndicator 38100 attribute is an Indicator 38102 data type. A VoidIndicator is a representation of a situation that has exactly two mutually exclusive Boolean values. If this indicator is set, it indicates that the respective transaction is invalid.

The Sale 38104 package is an <MT>RtlTransacItmSl 38108 data type. The Sale 38104 package includes a Sale 38106 entity. The Sale 38104 package includes various packages, namely a Common 38110 and a Party 38268.

The Common 38110 package is an <MT>RtlTransacItmCom 38114 data type. The Common 38110 package includes a Common 38112 entity. The Common 38110 package includes various packages, namely a PriceModification 38172, a Tax 38210, an ItemLink 38228 and a TransactionLink 38238. The Common 38112 entity includes various attributes, namely a ProductInternalID 38116, a ProductStandardID 38120, a ProductCategoryInternalID 38124, a ProductCategoryHierarchyTypeCode 38128, a ProductCategoryHierarchyID 38132, a Description 38136, a CostPrice 38140, a ListPrice 38144, a RegularSalesPrice 38148, an ActualSalesPrice 38152, a TotalAmount 38156, a DiscountAmount 38160, a TotalDiscountAmount 38164 and a Quantity 38168. The ProductInternalID 38116 attribute is an NOSC_ProductInternalID 38118 data type. A ProductInternalID is a proprietary identifier for a product. A product is either a tangible or intangible good, and is a part of the business activities of a company. A product can be traded and contributes directly or indirectly to value added. The ProductStandardID 38120 attribute is an NOSC_ProductStandardID 38122 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 38124 attribute is an NOSC_ProductCategoryInternalID 38126 data type. A ProductCategoryInternalID is a proprietary identifier for a product category. A product category is a division of products according to objective criteria. The ProductCategoryHierarchyTypeCode 38128 attribute is a ProductCategoryHierarchyTypeCode 38130 data type. A ProductCategoryHierarchyTypeCode is a coded representation of the type of a product category hierarchy. The ProductCategoryHierarchyID 38132 attribute is an NOSC_ProductCategoryHierarchyID 38134 data type. A ProductCategoryHierarchyID is a unique identifier for a product category hierarchy. The Description 38136 attribute is a MEDIUM_Description 38138 data type. A Description represents a description of a product or product category. The CostPrice 38140 attribute is a Price 38142 data type. A CostPrice represents a cost price per measure unit code. The ListPrice 38144 attribute is a Price 38146 data type. A ListPrice represents a suggested retail price per measure unit code. The RegularSalesPrice 38148 attribute is a Price 38150 data type. A RegularSalesPrice represents a regular sales price per measure unit code. The ActualSalesPrice 38152 attribute is a Price 38154 data type. An ActualSalesPrice represents the actual sales price per measure unit code. The TotalAmount 38156 attribute is an Amount 38158 data type. A TotalAmount is the TotalDiscountAmount minus the DiscountAmount. The DiscountAmount 38160 attribute is an Amount 38162 data type. A DiscountAmount is the sum of all PriceModification amounts. The TotalDiscountAmount 38164 attribute is an Amount 38166 data type. A TotalDiscountAmount is the ActualSalesPrice times the Quantity. The Quantity 38168 attribute is a Quantity 38170 data type. A Quantity is a non-monetary numerical specification of an amount in a unit of measurement. Quantity may represent the number of purchased items.

The PriceModification 38172 package is an <MT>RtlTransacItmComPrModif 38176 data type. The PriceModification 38172 package includes a PriceModification 38174 entity. The PriceModification 38174 entity includes various attributes, namely a PointOfSaleTransactionPriceModificationID 38178, a PointOfSaleTransactionPriceModifierTypeCode 38182, a PointOfSaleTransactionPriceModifierID 38186, an Amount 38190, a Percent 38194, a PreviousSalesPrice 38198, a NewSalesPrice 38202 and a PointOfSaleTransactionPriceModificationReasonCode 38206. The PointOfSaleTransactionPriceModificationID 38178 attribute is a PointOfSaleTransactionPriceModificationID 38180 data type. A PointOfSaleTransactionPriceModificationID is an identifier (e.g., 1 to 30 characters) for a price modification during a point of sale transaction. The PointOfSaleTransactionPriceModifierTypeCode 38182 attribute is an NOSC_PointOfSaleTransactionPriceModifierTypeCode 38184 data type. A PointOfSaleTransactionPriceModifierTypeCode is a coded representation (e.g., 1 to 2 characters) of the type of a price modifier of a point of sale transaction. Possible values can include Price Overwrite, Price Rule, Promotion, or Markdown. The PointOfSaleTransactionPriceModifierID 38186 attribute is an NOSC_PointOfSaleTransactionPriceModifierID 38188 data type. A PointOfSaleTransactionPriceModifierID is an identifier (e.g., 1 to 32 characters) for a price modifier during a point of sale transaction. A price modifier reduces a price for something during a retail transaction. A Retail Transaction is a transaction that involves both physical or logical movements of materials and monetary flow. The Amount 38190 attribute is an Amount 38192 data type. An Amount represents the amount of a price modification. The Percent 38194 attribute is a Percent 38196 data type. A Percent represents the percent of a price modification. The PreviousSalesPrice 38198 attribute is a Price 38200 data type. A PreviousSalesPrice represents the previous sales price before price modification. The NewSalesPrice 38202 attribute is a Price 38204 data type. A NewSalesPrice represents the new sales price after price modification. The PointOfSaleTransactionPriceModificationReasonCode 38206 attribute is an NOSC_PointOfSaleTransactionPriceModificationReasonCode 38208 data type. A PointOfSaleTransactionPriceModificationReasonCode is a coded representation (e.g., 1 to 4 characters) for the reason of a price modification of a point of sale transaction.

The Tax 38210 package is an <MT>RtlTransacItmComTx 38214 data type. The Tax 38210 package includes a Tax 38212 entity. The Tax 38212 entity includes various attributes, namely a PointOfSaleTransactionTaxID 38216, a PointOfSaleTransactionProductTaxationCharacteristicsCode 38220 and an Amount 38224. The PointOfSaleTransactionTaxID 38216 attribute is an NOSC_PointOfSaleTransactionTaxID 38218 data type. A PointOfSaleTransactionTaxID is an identifier for a tax used in a point of sale transaction. The PointOfSaleTransactionProductTaxationCharacteristicsCode 38220 attribute is an NOSC_PointOfSaleTransactionProductTaxationCharacteristicsCode 38222 data type. A PointOfSaleTransactionProductTaxationCharacteristicsCode is a coded representation of the main characteristics that form the basis of a product taxation in a point of sales system. The Amount 38224 attribute is an Amount 38226 data type. An Amount represents a tax amount.

The ItemLink 38228 package is an <MT>RtlTransacItmComItmLnk 38232 data type. The ItemLink 38228 package includes an ItemLink 38230 entity. An ItemLink represents a node used for a sales set. The ItemLink 38230 entity includes a PointOfSaleTransactionItemID 38234 attribute. The PointOfSaleTransactionItemID 38234 attribute is a PointOfSaleTransactionItemID 38236 data type. A PointOfSaleTransactionItemID represents a reference to a linked Point Of Sale Transaction Item ID. A possible usage of PointOfSaleTransactionItemID is to list an item of a sales set.

The TransactionLink 38238 package is an <MT>RtlTransacItmComTransacLnk 38242 data type. The TransactionLink 38238 package includes a TransactionLink 38240 entity. A TransactionLink is a link to a previous RetailTransaction. For example, a TransactionLink node can be used for return processes (e.g., as a reference to a transaction from which the returned item originates). The TransactionLink 38240 entity includes various attributes, namely a StoreInternalID 38244, a DeviceID 38248, a TillID 38252, a PointOfSaleTransactionID 38256, a BusinessDate 38260 and a ProcessingPeriod 38264. The StoreInternalID 38244 attribute is an NOSC_StoreInternalID 38246 data type. A StoreInternalID represents a proprietary identifier for a store. A store is an operational unit at a location where Retail processes with respect to consumers are executed. The DeviceID 38248 attribute is an NOSC_DeviceID 38250 data type. A DeviceID is an identifier (e.g., 1 to 65 characters) for an input or output device in computing. The device can include, for example, a cash register, mobile device or backoffice computer, where a point of sale transaction occurred. The TillID 38252 attribute is an NOSC_TillID 38254 data type. A TillID is an identifier (e.g., 1 to 20 characters) for a till. A till is a drawer in a cash register used for money. The PointOfSaleTransactionID 38256 attribute is an NOSC_PointOfSaleTransactionID 38258 data type. A PointOfSaleTransactionID is an identifier for a point of sale transaction. The BusinessDate 38260 attribute is a Date 38262 data type. A BusinessDate is the date during which a business transaction occurs in a store. The ProcessingPeriod 38264 attribute is a DateTimePeriod 38266 data type. A ProcessingPeriod is a period that is defined by two points in time. These points in time may be expressed by accurate-to-the-second time stamps together with calendar days. The date time period may be determined, for example, by a start time and an end time; a start time with a duration; or a duration with an end time. ProcessingPeriod is a Period in which a RetailTransactionItem is processed.

The Party 38268 package is an <MT>RtlTransacItmCommsnRcpntPty 38272 data type. The Party 38268 package includes a CommissionRecipientParty 38270 entity. The CommissionRecipientParty 38270 entity includes a PartyInternalID 38274 attribute. The PartyInternalID 38274 attribute is an NOSC_PartyInternalID 38276 data type. A PartyInternalID is a proprietary identifier for a party, for example, a commission recipient party.

The SaleForDelivery 38278 package is an <MT>RtlTransacItmSlForDeliv 38282 data type. The SaleForDelivery 38278 package includes a SaleForDelivery 38280 entity. The SaleForDelivery 38278 package includes various packages, namely a Common 38284, a Party 38442 and a Location 38460.

The Common 38284 package is an <MT>RtlTransacItmCom 38288 data type. The Common 38284 package includes a Common 38286 entity. The Common 38284 package includes various packages, namely a PriceModification 38346, a Tax 38384, an ItemLink 38402 and a TransactionLink 38412. The Common 38286 entity includes various attributes, namely a ProductInternalID 38290, a ProductStandardID 38294, a ProductCategoryInternalID 38298, a ProductCategoryHierarchyTypeCode 38302, a ProductCategoryHierarchyID 38306, a Description 38310, a CostPrice 38314, a ListPrice 38318, a RegularSalesPrice 38322, an ActualSalesPrice 38326, a TotalAmount 38330, a DiscountAmount 38334, a TotalDiscountAmount 38338 and a Quantity 38342. The ProductInternalID 38290 attribute is an NOSC_ProductInternalID 38292 data type. A ProductInternalID is a proprietary identifier for a product. The ProductStandardID 38294 attribute is an NOSC_ProductStandardID 38296 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 38298 attribute is an NOSC_ProductCategoryInternalID 38300 data type. A ProductCategoryInternalID is a proprietary identifier for a product category. The ProductCategoryHierarchyTypeCode 38302 attribute is a ProductCategoryHierarchyTypeCode 38304 data type. A ProductCategoryHierarchyTypeCode is a coded representation of the type of a product category hierarchy. The ProductCategoryHierarchyID 38306 attribute is an NOSC_ProductCategoryHierarchyID 38308 data type. A ProductCategoryHierarchyID is a unique identifier for a product category hierarchy. The Description 38310 attribute is a MEDIUM_Description 38312 data type. A Description represents a description of a product or product category. The CostPrice 38314 attribute is a Price 38316 data type. A CostPrice represents a cost price per measure unit code. The ListPrice 38318 attribute is a Price 38320 data type. A ListPrice represents a list price suggested retail price per measure unit code. The RegularSalesPrice 38322 attribute is a Price 38324 data type. A RegularSalesPrice represents a regular sales price per measure unit code. The ActualSalesPrice 38326 attribute is a Price 38328 data type. An ActualSalesPrice represents the actual sales price per measure unit code. The TotalAmount 38330 attribute is an Amount 38332 data type. A TotalAmount is the TotalDiscountAmount minus the DiscountAmount. The DiscountAmount 38334 attribute is an Amount 38336 data type. A DiscountAmount is the sum of all PriceModification amounts. The TotalDiscountAmount 38338 attribute is an Amount 38340 data type. A TotalDiscountAmount is the ActualSalesPrice times the Quantity. The Quantity 38342 attribute is a Quantity 38344 data type. A Quantity is a non-monetary numerical specification of an amount in a unit of measurement.

The PriceModification 38346 package is an <MT>RtlTransacItmComPrModif 38350 data type. The PriceModification 38346 package includes a PriceModification 38348 entity. The PriceModification 38348 entity includes various attributes, namely a PointOfSaleTransactionPriceModificationID 38352, a PointOfSaleTransactionPriceModifierTypeCode 38356, a PointOfSaleTransactionPriceModifierID 38360, an Amount 38364, a Percent 38368, a PreviousSalesPrice 38372, a NewSalesPrice 38376 and a PointOfSaleTransactionPriceModificationReasonCode 38380. The PointOfSaleTransactionPriceModificationID 38352 attribute is a PointOfSaleTransactionPriceModificationID 38354 data type. A PointOfSaleTransactionPriceModificationID is an identifier (e.g., 1 to 30 characters) for a price modification during a point of sale transaction. The PointOfSaleTransactionPriceModifierTypeCode 38356 attribute is an NOSC_PointOfSaleTransactionPriceModifierTypeCode 38358 data type. A PointOfSaleTransactionPriceModifierTypeCode is a coded representation (e.g., 1 to 2 characters) of the type of a price modifier of a point of sale transaction. The PointOfSaleTransactionPriceModifierID 38360 attribute is an NOSC_PointOfSaleTransactionPriceModifierID 38362 data type. A PointOfSaleTransactionPriceModifierID is an identifier (e.g., 1 to 32 characters) for a price modifier during a point of sale transaction. The Amount 38364 attribute is an Amount 38366 data type. An Amount represents the amount of a price modification. The Percent 38368 attribute is a Percent 38370 data type. A Percent represents the percent of a price modification. The PreviousSalesPrice 38372 attribute is a Price 38374 data type. A PreviousSalesPrice represents a previous sales price before price modification. The NewSalesPrice 38376 attribute is a Price 38378 data type. A NewSalesPrice represents a new sales after modification. The price price PointOfSaleTransactionPriceModificationReasonCode 38380 attribute is an NOSC_PointOfSaleTransactionPriceModificationReasonCode 38382 data type. A PointOfSaleTransactionPriceModificationReasonCode is a coded representation (e.g., 1 to 4 characters) for the reason of a price modification of a point of sale transaction.

The Tax 38384 package is an <MT>RtlTransacItmComTx 38388 data type. The Tax 38384 package includes a Tax 38386 entity. The Tax 38386 entity includes various attributes, namely a PointOfSaleTransactionTaxID 38390, a PointOfSaleTransactionProductTaxationCharacteristicsCode 38394 and an Amount 38398. The PointOfSaleTransactionTaxID 38390 attribute is an NOSC_PointOfSaleTransactionTaxID 38392 data type. A PointOfSaleTransactionTaxID is an identifier for a tax used in a point of sale transaction. The PointOfSaleTransactionProductTaxationCharacteristicsCode 38394 attribute is an NOSC_PointOfSaleTransactionProductTaxationCharacteristicsCode 38396 data type. A PointOfSaleTransactionProductTaxationCharacteristicsCode is a coded representation of the main characteristics that form the basis of a product taxation in a point of sales system. The Amount 38398 attribute is an Amount 38400 data type. An Amount represents a tax amount.

The ItemLink 38402 package is an <MT>RtlTransacItmComItmLnk 38406 data type. The ItemLink 38402 package includes an ItemLink 38404 entity. An ItemLink represents a node used for a sales set. The ItemLink 38404 entity includes a PointOfSaleTransactionItemID 38408 attribute. The PointOfSaleTransactionItemID 38408 attribute is a PointOfSaleTransactionItemID 38410 data type. A PointOfSaleTransactionItemID is a reference to a linked Point Of Sale Transaction Item ID.

The TransactionLink 38412 package is an <MT>RtlTransacItmComTransacLnk 38416 data type. The TransactionLink 38412 package includes a TransactionLink

38414 entity. A TransactionLink is a link to a previous RetailTransaction. For example, a TransactionLink can be used for return processes (e.g., a reference to a transaction from which the returned item originates). The TransactionLink 38414 entity includes various attributes, namely a StoreInternalID 38418, a DeviceID 38422, a TillID 38426, a PointOfSaleTransactionID 38430, a BusinessDate 38434 and a ProcessingPeriod 38438. The StoreInternalID 38418 attribute is an NOSC_StoreInternalID 38420 data type. A StoreInternalID is a proprietary identifier for a store. The DeviceID 38422 attribute is an NOSC_DeviceID 38424 data type. A DeviceID is an identifier (e.g., 1 to 65 characters) for an input or output device in computing. The device can include, for example, a cash register, mobile device or backoffice computer, where a point of sale transaction occurred. The TillID 38426 attribute is an NOSC_TillID 38428 data type. A TillID is an identifier (e.g., 1 to 20 characters) for a till. A till is a drawer in a cash register used for money. The PointOfSaleTransactionID 38430 attribute is an NOSC_PointOfSaleTransactionID 38432 data type. A PointOfSaleTransactionID is an identifier for a point of sale transaction. The BusinessDate 38434 attribute is a Date 38436 data type. A BusinessDate represents a date during which a business transaction occurs in a store. The ProcessingPeriod 38438 attribute is a DateTimePeriod 38440 data type. A ProcessingPeriod is a period that is defined by two points in time. These points in time may be expressed by accurate-to-the-second time stamps together with calendar days. The date time period is determined, for example, by a start time and an end time; a start time with a duration; or a duration with an end time.

The Party 38442 package is an <MT>RtlTransacItmSlForDelivProdRcpndtPty 38446 data type. The Party 38442 package includes various entities, namely a ProductRecipientParty 38444 and a CommissionRecipientParty 38452. The ProductRecipientParty 38444 entity includes a PartyInternalID 38448 attribute. The PartyInternalID 38448 attribute is an NOSC_PartyInternalID 38450 data type. A PartyInternalID is a proprietary identifier for a party, (e.g., a product recipient party). The CommissionRecipientParty 38452 entity includes a PartyInternalID 38456 attribute. The PartyInternalID 38456 attribute is an NOSC_PartyInternalID 38458 data type. A PartyInternalID is a proprietary identifier for a party (e.g., a commission recipient party).

The Location 38460 package is an <MT>RtlTransacItmSlForDelivShipFrmLoc 38464 data type. The Location 38460 package includes a ShipFromLocation 38462 entity. The ShipFromLocation 38462 entity includes a LocationInternalID 38466 attribute. The LocationInternalID 38466 attribute is an NOSC_LocationInternalID 38468 data type. A LocationInternalID is a proprietary identifier for a location, such as a ship from location.

The SaleForPickup 38470 package is an <MT>RtlTransacItmSlForPkup 38474 data type. The SaleForPickup 38470 package includes a SaleForPickup 38472 entity. The SaleForPickup 38470 package includes various packages, namely a Common 38476, a Party 38634 and a Location 38652.

The Common 38476 package is an <MT>RtlTransacItmCom 38480 data type. The Common 38476 package includes a Common 38478 entity. The Common 38476 package includes various packages, namely a PriceModification 38538, a Tax 38576, an ItemLink 38594 and a TransactionLink 38604. The Common 38478 entity includes various attributes, namely a ProductInternalID 38482, a ProductStandardID 38486, a ProductCategoryInternalID 38490, a ProductCategoryHierarchyTypeCode 38494, a ProductCategoryHierarchyID 38498, a Description 38502, a CostPrice 38506, a ListPrice 38510, a RegularSalesPrice 38514, an ActualSalesPrice 38518, a TotalAmount 38522, a DiscountAmount 38526, a TotalDiscountAmount 38530 and a Quantity 38534. The ProductInternalID 38482 attribute is an NOSC_ProductInternalID 38484 data type. A ProductInternalID is a proprietary identifier for a product. The ProductStandardID 38486 attribute is an NOSC_ProductStandardID 38488 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 38490 attribute is an NOSC_ProductCategoryInternalID 38492 data type. A ProductCategoryInternalID is a proprietary identifier for a product category. The ProductCategoryHierarchyTypeCode 38494 attribute is a ProductCategoryHierarchyTypeCode 38496 data type. A ProductCategoryHierarchyTypeCode is a coded representation of the type of a product category hierarchy. The ProductCategoryHierarchyID 38498 attribute is an NOSC_ProductCategoryHierarchyID 38500 data type. A ProductCategoryHierarchyID is a unique identifier for a product category hierarchy. The Description 38502 attribute is a MEDIUM_Description 38504 data type. A Description represents a description of a product or product category. The CostPrice 38506 attribute is a Price 38508 data type. A CostPrice represents a cost price per measure unit code. The ListPrice 38510 attribute is a Price 38512 data type. A ListPrice represents a suggested retail price per measure unit code. The RegularSalesPrice 38514 attribute is a Price 38516 data type. A RegularSalesPrice represents a regular sales price per measure unit code. The ActualSalesPrice 38518 attribute is a Price 38520 data type. An ActualSalesPrice represents the actual sales price per measure unit code. The TotalAmount 38522 attribute is an Amount 38524 data type. A TotalAmount is the TotalDiscountAmount minus the DiscountAmount. The DiscountAmount 38526 attribute is an Amount 38528 data type. A DiscountAmount is the sum of all PriceModification amounts. The TotalDiscountAmount 38530 attribute is an Amount 38532 data type. A TotalDiscountAmount is the ActualSalesPrice times the Quantity. The Quantity 38534 attribute is a Quantity 38536 data type. A Quantity is a non-monetary numerical specification of an amount in a unit of measurement.

The PriceModification 38538 package is an <MT>RtlTransachmComPrModif 38542 data type. The PriceModification 38538 package includes a PriceModification 38540 entity. The PriceModification 38540 entity includes various attributes, namely a PointOfSaleTransactionPriceModificationID 38544, a PointOfSaleTransactionPriceModifierTypeCode 38548, a PointOfSaleTransactionPriceModifierID 38552, an Amount 38556, a Percent 38560, a PreviousSalesPrice 38564, a NewSalesPrice 38568 and a PointOfSaleTransactionPriceModificationReasonCode 38572. The PointOfSaleTransactionPriceModificationID 38544 attribute is a PointOfSaleTransactionPriceModificationID 38546 data type. A PointOfSaleTransactionPriceModificationID is an identifier (e.g., 1 to 30 characters) for a price modification during a point of sale transaction. The PointOfSaleTransactionPriceModifierTypeCode 38548 attribute is an NOSC_PointOfSaleTransactionPriceModifierTypeCode 38550 data type. A PointOfSaleTransactionPriceModifierTypeCode is a coded representation (e.g., 1 to 2 characters) of the type of a price modifier of a point of sale transaction. The PointOfSaleTransactionPriceModifierID 38552 attribute is an NOSC_PointOfSaleTransactionPriceModifierID 38554 data type. A PointOfSaleTransactionPriceModifierID is an identifier (e.g., 1 to 32 characters) for a price modifier during a point of sale transaction. The Amount 38556 attribute is an Amount 38558 data type. An Amount represents the amount of a price modification. The Percent 38560 attribute is a Percent 38562 data type. A Percent represents the percent of a price modification. The PreviousSalesPrice 38564 attribute is a Price 38566 data type. A PreviousSalesPrice is a previous sales price before price modification. The NewSalesPrice 38568 attribute is a Price 38570 data type. A NewSalesPrice represents the new sales price after price modification. The PointOfSaleTransactionPriceModificationReasonCode 38572 attribute is an NOSC_PointOfSaleTransactionPriceModificationReasonCode 38574 data type. A PointOfSaleTransactionPriceModificationReasonCode is a coded representation (e.g., 1 to 4 characters) for the reason of a price modification of a point of sale transaction.

The Tax 38576 package is an <MT>RtlTransacItmComTx 38580 data type. The Tax 38576 package includes a Tax 38578 entity. The Tax 38578 entity includes various attributes, namely a PointOfSaleTransactionTaxID 38582, a PointOfSaleTransactionProductTaxationCharacteristicsCode 38586 and an Amount 38590. The PointOfSaleTransactionTaxID 38582 attribute is an NOSC_PointOfSaleTransactionTaxID 38584 data type. A PointOfSaleTransactionTaxID is an identifier for a tax used in a point of sale transaction. The PointOfSaleTransactionProductTaxationCharacteristicsCode 38586 attribute is an NOSC_PointOfSaleTransactionProductTaxationCharacteristicsCode 38588 data type. A PointOfSaleTransactionProductTaxationCharacteristicsCode is a coded representation of the main characteristics that form the basis of a product taxation in a point of sales system. The Amount 38590 attribute is an Amount 38592 data type. An Amount represents a tax amount.

The ItemLink 38594 package is an <MT>RtlTransacItmComItmLnk 38598 data type. The ItemLink 38594 package includes an ItemLink 38596 entity. An ItemLink is a node used for a sales set. The ItemLink 38596 entity includes a PointOfSaleTransactionItemID 38600 attribute. The PointOfSaleTransactionItemID 38600 attribute is a PointOfSaleTransactionItemID 38602 data type. A PointOfSaleTransactionItemID is a reference to a linked Point Of Sale Transaction Item ID.

The TransactionLink 38604 package is an <MT>RtlTransacItmComTransacLnk 38608 data type. The TransactionLink 38604 package includes a TransactionLink 38606 entity. A TransactionLink is a link to a previous RetailTransaction. For example, a TransactionLink can be used for return processes (e.g., a reference to a transaction from which the returned item originates). The TransactionLink 38606 entity includes various attributes, namely a StoreInternalID 38610, a DeviceID 38614, a TillID 38618, a PointOfSaleTransactionID 38622, a BusinessDate 38626 and a ProcessingPeriod 38630. The StoreInternalID 38610 attribute is an NOSC_StoreInternalID 38612 data type. A StoreInternalID is a proprietary identifier for a store. The DeviceID 38614 attribute is an NOSC_DeviceID 38616 data type. A DeviceID is an identifier (e.g., 1 to 65 characters) for an input or output device in computing. The device can include, for example, a cash register, mobile device or backoffice computer where a point of sale transaction occurred. The TillID 38618 attribute is an NOSC_TillID 38620 data type. A TillID is an identifier (e.g., 1 to 20 characters) for a till. A till is a drawer in a cash register used for money. The PointOfSaleTransactionID 38622 attribute is an NOSC_PointOfSaleTransactionID 38624 data type. A PointOfSaleTransactionID is an identifier for a point of sale transaction. The BusinessDate 38626 attribute is a Date 38628 data type. A BusinessDate represents a date during which a business transaction occurs in a store. The ProcessingPeriod 38630 attribute is a DateTimePeriod 38632 data type. A ProcessingPeriod is a period that is defined by two points in time. These points in time may be expressed by accurate-to-the-second time stamps together with calendar days. The date time period may be determined, for example, by a start time and an end time; a start time with a duration; or a duration with an end time.

The Party 38634 package is an <MT>RtlTransacItmSlF or PkupBuyrPty 38638 data type. The Party 38634 package includes various entities, namely a BuyerParty 38636 and a CommissionRecipientParty 38644. The BuyerParty 38636 entity includes a PartyInternalID 38640 attribute. The PartyInternalID 38640 attribute is an NOSC_PartyInternalID 38642 data type. A PartyInternalID is a proprietary identifier for a party, such as a buyer party. The CommissionRecipientParty 38644 entity includes a PartyInternalID 38648 attribute. The PartyInternalID 38648 attribute is an NOSC-_PartyInternalID 38650 data type. A PartyInternalID is a proprietary identifier for a party, such as a commission recipient party.

The Location 38652 package is an <MT>RtlTransacItmSlF or PkupShipFrmLoc 38656 data type. The Location 38652 package includes a ShipFromLocation 38654 entity. The ShipFromLocation 38654 entity includes a LocationInternalID 38658 attribute. The LocationInternalID 38658 attribute is an NOSC_LocationInternalID 38660 data type. A LocationInternalID is a proprietary identifier for a location, such as a ship from location.

The Return 38662 package is an <MT>RtlTransacItmRet 38666 data type. The Return 38662 package includes a Return 38664 entity. The Return 38662 package includes various packages, namely a Common 38672, an Authorisation 38830 and a Party 38840. The Return 38664 entity includes a PointOfSaleTransactionItemReturnReasonCode 38668 attribute. The PointOfSaleTransactionItemReturnReasonCode 38668 attribute is an NOSC_PointOfSaleTransactionItemReturnReasonCode 38670 data type. A PointOfSaleTransactionItemReturnReasonCode is a coded representation (e.g., 1 to 2 characters) of a return reason for a point of sale transaction item.

The Common 38672 package is an <MT>RtlTransacItmCom 38676 data type. The Common 38672 package includes a Common 38674 entity. The Common 38672 package includes various packages, namely a PriceModification 38734, a Tax 38772, an ItemLink 38790 and a TransactionLink 38800. The Common 38674 entity includes various attributes, namely a ProductInternalID 38678, a ProductStandardID 38682, a ProductCategoryInternalID 38686, a ProductCategoryHierarchyTypeCode 38690, a ProductCategoryHierarchyID 38694, a Description 38698, a CostPrice 38702, a ListPrice 38706, a RegularSalesPrice 38710, an ActualSalesPrice 38714, a TotalAmount 38718, a DiscountAmount 38722, a TotalDiscountAmount 38726 and a Quantity 38730. The ProductInternalID 38678 attribute is an NOSC_ProductInternalID 38680 data type. A ProductInternalID is a proprietary identifier for a product. The ProductStandardID 38682 attribute is an NOSC_ProductStandardID 38684 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 38686 attribute is an NOSC_ProductCategoryInternalID 38688 data type. A ProductCategoryInternalID is a proprietary identifier for a product category. The ProductCategoryHierarchyTypeCode 38690 attribute is a ProductCategoryHierarchyTypeCode 38692 data type. A ProductCategoryHierarchyTypeCode is a coded representation of the type of a product category hierarchy. The ProductCategoryHierarchyID 38694 attribute is an NOSC_ProductCategoryHierarchyID 38696 data type. A ProductCategoryHierarchyID is a unique identifier for a product category hierarchy. The Description 38698 attribute is a MEDIUM_Description 38700 data type. A Description represents the description of the product or product category. The CostPrice 38702 attribute is a Price 38704 data type. A CostPrice represents a cost price per measure unit code. The ListPrice 38706 attribute is a Price 38708 data type. A ListPrice represents a suggested retail price per measure unit code. The RegularSalesPrice 38710 attribute is a Price 38712 data type. A RegularSalesPrice represents a regular sales price per measure unit code. The ActualSalesPrice 38714 attribute is a Price 38716 data type. An ActualSalesPrice represents the actual sales price per measure unit code. The TotalAmount 38718 attribute is an Amount 38720 data type. A TotalAmount is the TotalDiscountAmount minus the DiscountAmount. The DiscountAmount 38722 attribute is an Amount 38724 data type. A DiscountAmount is the sum of all PriceModification amounts. The TotalDiscountAmount 38726 attribute is an Amount 38728 data type. A TotalDiscountAmount is the ActualSalesPrice times the Quantity. The Quantity 38730 attribute is a Quantity 38732 data type. A Quantity is a non-monetary numerical specification of an amount in a unit of measurement.

The PriceModification 38734 package is an <MT>RtlTransachmComPrModif 38738 data type. The PriceModification 38734 package includes a PriceModification 38736 entity. The PriceModification 38736 entity includes various attributes, namely a PointOfSaleTransactionPriceModificationID 38740, a PointOfSaleTransactionPriceModifierTypeCode 38744, a PointOfSaleTransactionPriceModifierID 38748, an Amount 38752, a Percent 38756, a PreviousSalesPrice 38760, a NewSalesPrice 38764 and a PointOfSaleTransactionPriceModificationReasonCode 38768. The PointOfSaleTransactionPriceModificationID 38740 attribute is a PointOfSaleTransactionPriceModificationID 38742 data type. A PointOfSaleTransactionPriceModificationID is an identifier (e.g., 1 to 30 characters) for a price modification during a point of sale transaction. The PointOfSaleTransactionPriceModifierTypeCode 38744 attribute is an NOSC_PointOfSaleTransactionPriceModifierTypeCode 38746 data type. A PointOfSaleTransactionPriceModifierTypeCode is a coded representation (e.g., 1 to 2 characters) of the type of a price modifier of a point of sale transaction. The PointOfSaleTransactionPriceModifierID 38748 attribute is an NOSC_PointOfSaleTransactionPriceModifierID 38750 data type. A PointOfSaleTransactionPriceModifierID is an identifier (e.g., 1 to 32 characters) for a price modifier during a point of sale transaction. The Amount 38752 attribute is an Amount 38754 data type. An Amount represents the amount of a price modification. The Percent 38756 attribute is a Percent 38758 data type. A Percent represents the percent of a price modification. The PreviousSalesPrice 38760 attribute is a Price 38762 data type. A PreviousSalesPrice represents a previous sales price before price modification. The NewSalesPrice 38764 attribute is a Price 38766 data type. A NewSalesPrice is a new sales price after price modification. The PointOfSaleTransactionPriceModificationReasonCode 38768 attribute is an NOSC_PointOfSaleTransactionPriceModificationReasonCode 38770 data type. A PointOfSaleTransactionPriceModificationReasonCode is a coded representation (e.g., 1 to 4 characters) for the reason of a price modification of a point of sale transaction.

The Tax 38772 package is an <MT>RtlTransacItmComTx 38776 data type. The Tax 38772 package includes a Tax 38774 entity. The Tax 38774 entity includes various attributes, namely a PointOfSaleTransactionTaxID 38778, a PointOfSaleTransactionProductTaxationCharacteristicsCode 38782 and an Amount 38786. The PointOfSaleTransactionTaxID 38778 attribute is an NOSC_PointOfSaleTransactionTaxID 38780 data type. A PointOfSaleTransactionTaxID is an identifier for a tax used in a point of sale transaction. The PointOfSaleTransactionProductTaxationCharacteristicsCode 38782 attribute is an NOSC_PointOfSaleTransactionProductTaxationCharacteristicsCode 38784 data type. A PointOfSaleTransactionProductTaxationCharacteristicsCode is a coded representation of the main characteristics that form the basis of a product taxation in a point of sales system. The Amount 38786 attribute is an Amount 38788 data type. An Amount represents a tax amount.

The ItemLink 38790 package is an <MT>RtlTransacItmComItmLnk 38794 data type. The ItemLink 38790 package includes an ItemLink 38792 entity. An ItemLink is a node used for a sales set. The ItemLink 38792 entity includes a PointOfSaleTransactionItemID 38796 attribute. The PointOfSaleTransactionItemID 38796 attribute is a PointOfSaleTransactionItemID 38798 data type. A PointOfSaleTransactionItemID is the reference to a linked Point Of Sale Transaction Item ID.

The TransactionLink 38800 package is an <MT>RtlTransacItmComTransacLnk 38804 data type. The TransactionLink 38800 package includes a TransactionLink 38802 entity. A TransactionLink is a link to a previous RetailTransaction. For example, a TransactionLink can be used for return processes (e.g., a reference to a transaction from which the returned item originates). The TransactionLink 38802 entity includes various attributes, namely a StoreInternalID 38806, a DeviceID 38810, a TillID 38814, a PointOfSaleTransactionID 38818, a BusinessDate 38822 and a ProcessingPeriod 38826. The StoreInternalID 38806 attribute is an NOSC_StoreInternalID 38808 data type. A StoreInternalID is a proprietary identifier for a store. The DeviceID 38810 attribute is an NOSC_DeviceID 38812 data type. A DeviceID is an identifier (e.g., 1 to 65 characters) for an input or output device in computing. The device can include, for example, a cash register, mobile device or backoffice computer where the point of sale transaction occurred. The TillID 38814 attribute is an NOSC_TillID 38816 data type. A TillID is an identifier (e.g., 1 to 20 characters) for a till. A till is a drawer in a cash register used for money. The PointOfSaleTransactionID 38818 attribute is an NOSC_PointOfSaleTransactionID 38820 data type. A PointOfSaleTransactionID is an identifier for a point of sale transaction. The BusinessDate 38822 attribute is a Date 38824 data type. A BusinessDate is a date during which a business transaction occurs in a store. The ProcessingPeriod 38826 attribute is a DateTimePeriod 38828 data type. A ProcessingPeriod is a period that is defined by two points in time. These points in time may be expressed by accurate-to-the-second time stamps together with calendar days. The date time period may be determined, for example, by a start time and an end time; a start time with a duration; or a duration with an end time.

The Authorisation 38830 package is an <MT>RtlTransacItmRetAuthsn 38834 data type. The Authorisation 38830 package includes an Authorisation 38832 entity. The Authorisation 38832 entity includes an EmployeeID 38836 attribute. The EmployeeID 38836 attribute is an NOSC_EmployeeID 38838 data type. An EmployeeID is a proprietary identifier for a party, such as an approving employee.

The Party 38840 package is an <MT>RtlTransacItmCommsnRcpntPty 38844 data type. The Party 38840 package includes a CommissionRecipientParty 38842 entity. The CommissionRecipientParty 38842 entity includes a PartyInternalID 38846 attribute. The PartyInternalID 38846 attribute is an NOSC_PartyInternalID 38848 data type. A PartyInternalID is a proprietary identifier for a party, such as a commission recipient party.

The ReturnForDelivery 38850 package is an <MT>RtlTransacItmRetForDeliv 38854 data type. The ReturnForDelivery 38850 package includes a ReturnForDelivery 38852 entity. The ReturnForDelivery 38850 package includes various packages, namely a Common 38860, an Authorisation 381018, a Party 381028 and a Location 381046. The ReturnForDelivery 38852 entity includes a PointOfSaleTransactionItemReturnReasonCode 38856 attribute. The PointOfSaleTransactionItemReturnReasonCode 38856 attribute is an NOSC_PointOfSaleTransactionItemReturnReasonCode 38858 data type. A PointOfSaleTransactionItemReturnReasonCode is a coded representation (e.g., 1 to 2 characters) of a return reason for a point of sale transaction item.

The Common 38860 package is an <MT>RtlTransacItmCom 38864 data type. The Common 38860 package includes a Common 38862 entity. The Common 38860 package includes various packages, namely a PriceModification 38922, a Tax 38960, an ItemLink 38978 and a TransactionLink 38988. The Common 38862 entity includes various attributes, namely a ProductInternalID 38866, a ProductStandardID 38870, a ProductCategoryInternalID 38874, a ProductCategoryHierarchyTypeCode 38878, a ProductCategoryHierarchyID 38882, a Description 38886, a CostPrice 38890, a ListPrice 38894, a RegularSalesPrice 38898, an ActualSalesPrice 38902, a TotalAmount 38906, a DiscountAmount 38910, a TotalDiscountAmount 38914 and a Quantity 38918. The ProductInternalID 38866 attribute is an NOSC_ProductInternalID 38868 data type. A ProductInternalID is a proprietary identifier for a product. The ProductStandardID 38870 attribute is an NOSC_ProductStandardID 38872 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 38874 attribute is an NOSC_ProductCategoryInternalID 38876 data type. A ProductCategoryInternalID is a proprietary identifier for a product category. The ProductCategoryHierarchyTypeCode 38878 attribute is a ProductCategoryHierarchyTypeCode 38880 data type. A ProductCategoryHierarchyTypeCode is a coded representation of the type of a product category hierarchy. The ProductCategoryHierarchyID 38882 attribute is an NOSC_ProductCategoryHierarchyID 38884 data type. A ProductCategoryHierarchyID is a unique identifier for a product category hierarchy. The Description 38886 attribute is a MEDIUM_Description 38888 data type. A Description represents a description of a product or product category. The CostPrice 38890 attribute is a Price 38892 data type. A CostPrice represents a cost price per measure unit code. The ListPrice 38894 attribute is a Price 38896 data type. A ListPrice represents a suggested retail price per measure unit code. The RegularSalesPrice 38898 attribute is a Price 38900 data type. A RegularSalesPrice represents a regular sales price per measure unit code. The ActualSalesPrice 38902 attribute is a Price 38904 data type. An ActualSalesPrice represents an actual sales price per measure unit code. The TotalAmount 38906 attribute is an Amount 38908 data type. A TotalAmount is the TotalDiscountAmount minus the DiscountAmount. The DiscountAmount 38910 attribute is an Amount 38912 data type. A DiscountAmount is the sum of all PriceModification amounts. The TotalDiscountAmount 38914 attribute is an Amount 38916 data type. A TotalDiscountAmount is the ActualSalesPrice times the Quantity. The Quantity 38918 attribute is a Quantity 38920 data type. A Quantity is a non-monetary numerical specification of an amount in a unit of measurement.

The PriceModification 38922 package is an <MT>RtlTransachmComPrModif 38926 data type. The PriceModification 38922 package includes a PriceModification 38924 entity. The PriceModification 38924 entity includes various attributes, namely a PointOfSaleTransactionPriceModificationID 38928, a PointOfSaleTransactionPriceModifierTypeCode 38932, a PointOfSaleTransactionPriceModifierID 38936, an Amount 38940, a Percent 38944, a PreviousSalesPrice 38948, a NewSalesPrice 38952 and a PointOfSaleTransactionPriceModificationReasonCode 38956. The PointOfSaleTransactionPriceModificationID 38928 attribute is a PointOfSaleTransactionPriceModificationID 38930 data type. A PointOfSaleTransactionPriceModificationID is an identifier (e.g., 1 to 30 characters) for a price modification during a point of sale transaction. The PointOfSaleTransactionPriceModifierTypeCode 38932 attribute is an NOSC_PointOfSaleTransactionPriceModifierTypeCode 38934 data type. A PointOfSaleTransactionPriceModifierTypeCode is a coded representation (e.g., 1 to 2 characters) of the type of a price modifier of a point of sale transaction. The PointOfSaleTransactionPriceModifierID 38936 attribute is an NOSC_PointOfSaleTransactionPriceModifierID 38938 data type. A PointOfSaleTransactionPriceModifierID is an identifier (e.g., 1 to 32 characters) for a price modifier during a point of sale transaction. The Amount 38940 attribute is an Amount 38942 data type. An Amount represents the amount of a price modification. The Percent 38944 attribute is a Percent 38946 data type. A Percent represents the percent of a price modification. The PreviousSalesPrice 38948 attribute is a Price 38950 data type. A PreviousSalesPrice represents a previous sales price before price modification. The NewSalesPrice 38952 attribute is a Price 38954 data type. A NewSalesPrice is a new sales price after price modification. The PointOfSaleTransactionPriceModificationReasonCode 38956 attribute is an NOSC_PointOfSaleTransactionPriceModificationReasonCode 38958 data type. A PointOfSaleTransactionPriceModificationReasonCode is a coded representation (e.g., 1 to 4 characters) for the reason of a price modification of a point of sale transaction.

The Tax 38960 package is an <MT>RtlTransacItmComTx 38964 data type. The Tax 38960 package includes a Tax 38962 entity. The Tax 38962 entity includes various attributes, namely a PointOfSaleTransactionTaxID 38966, a PointOfSaleTransactionProductTaxationCharacteristicsCode 38970 and an Amount 38974. The PointOfSaleTransactionTaxID 38966 attribute is an NOSC_PointOfSaleTransactionTaxID 38968 data type. A PointOfSaleTransactionTaxID is an identifier for a tax used in a point of sale transaction. The PointOfSaleTransactionProductTaxationCharacteristicsCode 38970 attribute is an NOSC_PointOfSaleTransaction-ProductTaxationCharacteristicsCode 38972 data type. A PointOfSaleTransactionProductTaxationCharacteristicsCode is a coded representation of the main characteristics that form the basis of a product taxation in a point of sales system. The Amount 38974 attribute is an Amount 38976 data type. An Amount represents a tax amount.

The ItemLink 38978 package is an <MT>RtlTransacItmComItmLnk 38982 data type. The ItemLink 38978 package includes an ItemLink 38980 entity. An ItemLink is a node used for a sales set. The ItemLink 38980 entity includes a PointOfSaleTransactionItemID 38984 attribute. The PointOfSaleTransactionItemID 38984 attribute is a PointOfSaleTransactionItemID 38986 data type. A PointOfSaleTransactionItemID represents a reference to a linked Point Of Sale Transaction Item ID.

The TransactionLink 38988 package is an <MT>RtlTransacItmComTransacLnk 38992 data type. The TransactionLink 38988 package includes a TransactionLink 38990 entity. A TransactionLink is a link to a previous RetailTransaction. For example, a TransactionLink can be used for return processes (e.g., a reference to a transaction from which the returned item originates). The TransactionLink 38990 entity includes various attributes, namely a StoreInternalID 38994, a DeviceID 38998, a TillID 381002, a PointOfSaleTransactionID 381006, a BusinessDate 381010 and a ProcessingPeriod 381014. The StoreInternalID 38994 attribute is an NOSC_StoreInternalID 38996 data type. A StoreInternalID is a proprietary identifier for a store. The DeviceID 38998 attribute is an NOSC_DeviceID 381000 data type. A DeviceID is an identifier (e.g., 1 to 65 characters) for an input or output device in computing. The device can include, for example, a cash register, mobile device or backoffice computer where the point of sale transaction occurred. The TillID 381002 attribute is an NOSC_TillID 381004 data type. A TillID is an identifier (e.g., 1 to 20 characters) for a till. A till is a drawer in a cash register used for money. The PointOfSaleTransactionID 381006 attribute is an NOSC_PointOfSaleTransactionID 381008 data type. A PointOfSaleTransactionID is an identifier for a point of sale transaction. The BusinessDate 381010 attribute is a Date 381012 data type. A BusinessDate represents a date during which a business transaction occurs in a store. The ProcessingPeriod 381014 attribute is a DateTimePeriod 381016 data type. A ProcessingPeriod is a period that is defined by two points in time. These points in time may be expressed by accurate-to-the-second time stamps together with calendar days. The date time period may be determined, for example, by a start time and an end time; a start time with a duration; or a duration with an end time.

The Authorisation 381018 package is an <MT>RtlTransacItmRetAuthsn 381022 data type. The Authorisation 381018 package includes an Authorisation 381020 entity. The Authorisation 381020 entity includes an EmployeeID 381024 attribute. The EmployeeID 381024 attribute is an NOSC_EmployeeID 381026 data type. An EmployeeID is a proprietary identifier for a party, such as an approving employee.

The Party 381028 package is an <MT>RtlTransacItmRetForDelivProdRcpntPty 381032 data type. The Party 381028 package includes various entities, namely a ProductRecipientParty 381030 and a CommissionRecipientParty 381038. The ProductRecipientParty 381030 entity includes a PartyInternalID 381034 attribute. The PartyInternalID 381034 attribute is an NOSC_PartyInternalID 381036 data type. A PartyInternalID is a proprietary identifier for a party, such as a product recipient party. The CommissionRecipientParty 381038 entity includes a PartyInternalID 381042 attribute. The PartyInternalID 381042 attribute is an NOSC_PartyInternalID 381044 data type. A PartyInternalID is a proprietary identifier for a party, such as a commission recipient party.

The Location 381046 package is an <MT>RtlTransacItmRetForDelivShipToLoc 381050 data type. The Location 381046 package includes a ShipToLocation 381048 entity. The ShipToLocation 381048 entity includes a LocationInternalID 381052 attribute. The LocationInternalID 381052 attribute is an NOSC_LocationInternalID 381054 data type. A LocationInternalID is a proprietary identifier for a location, such as a ship from location.

The ReturnForPickup 381056 package is an <MT>RtlTransacItmRetForPkup 381060 data type. The ReturnForPickup 381056 package includes a ReturnForPickup 381058 entity. The ReturnForPickup 381056 package includes various packages, namely a Common 381066, an Authorisation 381224, a Party 381234 and a Location 381252. The ReturnForPickup 381058 entity includes a PointOfSaleTransactionItemReturnReasonCode 381062 attribute. The PointOfSaleTransactionItemReturnReasonCode 381062 attribute is an NOSC_PointOfSaleTransactionItemReturnReasonCode 381064 data type. A PointOfSaleTransactionItemReturnReasonCode is a coded representation (e.g., 1 to 2 characters) of a return reason for a point of sale transaction item.

The Common 381066 package is an <MT>RtlTransacItmCom 381070 data type. The Common 381066 package includes a Common 381068 entity. The Common 381066 package includes various packages, namely a PriceModification 381128, a Tax 381166, an ItemLink 381184 and a TransactionLink 381194. The Common 381068 entity includes various attributes, namely a ProductInternalID 381072, a ProductStandardID 381076, a ProductCategoryInternalID 381080, a ProductCategoryHierarchyTypeCode 381084, a ProductCategoryHierarchyID 381088, a Description 381092, a CostPrice 381096, a ListPrice 381100, a RegularSalesPrice 381104, an ActualSalesPrice 381108, a TotalAmount 381112, a DiscountAmount 381116, a TotalDiscountAmount 381120 and a Quantity 381124. The ProductInternalID 381072 attribute is an NOSC_ProductInternalID 381074 data type. A ProductInternalID is a proprietary identifier for a product. The ProductStandardID 381076 attribute is an NOSC_ProductStandardID 381078 data type. A ProductStandardID is a standardized identifier for a product. In some implementations, the AgencySchemeID is fixed by Provider and Consumer (e.g., typically, nine characters (International Article Number, or EAN) and does not need to be specified). The ProductCategoryInternalID 381080 attribute is an NOSC_ProductCategoryInternalID 381082 data type. A ProductCategoryInternalID is a proprietary identifier for a product category. The ProductCategoryHierarchyTypeCode 381084 attribute is a ProductCategoryHierarchyTypeCode 381086 data type. A ProductCategoryHierarchyTypeCode is a coded representation of the type of a product category hierarchy. The ProductCategoryHierarchyID 381088 attribute is an NOSC_ProductCategoryHierarchyID 381090 data type. A ProductCategoryHierarchyID is a unique identifier for a product category hierarchy. The Description 381092 attribute is a MEDIUM_Description 381094 data type. A Description represents the description of a product or product category. The CostPrice 381096 attribute is a Price 381098 data type. A CostPrice represents a cost price per measure unit code. The ListPrice 381100 attribute is a Price 381102 data type. A ListPrice is a suggested retail price per measure unit code. The RegularSalesPrice 381104 attribute is a Price 381106 data type. A RegularSalesPrice represents a regular sales price per measure unit code. The ActualSalesPrice 381108 attribute is a Price 381110 data type. An ActualSalesPrice represents an actual sales price per measure unit code. The TotalAmount 381112 attribute is an Amount 381114 data type. A TotalAmount is the TotalDiscountAmount minus the DiscountAmount. The DiscountAmount 381116 attribute is an Amount 381118 data type. A DiscountAmount is the sum of all PriceModification amounts. The TotalDiscountAmount 381120 attribute is an Amount 381122 data type. A TotalDiscountAmount is the ActualSalesPrice times the Quantity. The Quantity 381124 attribute is a Quantity 381126 data type. A Quantity is a non-monetary numerical specification of an amount in a unit of measurement.

The PriceModification 381128 package is an <MT>RtlTransachmComPrModif 381132 data type. The PriceModification 381128 package includes a PriceModification 381130 entity. The PriceModification 381130 entity includes various attributes, namely a PointOfSaleTransactionPriceModificationID 381134, a PointOfSaleTransactionPriceModifierTypeCode 381138, a PointOfSaleTransactionPriceModifierID 381142, an Amount 381146, a Percent 381150, a PreviousSalesPrice 381154, a NewSalesPrice 381158 and a PointOfSaleTransactionPriceModificationReasonCode 381162. The PointOfSaleTransactionPriceModificationID 381134 attribute is a PointOfSaleTransactionPriceModificationID 381136 data type. A PointOfSaleTransactionPriceModificationID is an identifier (e.g., 1 to 30 characters) for a price modification during a point of sale transaction. The PointOfSaleTransactionPriceModifierTypeCode 381138 attribute is an NOSC_PointOfSaleTransactionPriceModifierTypeCode 381140 data type. A PointOfSaleTransactionPriceModifierTypeCode is a coded representation (e.g., 1 to 2 characters) of the type of a price modifier of a point of sale transaction. The PointOfSaleTransactionPriceModifierID 381142 attribute is an NOSC_PointOfSaleTransactionPriceModifierID 381144 data type. A PointOfSaleTransactionPriceModifierID is an identifier (e.g., 1 to 32 characters) for a price modifier during a point of sale transaction. The Amount 381146 attribute is an Amount 381148 data type. An Amount represents the amount of a price modification. The Percent 381150 attribute is a Percent 381152 data type. A Percent represents the percent of a price modification. The PreviousSalesPrice 381154 attribute is a Price 381156 data type. A PreviousSalesPrice represents a previous sales price before price modification. The NewSalesPrice 381158 attribute is a Price 381160 data type. A NewSalesPrice represents a new sales price after price modification. The PointOfSaleTransactionPriceModificationReasonCode 381162 attribute is an NOSC_PointOfSaleTransactionPriceModificationReasonCode 381164 data type. A PointOfSaleTransactionPriceModificationReasonCode is a coded representation (e.g., 1 to 4 characters) for the reason of a price modification of a point of sale transaction.

The Tax 381166 package is an <MT>RtlTransacItmComTx 381170 data type. The Tax 381166 package includes a Tax 381168 entity. The Tax 381168 entity includes various attributes, namely a PointOfSaleTransactionTaxID 381172, a PointOfSaleTransactionProductTaxationCharacteristicsCode 381176 and an Amount 381180. The PointOfSaleTransactionTaxID 381172 attribute is an NOSC_PointOfSaleTransactionTaxID 381174 data type. A PointOfSaleTransactionTaxID is an identifier for a tax used in a point of sale transaction. The PointOfSaleTransactionProductTaxationCharacteristicsCode 381176 attribute is an NOSC_PointOfSaleTransactionProductTaxationCharacteristicsCode 381178 data type. A PointOfSaleTransactionProductTaxationCharacteristicsCode is a coded representation of the main characteristics that form the basis of a product taxation in a point of sales system. The Amount 381180 attribute is an Amount 381182 data type. An Amount represents a tax amount.

The ItemLink 381184 package is an <MT>RtlTransacItmComItmLnk 381188 data type. The ItemLink 381184 package includes an ItemLink 381186 entity. An ItemLink is a node used for a sales set. The ItemLink 381186 entity includes a PointOfSaleTransactionItemID 381190 attribute. The PointOfSaleTransactionItemID 381190 attribute is a PointOfSaleTransactionItemID 381192 data type. A PointOfSaleTransactionItemID is a reference to a linked Point Of Sale Transaction Item ID.

The TransactionLink 381194 package is an <MT>RtlTransacItmComTransacLnk 381198 data type. The TransactionLink 381194 package includes a TransactionLink 381196 entity. A TransactionLink is a link to a previous RetailTransaction. For example, TransactionLink can be used for return processes (e.g., as a reference to a transaction from which the returned item originates). The TransactionLink 381196 entity includes various attributes, namely a StoreInternalID 381200, a DeviceID 381204, a TillID 381208, a PointOfSaleTransactionID 381212, a BusinessDate 381216 and a ProcessingPeriod 381220. The StoreInternalID 381200 attribute is an NOSC_StoreInternalID 381202 data type. A StoreInternalID is a proprietary identifier for a store. The DeviceID 381204 attribute is an NOSC_DeviceID 381206 data type. A DeviceID is an identifier (e.g., 1 to 65 characters) for an input or output device in computing. The device can include, for example, a cash register, mobile device or back-office computer where the point of sale transaction occurred. The TillID 381208 attribute is an NOSC_TillID 381210 data type. A TillID is an identifier (e.g., 1 to 20 characters) for a till. A till is a drawer in a cash register used for money. The PointOfSaleTransactionID 381212 attribute is an NOSC_PointOfSaleTransactionID 381214 data type. A PointOfSaleTransactionID is an identifier for a point of sale transaction. The BusinessDate 381216 attribute is a Date 381218 data type. A BusinessDate represents a date during which a business transaction occurs in a store. The ProcessingPeriod 381220 attribute is a DateTimePeriod 381222 data type. A ProcessingPeriod is a period that may be defined by two points in time. These points in time may be expressed by accurate-to-the-second time stamps together with calendar days. The date time period may be determined, for example, by a start time and an end time; a start time with a duration; or a duration with an end time.

The Authorisation 381224 package is an <MT>RtlTransacItmRetAuthsn 381228 data type. The Authorisation 381224 package includes an Authorisation 381226 entity. The Authorisation 381226 entity includes an EmployeeID 381230 attribute. The EmployeeID 381230 attribute is an NOSC_EmployeeID 381232 data type. An EmployeeID is a proprietary identifier for a party, such as an approving employee.

The Party 381234 package is an <MT>RtlTransacItmRetForPkupBuyrPty 381238 data type. The Party 381234 package includes various entities, namely a BuyerParty 381236 and a CommissionRecipientParty 381244. The BuyerParty 381236 entity includes a PartyInternalID 381240 attribute. The PartyInternalID 381240 attribute is an NOSC_PartyInternalID 381242 data type. A PartyInternalID is a proprietary identifier for a party, such as a buyer party. The CommissionRecipientParty 381244 entity includes a PartyInternalID 381248 attribute. The PartyInternalID 381248 attribute is an NOSC_PartyInternalID 381250 data type. A PartyInternalID is a proprietary identifier for a party, such as a commission recipient party.

The Location 381252 package is an <MT>RtlTransacItmRetForPickupSipToLoc 381256 data type. The Location 381252 package includes a ShipToLocation 381254 entity. The ShipToLocation 381254 entity includes a LocationInternalID 381258 attribute. The LocationInternalID 381258 attribute is an NOSC_LocationInternalID 381260 data type. A LocationInternalID is a proprietary identifier for a location, such as a ship from location.

The Void 381262 package is an <MT>RtlTransacItmVoid 381266 data type. The Void 381262 package includes a Void 381264 entity. The Void 381264 entity includes various attributes, namely a PointOfSaleTransactionItemID 381268 and a Quantity 381272. The PointOfSaleTransactionItemID 381268 attribute is a PointOfSaleTransactionItemID 381270 data type. A PointOfSaleTransactionItemID represents an ItemID of the voided RetailTransactionItem. The Quantity 381272 attribute is a Quantity 381274 data type. A Quantity represents the quantity of a voided RetailTransactionItem.

The PaymentOnAccount 381276 package is an <MT>RtlTransacItmPaytOnAcct 381280 data type. The PaymentOnAccount 381276 package includes a PaymentOnAccount 381278 entity. The PaymentOnAccount 381276 package includes a Party 381298 package. The PaymentOnAccount 381278 entity includes various attributes, namely a Business TransactionDocumentID 381282, a BusinessTransactionDocumentProcessingTypeCode 381286, a CustomerID 381290 and an Amount 381294. The BusinessTransactionDocumentID 381282 attribute is an NOSC_BusinessTransactionDocumentID 381284 data type. A BusinessTransactionDocumentID is a unique identifier for a business transaction document. The Business TransactionDocumentProcessingTypeCode 381286 attribute is a BusinessTransactionDocumentProcessingTypeCode 381288 data type. A BusinessTransactionDocumentProcessingTypeCode is a coded representation of the processing of a business document. The CustomerID 381290 attribute is an NOSC_CustomerID 381292 data type. A CustomerID is a proprietary identifier for a party, such as a customer involved in the payment on an account. The Amount 381294 attribute is an Amount 381296 data type. An Amount represents an amount that has been paid on an account.

The Party 381298 package is an <MT>RtlTransacItmCommsnRcpntPty 381302 data type. The Party 381298 package includes a CommissionRecipientParty 381300 entity. The CommissionRecipientParty 381300 entity includes a PartyInternalID 381304 attribute. The PartyInternalID 381304 attribute is an NOSC_PartyInternalID 381306 data type. A PartyInternalID is a proprietary identifier for a party, such as a commission recipient party.

The PriceModification 381308 package is an <MT>RtlTransacPrModif 381312 data type. The PriceModification 381308 package includes a PriceModification 381310 entity. The PriceModification 381310 entity includes various attributes, namely a PointOfSaleTransactionPriceModificationID 381314, a PointOfSaleTransactionPriceModifierTypeCode 381318, a PointOfSaleTransactionPriceModifierID 381322, an Amount 381326, a Percent 381330, a PreviousSalesPrice 381334, a NewSalesPrice 381338 and a PointOfSaleTransactionPriceModificationReasonCode 381342. The PointOfSaleTransactionPriceModificationID 381314 attribute is a PointOfSaleTransactionPriceModificationID 381316 data type. A PointOfSaleTransactionPriceModificationID is an identifier (e.g., 1 to 30 characters) for a price modification during a point of sale transaction. The PointOfSaleTransactionPriceModifierTypeCode 381318 attribute is an NOSC_PointOfSaleTransactionPriceModifierTypeCode 381320 data type. A PointOfSaleTransactionPriceModifierTypeCode is a coded representation (e.g., 1 to 2 characters) of the type of a price modifier of a point of sale transaction. The PointOfSaleTransactionPriceModifierID 381322 attribute is an NOSC_PointOfSaleTransactionPriceModifierID 381324 data type. A PointOfSaleTransactionPriceModifierID is an identifier (e.g., 1 to 32 characters) for a price modifier during a point of sale transaction. The Amount 381326 attribute is an Amount 381328 data type. An Amount represents the amount of a price modification. The Percent 381330 attribute is a Percent 381332 data type. A Percent represents the percent of a price modification. The PreviousSalesPrice 381334 attribute is a Price 381336 data type. A PreviousSalesPrice represents a previous sales price before price modification. The NewSalesPrice 381338 attribute is a Price 381340 data type. A NewSalesPrice represents a new sales after modification. The price price PointOfSaleTransactionPriceModificationReasonCode 381342 attribute is an NOSC_PointOfSaleTransactionPriceModificationReasonCode 381344 data type. A PointOfSaleTransactionPriceModificationReasonCode is a coded representation (e.g., 1 to 4 characters) for the reason of a price modification of a point of sale transaction.

The Tax 381346 package is an <MT>RtlTransacTx 381350 data type. The Tax 381346 package includes a Tax 381348 entity. A Tax represents a retail transaction header tax segment. The Tax 381348 entity includes various attributes, namely a PointOfSaleTransactionTaxID 381352, a PointOfSaleTransactionProductTaxationCharacteristicsCode 381356 and an Amount 381360. The PointOfSaleTransactionTaxID 381352 attribute is an NOSC_PointOfSaleTransactionTaxID 381354 data type. A PointOfSaleTransactionTaxID is an identifier for a tax used in a point of sale transaction. The PointOfSaleTransactionProductTaxationCharacteristicsCode 381356 attribute is an NOSC_PointOfSaleTransactionProductTaxationCharacteristicsCode 381358 data type. A PointOfSaleTransactionProductTaxationCharacteristicsCode is a coded representation of the main characteristics that form the basis of a product taxation in a point of sales system. The Amount 381360 attribute is an Amount 381362 data type. An Amount represents the total tax amount for one tax type code within an entire retail transaction.

The Tender 381364 package is an <MT>RtlTransacTndr 381368 data type. The Tender 381364 package includes a Tender 381366 entity. The Tender 381364 package includes various packages, namely a Change 381394, an Authorisation 381408, a Cheque 381448, a CreditCard 381474, a DebitCard 381500, a TravellersCheque 381526 and a GiftCard 381552. The Tender 381366 entity includes various attributes, namely a PointOfSaleTransactionTenderID 381370, a PointOfSaleTransactionTenderTypeCode 381374, a VoidIndicator 381378, an Amount 381382, a TipAmount 381386 and a CashbackAmount 381390. The PointOfSaleTransactionTenderID 381370 attribute is an NOSC_PointOfSaleTransactionTenderID 381372 data type. A PointOfSaleTransactionTenderID is an identifier for a tender during a point of sale transaction. The PointOfSaleTransactionTenderTypeCode 381374 attribute is an NOSC_PointOfSaleTransaction- TenderTypeCode 381376 data type. A PointOfSaleTransactionTenderTypeCode is a coded representation (e.g., 1 to 4 characters) of the type of the tender of a transaction at a point of sale. The VoidIndicator 381378 attribute is an Indicator 381380 data type. A VoidIndicator is a representation of a situation that has exactly two mutually exclusive Boolean values. If this indicator is set, it indicates that a transaction is invalid. The Amount 381382 attribute is an Amount 381384 data type. An Amount represents an amount of a tender. The TipAmount 381386 attribute is an Amount 381388 data type. A TipAmount represents the amount for a tip. The CashbackAmount 381390 attribute is an Amount 381392 data type. A CashbackAmount represents an amount that was passed back as cash.

The Change 381394 package is an <MT>RtlTransacTndrChg 381398 data type. The Change 381394 package includes a Change 381396 entity. The Change 381396 entity includes various attributes, namely a PointOfSaleTransactionTenderTypeCode 381400 and an Amount 381404. The PointOfSaleTransactionTenderTypeCode 381400 attribute is an NOSC_PointOfSaleTransactionTenderTypeCode 381402 data type. A PointOfSaleTransactionTenderTypeCode is a coded representation (e.g., 1 to 4 characters) of the type of the tender of a transaction at a point of sale. The Amount 381404 attribute is an Amount 381406 data type. An Amount represents a tender change amount.

The Authorisation 381408 package is an <MT>RtlTransacTndrAuthsn 381412 data type. The Authorisation 381408 package includes an Authorisation 381410 entity. An Authorisation is an authorization in the case of a credit card, debit card, or check payment. The Authorisation 381410 entity includes various attributes, namely a PaymentCardAuthorisationMethodCode 381414, a ConfirmedIndicator 381420, a RequestedAmount 381424, an AuthorisedAmount 381428, a PaymentCardPaymentID 381432, an AuthorisationTimePoint 381436, a PaymentCardPaymentAuthorisationPartyID 381440 and a MagnetStripeReaderDeviceID 381444. The PaymentCardAuthorisationMethodCode 381414 attribute is an NOSC_PaymentCardPaymentAuthorisationMethodCode 381418 data type. A PaymentCardAuthorisationMethodCode is a coded representation of the method of an authorization of a payment card payment. The ConfirmedIndicator 381420 attribute is an Indicator 381422 data type. A ConfirmedIndicator indicates whether an authorization was confirmed. The RequestedAmount 381424 attribute is an Amount 381426 data type. A RequestedAmount represents an amount that was requested for Authorization. The AuthorisedAmount 381428 attribute is an Amount 381430 data type. An AuthorisedAmount represents an amount that was authorized during an authorization. The PaymentCardPaymentID 381432 attribute is an NOSC_PaymentCardPaymentID 381434 data type. A PaymentCardPaymentID is an identifier for a card payment that is assigned by a clearing house for card payments. The AuthorisationTimePoint 381436 attribute is a TIMEZONEINDEPENDENT_DateTime 381438 data type. An AuthorisationTimePoint is the time point at which an authorization is carried out. The PaymentCardPaymentAuthorisationPartyID 381440 attribute is an NOSC_PaymentCardPaymentAuthorisationPartyID 381442 data type. A PaymentCardPaymentAuthorisationPartyID is a name (e.g., 1 to 30 characters) of the bank or organization that issues a payment card. The MagnetStripeReaderDeviceID 381444 attribute is an NOSC_DeviceID 381446 data type. A MagnetStripeReaderDeviceID is an identifier (e.g., 1 to 65 characters) for an input or output device in computing. A magnet stripe reader is a reader for a magnet stripe for payment means such as payment cards or check cards.

The Cheque 381448 package is an <MT>RtlTransacTndrChq 381452 data type. The Cheque 381448 package includes a Cheque 381450 entity. The Cheque 381450 entity includes various attributes, namely a BankStandardID 381454, a BankInternalID 381458, a BankAccountStandardID 381462, a BankAccountInternalID 381466 and an ID 381470. The BankStandardID 381454 attribute is a BankStandardID 381456 data type. A BankStandardID is a standardized identifier (e.g., 8 to 11 characters) for a bank according to the worldwide identification scheme of the S.W.I.F.T. (Society for Worldwide Interbank Financial Telecommunication) organization (e.g., Bank Identifier Code or, BIC code). The BankInternalID 381458 attribute is an NOSC_BankInternalID 381460 data type. A BankInternalID is a proprietary identifier (e.g., 1 to 18 characters) for a bank. The BankAccountStandardID 381462 attribute is a BankAccountStandardID 381464 data type. A BankAccountStandardID is an identifier (e.g., 1 to 34 characters) for an International Bank Account Number (IBAN) (i.e., a standardized identifier for a bank account). The BankAccountInternalID 381466 attribute is an NOSC_BankAccountInternalID 381468 data type. A BankAccountInternalID is a proprietary identifier (e.g., 1 to 32 characters) for a bank account. The ID 381470 attribute is an NOSC_ChequeID 381472 data type. An ID is a unique identifier (e.g., 1 to 20 characters) for a check.

The CreditCard 381474 package is an <MT>RtlTransacTndrCrdtCard 381478 data type. The CreditCard 381474 package includes a CreditCard 381476 entity. The CreditCard 381476 entity includes various attributes, namely a PaymentCardID 381480, a PaymentCardTypeCode 381484, a PaymentCardHolderName 381488, a ValidityPeriod 381492 and a PaymentCardDataOriginTypeCode 381496. The PaymentCardID 381480 attribute is a PaymentCardID 381482 data type. A PaymentCardID is a unique identifier of a payment card that is assigned by the issuer of the payment card. The PaymentCardTypeCode 381484 attribute is a PaymentCardTypeCode 381486 data type. A PaymentCardTypeCode is a coded representation of the type of a payment card. The PaymentCardHolderName 381488 attribute is a LANGUAGEINDEPENDENT_MEDIUM_Name 381490 data type. A PaymentCardHolderName represents the name of a payment card holder. The payment card holder can be a person or a company. First and last names are usually specified for persons. The ValidityPeriod 381492 attribute is a CLOSED_DatePeriod 381494 data type. A ValidityPeriod represents a validity period of a credit card that is defined by two points in time. These points in time may be expressed in calendar days. CLOSED_DatePeriod includes the start and the end time-point. The PaymentCardDataOriginTypeCode 381496 attribute is an NOSC_PaymentCardDataOriginTypeCode 381498 data type. A PaymentCardDataOriginTypeCode is a coded representation of the origin type of payment card data, and can represent, for example, Manual Entry, Card Reader, or Internet.

The DebitCard 381500 package is an <MT>RtlTransacTndrDebitCard 381504 data type. The DebitCard 381500 package includes a DebitCard 381502 entity. The DebitCard 381502 entity includes various attributes, namely a BankStandardID 381506, a BankInternalID 381510, a BankAccountStandardID 381514, a BankAccountInternalID 381518 and a PaymentCardHolderName 381522. The BankStandardID 381506 attribute is a BankStandardID 381508 data type. A BankStandardID is a standardized identifier (e.g., 8 to 11 characters) for a bank according to the worldwide identification scheme of the S.W.I.F.T. (Society for Worldwide Interbank Financial Telecommunication) organization (e.g., Bank Identifier Code or, BIC code). The BankInternalID 381510 attribute is an NOSC_BankInternalID 381512 data type. A BankInternalID is a proprietary identifier (e.g., 1 to 18 characters) for a bank. The BankAccountStandardID 381514 attribute is a BankAccountStandardID 381516 data type. A BankAccountStandardID is an identifier (e.g., 1 to 34 characters) for an International Bank Account Number (IBAN) (i.e., a standardized identifier for a bank account). The BankAccountInternalID 381518 attribute is an NOSC_BankAccountInternalID 381520 data type. A BankAccountInternalID is a proprietary identifier (e.g., 1 to 32 characters) for a bank account. The PaymentCardHolderName 381522 attribute is a LANGUAGEINDEPENDENT_MEDIUM_Name 381524 data type. A PaymentCardHolderName represents the name of a payment card holder. The payment card holder can be a person or a company. First and last names are usually specified for persons.

The TravellersCheque 381526 package is an <MT>RtlTransacTndrTrvlrChq 381530 data type. The TravellersCheque 381526 package includes a TravellersCheque 381528 entity. The TravellersCheque 381528 entity includes various attributes, namely a BankStandardID 381532, a BankInternalID 381536, a BankAccountStandardID 381540, a BankAccountInternalID 381544 and an ID 381548. The BankStandardID 381532 attribute is a BankStandardID 381534 data type. A BankStandardID is a standardized identifier (e.g., 8 to 11 characters) for a bank according to the worldwide identification scheme of the S.W.I.F.T. (Society for Worldwide Interbank Financial Telecommunication) organization (e.g., Bank Identifier Code or, BIC code). The BankInternalID 381536 attribute is an NOSC_BankInternalID 381538 data type. A BankInternalID is a proprietary identifier (e.g., 1 to 18 characters) for a bank. The BankAccountStandardID 381540 attribute is a BankAccountStandardID 381542 data type. A BankAccountStandardID is an identifier (e.g., 1 to 34 characters) for an International Bank Account Number (IBAN) (i.e., a standardized identifier for a bank account). The BankAccountInternalID 381544 attribute is an NOSC_BankAccountInternalID 381546 data type. A BankAccountInternalID is a proprietary identifier (e.g., 1 to 32 characters) for a bank account. The ID 381548 attribute is an NOSC_ChequeID 381550 data type. An ID is a unique identifier (e.g., 1 to 20 characters) for a check.

The GiftCard 381552 package is an <MT>RtlTransacTndrGftCard 381556 data type. The GiftCard 381552 package includes a GiftCard 381554 entity. The GiftCard 381554 entity includes various attributes, namely a PaymentCardID 381558 and an ExpirationDate 381562. The PaymentCardID 381558 attribute is an NOSC_PaymentCardID 381560 data type. A PaymentCardID is a unique identifier of a payment card that is assigned by the issuer of the payment card. The ExpirationDate 381562 attribute is a Date 381564 data type. An ExpirationDate represents a date at which a gift card expires.

The TransactionLink 381566 package is an <MT>RtlTransacTransacLnk 381570 data type. The TransactionLink 381566 package includes a TransactionLink 381568 entity. The TransactionLink 381568 entity includes various attributes, namely a StoreInternalID 381572, a DeviceID 381576, a TillID 381580, a PointOfSaleTransactionID 381584, a BusinessDate 381588 and a ProcessingPeriod 381592. The StoreInternalID 381572 attribute is an NOSC_StoreInternalID 381574 data type. A StoreInternalID is a proprietary identifier for a store. The DeviceID 381576 attribute is an NOSC_DeviceID 381578 data type. A DeviceID is an identifier (e.g., 1 to 65 characters) for an input or output device in computing. The device can include, for example, a cash register, mobile device or backoffice computer where a point of sale transaction occurred. The TillID 381580 attribute is an NOSC_TillID 381582 data type. A TillID is an identifier (e.g., 1 to 20 characters) for a till. A till is a drawer in a cash register used for money. The PointOfSaleTransactionID 381584 attribute is an NOSC_PointOfSaleTransactionID 381586 data type. A PointOfSaleTransactionID is an identifier for a point of sale transaction. The BusinessDate 381588 attribute is a Date 381590 data type. A BusinessDate represents a date during which a business transaction occurs in a store. The ProcessingPeriod 381592 attribute is a DateTimePeriod 381594 data type. A ProcessingPeriod is a period that is defined by two points in time. These points in time may be expressed by accurate-to-the-second time stamps together with calendar days. The date time period may be determined, for example, by a start time and an end time; a start time with a duration; or a duration with an end time.

The Party 381596 package is an <MT>RtlTransacBuyrPty 381600 data type. The Party 381596 package includes various entities, namely a BuyerParty 381598 and a ProductReceipientParty 381610. The BuyerParty 381598 entity includes various attributes, namely a PartyInternalID 381602 and an EmployeeID 381606. The PartyInternalID 381602 attribute is an NOSC_PartyInternalID 381604 data type. A PartyInternalID is a proprietary identifier for a party, such as the buyer party. The EmployeeID 381606 attribute is an NOSC_EmployeeID 381608 data type. An EmployeeID is a proprietary identifier for a party, such as a purchasing employee. EmployeeID indicates an employee sale. The ProductReceipientParty 381610 entity includes a PartyInternalID 381614 attribute. The PartyInternalID 381614 attribute is an NOSC_PartyInternalID 381616 data type. A PartyInternalID is a proprietary identifier for a party such as a product recipient party.

The Total 381618 package is an <MT>RtlTransacTot 381622 data type. The Total 381618 package includes a Total 381620 entity. The Total 381620 entity includes various attributes, namely a GrossTotalAmount 381624, a NetTotalAmount 381628 and a TaxTotalAmount 381632. The GrossTotalAmount 381624 attribute is an Amount 381626 data type. A GrossTotalAmount represents a total gross amount. The NetTotalAmount 381628 attribute is an Amount 381630 data type. A NetTotalAmount represents a total net amount. The TaxTotalAmount 381632 attribute is an Amount 381634 data type. A TaxTotalAmount represents a total tax amount.

The FinancialTransaction 381636 package is an <MT>FinTransac 381640 data type. The FinancialTransaction 381636 package includes a FinancialTransaction 381638 entity. The FinancialTransaction 381636 package includes an Item 381642 package.

The Item 381642 package is an <MT>FinTransacItm 381646 data type. The Item 381642 package includes an Item 381644 entity. The Item 381642 package includes various packages, namely a Deposit 381652, a PaidIn 381670, a PaidOut 381688, a TenderLoan 381706, a TenderPickup 381724 and a TenderAdjustment 381742. The Item 381644 entity includes a PointOfSaleTransactionItemID 381648 attribute. The PointOfSaleTransactionItemID 381648 attribute is a PointOfSaleTransactionItemID 381650 data type. A PointOfSaleTransactionItemID is an identifier for an item within a point of sale transaction.

The Deposit 381652 package is an <MT>FinTransacItmDep 381656 data type. The Deposit 381652 package includes a Deposit 381654 entity. The Deposit 381654 entity includes various attributes, namely a BankAccountStandardID 381658, a BankAccountInternalID 381662 and an Amount 381666. The BankAccountStandardID 381658 attribute is a BankAccountStandardID 381660 data type. A BankAccountStandardID is an identifier (e.g., 1 to 34 characters) for an International Bank Account Number (IBAN) (i.e., a standardized identifier for a bank account). The BankAccountInternalID 381662 attribute is an NOSC_BankAccountInternalID 381664 data type. A BankAccountInternalID is a proprietary identifier (e.g., 1 to 32 characters) for a bank account. The Amount 381666 attribute is an Amount 381668 data type. An Amount represents a deposit amount.

The PaidIn 381670 package is an <MT>FinTransacItmPaidIn 381674 data type. The PaidIn 381670 package includes a PaidIn 381672 entity. The PaidIn 381672 entity includes various attributes, namely a PointOfSaleTransactionTenderTypeCode 381676, an Amount 381680 and a PointOfSaleTransactionFinancialTransactionReasonCode 381684. The PointOfSaleTransactionTenderTypeCode 381676 attribute is an NOSC_PointOfSaleTransactionTenderTypeCode 381678 data type. A PointOfSaleTransactionTenderTypeCode is a coded representation (e.g., 1 to 4 characters) of the type of the tender of a transaction at a point of sale. The Amount 381680 attribute is an Amount 381682 data type. An Amount represents a paid-in amount. The PointOfSaleTransactionFinancialTransactionReasonCode 381684 attribute is an NOSC_PointOfSaleTransactionFinancialTransactionReasonCode 381686 data type. A PointOfSaleTransactionFinancialTransactionReasonCode is a coded representation for the reason for a financial transaction of a point of sale transaction.

The PaidOut 381688 package is an <MT>FinTransacItmPaidOut 381692 data type. The PaidOut 381688 package includes a PaidOut 381690 entity. The PaidOut 381690 entity includes various attributes, namely a PointOfSaleTransactionTenderTypeCode 381694, an Amount 381698 and a PointOfSaleTransactionFinancialTransactionReasonCode 381702. The PointOfSaleTransactionTenderTypeCode 381694 attribute is an NOSC_PointOfSaleTransactionTenderTypeCode 381696 data type. A PointOfSaleTransactionTenderTypeCode is a coded representation (e.g., 1 to 4 characters) of the type of the tender of a transaction at the point of sale. The Amount 381698 attribute is an Amount 381700 data type. An Amount represents a paid-out amount. The PointOfSaleTransactionFinancialTransactionReasonCode 381702 attribute is an NOSC_PointOfSaleTransactionFinancialTransactionReasonCode 381704 data type. A PointOfSaleTransactionFinancialTransactionReasonCode is a coded representation for the reason for a financial transaction of a point of sale transaction.

The TenderLoan 381706 package is an <MT>FinTransacItmTndrLoan 381710 data type. The TenderLoan 381706 package includes a TenderLoan 381708 entity. The TenderLoan 381708 entity includes various attributes, namely a PointOfSaleTransactionTenderTypeCode 381712, an Amount 381716 and a PointOfSaleTransactionFinancialTransactionReasonCode 381720. The PointOfSaleTransactionTenderTypeCode 381712 attribute is an NOSC_PointOfSaleTransactionTenderTypeCode 381714 data type. A PointOfSaleTransactionTenderTypeCode is a coded representation (e.g., 1 to 4 characters) of the type of the tender of a transaction at a point of sale. The Amount 381716 attribute is an Amount 381718 data type. An Amount represents a tender loan amount. The PointOfSaleTransactionFinancialTransactionReasonCode 381720 attribute is an NOSC_PointOfSaleTransactionFinancialTransactionReasonCode 381722 data type. A PointOfSaleTransactionFinancialTransactionReasonCode is a coded representation for the reason for a financial transaction of a point of sale transaction.

The TenderPickup 381724 package is an <MT>FinTransacItmTndrPkup 381728 data type. The TenderPickup 381724 package includes a TenderPickup 381726 entity. The TenderPickup 381726 entity includes various attributes, namely a PointOfSaleTransactionTenderTypeCode 381730, an Amount 381734 and a PointOfSaleTransactionFinancialTransactionReasonCode 381738. The PointOfSaleTransactionTenderTypeCode 381730 attribute is an NOSC_PointOfSaleTransactionTenderTypeCode 381732 data type. A PointOfSaleTransactionTenderTypeCode is a coded representation (e.g., 1 to 4 characters) of the type of the tender of a transaction at a point of sale. The Amount 381734 attribute is an Amount 381736 data type. An Amount represents a tender pickup amount. The PointOfSaleTransactionFinancialTransactionReasonCode 381738 attribute is an NOSC_PointOfSaleTransactionFinancialTransactionReasonCode 381740 data type. A PointOfSaleTransactionFinancialTransactionReasonCode is a coded representation for the reason for a financial transaction of a point of sale transaction.

The TenderAdjustment 381742 package is an <MT>FinTransacItmTndrAdjmt 381746 data type. The TenderAdjustment 381742 package includes a TenderAdjustment 381744 entity. The TenderAdjustment 381744 entity includes various attributes, namely a PointOfSaleTransactionTenderTypeCode 381748, an Amount 381752 and a PointOfSaleTransactionFinancialTransactionReasonCode 381756. The PointOfSaleTransactionTenderTypeCode 381748 attribute is an NOSC_PointOfSaleTransactionTenderTypeCode 381750 data type. A PointOfSaleTransactionTenderTypeCode is a coded representation (e.g., 1 to 4 characters) of the type of the tender of a transaction at a point of sale. The Amount 381752 attribute is an Amount 381754 data type. An Amount represents a tender adjustment amount. The PointOfSaleTransactionFinancialTransactionReasonCode 381756 attribute is an NOSC_PointOfSaleTransactionFinancialTransactionReasonCode 381758 data type. A PointOfSaleTransactionFinancialTransactionReasonCode is a coded representation for the reason for a financial transaction of a point of sale transaction.

The ControlTransaction 381760 package is an <MT>CtrlTransac 381764 data type. The ControlTransaction 381760 package includes a ControlTransaction 381762 entity. The ControlTransaction 381760 package includes an Item 381766 package.

The Item 381766 package is an <MT>CtrlTransacItm 381770 data type. The Item 381766 package includes an Item 381768 entity. The Item 381768 entity includes various attributes, namely a PointOfSaleTransactionItemID 381772 and a PointOfSaleTransactionControlTransactionReasonCode 381776. The PointOfSaleTransactionItemID 381772 attribute is a PointOfSaleTransactionItemID 381774 data type. A PointOfSaleTransactionItemID is an identifier for an item within a point of sale transaction. The PointOfSaleTransactionControlTransactionReasonCode 381776 attribute is an NOSC_PointOfSaleTransactionControlTransactionReasonCode 381778 data type. A PointOfSaleTransactionControlTransactionReasonCode is a coded representation of the reason of a control transaction of a point of sale transaction.

FIGS. 39-1 through 39-103 show an example configuration of an Element Structure that includes a PointOfSaleTransactionERPBulkCreateRequestMessage 39000 package. The data types of the various packages, entities, and attributes mentioned below are described above in more detail with respect to FIG. 38. The PointOfSaleTransactionERPBulkCreateRequestMessage 39000 package includes a PointOfSaleTransactionERPBulkCreateRequestMessage 39002 entity. The PointOfSaleTransactionERPBulkCreateRequestMessage 39000 package includes various packages, namely a MessageHeader 39004, and a PointOfSaleTransactionERPCreateRequestMessage 39010.

The MessageHeader 39004 package includes a MessageHeader 39006 entity. The MessageHeader 39006 entity has a cardinality of 1 39008 meaning that for each instance of the MessageHeader 39004 package there is one MessageHeader 39006 entity. The PointOfSaleTransactionERPCreateRequestMessage 39010 package includes a PointOfSaleTransactionERPCreateRequestMessage 39012 entity. The PointOfSaleTransactionERPCreateRequestMessage 39010 package includes various packages, namely a MessageHeader 39016 and a PointOfSaleTransaction 39022. The PointOfSaleTransactionERPCreateRequestMessage 39012 entity has a cardinality of 1 . . . n 39014 meaning that for each instance of the PointOfSaleTransactionERPCreateRequestMessage 39010 package there are one or more PointOfSaleTransactionERPCreateRequestMessage 39012 entities. The MessageHeader 39016 package includes a MessageHeader 39018 entity. The MessageHeader 39018 entity has a cardinality of 1 39020 meaning that for each instance of the MessageHeader 39016 package there is one MessageHeader 39018 entity.

The PointOfSaleTransaction 39022 package includes a PointOfSaleTransaction 39024 entity. The PointOfSaleTransaction 39022 package includes various packages, namely an Operator 39060, a RetailTransaction 39070, a FinancialTransaction 391630 and a ControlTransaction 391754. The PointOfSaleTransaction 39024 entity has a cardinality of 1 39026 meaning that for each instance of the PointOfSaleTransaction 39022 package there is one PointOfSaleTransaction 39024 entity. The PointOfSaleTransaction 39024 entity includes various attributes, namely a StoreInternalID 39028, a DeviceID 39032, a TillID 39036, an ID 39040, a BusinessDate 39044, a ProcessingPeriod 39048, a CurrencyCode 39052 and a TrainingModeActiveIndicator 39056. The StoreInternalID 39028 attribute has a cardinality of 1 39030 meaning that for each instance of the PointOfSaleTransaction 39024 entity there is one StoreInternalID 39028 attribute. The DeviceID 39032 attribute has a cardinality of 1 39034 meaning that for each instance of the PointOfSaleTransaction 39024 entity there is one DeviceID 39032 attribute. The TillID 39036 attribute has a cardinality of 0 . . . 1 39038 meaning that for each instance of the PointOfSaleTransaction 39024 entity there may be one TillID 39036 attribute. The ID 39040 attribute has a cardinality of 1 39042 meaning that for each instance of the PointOfSaleTransaction 39024 entity there is one ID 39040 attribute. The BusinessDate 39044 attribute has a cardinality of 1 39046 meaning that for each instance of the PointOfSaleTransaction 39024 entity there is one BusinessDate 39044 attribute. The ProcessingPeriod 39048 attribute has a cardinality of 0 . . . 1 39050 meaning that for each instance of the PointOfSaleTransaction 39024 entity there may be one ProcessingPeriod 39048 attribute. The CurrencyCode 39052 attribute has a cardinality of 0 . . . 1 39054 meaning that for each instance of the PointOfSaleTransaction 39024 entity there may be one CurrencyCode 39052 attribute. The TrainingModeActiveIndicator 39056 attribute has a cardinality of 1 39058 meaning that for each instance of the PointOfSaleTransaction 39024 entity there is one TrainingModeActiveIndicator 39056 attribute.

The Operator 39060 package includes an Operator 39062 entity. The Operator 39062 entity has a cardinality of 0 . . . n 39064 meaning that for each instance of the Operator 39060 package there may be one or more Operator 39062 entities. The Operator 39062 entity includes an EmployeeID 39066 attribute. The EmployeeID 39066 attribute has a cardinality of 1 39068 meaning that for each instance of the Operator 39062 entity there is one EmployeeID 39066 attribute.

The RetailTransaction 39070 package includes a RetailTransaction 39072 entity. The RetailTransaction 39070 package includes various packages, namely an Item 39080, a PriceModification 391302, a Tax 391340, a Tender 391358, a TransactionLink 391560, a Party 391590 and a Total 391612. The RetailTransaction 39072 entity has a cardinality of 0 . . . 1 39074 meaning that for each instance of the RetailTransaction 39070 package there may be one RetailTransaction 39072 entity. The RetailTransaction 39072 entity includes a LifeCycleStatusCode 39076 attribute. The LifeCycleStatusCode 39076 attribute has a cardinality of 1 39078 meaning that for each instance of the RetailTransaction 39072 entity there is one LifeCycleStatusCode 39076 attribute.

The Item 39080 package includes an Item 39082 entity. The Item 39080 package includes various packages, namely a Sale 39098, a SaleForDelivery 39272, a SaleForPickup 39464, a Return 39656, a ReturnForDelivery 39844, a ReturnForPickup 391050, a Void 391256 and a PaymentOnAccount 391270. The Item 39082 entity has a cardinality of 1 . . . n 39084 meaning that for each instance of the Item 39080 package there are one or more Item 39082 entities. The Item 39082 entity includes various attributes, namely a PointOfSaleTransactionItemID 39086, a ProcessingPeriod 39090 and a VoidIndicator 39094. The PointOfSaleTransactionItemID 39086 attribute has a cardinality of 1 39088 meaning that for each instance of the Item 39082 entity there is one PointOfSaleTransactionItemID 39086 attribute. The ProcessingPeriod 39090 attribute has a cardinality of 0 . . . 1 39092 meaning that for each instance of the Item 39082 entity there may be one ProcessingPeriod 39090 attribute. The VoidIndicator 39094 attribute has a cardinality of 1 39096 meaning that for each instance of the Item 39082 entity there is one VoidIndicator 39094 attribute.

The Sale 39098 package includes a Sale 39100 entity. The Sale 39098 package includes various packages, namely a Common 39104 and a Party 39262. The Sale 39100 entity has a cardinality of 0 . . . 1 39102 meaning that for each instance of the Sale 39098 package there may be one Sale 39100 entity.

The Common 39104 package includes a Common 39106 entity. The Common 39104 package includes various packages, namely a PriceModification 39166, a Tax 39204, an ItemLink 39222 and a TransactionLink 39232. The Common 39106 entity has a cardinality of 1 39108 meaning that for each instance of the Common 39104 package there is one Common 39106 entity. The Common 39106 entity includes various attributes, namely a ProductInternalID 39110, a ProductStandardID 39114, a ProductCategoryInternalID 39118, a ProductCategoryHierarchyTypeCode 39122, a ProductCategoryHierarchyID 39126, a Description 39130, a CostPrice 39134, a ListPrice 39138, a RegularSalesPrice 39142, an ActualSalesPrice 39146, a TotalAmount 39150, a DiscountAmount 39154, a TotalDiscountAmount 39158 and a Quantity 39162. The ProductInternalID 39110 attribute has a cardinality of 0 . . . 1 39112 meaning that for each instance of the Common 39106 entity there may be one ProductInternalID 39110 attribute. The ProductStandardID 39114 attribute has a cardinality of 0 . . . 1 39116 meaning that for each instance of the Common 39106 entity there may be one ProductStandardID 39114 attribute. The ProductCategoryInternalID 39118 attribute has a cardinality of 0 . . . 1 39120 meaning that for each instance of the Common 39106 entity there may be one ProductCategoryInternalID 39118 attribute. The ProductCategoryHierarchyTypeCode 39122 attribute has a cardinality of 0 . . . 1 39124 meaning that for each instance of the Common 39106 entity there may be one ProductCategoryHierarchyTypeCode 39122 attribute. The ProductCategoryHierarchyID 39126 attribute has a cardinality of 0 . . . 1 39128 meaning that for each instance of the Common 39106 entity there may be one ProductCategoryHierarchyID 39126 attribute. The Description 39130 attribute has a cardinality of 0 . . . 1 39132 meaning that for each instance of the Common 39106 entity there may be one Description 39130 attribute. The CostPrice 39134 attribute has a cardinality of 0 . . . 1 39136 meaning that for each instance of the Common 39106 entity there may be one CostPrice 39134 attribute. The ListPrice 39138 attribute has a cardinality of 0 . . . 1 39140 meaning that for each instance of the Common 39106 entity there may be one ListPrice 39138 attribute. The RegularSalesPrice 39142 attribute has a cardinality of 0 . . . 1 39144 meaning that for each instance of the Common 39106 entity there may be one RegularSalesPrice 39142 attribute. The ActualSalesPrice 39146 attribute has a cardinality of 0 . . . 1 39148 meaning that for each instance of the Common 39106 entity there may be one ActualSalesPrice 39146 attribute. The TotalAmount 39150 attribute has a cardinality of 1 39152 meaning that for each instance of the Common 39106 entity there is one TotalAmount 39150 attribute. The DiscountAmount 39154 attribute has a cardinality of 0 . . . 1 39156 meaning that for each instance of the Common 39106 entity there may be one DiscountAmount 39154 attribute. The TotalDiscountAmount 39158 attribute has a cardinality of 0 . . . 1 39160 meaning that for each instance of the Common 39106 entity there may be one TotalDiscountAmount 39158 attribute. The Quantity 39162 attribute has a cardinality of 1 39164 meaning that for each instance of the Common 39106 entity there is one Quantity 39162 attribute.

The PriceModification 39166 package includes a PriceModification 39168 entity. The PriceModification 39168 entity has a cardinality of 0 . . . n 39170 meaning that for each instance of the PriceModification 39166 package there may be one or more PriceModification 39168 entities. The PriceModification 39168 entity includes various attributes, namely a PointOfSaleTransactionPriceModificationID 39172, a PointOfSaleTransactionPriceModifierTypeCode 39176, a PointOfSaleTransactionPriceModifierID 39180, an Amount 39184, a Percent 39188, a PreviousSalesPrice 39192, a NewSalesPrice 39196 and a PointOfSaleTransactionPriceModificationReasonCode 39200. The PointOfSaleTransactionPriceModificationID 39172 attribute has a cardinality of 1 39174 meaning that for each instance of the PriceModification 39168 entity there is one PointOfSaleTransactionPriceModificationID 39172 attribute. The PointOfSaleTransactionPriceModifierTypeCode 39176 attribute has a cardinality of 1 39178 meaning that for each instance of the PriceModification 39168 entity there is one PointOfSaleTransactionPriceModifierTypeCode 39176 attribute. The PointOfSaleTransactionPriceModifierID 39180 attribute has a cardinality of 0 . . . 1 39182 meaning that for each instance of the PriceModification 39168 entity there may be one PointOfSaleTransactionPriceModifierID 39180 attribute. The Amount 39184 attribute has a cardinality of 0 . . . 1 39186 meaning that for each instance of the PriceModification 39168 entity there may be one Amount 39184 attribute. The Percent 39188 attribute has a cardinality of 0 . . . 1 39190 meaning that for each instance of the PriceModification 39168 entity there may be one Percent 39188 attribute. The PreviousSalesPrice 39192 attribute has a cardinality of 0 . . . 1 39194 meaning that for each instance of the PriceModification 39168 entity there may be one PreviousSalesPrice 39192 attribute. The NewSalesPrice 39196 attribute has a cardinality of 0 . . . 1 39198 meaning that for each instance of the PriceModification 39168 entity there may be one NewSalesPrice 39196 attribute. The PointOfSaleTransactionPriceModificationReasonCode 39200 attribute has a cardinality of 0 . . . 1 39202 meaning that for each instance of the PriceModification 39168 entity there may be one PointOfSaleTransactionPriceModificationReasonCode 39200 attribute.

The Tax 39204 package includes a Tax 39206 entity. The Tax 39206 entity has a cardinality of 0 . . . n 39208 meaning that for each instance of the Tax 39204 package there may be one or more Tax 39206 entities. The Tax 39206 entity includes various attributes, namely a PointOfSaleTransactionTaxID 39210, a PointOfSaleTransactionProductTaxationCharacteristicsCode 39214 and an Amount 39218. The PointOfSaleTransactionTaxID 39210 attribute has a cardinality of 1 39212 meaning that for each instance of the Tax 39206 entity there is one PointOfSaleTransactionTaxID 39210 attribute. The PointOfSaleTransactionProductTaxationCharacteristicsCode 39214 attribute has a cardinality of 1 39216 meaning that for each instance of the Tax 39206 entity there is one PointOfSaleTransactionProductTaxationCharacteristicsCode 39214 attribute. The Amount 39218 attribute has a cardinality of 1 39220 meaning that for each instance of the Tax 39206 entity there is one Amount 39218 attribute.

The ItemLink 39222 package includes an ItemLink 39224 entity. The ItemLink 39224 entity has a cardinality of 0 . . . n 39226 meaning that for each instance of the ItemLink 39222 package there may be one or more ItemLink 39224 entities. The ItemLink 39224 entity includes a PointOfSaleTransactionItemID 39228 attribute. The PointOfSaleTransactionItemID 39228 attribute has a cardinality of 1 39230 meaning that for each instance of the ItemLink 39224 entity there is one PointOfSaleTransactionItemID 39228 attribute.

The TransactionLink 39232 package includes a TransactionLink 39234 entity. The TransactionLink 39234 entity has a cardinality of 0 . . . 1 39236 meaning that for each instance of the TransactionLink 39232 package there may be one TransactionLink 39234 entity. The TransactionLink 39234 entity includes various attributes, namely a StoreInternalID 39238, a DeviceID 39242, a TillID 39246, a PointOfSaleTransactionID 39250, a BusinessDate 39254 and a ProcessingPeriod 39258. The StoreInternalID 39238 attribute has a cardinality of 1 39240 meaning that for each instance of the TransactionLink 39234 entity there is one StoreInternalID 39238 attribute. The DeviceID 39242 attribute has a cardinality of 1 39244 meaning that for each instance of the TransactionLink 39234 entity there is one DeviceID 39242 attribute. The TillID 39246 attribute has a cardinality of 0 . . . 1 39248 meaning that for each instance of the TransactionLink 39234 entity there may be one TillID 39246 attribute. The PointOfSaleTransactionID 39250 attribute has a cardinality of 1 39252 meaning that for each instance of the TransactionLink 39234 entity there is one PointOfSaleTransactionID 39250 attribute. The BusinessDate 39254 attribute has a cardinality of 1 39256 meaning that for each instance of the Transaction- Link 39234 entity there is one BusinessDate 39254 attribute. The ProcessingPeriod 39258 attribute has a cardinality of 0 . . . 1 39260 meaning that for each instance of the TransactionLink 39234 entity there may be one ProcessingPeriod 39258 attribute.

The Party 39262 package includes a CommissionRecipientParty 39264 entity. The CommissionRecipientParty 39264 entity has a cardinality of 0 . . . 1 39266 meaning that for each instance of the Party 39262 package there may be one CommissionRecipientParty 39264 entity. The CommissionRecipientParty 39264 entity includes a PartyInternalID 39268 attribute. The PartyInternalID 39268 attribute has a cardinality of 1 39270 meaning that for each instance of the CommissionRecipientParty 39264 entity there is one PartyInternalID 39268 attribute.

The SaleForDelivery 39272 package includes a SaleForDelivery 39274 entity. The SaleForDelivery 39272 package includes various packages, namely a Common 39278, a Party 39436 and a Location 39454. The SaleForDelivery 39274 entity has a cardinality of 0 . . . 1 39276 meaning that for each instance of the SaleForDelivery 39272 package there may be one SaleForDelivery 39274 entity.

The Common 39278 package includes a Common 39280 entity. The Common 39278 package includes various packages, namely a PriceModification 39340, a Tax 39378, an ItemLink 39396 and a TransactionLink 39406. The Common 39280 entity has a cardinality of 1 39282 meaning that for each instance of the Common 39278 package there is one Common 39280 entity. The Common 39280 entity includes various attributes, namely a ProductInternalID 39284, a ProductStandardID 39288, a ProductCategoryInternalID 39292, a ProductCategoryHierarchyTypeCode 39296, a ProductCategoryHierarchyID 39300, a Description 39304, a CostPrice 39308, a ListPrice 39312, a RegularSalesPrice 39316, an ActualSalesPrice 39320, a TotalAmount 39324, a DiscountAmount 39328, a TotalDiscountAmount 39332 and a Quantity 39336. The ProductInternalID 39284 attribute has a cardinality of 0 . . . 1 39286 meaning that for each instance of the Common 39280 entity there may be one ProductInternalID 39284 attribute. The ProductStandardID 39288 attribute has a cardinality of 0 . . . 1 39290 meaning that for each instance of the Common 39280 entity there may be one ProductStandardID 39288 attribute. The ProductCategoryInternalID 39292 attribute has a cardinality of 0 . . . 1 39294 meaning that for each instance of the Common 39280 entity there may be one ProductCategoryInternalID 39292 attribute. The ProductCategoryHierarchyTypeCode 39296 attribute has a cardinality of 0 . . . 1 39298 meaning that for each instance of the Common 39280 entity there may be one ProductCategoryHierarchyTypeCode 39296 attribute. The ProductCategoryHierarchyID 39300 attribute has a cardinality of 0 . . . 1 39302 meaning that for each instance of the Common 39280 entity there may be one ProductCategoryHierarchyID 39300 attribute. The Description 39304 attribute has a cardinality of 0 . . . 1 39306 meaning that for each instance of the Common 39280 entity there may be one Description 39304 attribute. The CostPrice 39308 attribute has a cardinality of 0 . . . 1 39310 meaning that for each instance of the Common 39280 entity there may be one CostPrice 39308 attribute. The ListPrice 39312 attribute has a cardinality of 0 . . . 1 39314 meaning that for each instance of the Common 39280 entity there may be one ListPrice 39312 attribute. The RegularSalesPrice 39316 attribute has a cardinality of 0 . . . 1 39318 meaning that for each instance of the Common 39280 entity there may be one RegularSalesPrice 39316 attribute. The ActualSalesPrice 39320 attribute has a cardinality of 0 . . . 1 39322 meaning that for each instance of the Common 39280 entity there may be one ActualSalesPrice 39320 attribute. The TotalAmount 39324 attribute has a cardinality of 1 39326 meaning that for each instance of the Common 39280 entity there is one TotalAmount 39324 attribute. The DiscountAmount 39328 attribute has a cardinality of 0 . . . 1 39330 meaning that for each instance of the Common 39280 entity there may be one DiscountAmount 39328 attribute. The TotalDiscountAmount 39332 attribute has a cardinality of 0 . . . 1 39334 meaning that for each instance of the Common 39280 entity there may be one TotalDiscountAmount 39332 attribute. The Quantity 39336 attribute has a cardinality of 1 39338 meaning that for each instance of the Common 39280 entity there is one Quantity 39336 attribute.

The PriceModification 39340 package includes a PriceModification 39342 entity. The PriceModification 39342 entity has a cardinality of 0 . . . n 39344 meaning that for each instance of the PriceModification 39340 package there may be one or more PriceModification 39342 entities. The PriceModification 39342 entity includes various attributes, namely a PointOfSaleTransactionPriceModificationID 39346, a PointOfSaleTransactionPriceModifierTypeCode 39350, a PointOfSaleTransactionPriceModifierID 39354, an Amount 39358, a Percent 39362, a PreviousSalesPrice 39366, a NewSalesPrice 39370 and a PointOfSaleTransactionPriceModificationReasonCode 39374. The PointOfSaleTransactionPriceModificationID 39346 attribute has a cardinality of 1 39348 meaning that for each instance of the PriceModification 39342 entity there is one PointOfSaleTransactionPriceModificationID 39346 attribute. The PointOfSaleTransactionPriceModifierTypeCode 39350 attribute has a cardinality of 1 39352 meaning that for each instance of the PriceModification 39342 entity there is one PointOfSaleTransactionPriceModifierTypeCode 39350 attribute. The PointOfSaleTransactionPriceModifierID 39354 attribute has a cardinality of 0 . . . 1 39356 meaning that for each instance of the PriceModification 39342 entity there may be one PointOfSaleTransactionPriceModifierID 39354 attribute. The Amount 39358 attribute has a cardinality of 0 . . . 1 39360 meaning that for each instance of the PriceModification 39342 entity there may be one Amount 39358 attribute. The Percent 39362 attribute has a cardinality of 0 . . . 1 39364 meaning that for each instance of the PriceModification 39342 entity there may be one Percent 39362 attribute. The PreviousSalesPrice 39366 attribute has a cardinality of 0 . . . 1 39368 meaning that for each instance of the PriceModification 39342 entity there may be one PreviousSalesPrice 39366 attribute. The NewSalesPrice 39370 attribute has a cardinality of 0 . . . 1 39372 meaning that for each instance of the PriceModification 39342 entity there may be one NewSalesPrice 39370 attribute. The PointOfSaleTransactionPriceModificationReasonCode 39374 attribute has a cardinality of 0 . . . 1 39376 meaning that for each instance of the PriceModification 39342 entity there may be one PointOfSaleTransactionPriceModificationReasonCode 39374 attribute.

The Tax 39378 package includes a Tax 39380 entity. The Tax 39380 entity has a cardinality of 0 . . . n 39382 meaning that for each instance of the Tax 39378 package there may be one or more Tax 39380 entities. The Tax 39380 entity includes various attributes, namely a PointOfSaleTransactionTaxID 39384, a PointOfSaleTransactionProductTaxationCharacteristicsCode 39388 and an Amount 39392. The PointOfSaleTransactionTaxID 39384 attribute has a cardinality of 1 39386 meaning that for each instance of the Tax 39380 entity there is one PointOfSaleTransactionTaxID 39384 attribute. The PointOfSaleTransactionProductTaxationCharacteristicsCode 39388 attribute has a cardinality of 1 39390 meaning that for each instance of the Tax 39380 entity there is one PointOfSaleTransactionProductTaxationCharacteristicsCode 39388 attribute. The Amount 39392 attribute has a cardinality of 1 39394 meaning that for each instance of the Tax 39380 entity there is one Amount 39392 attribute.

The ItemLink 39396 package includes an ItemLink 39398 entity. The ItemLink 39398 entity has a cardinality of 0 . . . n 39400 meaning that for each instance of the ItemLink 39396 package there may be one or more ItemLink 39398 entities. The ItemLink 39398 entity includes a PointOfSaleTransactionItemID 39402 attribute. The PointOfSaleTransactionItemID 39402 attribute has a cardinality of 1 39404 meaning that for each instance of the ItemLink 39398 entity there is one PointOfSaleTransactionItemID 39402 attribute.

The TransactionLink 39406 package includes a TransactionLink 39408 entity. The TransactionLink 39408 entity has a cardinality of 0 . . . 1 39410 meaning that for each instance of the TransactionLink 39406 package there may be one TransactionLink 39408 entity. The TransactionLink 39408 entity includes various attributes, namely a StoreInternalID 39412, a DeviceID 39416, a TillID 39420, a PointOfSaleTransactionID 39424, a BusinessDate 39428 and a ProcessingPeriod 39432. The StoreInternalID 39412 attribute has a cardinality of 1 39414 meaning that for each instance of the TransactionLink 39408 entity there is one StoreInternalID 39412 attribute. The DeviceID 39416 attribute has a cardinality of 1 39418 meaning that for each instance of the TransactionLink 39408 entity there is one DeviceID 39416 attribute. The TillID 39420 attribute has a cardinality of 0 . . . 1 39422 meaning that for each instance of the TransactionLink 39408 entity there may be one TillID 39420 attribute. The PointOfSaleTransactionID 39424 attribute has a cardinality of 1 39426 meaning that for each instance of the TransactionLink 39408 entity there is one PointOfSaleTransactionID 39424 attribute. The BusinessDate 39428 attribute has a cardinality of 1 39430 meaning that for each instance of the TransactionLink 39408 entity there is one BusinessDate 39428 attribute. The ProcessingPeriod 39432 attribute has a cardinality of 0 . . . 1 39434 meaning that for each instance of the TransactionLink 39408 entity there may be one ProcessingPeriod 39432 attribute.

The Party 39436 package includes various entities, namely a ProductRecipientParty 39438 and a CommissionRecipientParty 39446. The ProductRecipientParty 39438 entity has a cardinality of 1 39440 meaning that for each instance of the Party 39436 package there is one ProductRecipientParty 39438 entity. The ProductRecipientParty 39438 entity includes a PartyInternalID 39442 attribute. The PartyInternalID 39442 attribute has a cardinality of 1 39444 meaning that for each instance of the ProductRecipientParty 39438 entity there is one PartyInternalID 39442 attribute. The CommissionRecipientParty 39446 entity has a cardinality of 0 . . . 1 39448 meaning that for each instance of the Party 39436 package there may be one CommissionRecipientParty 39446 entity. The CommissionRecipientParty 39446 entity includes a PartyInternalID 39450 attribute. The PartyInternalID 39450 attribute has a cardinality of 1 39452 meaning that for each instance of the CommissionRecipientParty 39446 entity there is one PartyInternalID 39450 attribute.

The Location 39454 package includes a ShipFromLocation 39456 entity. The ShipFromLocation 39456 entity has a cardinality of 1 39458 meaning that for each instance of the Location 39454 package there is one ShipFromLocation 39456 entity. The ShipFromLocation 39456 entity includes a LocationInternalID 39460 attribute. The LocationInternalID 39460 attribute has a cardinality of 1 39462 meaning that for each instance of the ShipFromLocation 39456 entity there is one LocationInternalID 39460 attribute.

The SaleForPickup 39464 package includes a SaleForPickup 39466 entity. The SaleForPickup 39464 package includes various packages, namely a Common 39470, a Party 39628 and a Location 39646. The SaleForPickup 39466 entity has a cardinality of 0 . . . 1 39468 meaning that for each instance of the SaleForPickup 39464 package there may be one SaleForPickup 39466 entity.

The Common 39470 package includes a Common 39472 entity. The Common 39470 package includes various packages, namely a PriceModification 39532, a Tax 39570, an ItemLink 39588 and a TransactionLink 39598. The Common 39472 entity has a cardinality of 1 39474 meaning that for each instance of the Common 39470 package there is one Common 39472 entity. The Common 39472 entity includes various attributes, namely a ProductInternalID 39476, a ProductStandardID 39480, a ProductCategoryInternalID 39484, a ProductCategoryHierarchyTypeCode 39488, a ProductCategoryHierarchyID 39492, a Description 39496, a CostPrice 39500, a ListPrice 39504, a RegularSalesPrice 39508, an ActualSalesPrice 39512, a TotalAmount 39516, a DiscountAmount 39520, a TotalDiscountAmount 39524 and a Quantity 39528. The ProductInternalID 39476 attribute has a cardinality of 0 . . . 1 39478 meaning that for each instance of the Common 39472 entity there may be one ProductInternalID 39476 attribute. The ProductStandardID 39480 attribute has a cardinality of 0 . . . 1 39482 meaning that for each instance of the Common 39472 entity there may be one ProductStandardID 39480 attribute. The ProductCategoryInternalID 39484 attribute has a cardinality of 0 . . . 1 39486 meaning that for each instance of the Common 39472 entity there may be one ProductCategoryInternalID 39484 attribute. The ProductCategoryHierarchyTypeCode 39488 attribute has a cardinality of 0 . . . 1 39490 meaning that for each instance of the Common 39472 entity there may be one ProductCategoryHierarchyTypeCode 39488 attribute. The ProductCategoryHierarchyID 39492 attribute has a cardinality of 0 . . . 1 39494 meaning that for each instance of the Common 39472 entity there may be one ProductCategoryHierarchyID 39492 attribute. The Description 39496 attribute has a cardinality of 0 . . . 1 39498 meaning that for each instance of the Common 39472 entity there may be one Description 39496 attribute. The CostPrice 39500 attribute has a cardinality of 0 . . . 1 39502 meaning that for each instance of the Common 39472 entity there may be one CostPrice 39500 attribute. The ListPrice 39504 attribute has a cardinality of 0 . . . 1 39506 meaning that for each instance of the Common 39472 entity there may be one ListPrice 39504 attribute. The RegularSalesPrice 39508 attribute has a cardinality of 0 . . . 1 39510 meaning that for each instance of the Common 39472 entity there may be one RegularSalesPrice 39508 attribute. The ActualSalesPrice 39512 attribute has a cardinality of 0 . . . 1 39514 meaning that for each instance of the Common 39472 entity there may be one ActualSalesPrice 39512 attribute. The TotalAmount 39516 attribute has a cardinality of 1 39518 meaning that for each instance of the Common 39472 entity there is one TotalAmount 39516 attribute. The DiscountAmount 39520 attribute has a cardinality of 0 . . . 1 39522 meaning that for each instance of the Common 39472 entity there may be one DiscountAmount 39520 attribute. The TotalDiscountAmount 39524 attribute has a cardinality of 0 . . . 1 39526 meaning that for each instance of the Common 39472 entity there may be one TotalDiscountAmount 39524 attribute. The Quantity 39528 attribute has a cardinality of 1 39530 meaning that for each instance of the Common 39472 entity there is one Quantity 39528 attribute.

The PriceModification 39532 package includes a PriceModification 39534 entity. The PriceModification 39534 entity has a cardinality of 0 . . . n 39536 meaning that for each instance of the PriceModification 39532 package there may be one or more PriceModification 39534 entities. The PriceModification 39534 entity includes various attributes, namely a PointOfSaleTransactionPriceModificationID 39538, a PointOfSaleTransactionPriceModifierTypeCode 39542, a PointOfSaleTransactionPriceModifierID 39546, an Amount 39550, a Percent 39554, a PreviousSalesPrice 39558, a NewSalesPrice 39562 and a PointOfSaleTransactionPriceModificationReasonCode 39566. The PointOfSaleTransactionPriceModificationID 39538 attribute has a cardinality of 1 39540 meaning that for each instance of the PriceModification 39534 entity there is one PointOfSaleTransactionPriceModificationID 39538 attribute. The PointOfSaleTransactionPriceModifierTypeCode 39542 attribute has a cardinality of 1 39544 meaning that for each instance of the PriceModification 39534 entity there is one PointOfSaleTransactionPriceModifierTypeCode 39542 attribute. The PointOfSaleTransactionPriceModifierID 39546 attribute has a cardinality of 0 . . . 1 39548 meaning that for each instance of the PriceModification 39534 entity there may be one PointOfSaleTransactionPriceModifierID 39546 attribute. The Amount 39550 attribute has a cardinality of 0 . . . 1 39552 meaning that for each instance of the PriceModification 39534 entity there may be one Amount 39550 attribute. The Percent 39554 attribute has a cardinality of 0 . . . 1 39556 meaning that for each instance of the PriceModification 39534 entity there may be one Percent 39554 attribute. The PreviousSalesPrice 39558 attribute has a cardinality of 0 . . . 1 39560 meaning that for each instance of the PriceModification 39534 entity there may be one PreviousSalesPrice 39558 attribute. The NewSalesPrice 39562 attribute has a cardinality of 0 . . . 1 39564 meaning that for each instance of the PriceModification 39534 entity there may be one NewSalesPrice 39562 attribute. The PointOfSaleTransactionPriceModificationReasonCode 39566 attribute has a cardinality of 0 . . . 1 39568 meaning that for each instance of the PriceModification 39534 entity there may be one PointOfSaleTransactionPriceModificationReasonCode 39566 attribute.

The Tax 39570 package includes a Tax 39572 entity. The Tax 39572 entity has a cardinality of 0 . . . n 39574 meaning that for each instance of the Tax 39570 package there may be one or more Tax 39572 entities. The Tax 39572 entity includes various attributes, namely a PointOfSaleTransactionTaxID 39576, a PointOfSaleTransactionProductTaxationCharacteristicsCode 39580 and an Amount 39584. The PointOfSaleTransactionTaxID 39576 attribute has a cardinality of 1 39578 meaning that for each instance of the Tax 39572 entity there is one PointOfSaleTransactionTaxID 39576 attribute. The PointOfSaleTransactionProductTaxationCharacteristicsCode 39580 attribute has a cardinality of 1 39582 meaning that for each instance of the Tax 39572 entity there is one PointOfSaleTransactionProductTaxationCharacteristicsCode 39580 attribute. The Amount 39584 attribute has a cardinality of 1 39586 meaning that for each instance of the Tax 39572 entity there is one Amount 39584 attribute.

The ItemLink 39588 package includes an ItemLink 39590 entity. The ItemLink 39590 entity has a cardinality of 0 . . . n 39592 meaning that for each instance of the ItemLink 39588 package there may be one or more ItemLink 39590 entities. The ItemLink 39590 entity includes a PointOfSaleTransactionItemID 39594 attribute. The PointOfSaleTransactionItemID 39594 attribute has a cardinality of 1 39596 meaning that for each instance of the ItemLink 39590 entity there is one PointOfSaleTransactionItemID 39594 attribute.

The TransactionLink 39598 package includes a TransactionLink 39600 entity. The TransactionLink 39600 entity has a cardinality of 0 . . . 1 39602 meaning that for each instance of the TransactionLink 39598 package there may be one TransactionLink 39600 entity. The TransactionLink 39600 entity includes various attributes, namely a StoreInternalID 39604, a DeviceID 39608, a TillID 39612, a PointOfSaleTransactionID 39616, a BusinessDate 39620 and a ProcessingPeriod 39624. The StoreInternalID 39604 attribute has a cardinality of 1 39606 meaning that for each instance of the TransactionLink 39600 entity there is one StoreInternalID 39604 attribute. The DeviceID 39608 attribute has a cardinality of 1 39610 meaning that for each instance of the TransactionLink 39600 entity there is one DeviceID 39608 attribute. The TillID 39612 attribute has a cardinality of 0 . . . 1 39614 meaning that for each instance of the TransactionLink 39600 entity there may be one TillID 39612 attribute. The PointOfSaleTransactionID 39616 attribute has a cardinality of 1 39618 meaning that for each instance of the TransactionLink 39600 entity there is one PointOfSaleTransactionID 39616 attribute. The BusinessDate 39620 attribute has a cardinality of 1 39622 meaning that for each instance of the TransactionLink 39600 entity there is one BusinessDate 39620 attribute. The ProcessingPeriod 39624 attribute has a cardinality of 0 . . . 1 39626 meaning that for each instance of the TransactionLink 39600 entity there may be one ProcessingPeriod 39624 attribute.

The Party 39628 package includes various entities, namely a BuyerParty 39630 and a CommissionRecipientParty 39638. The BuyerParty 39630 entity has a cardinality of 1 39632 meaning that for each instance of the Party 39628 package there is one BuyerParty 39630 entity. The BuyerParty 39630 entity includes a PartyInternalID 39634 attribute. The PartyInternalID 39634 attribute has a cardinality of 1 39636 meaning that for each instance of the BuyerParty 39630 entity there is one PartyInternalID 39634 attribute. The CommissionRecipientParty 39638 entity has a cardinality of 0 . . . 1 39640 meaning that for each instance of the Party 39628 package there may be one CommissionRecipientParty 39638 entity. The CommissionRecipientParty 39638 entity includes a PartyInternalID 39642 attribute. The PartyInternalID 39642 attribute has a cardinality of 1 39644 meaning that for each instance of the CommissionRecipientParty 39638 entity there is one PartyInternalID 39642 attribute.

The Location 39646 package includes a ShipFromLocation 39648 entity. The ShipFromLocation 39648 entity has a cardinality of 1 39650 meaning that for each instance of the Location 39646 package there is one ShipFromLocation 39648 entity. The ShipFromLocation 39648 entity includes a LocationInternalID 39652 attribute. The LocationInternalID 39652 attribute has a cardinality of 1 39654 meaning that for each instance of the ShipFromLocation 39648 entity there is one LocationInternalID 39652 attribute.

The Return 39656 package includes a Return 39658 entity. The Return 39656 package includes various packages, namely a Common 39666, an Authorisation 39824 and a Party 39834. The Return 39658 entity has a cardinality of 0 . . . 1 39660 meaning that for each instance of the Return 39656 package there may be one Return 39658 entity. The Return 39658 entity includes a PointOfSaleTransactionItemReturnReasonCode 39662 attribute. The PointOfSaleTransactionItemReturnReasonCode 39662 attribute has a cardinality of 0 . . . 1 39664 meaning that for each instance of the Return 39658 entity there may be one PointOfSaleTransactionItemReturnReasonCode 39662 attribute.

The Common 39666 package includes a Common 39668 entity. The Common 39666 package includes various packages, namely a PriceModification 39728, a Tax 39766, an ItemLink 39784 and a TransactionLink 39794. The Common 39668 entity has a cardinality of 1 39670 meaning that for each instance of the Common 39666 package there is one Common 39668 entity. The Common 39668 entity includes various attributes, namely a ProductInternalID 39672, a ProductStandardID 39676, a ProductCategoryInternalID 39680, a ProductCategoryHierarchyTypeCode 39684, a ProductCategoryHierarchyID 39688, a Description 39692, a CostPrice 39696, a ListPrice 39700, a RegularSalesPrice 39704, an ActualSalesPrice 39708, a TotalAmount 39712, a DiscountAmount 39716, a TotalDiscountAmount 39720 and a Quantity 39724. The ProductInternalID 39672 attribute has a cardinality of 0 . . . 1 39674 meaning that for each instance of the Common 39668 entity there may be one ProductInternalID 39672 attribute. The ProductStandardID 39676 attribute has a cardinality of 0 . . . 1 39678 meaning that for each instance of the Common 39668 entity there may be one ProductStandardID 39676 attribute. The ProductCategoryInternalID 39680 attribute has a cardinality of 0 . . . 1 39682 meaning that for each instance of the Common 39668 entity there may be one ProductCategoryInternalID 39680 attribute. The ProductCategoryHierarchyTypeCode 39684 attribute has a cardinality of 0 . . . 1 39686 meaning that for each instance of the Common 39668 entity there may be one ProductCategoryHierarchyTypeCode 39684 attribute. The ProductCategoryHierarchyID 39688 attribute has a cardinality of 0 . . . 1 39690 meaning that for each instance of the Common 39668 entity there may be one ProductCategoryHierarchyID 39688 attribute. The Description 39692 attribute has a cardinality of 0 . . . 1 39694 meaning that for each instance of the Common 39668 entity there may be one Description 39692 attribute. The CostPrice 39696 attribute has a cardinality of 0 . . . 1 39698 meaning that for each instance of the Common 39668 entity there may be one CostPrice 39696 attribute. The ListPrice 39700 attribute has a cardinality of 0 . . . 1 39702 meaning that for each instance of the Common 39668 entity there may be one ListPrice 39700 attribute. The RegularSalesPrice 39704 attribute has a cardinality of 0 . . . 1 39706 meaning that for each instance of the Common 39668 entity there may be one RegularSalesPrice 39704 attribute. The ActualSalesPrice 39708 attribute has a cardinality of 0 . . . 1 39710 meaning that for each instance of the Common 39668 entity there may be one ActualSalesPrice 39708 attribute. The TotalAmount 39712 attribute has a cardinality of 1 39714 meaning that for each instance of the Common 39668 entity there is one TotalAmount 39712 attribute. The DiscountAmount 39716 attribute has a cardinality of 0 . . . 1 39718 meaning that for each instance of the Common 39668 entity there may be one DiscountAmount 39716 attribute. The TotalDiscountAmount 39720 attribute has a cardinality of 0 . . . 1 39722 meaning that for each instance of the Common 39668 entity there may be one TotalDiscountAmount 39720 attribute. The Quantity 39724 attribute has a cardinality of 1 39726 meaning that for each instance of the Common 39668 entity there is one Quantity 39724 attribute.

The PriceModification 39728 package includes a PriceModification 39730 entity. The PriceModification 39730 entity has a cardinality of 0 . . . n 39732 meaning that for each instance of the PriceModification 39728 package there may be one or more PriceModification 39730 entities. The PriceModification 39730 entity includes various attributes, namely a PointOfSaleTransactionPriceModificationID 39734, a PointOfSaleTransactionPriceModifierTypeCode 39738, a PointOfSaleTransactionPriceModifierID 39742, an Amount 39746, a Percent 39750, a PreviousSalesPrice 39754, a NewSalesPrice 39758 and a PointOfSaleTransactionPriceModificationReasonCode 39762. The PointOfSaleTransactionPriceModificationID 39734 attribute has a cardinality of 1 39736 meaning that for each instance of the PriceModification 39730 entity there is one PointOfSaleTransactionPriceModificationID 39734 attribute. The PointOfSaleTransactionPriceModifierTypeCode 39738 attribute has a cardinality of 1 39740 meaning that for each instance of the PriceModification 39730 entity there is one PointOfSaleTransactionPriceModifierTypeCode 39738 attribute. The PointOfSaleTransactionPriceModifierID 39742 attribute has a cardinality of 0 . . . 1 39744 meaning that for each instance of the PriceModification 39730 entity there may be one PointOfSaleTransactionPriceModifierID 39742 attribute. The Amount 39746 attribute has a cardinality of 0 . . . 1 39748 meaning that for each instance of the PriceModification 39730 entity there may be one Amount 39746 attribute. The Percent 39750 attribute has a cardinality of 0 . . . 1 39752 meaning that for each instance of the PriceModification 39730 entity there may be one Percent 39750 attribute. The PreviousSalesPrice 39754 attribute has a cardinality of 0 . . . 1 39756 meaning that for each instance of the PriceModification 39730 entity there may be one PreviousSalesPrice 39754 attribute. The NewSalesPrice 39758 attribute has a cardinality of 0 . . . 1 39760 meaning that for each instance of the PriceModification 39730 entity there may be one NewSalesPrice 39758 attribute. The PointOfSaleTransactionPriceModificationReasonCode 39762 attribute has a cardinality of 0 . . . 1 39764 meaning that for each instance of the PriceModification 39730 entity there may be one PointOfSaleTransactionPriceModificationReasonCode 39762 attribute.

The Tax 39766 package includes a Tax 39768 entity. The Tax 39768 entity has a cardinality of 0 . . . n 39770 meaning that for each instance of the Tax 39766 package there may be one or more Tax 39768 entities. The Tax 39768 entity includes various attributes, namely a PointOfSaleTransactionTaxID 39772, a PointOfSaleTransactionProductTaxationCharacteristicsCode 39776 and an Amount 39780. The PointOfSaleTransactionTaxID 39772 attribute has a cardinality of 1 39774 meaning that for each instance of the Tax 39768 entity there is one PointOfSaleTransactionTaxID 39772 attribute. The PointOfSaleTransactionProductTaxationCharacteristicsCode 39776 attribute has a cardinality of 1 39778 meaning that for each instance of the Tax 39768 entity there is one PointOfSaleTransactionProductTaxationCharacteristicsCode 39776 attribute. The Amount 39780 attribute has a cardinality of 1 39782 meaning that for each instance of the Tax 39768 entity there is one Amount 39780 attribute.

The ItemLink 39784 package includes an ItemLink 39786 entity. The ItemLink 39786 entity has a cardinality of 0 . . . n 39788 meaning that for each instance of the ItemLink 39784 package there may be one or more ItemLink 39786 entities. The ItemLink 39786 entity includes a PointOfSaleTransactionItemID 39790 attribute. The PointOfSaleTransactionItemID 39790 attribute has a cardinality of 1 39792 meaning that for each instance of the ItemLink 39786 entity there is one PointOfSaleTransactionItemID 39790 attribute.

The TransactionLink 39794 package includes a TransactionLink 39796 entity. The TransactionLink 39796 entity has a cardinality of 0 . . . 1 39798 meaning that for each instance of the TransactionLink 39794 package there may be one TransactionLink 39796 entity. The TransactionLink 39796 entity includes various attributes, namely a StoreInternalID 39800, a DeviceID 39804, a TillID 39808, a PointOfSaleTransactionID 39812, a BusinessDate 39816 and a ProcessingPeriod 39820. The StoreInternalID 39800 attribute has a cardinality of 1 39802 meaning that for each instance of the TransactionLink 39796 entity there is one StoreInternalID 39800 attribute. The DeviceID 39804 attribute has a cardinality of 1 39806 meaning that for each instance of the TransactionLink 39796 entity there is one DeviceID 39804 attribute. The TillID 39808 attribute has a cardinality of 0 . . . 1 39810 meaning that for each instance of the TransactionLink 39796 entity there may be one TillID 39808 attribute. The PointOfSaleTransactionID 39812 attribute has a cardinality of 1 39814 meaning that for each instance of the TransactionLink 39796 entity there is one PointOfSaleTransactionID 39812 attribute. The BusinessDate 39816 attribute has a cardinality of 1 39818 meaning that for each instance of the TransactionLink 39796 entity there is one BusinessDate 39816 attribute. The ProcessingPeriod 39820 attribute has a cardinality of 0 . . . 1 39822 meaning that for each instance of the TransactionLink 39796 entity there may be one ProcessingPeriod 39820 attribute.

The Authorisation 39824 package includes an Authorisation 39826 entity. The Authorisation 39826 entity has a cardinality of 0 . . . n 39828 meaning that for each instance of the Authorisation 39824 package there may be one or more Authorisation 39826 entities. The Authorisation 39826 entity includes an EmployeeID 39830 attribute. The EmployeeID 39830 attribute has a cardinality of 0 . . . 1 39832 meaning that for each instance of the Authorisation 39826 entity there may be one EmployeeID 39830 attribute.

The Party 39834 package includes a CommissionRecipientParty 39836 entity. The CommissionRecipientParty 39836 entity has a cardinality of 0 . . . 1 39838 meaning that for each instance of the Party 39834 package there may be one CommissionRecipientParty 39836 entity. The CommissionRecipientParty 39836 entity includes a PartyInternalID 39840 attribute. The PartyInternalID 39840 attribute has a cardinality of 1 39842 meaning that for each instance of the CommissionRecipientParty 39836 entity there is one PartyInternalID 39840 attribute.

The ReturnForDelivery 39844 package includes a ReturnForDelivery 39846 entity. The ReturnForDelivery 39844 package includes various packages, namely a Common 39854, an Authorisation 391012, a Party 391022 and a Location 391040. The ReturnForDelivery 39846 entity has a cardinality of 0 . . . 1 39848 meaning that for each instance of the ReturnForDelivery 39844 package there may be one ReturnForDelivery 39846 entity. The ReturnForDelivery 39846 entity includes a PointOfSaleTransactionItemReturnReasonCode 39850 attribute. The PointOfSaleTransactionItemReturnReasonCode 39850 attribute has a cardinality of 0 . . . 1 39852 meaning that for each instance of the ReturnForDelivery 39846 entity there may be one PointOfSaleTransactionItemReturnReasonCode 39850 attribute.

The Common 39854 package includes a Common 39856 entity. The Common 39854 package includes various packages, namely a PriceModification 39916, a Tax 39954, an ItemLink 39972 and a TransactionLink 39982. The Common 39856 entity has a cardinality of 1 39858 meaning that for each instance of the Common 39854 package there is one Common 39856 entity. The Common 39856 entity includes various attributes, namely a ProductInternalID 39860, a ProductStandardID 39864, a ProductCategoryInternalID 39868, a ProductCategoryHierarchyTypeCode 39872, a ProductCategoryHierarchyID 39876, a Description 39880, a CostPrice 39884, a ListPrice 39888, a RegularSalesPrice 39892, an ActualSalesPrice 39896, a TotalAmount 39900, a DiscountAmount 39904, a TotalDiscountAmount 39908 and a Quantity 39912. The ProductInternalID 39860 attribute has a cardinality of 0 . . . 1 39862 meaning that for each instance of the Common 39856 entity there may be one ProductInternalID 39860 attribute. The ProductStandardID 39864 attribute has a cardinality of 0 . . . 1 39866 meaning that for each instance of the Common 39856 entity there may be one ProductStandardID 39864 attribute. The ProductCategoryInternalID 39868 attribute has a cardinality of 0 . . . 1 39870 meaning that for each instance of the Common 39856 entity there may be one ProductCategoryInternalID 39868 attribute. The ProductCategoryHierarchyTypeCode 39872 attribute has a cardinality of 0 . . . 1 39874 meaning that for each instance of the Common 39856 entity there may be one ProductCategoryHierarchyTypeCode 39872 attribute. The ProductCategoryHierarchyID 39876 attribute has a cardinality of 0 . . . 1 39878 meaning that for each instance of the Common 39856 entity there may be one ProductCategoryHierarchyID 39876 attribute. The Description 39880 attribute has a cardinality of 0 . . . 1 39882 meaning that for each instance of the Common 39856 entity there may be one Description 39880 attribute. The CostPrice 39884 attribute has a cardinality of 0 . . . 1 39886 meaning that for each instance of the Common 39856 entity there may be one CostPrice 39884 attribute. The ListPrice 39888 attribute has a cardinality of 0 . . . 1 39890 meaning that for each instance of the Common 39856 entity there may be one ListPrice 39888 attribute. The RegularSalesPrice 39892 attribute has a cardinality of 0 . . . 1 39894 meaning that for each instance of the Common 39856 entity there may be one RegularSalesPrice 39892 attribute. The ActualSalesPrice 39896 attribute has a cardinality of 0 . . . 1 39898 meaning that for each instance of the Common 39856 entity there may be one ActualSalesPrice 39896 attribute. The TotalAmount 39900 attribute has a cardinality of 1 39902 meaning that for each instance of the Common 39856 entity there is one TotalAmount 39900 attribute. The DiscountAmount 39904 attribute has a cardinality of 0 . . . 1 39906 meaning that for each instance of the Common 39856 entity there may be one DiscountAmount 39904 attribute. The TotalDiscountAmount 39908 attribute has a cardinality of 0 . . . 1 39910 meaning that for each instance of the Common 39856 entity there may be one TotalDiscountAmount 39908 attribute. The Quantity 39912 attribute has a cardinality of 1 39914 meaning that for each instance of the Common 39856 entity there is one Quantity 39912 attribute.

The PriceModification 39916 package includes a PriceModification 39918 entity. The PriceModification 39918 entity has a cardinality of 0 . . . n 39920 meaning that for each instance of the PriceModification 39916 package there may be one or more PriceModification 39918 entities. The PriceModification 39918 entity includes various attributes, namely a PointOfSaleTransactionPriceModificationID 39922, a PointOfSaleTransactionPriceModifierTypeCode 39926, a PointOfSaleTransactionPriceModifierID 39930, an Amount 39934, a Percent 39938, a PreviousSalesPrice 39942, a NewSalesPrice 39946 and a PointOfSaleTransactionPriceModificationReasonCode 39950. The PointOfSaleTransactionPriceModificationID 39922 attribute has a cardinality of 1 39924 meaning that for each instance of the PriceModification 39918 entity there is one PointOfSaleTransactionPriceModificationID 39922 attribute. The PointOfSaleTransactionPriceModifierTypeCode 39926 attribute has a cardinality of 1 39928 meaning that for each instance of the PriceModification 39918 entity there is one PointOfSaleTransactionPriceModifierTypeCode 39926 attribute. The PointOfSaleTransactionPriceModifierID 39930 attribute has a cardinality of 0 . . . 1 39932 meaning that for each instance of the PriceModification 39918 entity there may be one PointOfSaleTransactionPriceModifierID 39930 attribute. The Amount 39934 attribute has a cardinality of 0 . . . 1 39936 meaning that for each instance of the PriceModification 39918 entity there may be one Amount 39934 attribute. The Percent 39938 attribute has a cardinality of 0 . . . 1 39940 meaning that for each instance of the PriceModification 39918 entity there may be one Percent 39938 attribute. The PreviousSalesPrice 39942 attribute has a cardinality of 0 . . . 1 39944 meaning that for each instance of the PriceModification 39918 entity there may be one PreviousSalesPrice 39942 attribute. The NewSalesPrice 39946 attribute has a cardinality of 0 . . . 1 39948 meaning that for each instance of the PriceModification 39918 entity there may be one NewSalesPrice 39946 attribute. The PointOfSaleTransactionPriceModificationReasonCode 39950 attribute has a cardinality of 0 . . . 1 39952 meaning that for each instance of the PriceModification 39918 entity there may be one PointOfSaleTransactionPriceModificationReasonCode 39950 attribute.

The Tax 39954 package includes a Tax 39956 entity. The Tax 39956 entity has a cardinality of 0 . . . n 39958 meaning that for each instance of the Tax 39954 package there may be one or more Tax 39956 entities. The Tax 39956 entity includes various attributes, namely a PointOfSaleTransactionTaxID 39960, a PointOfSaleTransactionProductTaxationCharacteristicsCode 39964 and an Amount 39968. The PointOfSaleTransactionTaxID 39960 attribute has a cardinality of 1 39962 meaning that for each instance of the Tax 39956 entity there is one PointOfSaleTransactionTaxID 39960 attribute. The PointOfSaleTransactionProductTaxationCharacteristicsCode 39964 attribute has a cardinality of 1 39966 meaning that for each instance of the Tax 39956 entity there is one PointOfSaleTransactionProductTaxationCharacteristicsCode 39964 attribute. The Amount 39968 attribute has a cardinality of 1 39970 meaning that for each instance of the Tax 39956 entity there is one Amount 39968 attribute.

The ItemLink 39972 package includes an ItemLink 39974 entity. The ItemLink 39974 entity has a cardinality of 0 . . . n 39976 meaning that for each instance of the ItemLink 39972 package there may be one or more ItemLink 39974 entities. The ItemLink 39974 entity includes a PointOfSaleTransactionItemID 39978 attribute. The PointOfSaleTransactionItemID 39978 attribute has a cardinality of 1 39980 meaning that for each instance of the ItemLink 39974 entity there is one PointOfSaleTransactionItemID 39978 attribute.

The TransactionLink 39982 package includes a TransactionLink 39984 entity. The TransactionLink 39984 entity has a cardinality of 0 . . . 1 39986 meaning that for each instance of the TransactionLink 39982 package there may be one TransactionLink 39984 entity. The TransactionLink 39984 entity includes various attributes, namely a StoreInternalID 39988, a DeviceID 39992, a TillID 39996, a PointOfSaleTransactionID 391000, a BusinessDate 391004 and a ProcessingPeriod 391008. The StoreInternalID 39988 attribute has a cardinality of 1 39990 meaning that for each instance of the TransactionLink 39984 entity there is one StoreInternalID 39988 attribute. The DeviceID 39992 attribute has a cardinality of 1 39994 meaning that for each instance of the TransactionLink 39984 entity there is one DeviceID 39992 attribute. The TillID 39996 attribute has a cardinality of 0 . . . 1 39998 meaning that for each instance of the TransactionLink 39984 entity there may be one TillID 39996 attribute. The PointOfSaleTransactionID 391000 attribute has a cardinality of 1 391002 meaning that for each instance of the TransactionLink 39984 entity there is one PointOfSaleTransactionID 391000 attribute. The BusinessDate 391004 attribute has a cardinality of 1 391006 meaning that for each instance of the TransactionLink 39984 entity there is one BusinessDate 391004 attribute. The ProcessingPeriod 391008 attribute has a cardinality of 0 . . . 1 391010 meaning that for each instance of the TransactionLink 39984 entity there may be one ProcessingPeriod 391008 attribute.

The Authorisation 391012 package includes an Authorisation 391014 entity. The Authorisation 391014 entity has a cardinality of 0 . . . n 391016 meaning that for each instance of the Authorisation 391012 package there may be one or more Authorisation 391014 entities. The Authorisation 391014 entity includes an EmployeeID 391018 attribute. The EmployeeID 391018 attribute has a cardinality of 0 . . . 1 391020 meaning that for each instance of the Authorisation 391014 entity there may be one EmployeeID 391018 attribute.

The Party 391022 package includes various entities, namely a ProductRecipientParty 391024 and a CommissionRecipientParty 391032. The ProductRecipientParty 391024 entity has a cardinality of 1 391026 meaning that for each instance of the Party 391022 package there is one ProductRecipientParty 391024 entity. The ProductRecipientParty 391024 entity includes a PartyInternalID 391028 attribute. The PartyInternalID 391028 attribute has a cardinality of 1 391030 meaning that for each instance of the ProductRecipientParty 391024 entity there is one PartyInternalID 391028 attribute. The CommissionRecipientParty 391032 entity has a cardinality of 0 . . . 1 391034 meaning that for each instance of the Party 391022 package there may be one CommissionRecipientParty 391032 entity. The CommissionRecipientParty 391032 entity includes a PartyInternalID 391036 attribute. The PartyInternalID 391036 attribute has a cardinality of 1 391038 meaning that for each instance of the CommissionRecipientParty 391032 entity there is one PartyInternalID 391036 attribute.

The Location 391040 package includes a ShipToLocation 391042 entity. The ShipToLocation 391042 entity has a cardinality of 1 391044 meaning that for each instance of the Location 391040 package there is one ShipToLocation 391042 entity. The ShipToLocation 391042 entity includes a LocationInternalID 391046 attribute. The LocationInternalID 391046 attribute has a cardinality of 1 391048 meaning that for each instance of the ShipToLocation 391042 entity there is one LocationInternalID 391046 attribute.

The ReturnForPickup 391050 package includes a ReturnForPickup 391052 entity. The ReturnForPickup 391050 package includes various packages, namely a Common 391060, an Authorisation 391218, a Party 391228 and a Location 391246. The ReturnForPickup 391052 entity has a cardinality of 0 . . . 1 391054 meaning that for each instance of the ReturnForPickup 391050 package there may be one ReturnForPickup 391052 entity. The ReturnForPickup 391052 entity includes a PointOfSaleTransactionItemReturnReasonCode 391056 attribute. The PointOfSaleTransactionItemReturnReasonCode 391056 attribute has a cardinality of 0 . . . 1 391058 meaning that for each instance of the ReturnForPickup 391052 entity there may be one PointOfSaleTransactionItemReturnReasonCode 391056 attribute.

The Common 391060 package includes a Common 391062 entity. The Common 391060 package includes various packages, namely a PriceModification 391122, a Tax 391160, an ItemLink 391178 and a TransactionLink 391188. The Common 391062 entity has a cardinality of 1 391064 meaning that for each instance of the Common 391060 package there is one Common 391062 entity. The Common 391062 entity includes various attributes, namely a ProductInternalID 391066, a ProductStandardID 391070, a ProductCategoryInternalID 391074, a ProductCategoryHierarchyTypeCode 391078, a ProductCategoryHierarchyID 391082, a Description 391086, a CostPrice 391090, a ListPrice 391094, a RegularSalesPrice 391098, an ActualSalesPrice 391102, a TotalAmount 391106, a DiscountAmount 391110, a TotalDiscountAmount 391114 and a Quantity 391118. The ProductInternalID 391066 attribute has a cardinality of 0 . . . 1 391068 meaning that for each instance of the Common 391062 entity there may be one ProductInternalID 391066 attribute. The ProductStandardID 391070 attribute has a cardinality of 0 . . . 1 391072 meaning that for each instance of the Common 391062 entity there may be one ProductStandardID 391070 attribute. The ProductCategoryInternalID 391074 attribute has a cardinality of 0 . . . 1 391076 meaning that for each instance of the Common 391062 entity there may be one ProductCategoryInternalID 391074 attribute. The ProductCategoryHierarchyTypeCode 391078 attribute has a cardinality of 0 . . . 1 391080 meaning that for each instance of the Common 391062 entity there may be one ProductCategoryHierarchyTypeCode 391078 attribute. The ProductCategoryHierarchyID 391082 attribute has a cardinality of 0 . . . 1 391084 meaning that for each instance of the Common 391062 entity there may be one ProductCategoryHierarchyID 391082 attribute. The Description 391086 attribute has a cardinality of 0 . . . 1 391088 meaning that for each instance of the Common 391062 entity there may be one Description 391086 attribute. The CostPrice 391090 attribute has a cardinality of 0 . . . 1 391092 meaning that for each instance of the Common 391062 entity there may be one CostPrice 391090 attribute. The ListPrice 391094 attribute has a cardinality of 0 . . . 1 391096 meaning that for each instance of the Common 391062 entity there may be one ListPrice 391094 attribute. The RegularSalesPrice 391098 attribute has a cardinality of 0 . . . 1 391100 meaning that for each instance of the Common 391062 entity there may be one RegularSalesPrice 391098 attribute. The ActualSalesPrice 391102 attribute has a cardinality of 0 . . . 1 391104 meaning that for each instance of the Common 391062 entity there may be one ActualSalesPrice 391102 attribute. The TotalAmount 391106 attribute has a cardinality of 1 391108 meaning that for each instance of the Common 391062 entity there is one TotalAmount 391106 attribute. The DiscountAmount 391110 attribute has a cardinality of 0 . . . 1 391112 meaning that for each instance of the Common 391062 entity there may be one DiscountAmount 391110 attribute. The TotalDiscountAmount 391114 attribute has a cardinality of 0 . . . 1 391116 meaning that for each instance of the Common 391062 entity there may be one TotalDiscountAmount 391114 attribute. The Quantity 391118 attribute has a cardinality of 1 391120 meaning that for each instance of the Common 391062 entity there is one Quantity 391118 attribute.

The PriceModification 391122 package includes a PriceModification 391124 entity. The PriceModification 391124 entity has a cardinality of 0 . . . n 391126 meaning that for each instance of the PriceModification 391122 package there may be one or more PriceModification 391124 entities. The PriceModification 391124 entity includes various attributes, namely a PointOfSaleTransactionPriceModificationID 391128, a PointOfSaleTransactionPriceModifierTypeCode 391132, a PointOfSaleTransactionPriceModifierID 391136, an Amount 391140, a Percent 391144, a PreviousSalesPrice 391148, a NewSalesPrice 391152 and a PointOfSaleTransactionPriceModificationReasonCode 391156. The PointOfSaleTransactionPriceModificationID 391128 attribute has a cardinality of 1 391130 meaning that for each instance of the PriceModification 391124 entity there is one PointOfSaleTransactionPriceModificationID 391128 attribute. The PointOfSaleTransactionPriceModifierTypeCode 391132 attribute has a cardinality of 1 391134 meaning that for each instance of the PriceModification 391124 entity there is one PointOfSaleTransactionPriceModifierTypeCode 391132 attribute. The PointOfSaleTransactionPriceModifierID 391136 attribute has a cardinality of 0 . . . 1 391138 meaning that for each instance of the PriceModification 391124 entity there may be one PointOfSaleTransactionPriceModifierID 391136 attribute. The Amount 391140 attribute has a cardinality of 0 . . . 1 391142 meaning that for each instance of the PriceModification 391124 entity there may be one Amount 391140 attribute. The Percent 391144 attribute has a cardinality of 0 . . . 1 391146 meaning that for each instance of the PriceModification 391124 entity there may be one Percent 391144 attribute. The PreviousSalesPrice 391148 attribute has a cardinality of 0 . . . 1 391150 meaning that for each instance of the PriceModification 391124 entity there may be one PreviousSalesPrice 391148 attribute. The NewSalesPrice 391152 attribute has a cardinality of 0 . . . 1 391154 meaning that for each instance of the PriceModification 391124 entity there may be one NewSalesPrice 391152 attribute. The PointOfSaleTransactionPriceModificationReasonCode 391156 attribute has a cardinality of 0 . . . 1 391158 meaning that for each instance of the PriceModification 391124 entity there may be one PointOfSaleTransactionPriceModificationReasonCode 391156 attribute.

The Tax 391160 package includes a Tax 391162 entity. The Tax 391162 entity has a cardinality of 0 . . . n 391164 meaning that for each instance of the Tax 391160 package there may be one or more Tax 391162 entities. The Tax 391162 entity includes various attributes, namely a PointOfSaleTransactionTaxID 391166, a PointOfSaleTransactionProductTaxationCharacteristicsCode 391170 and an Amount 391174. The PointOfSaleTransactionTaxID 391166 attribute has a cardinality of 1 391168 meaning that for each instance of the Tax 391162 entity there is one PointOfSaleTransactionTaxID 391166 attribute. The PointOfSaleTransactionProductTaxationCharacteristicsCode 391170 attribute has a cardinality of 1 391172 meaning that for each instance of the Tax 391162 entity there is one PointOfSaleTransactionProductTaxationCharacteristicsCode 391170 attribute. The Amount 391174 attribute has a cardinality of 1 391176 meaning that for each instance of the Tax 391162 entity there is one Amount 391174 attribute.

The ItemLink 391178 package includes an ItemLink 391180 entity. The ItemLink 391180 entity has a cardinality of 0 . . . n 391182 meaning that for each instance of the ItemLink 391178 package there may be one or more ItemLink 391180 entities. The ItemLink 391180 entity includes a PointOfSaleTransactionItemID 391184 attribute. The PointOfSaleTransactionItemID 391184 attribute has a cardinality of 1 391186 meaning that for each instance of the ItemLink 391180 entity there is one PointOfSaleTransactionItemID 391184 attribute.

The TransactionLink 391188 package includes a TransactionLink 391190 entity. The TransactionLink 391190 entity has a cardinality of 0 . . . 1 391192 meaning that for each instance of the TransactionLink 391188 package there may be one TransactionLink 391190 entity. The TransactionLink 391190 entity includes various attributes, namely a StoreInternalID 391194, a DeviceID 391198, a TillID 391202, a PointOfSaleTransactionID 391206, a BusinessDate 391210 and a ProcessingPeriod 391214. The StoreInternalID 391194 attribute has a cardinality of 1 391196 meaning that for each instance of the TransactionLink 391190 entity there is one StoreInternalID 391194 attribute. The DeviceID 391198 attribute has a cardinality of 1 391200 meaning that for each instance of the TransactionLink 391190 entity there is one DeviceID 391198 attribute. The TillID 391202 attribute has a cardinality of 0 . . . 1 391204 meaning that for each instance of the TransactionLink 391190 entity there may be one TillID 391202 attribute. The PointOfSaleTransactionID 391206 attribute has a cardinality of 1 391208 meaning that for each instance of the TransactionLink 391190 entity there is one PointOfSaleTransactionID 391206 attribute. The BusinessDate 391210 attribute has a cardinality of 1 391212 meaning that for each instance of the TransactionLink 391190 entity there is one BusinessDate 391210 attribute. The ProcessingPeriod 391214 attribute has a cardinality of 0 . . . 1 391216 meaning that for each instance of the TransactionLink 391190 entity there may be one ProcessingPeriod 391214 attribute.

The Authorisation 391218 package includes an Authorisation 391220 entity. The Authorisation 391220 entity has a cardinality of 0 . . . n 391222 meaning that for each instance of the Authorisation 391218 package there may be one or more Authorisation 391220 entities. The Authorisation 391220 entity includes an EmployeeID 391224 attribute. The EmployeeID 391224 attribute has a cardinality of 0 . . . 1 391226 meaning that for each instance of the Authorisation 391220 entity there may be one EmployeeID 391224 attribute.

The Party 391228 package includes various entities, namely a BuyerParty 391230 and a CommissionRecipientParty 391238. The BuyerParty 391230 entity has a cardinality of 1 391232 meaning that for each instance of the Party 391228 package there is one BuyerParty 391230 entity. The BuyerParty 391230 entity includes a PartyInternalID 391234 attribute. The PartyInternalID 391234 attribute has a cardinality of 1 391236 meaning that for each instance of the BuyerParty 391230 entity there is one PartyInternalID 391234 attribute. The CommissionRecipientParty 391238 entity has a cardinality of 0 . . . 1 391240 meaning that for each instance of the Party 391228 package there may be one CommissionRecipientParty 391238 entity. The CommissionRecipientParty 391238 entity includes a PartyInternalID 391242 attribute. The PartyInternalID 391242 attribute has a cardinality of 1 391244 meaning that for each instance of the CommissionRecipientParty 391238 entity there is one PartyInternalID 391242 attribute.

The Location 391246 package includes a ShipToLocation 391248 entity. The ShipToLocation 391248 entity has a cardinality of 1 391250 meaning that for each instance of the Location 391246 package there is one ShipToLocation 391248 entity. The ShipToLocation 391248 entity includes a LocationInternalID 391252 attribute. The LocationInternalID 391252 attribute has a cardinality of 1 391254 meaning that for each instance of the ShipToLocation 391248 entity there is one LocationInternalID 391252 attribute.

The Void 391256 package includes a Void 391258 entity. The Void 391258 entity has a cardinality of 0 . . . 1 391260 meaning that for each instance of the Void 391256 package there may be one Void 391258 entity. The Void 391258 entity includes various attributes, namely a PointOfSaleTransactionItemID 391262 and a Quantity 391266. The PointOfSaleTransactionItemID 391262 attribute has a cardinality of 1 391264 meaning that for each instance of the Void 391258 entity there is one PointOfSaleTransactionItemID 391262 attribute. The Quantity 391266 attribute has a cardinality of 1 391268 meaning that for each instance of the Void 391258 entity there is one Quantity 391266 attribute.

The PaymentOnAccount 391270 package includes a PaymentOnAccount 391272 entity. The PaymentOnAccount

391270 package includes a Party 391292 package. The PaymentOnAccount 391272 entity has a cardinality of 0 . . . 1 391274 meaning that for each instance of the PaymentOnAccount 391270 package there may be one PaymentOnAccount 391272 entity. The PaymentOnAccount 391272 entity includes various attributes, namely a BusinessTransactionDocumentID 391276, a BusinessTransactionDocumentProcessingTypeCode 391280, a CustomerID 391284 and an Amount 391288. The BusinessTransactionDocumentID 391276 attribute has a cardinality of 0 . . . 1 391278 meaning that for each instance of the PaymentOnAccount 391272 entity there may be one BusinessTransactionDocumentID 391276 attribute. The BusinessTransactionDocumentProcessingTypeCode 391280 attribute has a cardinality of 0 . . . 1 391282 meaning that for each instance of the PaymentOnAccount 391272 entity there may be one BusinessTransactionDocumentProcessingTypeCode 391280 attribute. The CustomerID 391284 attribute has a cardinality of 0 . . . 1 391286 meaning that for each instance of the PaymentOnAccount 391272 entity there may be one CustomerID 391284 attribute. The Amount 391288 attribute has a cardinality of 0 . . . 1 391290 meaning that for each instance of the PaymentOnAccount 391272 entity there may be one Amount 391288 attribute.

The Party 391292 package includes a CommissionRecipientParty 391294 entity. The CommissionRecipientParty 391294 entity has a cardinality of 0 . . . 1 391296 meaning that for each instance of the Party 391292 package there may be one CommissionRecipientParty 391294 entity. The CommissionRecipientParty 391294 entity includes a PartyInternalID 391298 attribute. The PartyInternalID 391298 attribute has a cardinality of 1 391300 meaning that for each instance of the CommissionRecipientParty 391294 entity there is one PartyInternalID 391298 attribute.

The PriceModification 391302 package includes a PriceModification 391304 entity. The PriceModification 391304 entity has a cardinality of 0 . . . n 391306 meaning that for each instance of the PriceModification 391302 package there may be one or more PriceModification 391304 entities. The PriceModification 391304 entity includes various attributes, namely a PointOfSaleTransactionPriceModificationID 391308, a PointOfSaleTransactionPriceModifierTypeCode 391312, a PointOfSaleTransactionPriceModifierID 391316, an Amount 391320, a Percent 391324, a PreviousSalesPrice 391328, a NewSalesPrice 391332 and a PointOfSaleTransactionPriceModificationReasonCode 391336. The PointOfSaleTransactionPriceModificationID 391308 attribute has a cardinality of 1 391310 meaning that for each instance of the PriceModification 391304 entity there is one PointOfSaleTransactionPriceModificationID 391308 attribute. The PointOfSaleTransactionPriceModifierTypeCode 391312 attribute has a cardinality of 1 391314 meaning that for each instance of the PriceModification 391304 entity there is one PointOfSaleTransactionPriceModifierTypeCode 391312 attribute. The PointOfSaleTransactionPriceModifierID 391316 attribute has a cardinality of 0 . . . 1 391318 meaning that for each instance of the PriceModification 391304 entity there may be one PointOfSaleTransactionPriceModifierID 391316 attribute. The Amount 391320 attribute has a cardinality of 0 . . . 1 391322 meaning that for each instance of the PriceModification 391304 entity there may be one Amount 391320 attribute. The Percent 391324 attribute has a cardinality of 0 . . . 1 391326 meaning that for each instance of the PriceModification 391304 entity there may be one Percent 391324 attribute. The PreviousSalesPrice 391328 attribute has a cardinality of 0 . . . 1 391330 meaning that for each instance of the PriceModification 391304 entity there may be one PreviousSalesPrice 391328 attribute. The NewSalesPrice 391332 attribute has a cardinality of 0 . . . 1 391334 meaning that for each instance of the PriceModification 391304 entity there may be one NewSalesPrice 391332 attribute. The PointOfSaleTransactionPriceModificationReasonCode 391336 attribute has a cardinality of 0 . . . 1 391338 meaning that for each instance of the PriceModification 391304 entity there may be one PointOfSaleTransactionPriceModificationReasonCode 391336 attribute.

The Tax 391340 package includes a Tax 391342 entity. The Tax 391342 entity has a cardinality of 0 . . . n 391344 meaning that for each instance of the Tax 391340 package there may be one or more Tax 391342 entities. The Tax 391342 entity includes various attributes, namely a PointOfSaleTransactionTaxID 391346, a PointOfSaleTransactionProductTaxationCharacteristicsCode 391350 and an Amount 391354. The PointOfSaleTransactionTaxID 391346 attribute has a cardinality of 1 391348 meaning that for each instance of the Tax 391342 entity there is one PointOfSaleTransactionTaxID 391346 attribute. The PointOfSaleTransactionProductTaxationCharacteristicsCode 391350 attribute has a cardinality of 1 391352 meaning that for each instance of the Tax 391342 entity there is one PointOfSaleTransactionProductTaxationCharacteristicsCode 391350 attribute. The Amount 391354 attribute has a cardinality of 1 391356 meaning that for each instance of the Tax 391342 entity there is one Amount 391354 attribute.

The Tender 391358 package includes a Tender 391360 entity. The Tender 391358 package includes various packages, namely a Change 391388, an Authorisation 391402, a Cheque 391442, a CreditCard 391468, a DebitCard 391494, a TravellersCheque 391520 and a GiftCard 391546. The Tender 391360 entity has a cardinality of 0 . . . n 391362 meaning that for each instance of the Tender 391358 package there may be one or more Tender 391360 entities. The Tender 391360 entity includes various attributes, namely a PointOfSaleTransactionTenderID 391364, a PointOfSaleTransactionTenderTypeCode 391368, a VoidIndicator 391372, an Amount 391376, a TipAmount 391380 and a CashbackAmount 391384. The PointOfSaleTransactionTenderID 391364 attribute has a cardinality of 1 391366 meaning that for each instance of the Tender 391360 entity there is one PointOfSaleTransactionTenderID 391364 attribute. The PointOfSaleTransactionTenderTypeCode 391368 attribute has a cardinality of 1 391370 meaning that for each instance of the Tender 391360 entity there is one PointOfSaleTransactionTenderTypeCode 391368 attribute. The VoidIndicator 391372 attribute has a cardinality of 1 391374 meaning that for each instance of the Tender 391360 entity there is one VoidIndicator 391372 attribute. The Amount 391376 attribute has a cardinality of 1 391378 meaning that for each instance of the Tender 391360 entity there is one Amount 391376 attribute. The TipAmount 391380 attribute has a cardinality of 0 . . . 1 391382 meaning that for each instance of the Tender 391360 entity there may be one TipAmount 391380 attribute. The CashbackAmount 391384 attribute has a cardinality of 0 . . . 1 391386 meaning that for each instance of the Tender 391360 entity there may be one CashbackAmount 391384 attribute.

The Change 391388 package includes a Change 391390 entity. The Change 391390 entity has a cardinality of 0 . . . n 391392 meaning that for each instance of the Change 391388 package there may be one or more Change 391390 entities. The Change 391390 entity includes various attributes, namely a PointOfSaleTransactionTenderTypeCode 391394 and an Amount 391398. The PointOfSaleTransactionTenderTypeCode 391394 attribute has a cardinality of 1 391396 meaning that for each instance of the Change 391390 entity there is one PointOfSaleTransactionTenderTypeCode 391394 attribute. The Amount 391398 attribute has a cardinality of 1 391400 meaning that for each instance of the Change 391390 entity there is one Amount 391398 attribute.

The Authorisation 391402 package includes an Authorisation 391404 entity. The Authorisation 391404 entity has a cardinality of 0 . . . n 391406 meaning that for each instance of the Authorisation 391402 package there may be one or more Authorisation 391404 entities. The Authorisation 391404 entity includes various attributes, namely a PaymentCardAuthorisationMethodCode 391408, a ConfirmedIndicator 391414, a RequestedAmount 391418, an AuthorisedAmount 391422, a PaymentCardPaymentID 391426, an AuthorisationTimePoint 391430, a PaymentCardPaymentAuthorisationPartyID 391434 and a MagnetStripeReaderDeviceID 391438. The PaymentCardAuthorisationMethodCode 391408 attribute has a cardinality of 0 . . . 1 391412 meaning that for each instance of the Authorisation 391404 entity there may be one PaymentCardAuthorisationMethodCode 391408 attribute. The ConfirmedIndicator 391414 attribute has a cardinality of 1 391416 meaning that for each instance of the Authorisation 391404 entity there is one ConfirmedIndicator 391414 attribute. The RequestedAmount 391418 attribute has a cardinality of 0 . . . 1 391420 meaning that for each instance of the Authorisation 391404 entity there may be one RequestedAmount 391418 attribute. The AuthorisedAmount 391422 attribute has a cardinality of 0 . . . 1 391424 meaning that for each instance of the Authorisation 391404 entity there may be one AuthorisedAmount 391422 attribute. The PaymentCardPaymentID 391426 attribute has a cardinality of 0 . . . 1 391428 meaning that for each instance of the Authorisation 391404 entity there may be one PaymentCardPaymentID 391426 attribute. The AuthorisationTimePoint 391430 attribute has a cardinality of 0 . . . 1 391432 meaning that for each instance of the Authorisation 391404 entity there may be one AuthorisationTimePoint 391430 attribute. The PaymentCardPaymentAuthorisationPartyID 391434 attribute has a cardinality of 0 . . . 1 391436 meaning that for each instance of the Authorisation 391404 entity there may be one PaymentCardPaymentAuthorisationPartyID 391434 attribute. The MagnetStripeReaderDeviceID 391438 attribute has a cardinality of 0 . . . 1 391440 meaning that for each instance of the Authorisation 391404 entity there may be one MagnetStripeReaderDeviceID 391438 attribute.

The Cheque 391442 package includes a Cheque 391444 entity. The Cheque 391444 entity has a cardinality of 0 . . . n 391446 meaning that for each instance of the Cheque 391442 package there may be one or more Cheque 391444 entities. The Cheque 391444 entity includes various attributes, namely a BankStandardID 391448, a BankInternalID 391452, a BankAccountStandardID 391456, a BankAccountInternalID 391460 and an ID 391464. The BankStandardID 391448 attribute has a cardinality of 0 . . . 1 391450 meaning that for each instance of the Cheque 391444 entity there may be one BankStandardID 391448 attribute. The BankInternalID 391452 attribute has a cardinality of 0 . . . 1 391454 meaning that for each instance of the Cheque 391444 entity there may be one BankInternalID 391452 attribute. The BankAccountStandardID 391456 attribute has a cardinality of 0 . . . 1 391458 meaning that for each instance of the Cheque 391444 entity there may be one BankAccountStandardID 391456 attribute. The BankAccountInternalID 391460 attribute has a cardinality of 0 . . . 1 391462 meaning that for each instance of the Cheque 391444 entity there may be one BankAccountInternalID 391460 attribute. The ID 391464 attribute has a cardinality of 0 . . . 1 391466 meaning that for each instance of the Cheque 391444 entity there may be one ID 391464 attribute.

The CreditCard 391468 package includes a CreditCard 391470 entity. The CreditCard 391470 entity has a cardinality of 0 . . . n 391472 meaning that for each instance of the CreditCard 391468 package there may be one or more CreditCard 391470 entities. The CreditCard 391470 entity includes various attributes, namely a PaymentCardID 391474, a PaymentCardTypeCode 391478, a PaymentCardHolderName 391482, a ValidityPeriod 391486 and a PaymentCardDataOriginTypeCode 391490. The PaymentCardID 391474 attribute has a cardinality of 0 . . . 1 391476 meaning that for each instance of the CreditCard 391470 entity there may be one PaymentCardID 391474 attribute. The PaymentCardTypeCode 391478 attribute has a cardinality of 0 . . . 1 391480 meaning that for each instance of the CreditCard 391470 entity there may be one PaymentCardTypeCode 391478 attribute. The PaymentCardHolderName 391482 attribute has a cardinality of 0 . . . 1 391484 meaning that for each instance of the CreditCard 391470 entity there may be one PaymentCardHolderName 391482 attribute. The ValidityPeriod 391486 attribute has a cardinality of 0 . . . 1 391488 meaning that for each instance of the CreditCard 391470 entity there may be one ValidityPeriod 391486 attribute. The PaymentCardDataOriginTypeCode 391490 attribute has a cardinality of 0 . . . 1 391492 meaning that for each instance of the CreditCard 391470 entity there may be one PaymentCardDataOriginTypeCode 391490 attribute.

The DebitCard 391494 package includes a DebitCard 391496 entity. The DebitCard 391496 entity has a cardinality of 0 . . . n 391498 meaning that for each instance of the DebitCard 391494 package there may be one or more DebitCard 391496 entities. The DebitCard 391496 entity includes various attributes, namely a BankStandardID 391500, a BankInternalID 391504, a BankAccountStandardID 391508, a BankAccountInternalID 391512 and a PaymentCardHolderName 391516. The BankStandardID 391500 attribute has a cardinality of 0 . . . 1 391502 meaning that for each instance of the DebitCard 391496 entity there may be one BankStandardID 391500 attribute. The BankInternalID 391504 attribute has a cardinality of 0 . . . 1 391506 meaning that for each instance of the DebitCard 391496 entity there may be one BankInternalID 391504 attribute. The BankAccountStandardID 391508 attribute has a cardinality of 0 . . . 1 391510 meaning that for each instance of the DebitCard 391496 entity there may be one BankAccountStandardID 391508 attribute. The BankAccountInternalID 391512 attribute has a cardinality of 0 . . . 1 391514 meaning that for each instance of the DebitCard 391496 entity there may be one BankAccountInternalID 391512 attribute. The PaymentCardHolderName 391516 attribute has a cardinality of 0 . . . 1 391518 meaning that for each instance of the DebitCard 391496 entity there may be one PaymentCardHolderName 391516 attribute.

The TravellersCheque 391520 package includes a TravellersCheque 391522 entity. The TravellersCheque 391522 entity has a cardinality of 0 . . . n 391524 meaning that for each instance of the TravellersCheque 391520 package there may be one or more TravellersCheque 391522 entities. The TravellersCheque 391522 entity includes various attributes, namely a BankStandardID 391526, a BankInternalID 391530, a BankAccountStandardID 391534, a BankAccountInternalID 391538 and an ID 391542. The BankStandardID 391526 attribute has a cardinality of 0 . . . 1 391528 meaning that for each instance of the TravellersCheque 391522 entity there may be one BankStandardID 391526 attribute. The BankInternalID 391530 attribute has a cardinality of 0 . . . 1 391532 meaning that for each instance of the TravellersCheque 391522 entity there may be one BankInternalID 391530 attribute. The BankAccountStandardID 391534 attribute has a cardinality of 0 . . . 1 391536 meaning that for each instance of the TravellersCheque 391522 entity there may be one BankAccountStandardID 391534 attribute. The BankAccountInternalID 391538 attribute has a cardinality of 0 . . . 1 391540 meaning that for each instance of the TravellersCheque 391522 entity there may be one BankAccountInternalID 391538 attribute. The ID 391542 attribute has a cardinality of 0 . . . 1 391544 meaning that for each instance of the TravellersCheque 391522 entity there may be one ID 391542 attribute.

The GiftCard 391546 package includes a GiftCard 391548 entity. The GiftCard 391548 entity has a cardinality of 0 . . . n 391550 meaning that for each instance of the GiftCard 391546 package there may be one or more GiftCard 391548 entities. The GiftCard 391548 entity includes various attributes, namely a PaymentCardID 391552 and an ExpirationDate 391556. The PaymentCardID 391552 attribute has a cardinality of 0 . . . 1 391554 meaning that for each instance of the GiftCard 391548 entity there may be one PaymentCardID 391552 attribute. The ExpirationDate 391556 attribute has a cardinality of 0 . . . 1 391558 meaning that for each instance of the GiftCard 391548 entity there may be one ExpirationDate 391556 attribute.

The TransactionLink 391560 package includes a TransactionLink 391562 entity. The TransactionLink 391562 entity has a cardinality of 0 . . . 1 391564 meaning that for each instance of the TransactionLink 391560 package there may be one TransactionLink 391562 entity. The TransactionLink 391562 entity includes various attributes, namely a StoreInternalID 391566, a DeviceID 391570, a TillID 391574, a PointOfSaleTransactionID 391578, a BusinessDate 391582 and a ProcessingPeriod 391586. The StoreInternalID 391566 attribute has a cardinality of 1 391568 meaning that for each instance of the TransactionLink 391562 entity there is one StoreInternalID 391566 attribute. The DeviceID 391570 attribute has a cardinality of 1 391572 meaning that for each instance of the TransactionLink 391562 entity there is one DeviceID 391570 attribute. The TillID 391574 attribute has a cardinality of 0 . . . 1 391576 meaning that for each instance of the TransactionLink 391562 entity there may be one TillID 391574 attribute. The PointOfSaleTransactionID 391578 attribute has a cardinality of 1 391580 meaning that for each instance of the TransactionLink 391562 entity there is one PointOfSaleTransactionID 391578 attribute. The BusinessDate 391582 attribute has a cardinality of 1 391584 meaning that for each instance of the TransactionLink 391562 entity there is one BusinessDate 391582 attribute. The ProcessingPeriod 391586 attribute has a cardinality of 0 . . . 1 391588 meaning that for each instance of the TransactionLink 391562 entity there may be one ProcessingPeriod 391586 attribute.

The Party 391590 package includes various entities, namely a BuyerParty 391592 and a ProductReceipientParty 391604. The BuyerParty 391592 entity has a cardinality of 0 . . . 1 391594 meaning that for each instance of the Party 391590 package there may be one BuyerParty 391592 entity. The BuyerParty 391592 entity includes various attributes, namely a PartyInternalID 391596 and an EmployeeID 391600. The PartyInternalID 391596 attribute has a cardinality of 0 . . . 1 391598 meaning that for each instance of the BuyerParty 391592 entity there may be one PartyInternalID 391596 attribute. The EmployeeID 391600 attribute has a cardinality of 0 . . . 1 391602 meaning that for each instance of the BuyerParty 391592 entity there may be one EmployeeID 391600 attribute. The ProductReceipientParty 391604 entity has a cardinality of 0 . . . 1 391606 meaning that for each instance of the Party 391590 package there may be one ProductReceipientParty 391604 entity. The ProductReceipientParty 391604 entity includes a PartyInternalID 391608 attribute. The PartyInternalID 391608 attribute has a cardinality of 1 391610 meaning that for each instance of the ProductReceipientParty 391604 entity there is one PartyInternalID 391608 attribute.

The Total 391612 package includes a Total 391614 entity. The Total 391614 entity has a cardinality of 0 . . . 1 391616 meaning that for each instance of the Total 391612 package there may be one Total 391614 entity. The Total 391614 entity includes various attributes, namely a GrossTotalAmount 391618, a NetTotalAmount 391622 and a TaxTotalAmount 391626. The GrossTotalAmount 391618 attribute has a cardinality of 0 . . . 1 391620 meaning that for each instance of the Total 391614 entity there may be one GrossTotalAmount 391618 attribute. The NetTotalAmount 391622 attribute has a cardinality of 0 . . . 1 391624 meaning that for each instance of the Total 391614 entity there may be one NetTotalAmount 391622 attribute. The TaxTotalAmount 391626 attribute has a cardinality of 0 . . . 1 391628 meaning that for each instance of the Total 391614 entity there may be one TaxTotalAmount 391626 attribute.

The FinancialTransaction 391630 package includes a FinancialTransaction 391632 entity. The FinancialTransaction 391630 package includes an Item 391636 package. The FinancialTransaction 391632 entity has a cardinality of 0 . . . 1 391634 meaning that for each instance of the FinancialTransaction 391630 package there may be one FinancialTransaction 391632 entity.

The Item 391636 package includes an Item 391638 entity. The Item 391636 package includes various packages, namely a Deposit 391646, a PaidIn 391664, a PaidOut 391682, a TenderLoan 391700, a TenderPickup 391718 and a TenderAdjustment 391736. The Item 391638 entity has a cardinality of 1 . . . n 391640 meaning that for each instance of the Item 391636 package there are one or more Item 391638 entities. The Item 391638 entity includes a PointOfSaleTransactionItemID 391642 attribute. The PointOfSaleTransactionItemID 391642 attribute has a cardinality of 1 391644 meaning that for each instance of the Item 391638 entity there is one PointOfSaleTransactionItemID 391642 attribute.

The Deposit 391646 package includes a Deposit 391648 entity. The Deposit 391648 entity has a cardinality of 0 . . . 1 391650 meaning that for each instance of the Deposit 391646 package there may be one Deposit 391648 entity. The Deposit 391648 entity includes various attributes, namely a BankAccountStandardID 391652, a BankAccountInternalID 391656 and an Amount 391660. The BankAccountStandardID 391652 attribute has a cardinality of 0 . . . 1 391654 meaning that for each instance of the Deposit 391648 entity there may be one BankAccountStandardID 391652 attribute. The BankAccountInternalID 391656 attribute has a cardinality of 0 . . . 1 391658 meaning that for each instance of the Deposit 391648 entity there may be one BankAccountInternalID 391656 attribute. The Amount 391660 attribute has a cardinality of 1 391662 meaning that for each instance of the Deposit 391648 entity there is one Amount 391660 attribute.

The PaidIn 391664 package includes a PaidIn 391666 entity. The PaidIn 391666 entity has a cardinality of 0 . . . 1 391668 meaning that for each instance of the PaidIn 391664 package there may be one PaidIn 391666 entity. The PaidIn 391666 entity includes various attributes, namely a PointOfSaleTransactionTenderTypeCode 391670, an Amount 391674 and a PointOfSaleTransactionFinancialTransactionReasonCode 391678. The PointOfSaleTransactionTenderTypeCode 391670 attribute has a cardinality of 0 . . . 1 391672 meaning that for each instance of the PaidIn 391666 entity there may be one PointOfSaleTransactionTenderTypeCode 391670 attribute. The Amount 391674 attribute has a cardinality of 1 391676 meaning that for each instance of the PaidIn 391666 entity there is one Amount 391674 attribute. The PointOfSaleTransactionFinancialTransactionReasonCode 391678 attribute has a cardinality of 0 . . . 1 391680 meaning that for each instance of the PaidIn 391666 entity there may be one PointOfSaleTransactionFinancialTransactionReasonCode 391678 attribute.

The PaidOut 391682 package includes a PaidOut 391684 entity. The PaidOut 391684 entity has a cardinality of 0 . . . 1 391686 meaning that for each instance of the PaidOut 391682 package there may be one PaidOut 391684 entity. The PaidOut 391684 entity includes various attributes, namely a PointOfSaleTransactionTenderTypeCode 391688, an Amount 391692 and a PointOfSaleTransactionFinancialTransactionReasonCode 391696. The PointOfSaleTransactionTenderTypeCode 391688 attribute has a cardinality of 0 . . . 1 391690 meaning that for each instance of the PaidOut 391684 entity there may be one PointOfSaleTransactionTenderTypeCode 391688 attribute. The Amount 391692 attribute has a cardinality of 1 391694 meaning that for each instance of the PaidOut 391684 entity there is one Amount 391692 attribute. The PointOfSaleTransactionFinancialTransactionReasonCode 391696 attribute has a cardinality of 0 . . . 1 391698 meaning that for each instance of the PaidOut 391684 entity there may be one PointOfSaleTransactionFinancialTransactionReasonCode 391696 attribute.

The TenderLoan 391700 package includes a TenderLoan 391702 entity. The TenderLoan 391702 entity has a cardinality of 0 . . . 1 391704 meaning that for each instance of the TenderLoan 391700 package there may be one TenderLoan 391702 entity. The TenderLoan 391702 entity includes various attributes, namely a PointOfSaleTransactionTenderTypeCode 391706, an Amount 391710 and a PointOfSaleTransactionFinancialTransactionReasonCode 391714. The PointOfSaleTransactionTenderTypeCode 391706 attribute has a cardinality of 0 . . . 1 391708 meaning that for each instance of the TenderLoan 391702 entity there may be one PointOfSaleTransactionTenderTypeCode 391706 attribute. The Amount 391710 attribute has a cardinality of 1 391712 meaning that for each instance of the TenderLoan 391702 entity there is one Amount 391710 attribute. The PointOfSaleTransactionFinancialTransactionReasonCode 391714 attribute has a cardinality of 0 . . . 1 391716 meaning that for each instance of the TenderLoan 391702 entity there may be one PointOfSaleTransactionFinancialTransactionReasonCode 391714 attribute.

The TenderPickup 391718 package includes a TenderPickup 391720 entity. The TenderPickup 391720 entity has a cardinality of 0 . . . 1 391722 meaning that for each instance of the TenderPickup 391718 package there may be one TenderPickup 391720 entity. The TenderPickup 391720 entity includes various attributes, namely a PointOfSaleTransactionTenderTypeCode 391724, an Amount 391728 and a PointOfSaleTransactionFinancialTransactionReasonCode 391732. The PointOfSaleTransactionTenderTypeCode 391724 attribute has a cardinality of 0 . . . 1 391726 meaning that for each instance of the TenderPickup 391720 entity there may be one PointOfSaleTransactionTenderTypeCode 391724 attribute. The Amount 391728 attribute has a cardinality of 1 391730 meaning that for each instance of the TenderPickup 391720 entity there is one Amount 391728 attribute. The PointOfSaleTransactionFinancialTransactionReasonCode 391732 attribute has a cardinality of 0 . . . 1 391734 meaning that for each instance of the TenderPickup 391720 entity there may be one PointOfSaleTransactionFinancialTransactionReasonCode 391732 attribute.

The TenderAdjustment 391736 package includes a TenderAdjustment 391738 entity. The TenderAdjustment 391738 entity has a cardinality of 0 . . . 1 391740 meaning that for each instance of the TenderAdjustment 391736 package there may be one TenderAdjustment 391738 entity. The TenderAdjustment 391738 entity includes various attributes, namely a PointOfSaleTransactionTenderTypeCode 391742, an Amount 391746 and a PointOfSaleTransactionFinancialTransactionReasonCode 391750. The PointOfSaleTransactionTenderTypeCode 391742 attribute has a cardinality of 0 . . . 1 391744 meaning that for each instance of the TenderAdjustment 391738 entity there may be one PointOfSaleTransactionTenderTypeCode 391742 attribute. The Amount 391746 attribute has a cardinality of 1 391748 meaning that for each instance of the TenderAdjustment 391738 entity there is one Amount 391746 attribute. The PointOfSaleTransactionFinancialTransactionReasonCode 391750 attribute has a cardinality of 0 . . . 1 391752 meaning that for each instance of the TenderAdjustment 391738 entity there may be one PointOfSaleTransactionFinancialTransactionReasonCode 391750 attribute.

The ControlTransaction 391754 package includes a ControlTransaction 391756 entity. The ControlTransaction 391754 package includes an Item 391760 package. The ControlTransaction 391756 entity has a cardinality of 0 . . . 1 391758 meaning that for each instance of the ControlTransaction 391754 package there may be one ControlTransaction 391756 entity.

The Item 391760 package includes an Item 391762 entity. The Item 391762 entity has a cardinality of 1 . . . n 391764 meaning that for each instance of the Item 391760 package there are one or more Item 391762 entities. The Item 391762 entity includes various attributes, namely a PointOfSaleTransactionItemID 391766 and a PointOfSaleTransactionControlTransactionReasonCode 391770. The PointOfSaleTransactionItemID 391766 attribute has a cardinality of 1 391768 meaning that for each instance of the Item 391762 entity there is one PointOfSaleTransactionItemID 391766 attribute. The PointOfSaleTransactionControlTransactionReasonCode 391770 attribute has a cardinality of 1 391772 meaning that for each instance of the Item 391762 entity there is one PointOfSaleTransactionControlTransactionReasonCode 391770 attribute.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for exchanging comprehensive merchandise information, including product, bill of material, configuration, sales price information and purchase price information, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing information for a comprehensive merchandise view for a product including bill of material, configuration, sales price information and purchase price information that includes a first message package derived from the common business object model and hierarchically organized as:

a merchandise enterprise resource planning (ERP) replication bulk request message entity; and a merchandise ERP replication request message package comprising a merchandise ERP replication request message entity and a merchandise package, the merchandise package comprising a merchandise entity and a receiving store package, where the merchandise entity includes an internal identifier (ID), and where the receiving store package includes at least one receiving store entity, where each receiving store entity includes a store internal ID; and program code for processing the first message according to the hierarchical organization of the first message package, where processing the first message includes unpacking the first message package based on the common business object model; and program code for sending a second message to the heterogeneous application responsive to the first message, where the second message includes a second message package derived from the common business object model to provide consistent semantics with the first message package.

2. The computer readable medium of claim 1, wherein the merchandise package further comprises at least one of the following: a point of sale processing condition package, a description package, a global trade item number package, a quantity unit package, a quantity conversion package, a product category package, a configurable material assignment package, a configuration property valuation package, a measure unit code specific description package, a tax classification package, an empties bill of material package, a material merchandise bill of material package, a procurement price information package, and a sale price information package.

3. The computer readable medium of claim 1, wherein the merchandise entity further includes an action code, a material type code, and a material merchandise type code.

4. A distributed system operating in a landscape of computer systems providing message-based services defined in a service registry, the system comprising:

a graphical user interface comprising computer readable instructions, embedded on tangible media, for exchanging comprehensive merchandise information, including product, bill of material, configuration, sales price information and purchase price information using a request;

a first memory storing a user interface controller for processing the request and involving a message including a message package derived from a common business object model, where the common business object model includes business objects having relationships that enable derivation of message-based service interfaces and message packages, the message package hierarchically organized as:

a merchandise enterprise resource planning (ERP) replication bulk request message entity; and a merchandise ERP replication request message package comprising a merchandise ERP replication request message entity and a merchandise package, the merchandise package comprising a merchandise entity and a receiving store package, where the merchandise entity includes an internal identifier (ID), and where the receiving store package includes at least one receiving store entity, where each receiving store entity includes a store internal ID; and a second memory, remote from the graphical user interface, storing a plurality of message-based service interfaces derived from the common business object model to provide consistent semantics with messages derived from the common business object model, where one of the message-based service interfaces processes the message according to the hierarchical organization of the message package, where processing the message includes unpacking the first message package based on the common business object model.

5. The distributed system of claim 4, wherein the first memory is remote from the graphical user interface.

6. The distributed system of claim 4, wherein the first memory is remote from the second memory.

* * * * *

UNITED STATES PATENT AND TRADEMARK OFFICE
Certificate

Patent No. 8,396,751 B2 Patented: March 12, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Markus Becker, Saalouis (DE); Sascha Theiss, Bad Schoenborn (DE); and Udo Lanzer, Blieskastel (DE).

Signed and Sealed this Sixteenth Day of July 2013.

JEFFREY A. SMITH
*Supervisory Patent Examiner*
Art Unit 3625
Technology Center 3600